US007917647B2

(12) United States Patent
Cooper et al.

(10) Patent No.: US 7,917,647 B2
(45) Date of Patent: Mar. 29, 2011

(54) METHOD AND APPARATUS FOR RATE LIMITING

(75) Inventors: Geoffrey Cooper, Palo Alto, CA (US); Kieran G. Sherlock, Palo Alto, CA (US); Mark Hoy, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 2370 days.

(21) Appl. No.: 10/453,824

(22) Filed: Jun. 2, 2003

(65) Prior Publication Data

US 2004/0042470 A1 Mar. 4, 2004

Related U.S. Application Data

(63) Continuation-in-part of application No. 10/311,109, filed as application No. PCT/US01/19063 on Jun. 14, 2001, now Pat. No. 7,272,646.

(60) Provisional application No. 60/385,252, filed on May 31, 2002, provisional application No. 60/212,126, filed on Jun. 16, 2000.

(51) Int. Cl.

| | |
|---|---|
| ***G06F 15/16*** | (2006.01) |
| ***G06F 15/173*** | (2006.01) |
| ***G06F 11/00*** | (2006.01) |
| ***H06J 3/14*** | (2006.01) |

(52) U.S. Cl. ........ 709/233; 709/224; 709/225; 370/229; 370/230; 370/235

(58) Field of Classification Search .................. 709/233, 709/225, 224, 215; 370/229–235
See application file for complete search history.

(56) References Cited

U.S. PATENT DOCUMENTS

| | | | |
|---|---|---|---|
| 5,262,956 | A | 11/1993 | DeLeeuw |
| 5,557,747 | A | 9/1996 | Rogers et al. |
| 5,679,940 | A | 10/1997 | Templeton et al. |
| 5,701,400 | A | 12/1997 | Amado |
| 5,751,965 | A | 5/1998 | Mayo et al. |
| 5,781,629 | A | 7/1998 | Haber et al. |
| 5,819,226 | A | 10/1998 | Gopinathan et al. |
| 5,825,361 | A | 10/1998 | Rubin et al. |
| 5,867,483 | A | 2/1999 | Ennis, Jr. et al. |

(Continued)

FOREIGN PATENT DOCUMENTS

EP 0782112 A2 7/1997

(Continued)

OTHER PUBLICATIONS

"Workstation NT—Recovery Tips for Windows NT Workstation", [online]. [archived Oct. 12, 1999]. Retrieved from the Internet: <URL: http://web.archive.org/web/19991012224636/http://personal.cfw.com/~tkprit/utils/recovery.html>, (1999), 4 pgs.

(Continued)

*Primary Examiner* — Saleh Najjar
*Assistant Examiner* — Edward J Kim
(74) *Attorney, Agent, or Firm* — Schwegman, Lundberg & Woessener, P.A.

(57) ABSTRACT

A method and apparatus for a network monitor internals mechanism, which serves to translate packet data into multiple concurrent streams of encoded network event data, to contribute to enterprise management, reporting, and global mechanisms for aggregating monitors at a centralized aggregation point, and to facilitate rate limiting techniques because such monitors are not in control (i.e. cannot back pressure flow) is provided.

32 Claims, 60 Drawing Sheets

U.S. PATENT DOCUMENTS

| | | | | |
|---|---|---|---|---|
| 5,870,561 | A | 2/1999 | Jarvis et al. | |
| 5,872,928 | A | 2/1999 | Lewis et al. | |
| 5,887,139 | A | 3/1999 | Madison, Jr. et al. | |
| 5,960,460 | A | 9/1999 | Marasco et al. | |
| 5,978,475 | A | 11/1999 | Schneier et al. | |
| 5,983,270 | A | 11/1999 | Abraham et al. | |
| 5,987,611 | A | 11/1999 | Freund | |
| 5,991,877 | A | 11/1999 | Luckenbaugh | |
| 6,026,397 | A | 2/2000 | Sheppard | |
| 6,049,621 | A | 4/2000 | Jain et al. | |
| 6,058,193 | A | 5/2000 | Cordery et al. | |
| 6,064,304 | A | 5/2000 | Arrowsmith et al. | |
| 6,064,810 | A | 5/2000 | Raad et al. | |
| 6,065,119 | A | 5/2000 | Standford, II et al. | |
| 6,069,563 | A | 5/2000 | Kadner et al. | |
| 6,091,835 | A | 7/2000 | Smithies et al. | |
| 6,108,782 | A | 8/2000 | Fletcher et al. | |
| 6,119,103 | A | 9/2000 | Basch et al. | |
| 6,134,532 | A | 10/2000 | Lazarus et al. | |
| 6,157,707 | A | 12/2000 | Baulier et al. | |
| 6,212,558 | B1 | 4/2001 | Antur et al. | |
| 6,263,349 | B1 | 7/2001 | Anderson | |
| 6,269,447 | B1 | 7/2001 | Maloney et al. | |
| 6,271,845 | B1 | 8/2001 | Richardson | |
| 6,279,037 | B1 | 8/2001 | Tams et al. | |
| 6,301,668 | B1 | 10/2001 | Gleichauf et al. | |
| 6,317,788 | B1 | 11/2001 | Richardson | |
| 6,381,649 | B1 * | 4/2002 | Carlson | 709/235 |
| 6,442,615 | B1 | 8/2002 | Nordenstam et al. | |
| 6,453,345 | B2 | 9/2002 | Trcka et al. | |
| 6,463,470 | B1 | 10/2002 | Mohaban et al. | |
| 6,484,143 | B1 | 11/2002 | Swildens et al. | |
| 6,484,261 | B1 | 11/2002 | Wiegel | |
| 6,499,107 | B1 * | 12/2002 | Gleichauf et al. | 726/23 |
| 6,502,131 | B1 | 12/2002 | Vaid et al. | |
| 6,505,245 | B1 | 1/2003 | North et al. | |
| 6,526,044 | B1 | 2/2003 | Cookmeyer, II et al. | |
| 6,578,077 | B1 | 6/2003 | Rakoshitz et al. | |
| 6,636,873 | B1 | 10/2003 | Carini et al. | |
| 6,651,099 | B1 * | 11/2003 | Dietz et al. | 709/224 |
| 6,665,725 | B1 * | 12/2003 | Dietz et al. | 709/230 |
| 6,704,873 | B1 | 3/2004 | Underwood | |
| 6,711,699 | B1 | 3/2004 | Kanevsky et al. | |
| 6,738,933 | B2 | 5/2004 | Fraenkel et al. | |
| 6,771,646 | B1 | 8/2004 | Sarkissian et al. | |
| 6,789,116 | B1 * | 9/2004 | Sarkissian et al. | 709/224 |
| 6,792,458 | B1 | 9/2004 | Muret et al. | |
| 6,816,973 | B1 | 11/2004 | Gleichauf et al. | |
| 6,839,751 | B1 | 1/2005 | Dietz et al. | |
| 6,901,442 | B1 | 5/2005 | Schwaller et al. | |
| 6,954,789 | B2 * | 10/2005 | Dietz et al. | 709/224 |
| 7,007,301 | B2 | 2/2006 | Croebie et al. | |
| 7,020,697 | B1 | 3/2006 | Goodman et al. | |
| 7,047,423 | B1 | 5/2006 | Maloney et al. | |
| 7,047,564 | B2 * | 5/2006 | Cohen | 726/23 |
| 7,054,930 | B1 * | 5/2006 | Cheriton | 709/226 |
| 7,143,439 | B2 | 11/2006 | Cooper | |
| 7,207,062 | B2 * | 4/2007 | Brustoloni | 726/13 |
| 7,272,646 | B2 | 9/2007 | Cooper | |
| 2001/0054097 | A1 | 12/2001 | Chafe | |
| 2002/0093527 | A1 | 7/2002 | Sherlock et al. | |
| 2002/0108059 | A1 | 8/2002 | Canion et al. | |
| 2002/0188584 | A1 | 12/2002 | Ghannam et al. | |
| 2003/0061506 | A1 | 3/2003 | Cooper et al. | |
| 2003/0208689 | A1 | 11/2003 | De La Garza | |
| 2004/0015579 | A1 | 1/2004 | Cooper | |
| 2004/0039942 | A1 | 2/2004 | Cooper et al. | |
| 2004/0103315 | A1 | 5/2004 | Cooper et al. | |
| 2005/0195964 | A1 | 9/2005 | Hahn et al. | |

FOREIGN PATENT DOCUMENTS

| | | | |
|---|---|---|---|
| EP | 0669032 | B1 | 11/1997 |
| EP | 0849909 | A2 | 6/1998 |
| EP | 0893763 | A1 | 1/1999 |
| EP | 0909074 | A1 | 4/1999 |
| EP | 0961440 | A2 | 12/1999 |
| EP | 1026867 | A2 | 8/2000 |
| EP | 1050833 | A2 | 11/2000 |
| EP | 1143660 | A2 | 10/2001 |
| GB | 2335829 | A | 9/1999 |
| WO | WO-93/11480 | A1 | 6/1993 |
| WO | WO-98/26541 | A1 | 6/1998 |
| WO | WO-99/15950 | A1 | 4/1999 |
| WO | WO-9922492 | A1 | 5/1999 |
| WO | WO-99/67930 | A2 | 12/1999 |
| WO | WO-00/05842 | A1 | 2/2000 |
| WO | WO-00/35130 | A1 | 6/2000 |
| WO | WO-01/99002 | A2 | 12/2001 |
| WO | WO-01/99031 | A2 | 12/2001 |
| WO | WO-01/99343 | A2 | 12/2001 |
| WO | WO-01/99349 | A2 | 12/2001 |
| WO | WO-01/99371 | A2 | 12/2001 |
| WO | WO-01/99373 | A2 | 12/2001 |
| WO | WO-02/071192 | A2 | 9/2002 |

OTHER PUBLICATIONS

Briody, D., "IT Managers Weigh Legal Issues", *InfoWorld 21*, vol. 36, No. 69, (Sep. 6, 1999), 69-70.

Castell, S., "The Legal Admissibilty of Computer Generated Evidence Towards 'Legally Reliable' Information and Communications Technology", *Computer Law and Security Report*, vol. 5, No. 2, (Jul.-Aug. 1989), 2-8.

Chatterjee, B., et al., "Taxonomy for QoS Specifications", *Proceedings, Third International Workshop on Object-Oriented Real-Time Dependable Systems*, (1997), 100-107.

Cockcroft, A., "Observability", *Sun BluePrints tm OnLine*, © 1999 Sun Microsystems, Inc., (Dec. 1999), 21 pgs.

Deri, L., "Effective Traffic Measurement Using nTop", *IEEE Communications Magazine*, (May 2000), 138-143.

Goodwin, B., "Cybercrime—An Inside Job", *Computer Weekly*, vol. 16, (Aug. 31, 2000), 3 pgs.

Guttman, E., "Service Location Protocol: Automatic Discovery of IP Network Services", *IEEE Internet Computing*, (Jul. Aug. 1999), 71-80.

Heaney, J., et al., "Security Model Development Environment", *Fifth Annual Computer Security Applications Conference*, (Dec. 4, 1989-Dec. 8, 1989, Tucson, AZ), (1990), 299-307.

Hosmer, C., et al., "Advancing Crime Scene Computer Forensic Techniques", *Proceedings of the 1998 Investigation and Forensic Science Technologies*, [online]. [archived Jan. 4, 2001]. Retrieved from the Internet: <http://web.archive.org/web/20010104101500/http://www.wetstonetech.com/crime.htm>, (1999), 14 pgs.

Jackson, W., "When It Comes to Web Site Vandalism, Attackers Target Microsoft Software", *Government Computer News*, vol. 19, No. 31, (Oct. 23, 2000), 2 pgs.

Larsen, A. K., "All Eyes on IP Traffic New apps can monitor internet and intranet traffic, but do they deliver enough data to hold ISPs to their promises", *Data Communications*, 26(4), (Mar. 21, 1997), 5 pgs.

Lee, W., ""?": A Context-Sensitive Help System based on Hypertext", *Proceedings of the 24th ACM/IEEE Design Automation Conference*, (1987), 429-435.

Lin, H.-C., et al., "An Algorithm for Automatic Topology Discovery of IP Networks", *IEEE International Conference on Communications (ICC '98)*, vol. 2, (1998), 1192-1196.

Murray, B., "Army Debuts IT Crime Unit", *Government Computer News*, 19(20), (Jul. 20, 2000), 3 pgs.

Santo, B., "'Sherlock Holmes of Software' Bridges Technical and Legal Guff in Cracking IP-Theft Cases-Software Forensics Expert Takes a Byte Out of Crime", *Electronics Engineering Times*, vol. 987, (1998), 3 pgs.

Slabodkin, G., "AF Computer Forensics Lab nabs criminats, byte by byte", *Government News*, 17(25), (Aug. 10, 1998), 2 pgs.

Sommer, P., "Intrusion Detection System as Evidence", *Computer Networks*, 13(23-24), (1999), 2477-2487.

Sommer, P., "Investigating Cyberspace", *Computer Weekly*, (Jan. 27, 2000), 4 pgs.

Tadjer, R., "Safeguard Your IT Assets—You Can Prosecute a Hacker, If You Have the Right Systems in Place", *InternetWeek* No. 767, (May 31, 1999), 3 pgs.

Wright, R., "How to Avoid an Online Breach—The Right Tools to Fight Cybercrime—New Technology Helps E-Business Fight Online Security Breaches", *VARbusiness*, (Nov. 13, 2000), 3 pgs.

* cited by examiner

K RULE VIEW

EXECUTION RUN: 1999-10-01 14:30:20.0 C:\BMP

FINAL RULE NAME: <ANY RULE>

DISPOSITION NAME: <ANY DISPOSITION>

DISPOSITION CODES: ☐ ACCESS DENIED ☐ AUTH VIOLATION ☐ SECURITY ATTACK ☐ SECURITY QOS ☐ POLICY ERROR ☐ OK

DISPOSITION SEVERITY: ☐ CRITICAL ☐ HIGH ☐ MEDIUM ☐ MONITOR ☐ WARNING ☐ INFORMATION ☐ <NONE>

QUERY

| RULE NAME | DISPOSITION NAME | INITIATOR IP | INIT NAME | TARGET IP | TARG NAME | TARG SERVICE |
|---|---|---|---|---|---|---|
| UDP_DENY | UDP_ACCESS_DENIED | 10.5.63.143 | VG-143.SECURIFY.COM | 10.5.63.6 | DUDE.SECURIFY.COM | DOMAIN |
| HTTP_DENY | HTTP_ACCESS_DENIED | 10.5.63.143 | VG-143.SECURIFY.COM | 208.178.27.198 | | HTTP |
| HTTP_DENY | HTTP_ACCESS_DENIED | 10.5.63.143 | VG-143.SECURIFY.COM | 208.178.27.201 | | HTTP |
| HTTP_DENY | HTTP_ACCESS_DENIED | 10.5.63.143 | VG-143.SECURIFY.COM | 208.178.27.198 | | HTTP |
| UDP_DENY | UDP_ACCESS_DENIED | 10.5.63.143 | VG-143.SECURIFY.COM | 10.5.63.6 | DUDE.SECURIFY.COM | DOMAIN |
| UDP_DENY | UDP_ACCESS_DENIED | 10.5.63.143 | VG-143.SECURIFY.COM | 10.5.63.6 | DUDE.SECURIFY.COM | DOMAIN |
| HTTP_DENY | HTTP_ACCESS_DENIED | 10.5.63.143 | VG-143.SECURIFY.COM | 204.71.200.68 | WWW3.YAHOO.COM | HTTP |
| UDP_DENY | UDP_ACCESS_DENIED | 10.5.63.143 | VG-143.SECURIFY.COM | 10.5.63.6 | DUDE.SECURIFY.COM | DOMAIN |
| HTTP_DENY | HTTP_ACCESS_DENIED | 10.5.63.143 | VG-143.SECURIFY.COM | 10.5.63.97 | KABALE.SECURIFY.COM | HTTP |
| TOP_MISSED_CONNECTIONS | WARN_MISSED_TOP_CONNECT | 10.5.63.143 | VG-143.SECURIFY.COM | 10.5.63.24 | FRED.SECURIFY.COM | NETBIOS-SSN |

ROWS 10

DONE | EDIT SQL | COPY ROW | COPY DEEP

*Fig. 9*

SECURIFY

SECURITY CHAIN VERIFICATION SERVICE

PROFILE    LOG OUT    HELP

CONFORMANCE EVENT DETAIL

SERVER TIME: 12.21.00 17:24 PST    SUMMARY

[PRINT VERSION]

HTTP_SERVERS_RESPONSE/UNAUTHORIZED_ACCESS_TO_URL
ACCESS_VIOLATION/CRITICAL

[TODAY ▼]

VIOLATORS (Bar chart showing value 4, with callout: SRCIP: 208.50.51.100 — labels 2302, 2303)
— 2301

SRCIP 12/19/2000 – 12/21/2000

VIEWING: 1-5 OF 5

| DETAIL | ▽ SRCIP | SRCPORT | DSTIP | DSTPORT | PROTID | DATETIME | APPDATA | STATUS | MONITOR |
|---|---|---|---|---|---|---|---|---|---|
| VIEW | 212.210.11.4 | 2135 | 209.143.242.119 | 80 | 6 | 09:36:35AM 12/21/2000 | 209.143.242.119:80/ | 200 | PSS MONITOR |
| VIEW | 208.50.51.100 | 1060 | 209.143.242.118 | 80 | 6 | 08:28:55PM 12/20/2000 | WWW2.SECURIFY.COM/PKLFORM.PHTML | 200 | PSS MONITOR |
| VIEW | 208.50.51.100 | 1062 | 209.143.242.118 | 80 | 6 | 08:29:49PM 12/20/2000 | WWW2.SECURIFY.COM/PKLFORM.PHTML | 200 | PSS MONITOR |
| VIEW | 208.50.51.100 | 1064 | 209.143.242.118 | 80 | 6 | 08:30:15PM 12/20/2000 | WWW2.SECURIFY.COM/PKLFORM.PHTML | 200 | PSS MONITOR |
| VIEW | 208.50.51.100 | 1066 | 209.143.242.118 | 80 | 6 | 08:30:38PM 12/20/2000 | WWW2.SECURIFY.COM/PKLFORM.PHTML | 200 | PSS MONITOR |

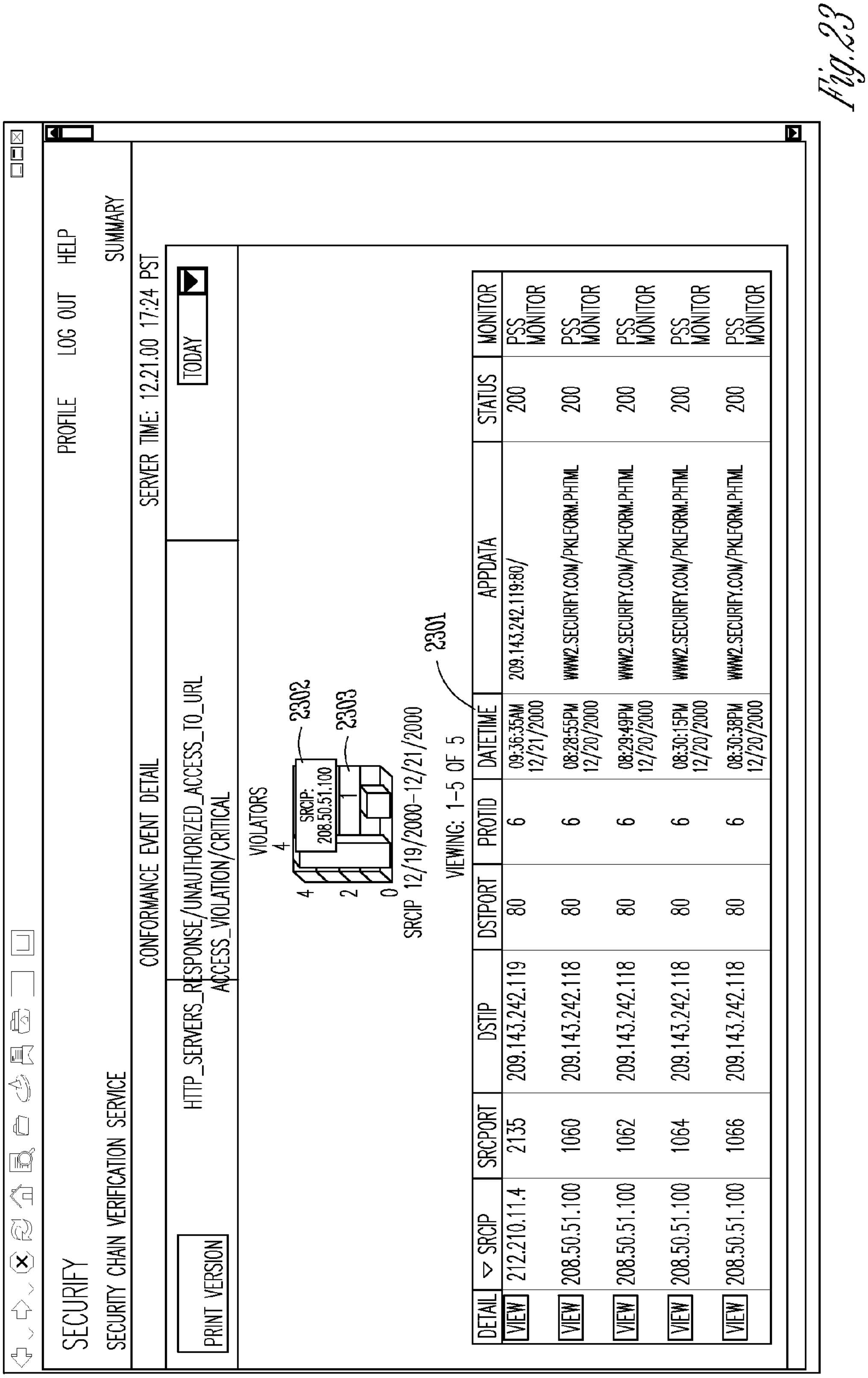

Fig. 23

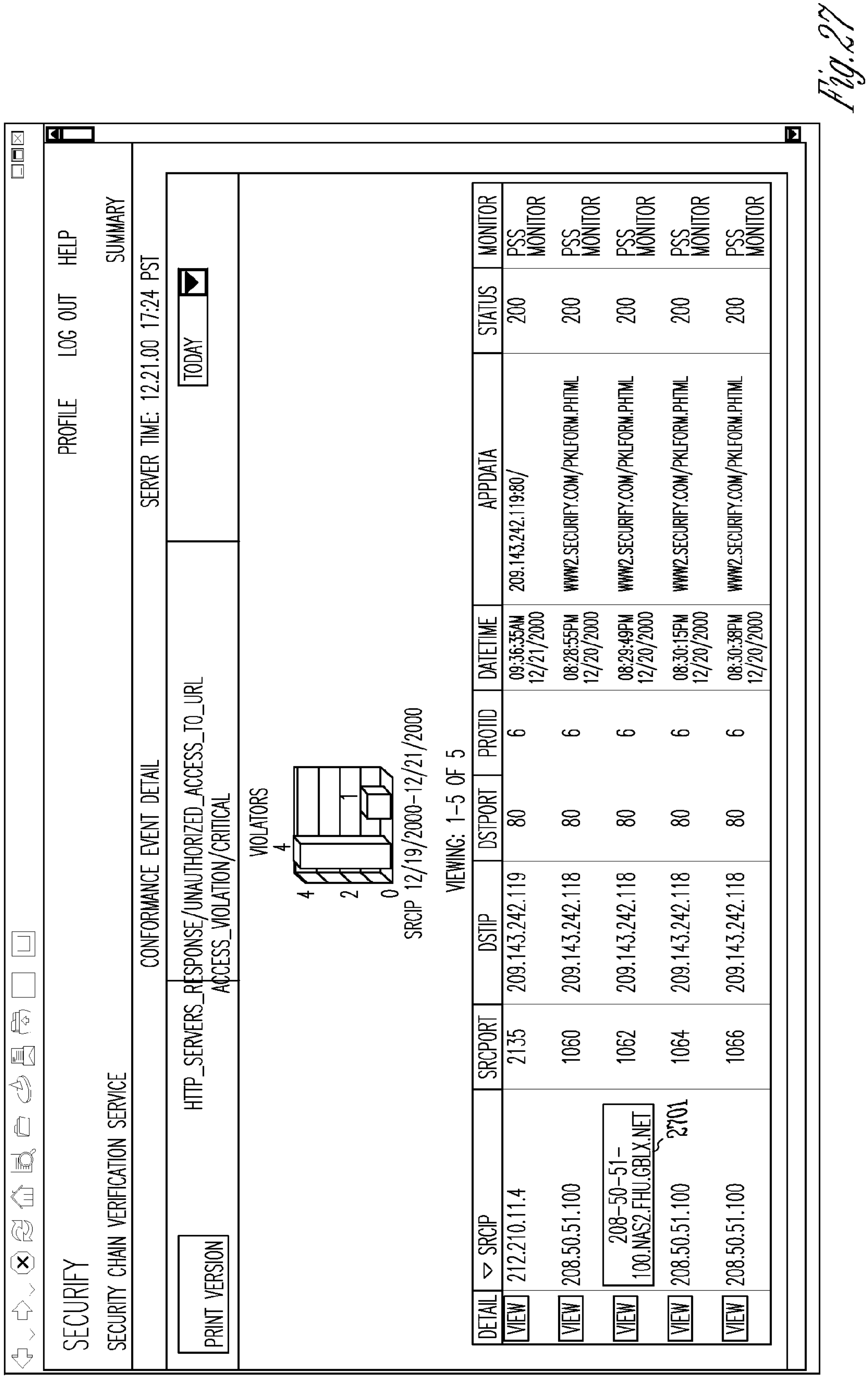

Fig. 27

SECURIFY
SECURITY CHAIN VERIFICATION SERVICE

PROFILE  LOG OUT  HELP

CONFORMANCE EVENT DETAIL

SERVER TIME: 12.21.00 17:24 PST   SUMMARY

HTTP_SERVERS_RESPONSE/UNAUTHORIZED_ACCESS_TO_URL
ACCESS_VIOLATION/CRITICAL

PRINT VERSION    TODAY ▶

SRCIP 12/19/2000–12/21/2000

VIEWING: 1-5 OF 5

| DETAIL | ▽ SRCIP | SRCPORT | DSTIP | DSTPORT | PROTID | DATETIME | APPDATA | STATUS | MONITOR |
|---|---|---|---|---|---|---|---|---|---|
| VIEW | 212.210.11.4 | 2135 | 209.143.242.119 | 80 | 6 | 09:36:35AM 12/21/2000 | 209.143.242.119:80/ | 200 | PSS MONITOR |
| VIEW | 208.50.51.100 | 1060 | 209.143.242.118 | 80 | 6 | 08:28:55PM 12/20/2000 | WWW2.SECURIFY.COM/PKLFORM.PHTML | 200 | PSS MONITOR |
| VIEW | 208.50.51.100 `208-50-51-100.NAS2.FHU.GBLX.NET` 2701 | 1062 | 209.143.242.118 | 80 | 6 | 08:29:49PM 12/20/2000 | WWW2.SECURIFY.COM/PKLFORM.PHTML | 200 | PSS MONITOR |
| VIEW | 208.50.51.100 | 1064 | 209.143.242.118 | 80 | 6 | 08:30:15PM 12/20/2000 | WWW2.SECURIFY.COM/PKLFORM.PHTML | 200 | PSS MONITOR |
| VIEW | 208.50.51.100 | 1066 | 209.143.242.118 | 80 | 6 | 08:30:38PM 12/20/2000 | WWW2.SECURIFY.COM/PKLFORM.PHTML | 200 | PSS MONITOR |

SECURIFY

ADVANCED SEARCH  ☒ CLOSE
FILTER BY ONE OR ALL OF THE FOLLOWING:

PROTOCOL [NONE ▼] — 3101
RULE [NONE ▼] — 3102
OR [_____] — 3104
(REGULAR EXPRESSION IN RULE)

DISPOSITION [NONE ▼] — 3103
OR [_____] — 3105
(REGULAR EXPRESSION IN DISPOSITION)

SOURCE IP [_____] — 3106
TARGET IP [_____] — 3106
TARGET PORT [_____]

MONITOR(S)
ALL_MONITORS
INTRANET_LOCAL_MONITOR
INTRANET_MONITOR
PARTNER_A_MONITOR

[SUBMIT]

~3100

(UP TO 8 NIC CARDS AND UP TO 8 HARVESTERS CAN CONNECT TO A SPFM DEVICE, (SEE SPFM.TXT FOR DETAILS).)

METHOD AND APPARATUS FOR RATE LIMITING

CROSS-REFERENCE TO RELATED APPLICATIONS

This application claims priority to U.S. Provisional Patent Application Ser. No. 60/385,252, filed May 31, 2002; and is a Continuation-in-part of U.S. patent application Ser. No. 10/311,109, filed Jun. 10, 2003, now U.S. Pat. No. 7,272,646 which is a national filing of International Patent Application No. PCT/US01/19063 filed Jun. 14, 2001, which claims priority to U.S. Provisional Patent Application Ser. No. 60/212,126 filed Jun. 16, 2000.

BACKGROUND OF THE INVENTION

1. Technical Field

The invention relates generally to network security. More particularly, the invention relates to a method and apparatus for efficiently monitoring and subsequent handling of network data.

2. Description of the Prior Art

Networked information systems are an essential part of many organizations. Critical systems, services, and information resources all require protection that depends on effective orchestration of a variety of factors: network architecture, security products, site security, administrative procedures, end user responsibility, and more. A network security policy is an explicit plan of how to accomplish this multi-faceted protection, what objectives the plans should meet, and what assets are being protected.

To manage a network, an end user needs to know and understand what is happening on the network. Most security holes come from unexpected, misconfigured, or unauthorized services, for example, from a high-port telnet, a new service added in, a rogue server, and/or a misconfigured workstation. The end user does not know what is the unauthorized network traffic.

Security administrators need tools to help them formulate site security policy and to translate the policy into monitoring and enforcement mechanisms. They need to be sure that the computer enforced policy—often cobbled together from a plethora of disjoint access control mechanisms—matches their enterprise policy, all too often specified in a loose natural language or a set of unwritten principles. This leads to confusion as to why access is being granted or denied to particular resources and may lead to unintentional breaches of security.

In addition to monitoring network system traffic, it is important for network analysts to assess their network's configuration. A discussion on current techniques for network assessment follows below.

A conventional network assessment visit determines the customer network using the following information:

1) Network security scanning technology, e.g. port or vulnerability scans;
2) Customer interviews;
3) Inspection of customer log files, perhaps using machine aggregation and filtering; and
4) Occasionally, inspection of customer log files and network traffic.

As a matter of practicality, the information is typically derived from the first three of these items. Customer log files and network traffic is of a volume so great that it is impractical to examine it in a short assessment visit.

The weaknesses such conventional methods are as follows:

Vulnerability Scans

Network vulnerability scanners only detect certain types of known vulnerabilities. Such vulnerabilities are generally not detected directly, but are inferred based on host responses to a series of network packets sent to hosts by the scanner. This process does not directly ensure that data traffic on the subject network matches expectations, either explicit or implicit.

Network vulnerability scanners cannot see a host if it does not respond to packets. A host that is only a source of network packets, such as, for example, a rogue router, is not visible to a scanner. Hosts which are turned off or otherwise temporarily disconnected, such as, for example, workstations and laptops, are often missed by vulnerability scanners. This problem is compounded by the fact that scans are often scheduled for non-work hours in order to alleviate customer fears that the scans will somehow impact production systems and organizational mission.

Network scanners typically return a large volume of vulnerability information, based on all possible configured elements in a network. The scanner tools cannot currently interpret those vulnerabilities in light of business requirements which the subject systems are intended to support, or even for the specific network architecture of which those systems are a part. The scan results must be reviewed manually by a security analyst, who applies a knowledge of the business requirements and network architecture to an interpretation of those results. Such manual process is error-prone because the volume is so great that problems may be overlooked.

Another problem is that the scan derives only vulnerabilities, not network usage patterns. Therefore, the scan cannot detect security problems that are attributable to human behavior, but only those scans that result from misconfigured systems and/or systems which have documented design problems.

Network scanners cannot diagnose incorrect client usage of software. For example, network scanners cannot detect whether web servers are being used with invalid ciphersuites, whether 40-bit browsers are in use, and whether a given telnet port is accessed only by a management station.

Network scanners must be targeted to particular subnets. If a customer has forgotten to mention a subnet, the scanner does not notice it.

Customer Interviews

Customers may not provide the network analyst complete or accurate information, either because the customer forgot details, because the information is not known to the customer, or because the customer does not understand the importance of giving the information to the analyst.

Customer interviews at best can provide descriptions of overt usage of subject systems, and generally not covert usage. Often, formal policies of the organization are not even documented, much less promulgated, audited and enforced.

Hidden agendas, office politics, and other factors also can affect the success of the interview process.

Host Inspection

Inspecting host configuration files is a time consuming, manual process that is subject to human error. In the assessment of any large network, it is impractical to include an inspection of the configurations for more than a few critical systems.

Once again, inspection of host configurations does not reveal completely intended usage of the subject systems. The configurations must be analyzed within the context of the business requirements and overall security environment of the organization. This manual process is very human dependent and prone to error.

Log File Inspection

Log file inspection can provide great insight into the workings of network components. Machine-based aggregation and filtering systems can speed this process. However, logs provide only a components' own view of its status. If a component is misconfigured, the log data from the component cannot be trusted. Log data may also be subject to modification by an attacker who has penetrated the machine and is seeking to mask his presence.

In addition, because log aggregation systems work in cooperation with the components that generate the information, they require configuration changes to every component that they examine. Also, they are unable to detect when a component is added to the system.

Back Pressuring

A conventional pipelined system uses flow-control between the stages of the pipeline. Consider stage N, putting data into a queue for stage N+1. When stage N generates data faster than N+1, the queue will fill. This prevents stage N from inserting new data into the pipeline. Stage N waits until stage N+1 is ready to accept more data. The process of each stage causing its predecessor to slow down is called "back-pressuring".

In a passive network monitoring device, back-pressuring is not possible, because the data that feeds the pipeline is not controlled by the network monitor. Were a monitoring system to use back-pressuring, it would have no recourse but to drop input data from the network interface when too much data is received.

Such techniques of performing network assessments generally are limited in their ability to determine actual security threats to information systems. Generally, they represent the state of the art and are indicative of best practices within the security community today.

It would be advantageous to provide a method and apparatus for harnessing the traffic across networks in such a way as to also expand the environment from which to gather traffic, and to further provide a method and apparatus for accessing and hence viewing such greater volumes of data in a meaningful way.

It would further be advantageous to provide a method and apparatus for controlling great volumes of data in a smooth and reliable fashion.

SUMMARY OF THE INVENTION

A method and apparatus for a network monitor internals mechanism, which serves to translate packet data into multiple concurrent streams of encoded network event data, to contribute to enterprise management, reporting, and global mechanisms for aggregating monitors at a centralized aggregation point, and to facilitate rate limiting techniques because such monitors are not in control (i.e. cannot back pressure flow) is provided.

Rate limiting is the process of selectively dropping data at various stages of a pipelined system, so as to prevent back pressuring. Rate limiting is applied at each stage so that data is dropped in a heuristic manner that is appropriate to this stage of the pipeline. The heuristic is chosen so that the data discarded causes the least impact on the monitoring result. For example: packets may be dropped based on connection boundaries, rather than randomly; event details may be dropped, but counts of the events maintained; event information may be abstracted by counting and combining like events over a time interval.

BRIEF DESCRIPTION OF THE DRAWINGS

FIG. 9 is an example of a query tool dialog box according to the invention;

FIG. 23 shows an example of a conformance event details page according to the invention;

FIG. 27 shows an example of a conformance event details page containing a pop up description according to the invention;

DETAILED DESCRIPTION OF THE INVENTION

Network Monitor Internals Description

Figure 1A:
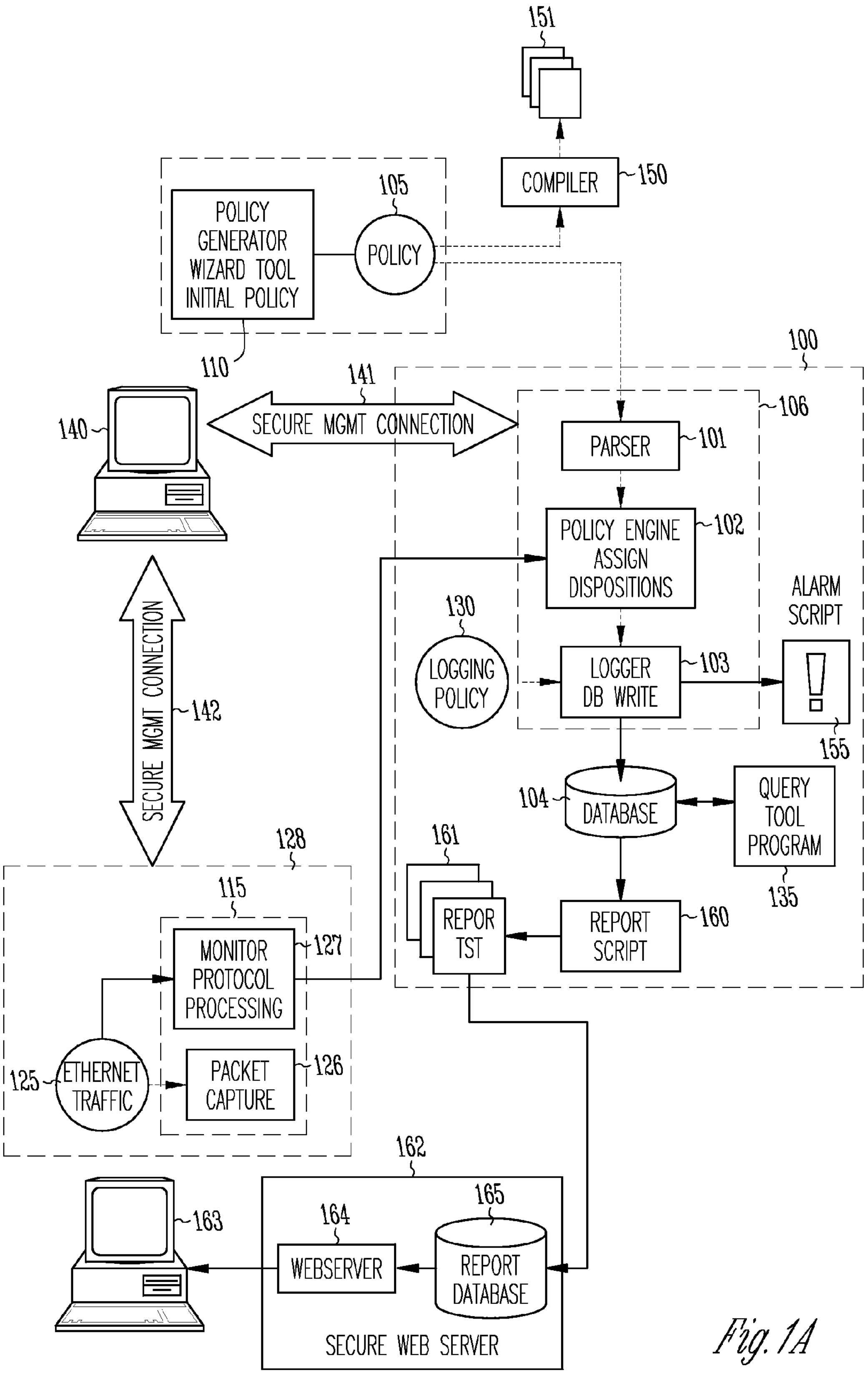
FIG. 1*a* is a schematic diagram of components of the system according to the invention.

A method and apparatus for a network monitor internals mechanism that serves to translate packet data into multiple concurrent streams of encoded network event data is provided. The data translation is accomplished by interpreting both sides of each protocol transaction.

The invention is a component of a network security policy monitoring system and method that comprises supportive features, algorithms, and tools. The monitoring system is ideally suited for network and security assessments or long-term monitoring where real network traffic is analyzed to identify abnormal traffic patterns, system vulnerabilities, and incorrect configuration of computer systems on the network. The monitoring system listens on a network, logs events, and takes action, all in accordance with a rule based system-wide policy. The monitoring system provides a technique that is able to incorporate external sources of event information, such as are generated in log files of other network components. The inventive technique of the monitoring system gets protocol information, which can make it more meaningful to a network administrator. It sends data upstream to an event log and interprets the data. It listens to secure protocols and can identify encryption quality of service parameters. It extracts basic security parameters, such as, for example, network events, and passes them to a policy manager component.

An important part of understanding the invention is understanding network security terminology for policy monitoring. See Table A below.

TABLE A

| Terminology |
|---|
| Network Event: One complete transaction on the network, such as a FTP connection or a HTTPS transaction. Each network event has several component protocol events. |
| Protocol Event: A transaction at one protocol level. For example, a network event that represents an FTP connection has protocol events representing an IP association, a TCP connection, an FTP control connection, and several FTP control commands. |
| Initiator, Target: The endpoints of a network event or protocol event. |
| Credential: An identification of the initiator or target of a protocol event at a particular protocol level. For lower-level protocols, credentials are, for example, IP addresses or UDP port numbers. For higher level protocols, credentials are, for example, user names, file names, or public key certificates. |
| Association: A placeholder for a transaction run over a datagram-based protocol such as IP, ICMP or UDP. The invention herein constructs an association to collect a conversation between two hosts, or processes in the case of UDP. It is noted that when the invention misses any data packets between |

TABLE A-continued

| Terminology |
|---|
| the two communicating computers, it might not be able to determine the initiator and the target of the association. |
| Associative array: A list of value pairs where each associative array entry is indexed by the first element of its value pair, which is called the key. Keys are stored in a hash table to make lookups efficient irrespective of the size of the associative array. |
| Rule: A policy rule governs a specific interaction, or set of interactions, between two communicating entities. The invention evaluates policy rules against protocol events to determine if the latter conform to the active security policy. |
| Disposition: The policy definition of what action or state change needs to take place in response to a network event. |
| Policy Domain: A top level segmentation of a network, roughly akin to a cloud-like object in a network diagram, which hides internal detail. Within the policy domain communities of hosts provide or access services. One community of hosts defines the limits of the domain. |
| Monitoring Point: A point within a policy domain where it will be possible to plug a machine into the network in order to collect packet data. |
| Communities of Hosts: A mechanism for grouping hosts that have a similar function, e.g. all web servers or all NT workstations. |
| Perimeter Element: A hardware device that allows access to and from communities of hosts outside a policy domain. Examples of perimeter elements are firewalls and routers. |
| Policy Language: A policy language is used to create a formal specification of a network security policy. The preferred embodiment of the invention incorporates the policy definition language of U.S. patent application number 09/479,781, filed Jan. 07, 2000, entitled, "A Declarative Language for Specifying A Security Policy." It defines first class objects such as rules, credentials and dispositions. It is based on s-expressions, which are LISP-like parenthesized expressions. |
| Rogue server: A machine introduced to a network that is not authorized to be on that network. |
| Rogue router: An unauthorized router that is added to a network, providing an alternate path into the network. Typically occurs through misconfiguration of switches or dialup connections. |
| Real-time monitoring: Reading packet data off a network and processing it to events in a stream, so that an event appearing in the network causes a corresponding event in the stream a short time later. |
| DLL: Any kind of a dynamically linked library |

System Overview

The preferred embodiment of the invention translates traffic on the network into protocol events that are themselves combined into network events. As protocol events are detected, they are compared against a policy. The policy specifies a disposition of the network event, as defined by the observed series of protocol events. Information about the protocol events, the network event and its disposition is stored in a database. This database of network traffic information can be mined for policy violations.

This preferred embodiment of the invention is described with reference to FIG. 1*a*. FIG. 1*a* is a schematic diagram of components of the system according to the invention. The system comprises a policy monitoring component 100 that takes as input a policy file 105 that has been generated using a policy generator wizard 110 or other means, and a file containing network packet dump data 115 that has been collected from an observed network 125 by a packet capture 126, or that has been processed by a protocol monitor processor 127. The system can also process packet event data from the observed network 125 in a continuous real-time mode, without first storing packet data to a file.

The policy monitoring component 100 comprises a policy manager component 106 that itself comprises a parser 101 for parsing the policy file 105, a policy engine for 102 for assigning policy dispositions to network events, and a logger 103 for determining how to log the information processed by the policy engine 102, according to an input logging policy 130. It also comprises a database 104 for storing synthesized information of the packet dump's 115 conformance to the specified policy 105 performed by the policy engine 102, where it can be mined with a query tool 135. It also comprises a report script component 160 for querying the database 104 and creating reports 161, and an alarm script component 155, for generating alarms based on the severity of the disposition assigned to network events.

An equally preferred embodiment of the invention also comprises a parser tool 150 that takes the policy specification file 105 as input and automatically generates an English description of the policy 151 for the end user. The parser tool 150 is optional.

An equally preferred embodiment of the invention also provides a secure Web server feature 162 for the end user to review reports from the end user's host computer 163. The secure Web server feature 162 comprises the Web server 164 and a report database 165 that hosts the reports 161 generated using the report script 160. The Web server feature 162 is optional.

An equally preferred embodiment of the invention provides secure management connections (141,142) and a secure management host 140 for managing the policy monitoring component 100 and the combination of the network monitoring components 128, respectively.

Figure 1B:
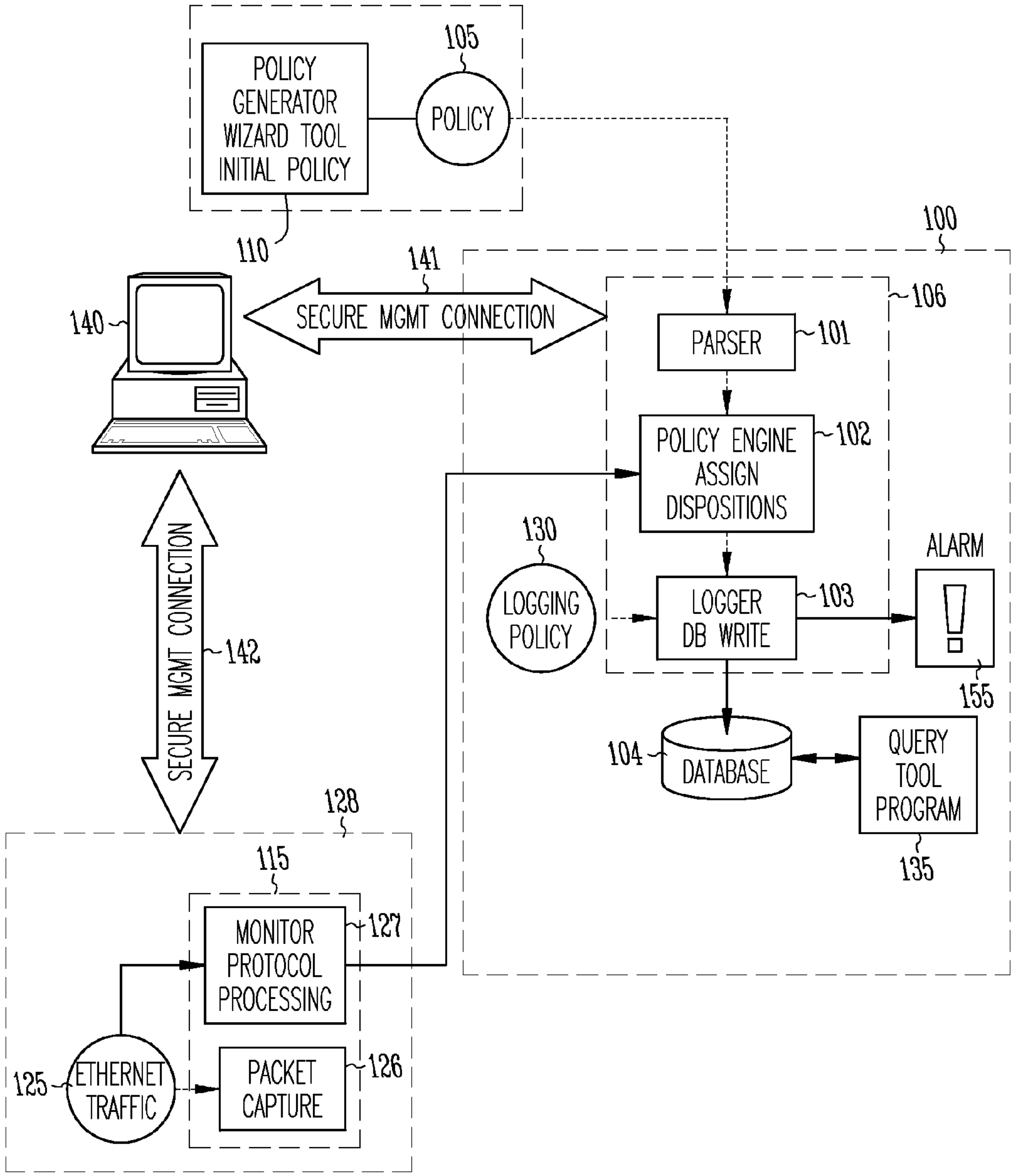
FIG. 1*b* is a schematic diagram of components of the system according to the invention.

FIG. 1*b* shows a simpler embodiment of the invention, wherein the parser tool 150 and the secure Web server feature 162 are omitted.

The default action of the policy engine 102 is that it denies all traffic. The policy 105 opens holes in this denial to allow permitted traffic to flow. Although the policy engine 102 assigns a single disposition to an entire network event, the protocol events are significant. As network data 115 arrives, the policy engine 102 interprets protocols and generates updates of protocol event information. The policy 105 is consulted as each new piece of information arrives, so that the earliest determination of disposition is reached. For example, if the policy 105 states that a given IP address may not communicate with another IP address, the policy 105 can generate a disposition immediately upon receiving the first packet 115 of the network event.

To aid policies in early determination of disposition, the policy language divides dispositions into immediate and final. An immediate disposition fires immediately, i.e. its value becomes associated with the network event right away. A final disposition sets a bookmark to itself as the latest and best disposition. When all protocol events are processed without an immediate disposition, the last bookmark set is the disposition that is applied to that network event. Immediate dispositions are designed to generate early results and to allow policy writers to issue a definitive disposition for the network event based on the information received up to that point. Final dispositions allow for the possibility that a better disposition might be determined later on. In other words, they allow the policy engine 102 to make a more informed decision based on additional protocol events that might be received as the network event progresses.

Overview of the Components

An overview of main components of the preferred embodiment of the invention is discussed below with reference to FIG. 1.

Policy Generator

The preferred embodiment of the policy generator component 110, also referred to as policy wizard, is a program that makes an end user readily able to generate a first-pass policy for a new site. Policy information is input into a set of dialog boxes and a policy is generated. The wizard enables the end user to generate policy based on what can be considered gross characteristics of a network at the IP level, such as, for example, policy domains, communities of hosts, servers, subnets and firewalls, as well as at the UDP/TCP service level. For example, such network characteristics can comprise communities of hosts that can access certain services on server hosts.

Once a policy has been generated with the wizard, it is output in the policy specification language 105 so that it may be directly processed by the policy monitor component 100. The policy wizard 110 is also able to save files at the wizard level, i.e. such that the policy may be refined in the wizard and re-generated.

Policy Monitor

The policy monitoring component 100 comprises a suitable user interface, such as an MFC-based front end or a command line interface, and the policy manager 106. The policy manager 106 performs the actual examination of a sequence of event updates stored in a file or transmitted in a continuous stream 115 in the context of a policy specification 105 and signals the adherence to the policy via records written to the database 104.

Network Monitor

The network monitor component 127 provides the following capabilities:

- Streams-based interpretation of packet dump data 126 in, for example, DMP format; and
- Packet- and connection-based textual logging of protocol information. Logging is selectable by protocol and may be enabled only for one or more connections. In another embodiment of the invention, the network monitor 127 can perform serialization of event data. That is, the network monitor 106 can process a packet capture file 126 into a series of event updates that contain only the salient security details for processing by the policy monitor 100. The resulting file is significantly smaller than the original, for example, approximately $\frac{1}{20}^{th}$ to $\frac{1}{100}^{th}$ the size of the original. It is also possible for sensitive data, such as passwords and documents, to be removed from the file. However, it should be appreciated that the original packet capture file is needed to perform full analysis.

In another embodiment of the invention, the network monitor 127 can read packet data directly from observed network 125, generating a continuous stream of event updates for the policy monitor 100. This stream operates in real-time so that the policy monitor 100 processes events shortly after they happen on observed network 125.

It should be noted that the network monitor 127 can be used as a standalone tool, but typically is invoked from within the policy monitor component 100 and the query tool 135 in normal operation of the invention.

It should also be noted that the network monitor and the policy monitor may run on the same machine.

For a more detailed discussion on the internals of the network monitor, refer to the section, below entitled "Network Monitor Internals Descriptions."

Query Tool

The query tool 135 allows the end user to view the data that has been stored in the database 104 by the policy manager 106.

Policy Compiler

The policy compiler performs syntactic and semantic checking of a policy specification. Upon successful compilation the compiler as controlled by runtime arguments, may:

- Generate a DLL containing a compilation of credential and condition verification code; and
- Generate a pseudo-english report that summarizes the policy.

It should be appreciated that it is not necessary to run the compiler because the policy monitor component automatically compiles and installs policy from the policy specification file.

Platform

The policy generator 110 runs on a Windows NT or Unix machine, while the policy monitor 100 and the network monitor 127 run on Linux machine(s). It should be appreciated that these components can run equally well on other suitable operating systems. In addition to policy and network monitoring software, the following software components are also installed on the appropriate machines:

- Microsoft Visual C++ 6.0;
- Sybase ASE 11.9.2; and
- NT NDIS packet drivers and Windump 2.0.

It should be appreciated that these components can run equally well on other compilers, databases, and packet monitoring systems.

Policy Files

There are two file types that are used within the invention's environment, and are described below in Table B.

TABLE B

| File Type | Suffix | Description |
|---|---|---|
| Policy wizard File | .spw | Intermediate file used by the policy wizard to store policy information between invocations. |
| Policy monitor File | .spm | Output file generated by the policy wizard and used as the policy input into the policy monitor. Contains a description of the policy in the policy language. |

The preferred embodiment of the invention incorporates a high level workflow method for developing policy, as follows:

1) Creating an initial policy using the policy generator tool;
2) Uploading the policy file to a remote machine;
3) During the initial policy development phase, running the network monitor to collect traffic, and the policy monitor to analyze traffic separately, as follows:
   a) Running the network monitor and specifying an output file of the collected traffic, and possibly specifying via parameter a limit to the number of packets captured, e.g. 50,000;
   b) Running the policy monitor to analyze traffic collected by specifying the file containing the collected traffic;
4) Examining the output of the policy monitor run by querying the database using the query tool;
5) Modifying the policy as needed using the policy generator tool; and
6) Repeating steps 2 through 5 until a comprehensive desired policy is defined. At this point the end user may start monitoring network traffic on a continuous basis, and using generated reports as input for further policy refinement.

High Level Workflow Example

The high level workflow described above can be illustrated further by understanding an example, as follows. System components of the invention are referenced using FIG. 1.

Screen interactions are described with reference to the preferred embodiment of the invention. Other screen displays with similar function might equally well embody the invention.

Figure 2:
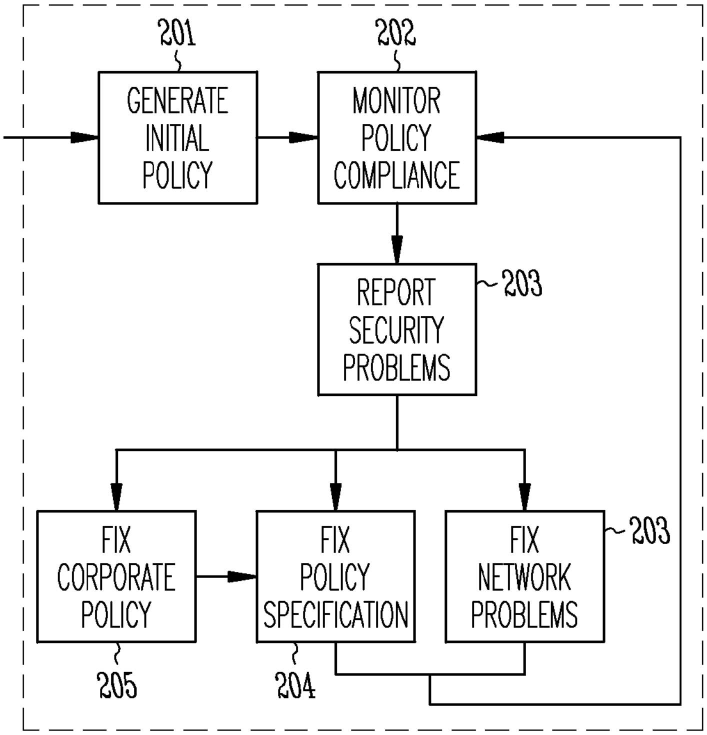
FIG. 2 is a high level workflow flow diagram according to the invention.

Referring to FIG. 2, an initial policy is generated (201). Often the initial policy is created from corporate network policy, in whatever form that may take, and a network topology diagram. For the sake of this example, it is assumed that the policy wizard 110 was used to generate an initial, simple policy 105.

Next, compliance of current network traffic to this initial policy is monitored (202). Such monitoring is achieved by collecting packet information off the network and running such data 115 against the initial policy 105 using the policy monitor 100.

Then the query tool 135 is used to data-mine output network event data from the database 104, using the mined data to check for traffic that is not consistent with the policy 105, and reporting the results (203).

Once anomalies have been found, the next step is to work out where the problem lies. The problem could be network equipment is misconfigured and needs to be corrected (203); otherwise acceptable behavior is not covered currently by the policy specification file the file needs to be corrected (204); or, otherwise acceptable behavior is not covered currently by the corporate policy and the corporate policy needs to be corrected (205). In the case of this example, it is assumed that the policy specification 105 is incomplete and an end user needs to add a new rule to permit the observed traffic pattern.

Generate a Policy Specification File From a Wizard Policy

Figure 3:
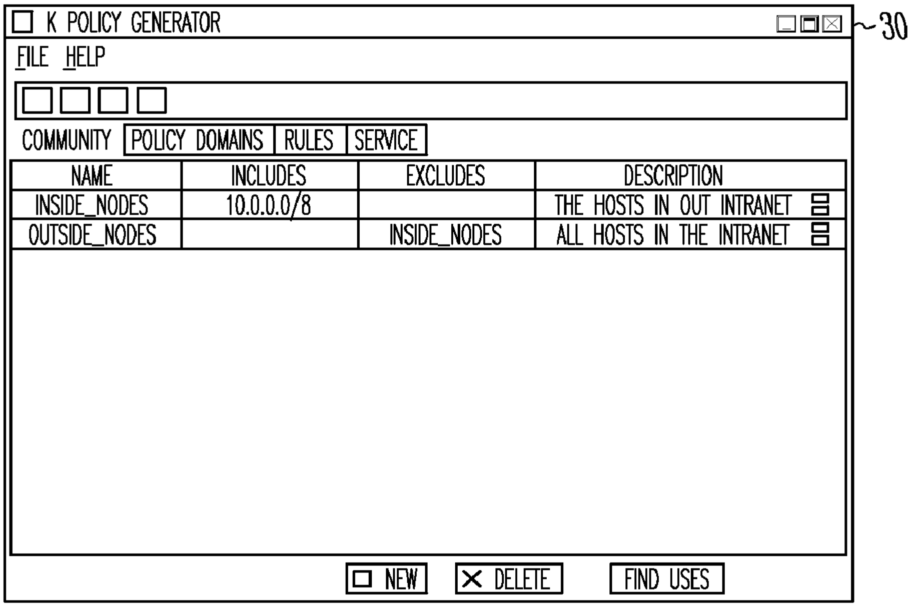
FIG. 3 is an example of a policy wizard dialog box according to the invention.

The end user starts the policy generator tool, or wizard 110, by double clicking on a policy wizard shortcut on the end user's desktop. In the preferred embodiment, a window such as depicted in FIG. 3 opens.

In this example, the end user has opened a file, c:\spm\quickstart\null.spw, through the File->Open menu item 301. This file contains a very simple policy that defines a single policy domain defined by a 10.0.0.0/8 subnet mask. Rules within this policy deny essentially all traffic.

The end user chooses to compile the policy, whereby the dialog box in FIG. 4 opens. The end user presses the "Process Policy" button 401 and a file named null.spm in the output file entry field 402 is generated and saved.

Figure 4A:
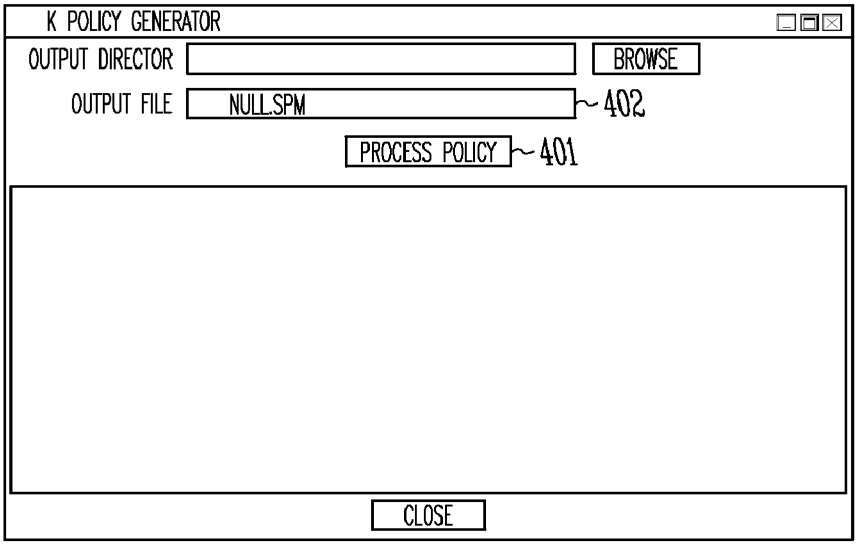
FIG. 4*a* is an example of a policy wizard dialog box according to the invention.
Figure 4B:
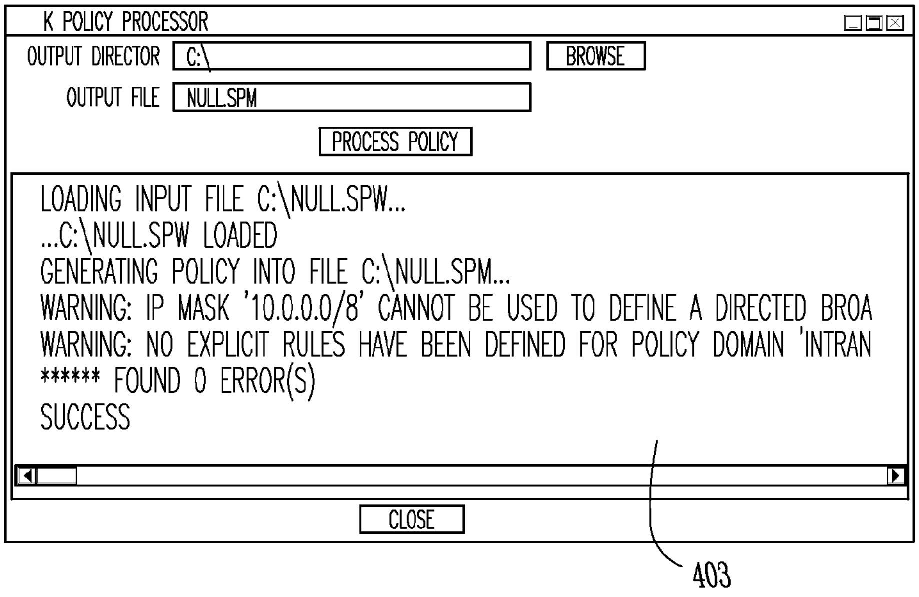
FIG. 4*b* is an example of a policy wizard dialog box according to the invention.

FIG. 4*b* shows the dialog box in FIG. 4*a* with printed results from the compile process in a text window 403.

File Running Policy Monitor Over Canned Data

Figure 5:
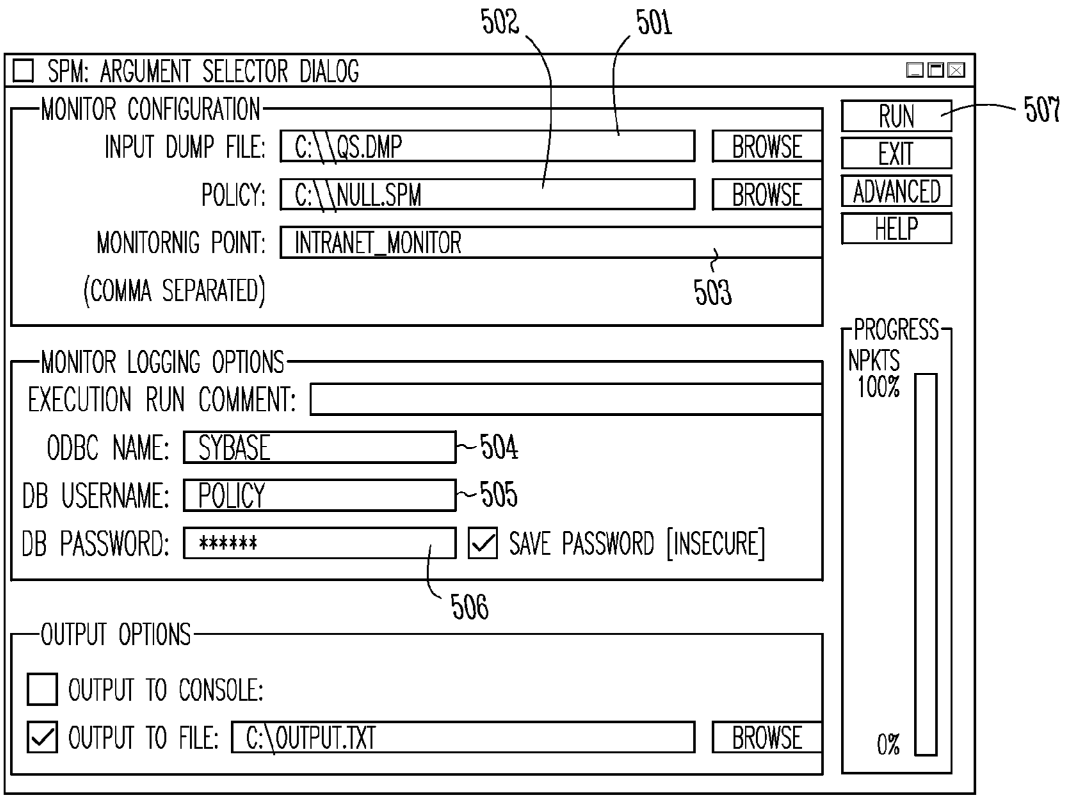
FIG. 5 is an example of a policy monitor dialog box according to the invention.

The end user starts the policy monitor 100 by double clicking on a policy monitor shortcut on the desktop. In the preferred embodiment, a window such as depicted in FIG. 5 opens.

The end user ensures that the "Input Dump File" entry field 501 points to a data dump file, here qs.dmp, and that the "Policy" entry field 502 points to the null.spm (monitor) file that the end user generated above. The "Monitoring Point" entry field 503 is derived from a policy domain name "Intranet" that is present in the null.spw (wizard) file.

The end user ensures database connectivity information is set correctly. The ODBC entry field 504 with entry "sybase" points to a Sybase database running on a local machine. The username "policy" 505 with some password, shown as "****" 506** have been preinstalled.

The end user presses the Run button 507 and the .dmp file is processed through the policy specification file 105 placing the output data into the database 104.

Look at the Results Using Query Tool

Figure 6:
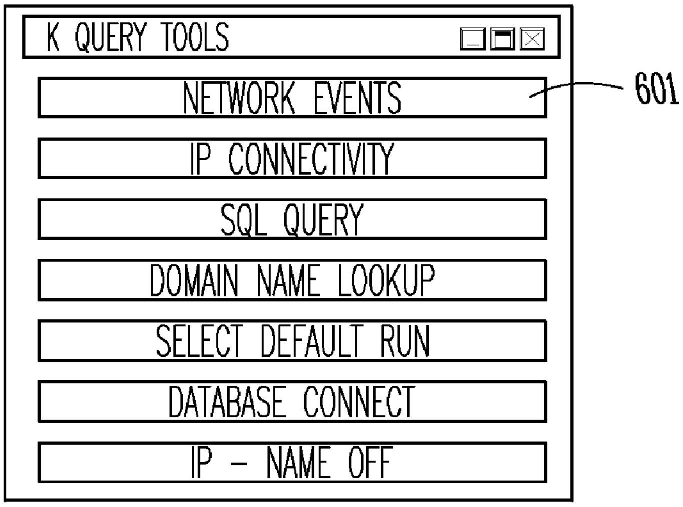
FIG. 6 is an example of a query tool dialog box according to the invention.

The end user starts the query tool 135 by double clicking on a query tool shortcut on the desktop. In the preferred embodiment, a window such as depicted in FIG. 6 opens.

Figure 7:
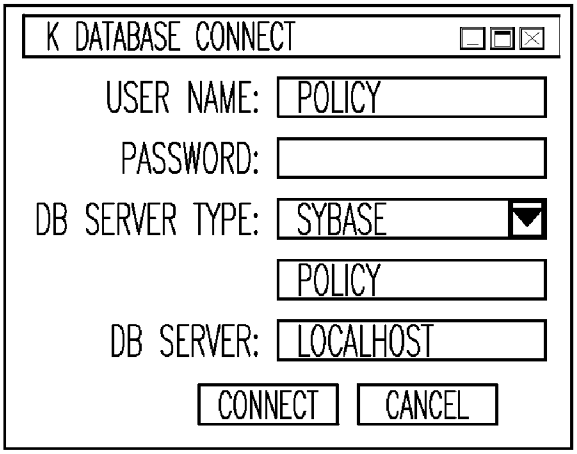
FIG. 7 is an example of a query tool dialog box according to the invention.

The end user presses a "Network Events" button 601 and the dialog box depicted in FIG. 7 appears. FIG. 7 is a dialog box that allows the end user to enter login information for the database 104.

Here, the end user enters the same username and password as was used in policy monitor 100 and connects to a database 104 named Policy on localhost.

Figure 8:
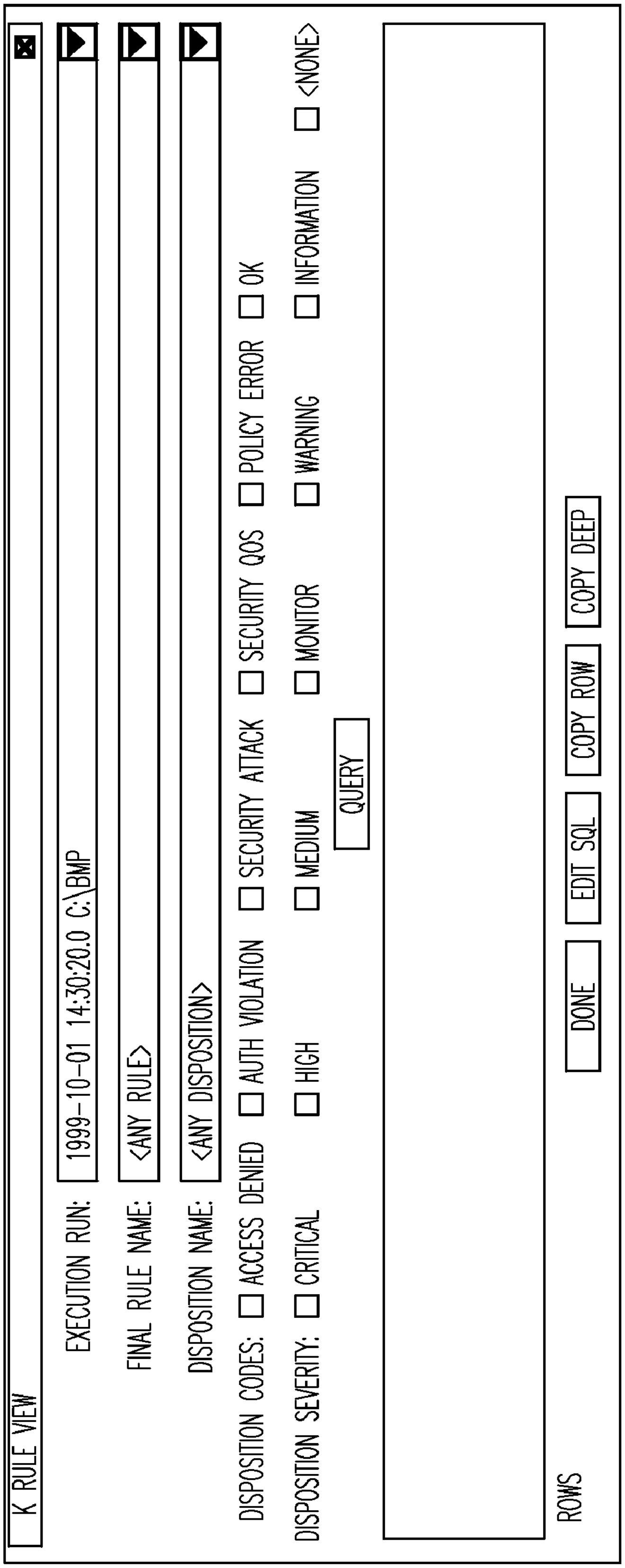
FIG. 8 is an example of a query tool dialog box according to the invention.

When connected, the screen shown in FIG. 8 appears. FIG. 8 is a dialog box that allows the user to select which processed network data to view from database 104. The topmost entry in the "Execution Run" pull-down contains most recent data was added to the database 104. In this case it is current processing of the qs.dmp file. The end user presses the "Query" button and network event information for this run is retrieved from the database 104 and shown in as in FIG. 9.

FIG. 9 shows a queried rule view dialog box according to the preferred embodiment of the invention. FIG. 9 shows that the null.spw policy has denied all traffic. The network events having disposition Udp_Access_Denied represent DNS lookups from an internal host (10.5.63.143) to another internal host (10.5.63.6). It is assumed for this example that this is traffic conforming to policy, and therefore the end user adds a rule to the policy to permit this event.

Add a New Rule Using The Wizard

Figure 10A:
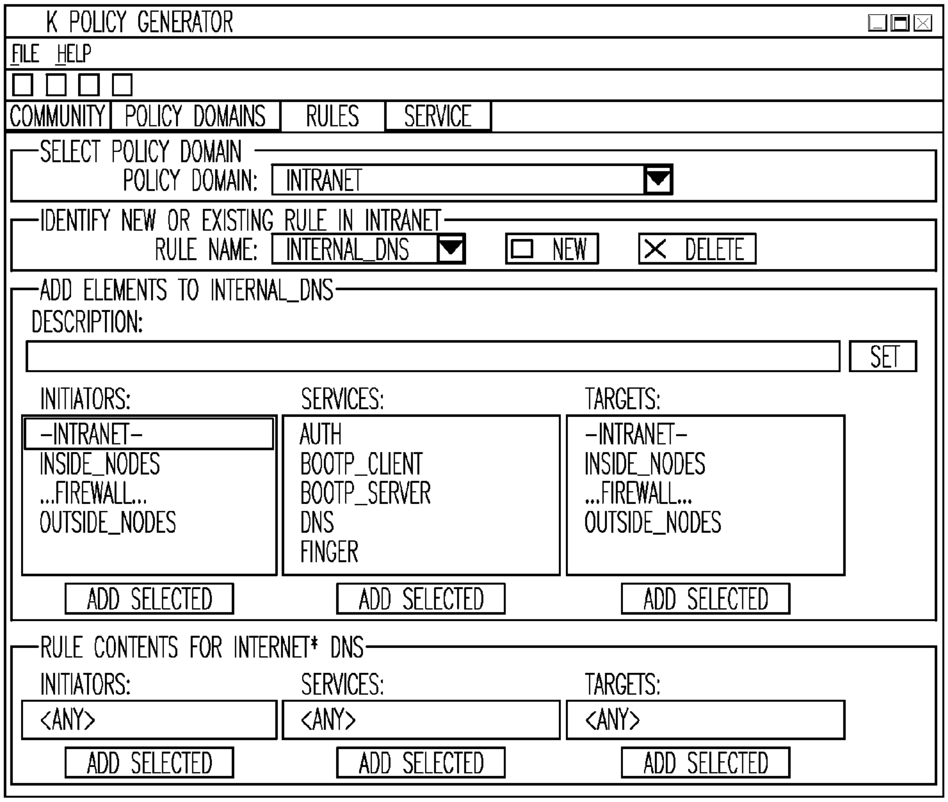
FIG. 10*a* is an example of a policy wizard dialog box according to the invention.
Figure 10B:
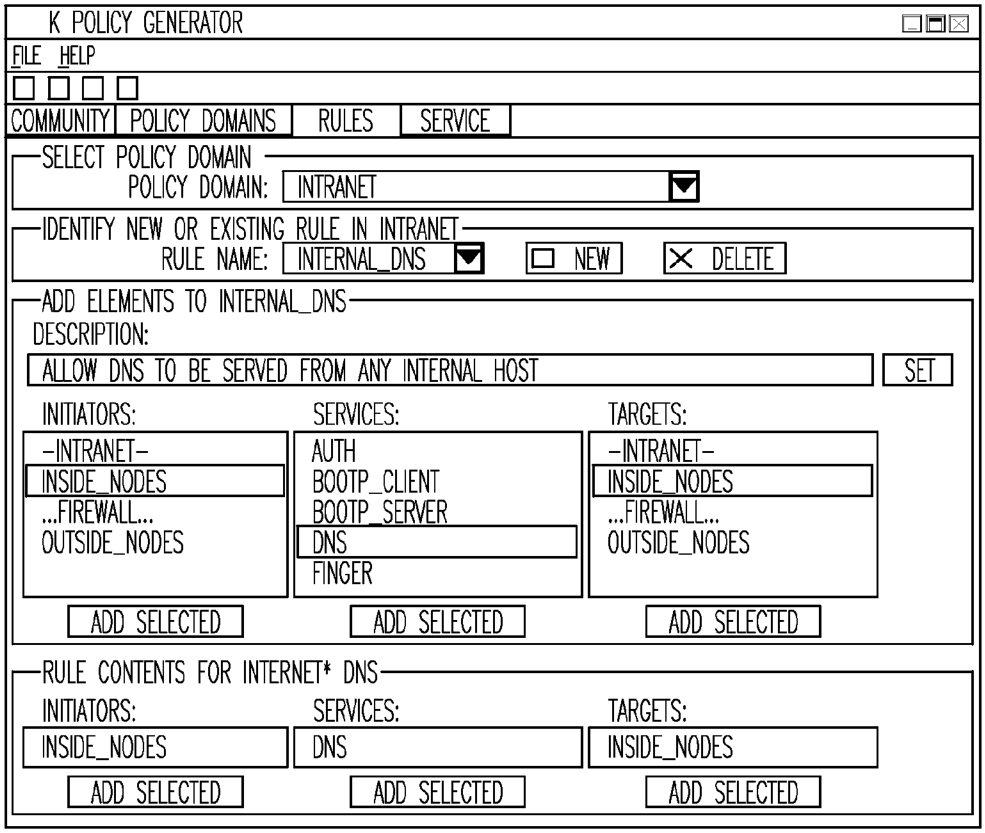
FIG. 10*b* is an example of a policy wizard dialog box according to the invention.

The end user returns to the policy wizard main window and presses the "Edit Rules" button which opens a dialog box as shown in FIG. 10*a*. FIG. 10*a* shows a dialog box for generating a new rule according to the invention. The end user selects the "Intranet" domain from the "Policy Domain" pull-down to add a rule for our Intranet domain. The end user types a rule name, such as Internal_Dns into the "Rule Name" field and presses the "New" button. The end user selects the communities and services to which this rule applies. For simplicity in this example, the end user wants to allow DNS from any internal nodes to any other internal nodes and therefore selects an Initiator community of hosts Inside_Nodes, a service of DNS, and a Target community of hosts Inside_Nodes. The end user then presses the "Add Selected" button for each in turn to create a rule as shown in FIG. 10*b*, where FIG. 10*b* shows a dialog box for generating a new rule according to the preferred embodiment of the invention.

Figure 10C:
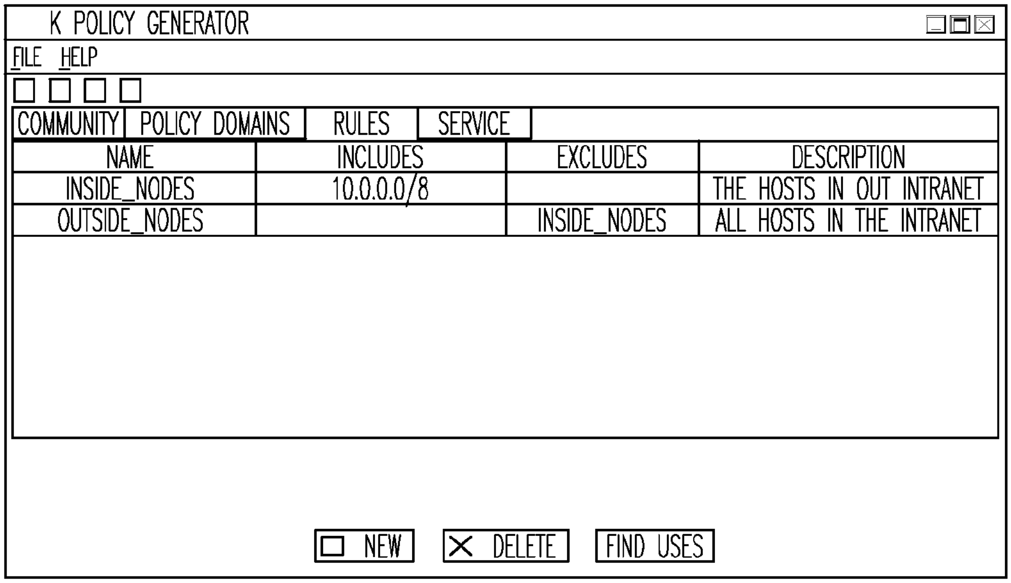
FIG. 10*c* is an example of a policy wizard dialog box according to the invention.

Next the end user generates a new policy specification file and runs policy monitor. The end user returns to the query tool and presses the "Network Events" button again to get a new rule view dialog box. The topmost "Execution Run" is now the output from the processing just completed. The end user presses the "Query" button and can now see that DNS traffic from 10.5.63.143 to 10.5.63.6 is now conformant to the policy as shown in FIG. 10*c*, where FIG. 10*c* shows the communities of the policy specification.

Detailed Description of Components

The preferred embodiment of the invention incorporates the following components, detailed description of which follows below.

The Policy Generator Tool

The preferred embodiment of the invention provides a policy generator tool, or simply policy generator, equally referred to as policy wizard, that provides a level of abstraction on top of the policy language, and which simplifies the process of creating an initial policy based on gross characteristics of a network at the IP level, such as policy domains, communities of hosts, servers, subnets, firewalls.

The policy generator provides a novel mechanism for translating desired network security policy, such as corporate network security policy, into a policy specification file that can be interpreted and implemented by a policy monitor mechanism.

Building a policy with the policy wizard involves: deciding on logical divisions within the network, i.e. policy domains, grouping network nodes into logical communities, and expressing rules about which communities of hosts can provide what services to which communities of hosts.

High Level View of Policy Generation

The first step in building a basic policy is to define a high-level topology for the network. Not much detail is necessary. In the preferred embodiment of the invention, the network needs to be divided into bounded units called policy domains. In practice, the choice of a policy domain boundary is fairly obvious. Usually natural logical and physical boundaries in a network help define policy domain boundaries. For example, firewalls and routers with packet filters commonly denote the important boundaries. When defining a simple policy, it is reasonable to ignore switches, bridges, hubs, and routers that connect interior subnets.

It is suggested that policy domains be as small as required by traffic monitoring limitations and as large as specification of rules allow. Rules are written about traffic visible in a policy domain. Traffic in a policy domain is logically considered to be visible anywhere within the policy domain even though networking elements, such as, for example, switches prevent such visibility in most networks. By writing rules about traffic as though it is visible anywhere within the policy domain, the same set of rules can be applied to network traffic anywhere within the policy domain.

It has been found that if a policy domain is too small, rules need to be duplicated for each extraneous policy domain. If a policy domain is too large, then the choice of a network traffic monitoring point can become overly constrained, or the ability to detect IP spoofing and rogue routers is lost.

Identify the Policy Domains

Figure 11:
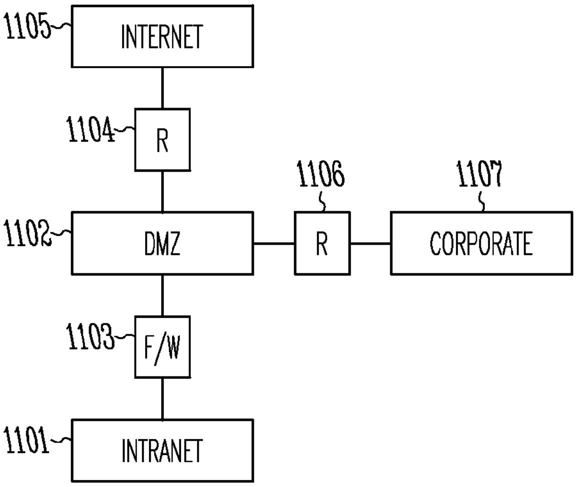
FIG. 11 shows a high-level view of an example network according to the invention.

FIG. 11 shows a high-level view of an example network. An Intranet 1101 is connected to a DMZ 1102 through a firewall 1103. The DMZ 1102, in turn, connects through a router 1104 to the Internet 1105 and through a second router 1106 to an external corporate network 1107. In this example, an end user is only expected to be able to monitor traffic in the Intranet and DMZ, so these two entities are declared to be policy domains. Rules in the policy only apply to allowed traffic in the DMZ and Intranet. The corporate network and Internet are viewed only as communities of hosts visible from within the policy domains.

It should be appreciated that the end user could choose to declare the Internet and Corporate network to be policy domains, but, by doing so, would only create unnecessary work because the end user does not intend to monitor traffic there. Any rules generated would thus never be used.

Add Perimeter Elements

In the preferred embodiment of the invention, the point of connection of a policy domain to the outside world is known as a perimeter element. For each perimeter element the set of nodes visible through it needs to be known and, for generating rules to detect IP spoofing and rogue routers, the MAC address of the perimeter element itself needs to be known.

As an example, if an end user could sit inside a policy domain and look out through boundaries, it is probable that the end user would see a filtered version of what is on the other side. Network address translation (NAT) can change the IP addresses seen though the boundary. For example, a proxying firewall may not let the end user see anything directly beyond a single IP address at the boundary. Filters may limit the view to only a few hosts when thousands are actually present.

Define Communities

In the preferred embodiment of the invention, communities consist of sets of IP addresses. They can be expressed as, for example, individual IP addresses, ranges of addresses, or subnet masks. Additionally, communities can be composed of other communities. It is often the case that a community of nodes involves all nodes in some existing set except for a node or two. Communities are defined in terms of included elements and excluded elements.

Define Rules for Each Policy Domain

In the preferred embodiment of the invention, rules defined for a policy domain describe allowed transactions. For example, if no rules are written, the policy specifies that everything at the IP level or above is denied, although this specification is not strictly true because typically auto-generated rules that apply to IP broadcast traffic and ICMP traffic within the policy domain exist. Rules create holes in this base layer that declares all traffic illegal.

Rules are defined in terms of initiator communities, target communities, and the services allowed. Services consist of a set of port numbers and indicators of whether TCP or UDP protocols are used.

Using the Policy Generator

The preferred embodiment of the invention provides a front end for the policy generator. It provides a user interface for entering and editing a simple policy. The front end reads and writes the current state of a policy from or to an intermediate file. The currently preferred extension for the intermediate file is .spw. When a policy has been specified to the satisfaction of the end user, it is written to an intermediate policy file for processing by the policy generator backend that generates a formal policy specification file compatible with the policy monitoring system.

The front end allows the end user to edit policy domains, communities, services, and rules, to read and write the current policy from or to an intermediate file, and to process the intermediate policy file into the formal policy specification file.

The preferred embodiment of the invention allows several instances of each editing process to be open simultaneously. The interaction is intended to feel very live. Data changed in one editing process should be reflected in the contents shown in other editing processes. For example, if a community is added in one community editing process, then it is immediately available for use in all editing processes. When building a policy, entities are first created, then filled in. From the time of creation they can be used throughout the policy. Consequently, a community or policy domain does not need to be fully specified in order to be used. However, to prevent errors in backend processing, all entities should be complete before the intermediate policy file is submitted to the backend for policy specification file generation.

In the preferred embodiment, only one policy is under development at any time. The front end starts up containing a default policy that is empty except for some predefined default services. This policy can be used as a starting point or an existing policy can be read from a saved intermediate policy file.

It has been found that it is best to use simple names in developing a policy and to use a name that makes sense from a predetermined point of reference, not a fully qualified name that makes sense from any point of reference. For example, it is better to give a rule a short, descriptive name such as, "Allow_Outgoing_Mail" than to give the rule a long name such as, "Allow_Mail_From_Intranet_To_Outside_Intranet".

For an in-depth understanding of the formal policy specification generated by the policy generator, or policy wizard, please refer to the section, Understanding the Wizard Generated Policy, below.

Collecting Packet Data

The preferred embodiment of the packet gathering component 128 is a program referred to as the harvester. It reads packets off the observed network 125 and writes them to either a packet capture file 126 or to a TCP socket that is connected to the policy monitor 100.

As an example, the harvester reads packets off the network when invoked as follows:

harvester -i eth0 -c 1000 -dump qs.dmp

In this example, 1000 packets are read from a network interface labeled 'eth0' and stored in file 'qs.dmp.'

The harvester can also be configured to read packet data and convert it to event data suitable for policy monitor 100. As an example, the harvester may be invoked as follows:

harvester -i eth0 -c 1000 -enc qs.dme

In this example, 1000 packets are read off the network interface labeled 'eth0', converted to event data suitable for policy monitor 100, and stored in the file 'qs.dme'.

The harvester can also be configured to read packet data, convert it to event data suitable for policy monitor 100, and stream such data directly to the policy monitor in real time. As an example, the harvester may be invoked as follows:

harvester -i eth0 -c 1000 -enc 10.5.63.6:333

In this example, 1000 packets are read off the network interface labeled 'eth0', converted to event data suitable for policy monitor 100, and transmitted in a TCP network stream to port 333 on the machine with IP address 10.5.63.6. This machine and TCP port may be configured so that the policy monitor 100 reads the data and processes it.

It should be appreciated that the events are transmitted as they are processed, so that the policy monitor 100 is able to see events shortly after they occur on the observed network 125.

In this mode of operation, the policy monitor 100 is also able to pass information about policy dispositions back to the harvester. The harvester can use this information to make processing of packets more efficient. For example, if the policy monitor 100 has determined that a given network event is acceptable according to the policy, the monitor can sometimes expedite its protocol processing by skipping packets until the network event terminates.

Policy Monitor

The preferred embodiment of the invention provides a policy monitor component that provides a user interface, either graphical or command line, that allows the configuration of various options of the monitor, policy engine and logger.

Monitor Configuration

Monitor configuration allows the end user to configure the location of the input packet dump, policy to be used, and the specification of the monitoring point.

The Input dump file specifies the input file, in tcpdump format that is to be used.

The Policy input specifies the .spm file that contains the policy specification to be used.

The Monitoring Point is a specification of where the Input dump file was collected. This name is derived from policy domain names that are specified in the policy wizard. For example, if a packet dump was collected in a policy domain named "Intranet" then the Monitoring Point name INTRANET_MONITOR should be used.

Monitor Logging Options

The monitor logging options allow the end user control of the location and the amount of data that gets written to the backend database.

The Execution Run Comment field allows the entry of freeform text that is added to the logs in the database to help identify this particular run of policy monitor.

ODBC Name provides the name of the ODBC source to which output data is written. The DB Username and DB password are the end user's database login information. The Save Password allows the program to save the password in the clear so that it does not need to be entered the next time the program is run.

Output Options

Output options allow the end user to specify whether the trace output from the monitor should be displayed in a console window (Output to console) or sent to a file (Output to file:).

Advanced Options

Advanced options allow more options to be set. In day to day operation, it is rare that such options need to be changed.

Advanced Monitor Configuration

An Assert DLL parameter allows specification of the name of the DLL to be used to verify condition and credential assertions. Note that if this DLL does not match the version of the policy specified then this DLL is regenerated, overwriting the provided DLL.

A Trace Options parameter allows the end user to provide configuration of runtime trace options. This option affects the amount of output generated by the monitor. For a more efficient operation, this field should be left blank.

A Certificate Dir argument points to a directory that contains trusted CA root certificates in DER encoded form.

Advanced Packet Logging Options

The packet logging options section allows the configuration of the trace options to be provided by the low level packet monitor. The various logging options may be specified at a global level (by setting them for layer "-All-") or individually on a per-layer basis. Again it is to be noted that specifying logging options adversely affect the performance of the monitor.

The Site Handle parameter specifies a name that is associated with the particular company or site that is being monitored. It is used to segment a table that is used for IP-address name resolution within the output database.

Advanced Monitor Logging Options

The Disable Logging checkbox disables the writing of all logging data to the database. If logging is enabled then the remaining checkboxes provide for the enabling or disabling of the logging of network events with the given final disposition code. For example, if Disable Logging is not selected and only Policy Error selected then the only network events that are logged to the database are those that resulted in a final disposition code of POLICY_ERROR.

During normal operation information about all protocol events within a network event is logged, even those that occurred after a final disposition was reached. An Enable All Layer Logging parameter can control this feature. When set on, all protocol events are logged to the database. When not set only those protocol events that are processed before a disposition is reached are logged.

QueryTool

The preferred embodiment of the invention provides a query tool to examine the data that was placed in the database. The preferred query tool allows the following functions to be performed:

- Examining network events, such as protocol events, that are contained within the execution runs in the database;
- Examining IP Connectivity for execution runs in the database;
- Editing and making user defined SQL queries to the database;
- Performing forward and reverse DNS lookups (using the current DNS configuration);
- Viewing policy monitoring run information from the database, and selecting a default run for further viewing;
- Explicitly connecting to a specific database; and
- Turning on/off IP address to hostname resolution.

Other Tools

The preferred embodiment of the invention provides other tools discussed below.

Compiler

In its simplest form the compiler needs just a single argument that is the input policy specification file. This form is often all that is needed while doing initial development of a policy. It should be appreciated that the compiler is rarely used in standalone form since its function, with the exception of the -r flag, is subsumed into the policy monitor component.

Example Usage

During initial development a command such as the following could be used while getting rid of syntactic and semantic errors from the policy under development:

pmsCompiler.exe security.pms

Once compiler errors are gone, the end user is ready to generate pieces that are used to run the policy monitor. For example, the end user can use the command line:

pmsCompiler.exe -d verify security.pms that compiles the security policy, and generates a verification DLL named "verify.dll".

Compiler Options

The following arguments in Table C may be provided to the example pmsCompiler.exe.

TABLE C

| |
|---|
| pmsCompiler -? -r<br>-c <cxx-file> -d <dll-file><br><policy-file>* |
| -c <cxx-file> |
| Generate Credential and Condition assertion verification code to the named file. The suffix ".cxx" is appended to the name that is provided. This option is rarely used to allow the end user to look at the actual code that is used to verify assertions. |
| -d <dll-file> |
| Generate a DLL containing the assertion verification code to the named file. The suffix ".dll" is appended to the name that is provided. If the -d flag is used without the -c flag then the source code is written to a temporary file. This option is often used to generate the assertion verification DLL. The alternative is to allow the runtime Policy Monitor to generate the DLL for itself. |
| -r |
| Generate a pseudo-english description of the policy to stdout. The output of this command is a useful starting point for a policy report to a customer. |
| -? |
| Display a usage string. |
| <policy-file> |
| The required policy specification (".pms") file. |
| -b <db-name> |
| Store information about the compiled policy in the named database. db-name is the name of a user data source that has been configured within Control Panels->ODBC. This argument is rarely used. The alternative is to allow the runtime Policy Monitor to write the policy to the database if needed. |
| -o <output-file> |
| Redirect compiler messages to stdout to the named output file. Rarely used. |
| -t <trace-opts> |
| Enable debug tracing. For more specific details try providing the argument "-t ?". This option is rarely used because it only provides information to allow debugging of the compiler itself. |
| -v |
| Use VisualC++ to preprocess macros rather than the internal preprocessor. This overrides the -n option. This option is rarely used. |
| -g |
| Add debug trace code, i.e. printf statements, to the generated Credential and Condition verification code. The generated code is compiled with symbol information (the C compiler -g flag). This option is rarely used. |
| -n |
| Do not run a preprocessor. C preprocessor macros such as #define and #include may be included within a policy file. This option specifies that the pre-compiler should not be run prior to actually compiling. This option is rarely used. |
| -z |
| Output the dump output of the parsed policy. This output looks remarkably similar to the input file with the comments stripped and some component definitions reordered. |

Network Monitor

The preferred embodiment provides a streams-based network monitor that can be run in a standalone mode independent of the policy monitor. In this way it can be used to provide a detailed, streams-based view of the network traffic, or a subset thereof. For example, run in standalone mode is desirable when a particular protocol is not supported natively by the policy monitor and an end user desires to see raw data to gain an understanding of what is going on.

It should be appreciated that a convenient way of accessing such functionality is through the query tool.

Example Usage

The following invocation of the network monitor:

mon -ev 2 -I ALL=all C:\spm\quickstart\qs.dmp examines the qs.dmp file, producing extremely verbose output for event 2 only.

Table D provides a list of network monitor options according to the invention.

TABLE D

| Monitor Options |
|---|
| mon [-log LAYER[=[-]option1,[-]option2...]]* |
| [-n npkt] [-skip pkt] [-until endpkt] |
| [-ev eventID] [-untilev eventid] [-justev eventid] |
| [-noclients] dump_file |
| -log |
| -n npkt |
| Only process the first npkt packets from the input data. |
| -skip pkt |
| Skip pkt packets before beginning to process the input data. |
| -until endpkt |
| Only process data through the packet number provided is reached |
| -ev eventID |
| Only process the data starting at the given eventID. |
| -untilev eventid |
| Only process the data through eventid. Note that to find the end of eventid, events with ids |
| greater than eventid may be processed. |
| -justev eventid |
| Only process the data for eventid. Note that to find the end of eventid, events with ids greater |
| than eventid may be processed. This option is the equivalent of -ev eventid -untilev eventid. |
| -noclients |
| Do not generate any output for higher level protocols such as HTTP, FTP, etc. |
| dump_file |
| The dump file, in tcpdump/windump format, that contains the input data. |

Understanding the Wizard Generated Policy

Using the Policy Generation Wizard, a user specifies a network security policy in terms of the network services provided by certain hosts to other hosts in the network. When such policy is processed, the wizard generates a formal and more detailed description of the network security policy using the policy language. The policy language specification may then be used to analyze network traffic using the policy monitor tool. The results of this analysis can be studied using the query tool. An exemplary policy language is taught in A Declarative Language for Specifying a Security Policy, patent application Ser. No. 09/479,781 (Jan. 7, 2000).

Understanding the output of the preferred query tool requires understanding how the preferred wizard translates the high-level view of security policy it presents to its users into a set of policy language objects such as rules, credentials and dispositions.

Understanding the policy generation process involves the following:

Understanding the predefined rules, credentials and dispositions;

Understanding the implicit rules and credentials; and

Understanding the explicit rules and credentials.

Predefined Rules, Credentials and Dispositions

Every policy generated by the wizard includes a set of predefined default rules for handling protocol events that do not conform to the user-defined policy i.e. rules that deny access, as well as rules for handling common network events not covered by the user policy. These rules and their dispositions are shown in Table E and Table F, and further discussed below.

TABLE E

| Rule | Protocol - Action | Disposition |
|---|---|---|
| Ip_Deny | IP - all | Ip_Access_Denied |
| Icmp_Deny | ICMP - all | Icmp_Access_Denied |
| Udp_Deny | UDP - all | Udp_Access_Denied |
| Tcp_Deny | TCP - all | Tcp_Access_Denied |
| Http_Deny | HTTP - all | Http_Access_Denied |
| Ftp_Deny | FTP - all | Ftp_Access_Denied |
| Ssl_Deny | SSL - all | Ssl_Access_Denied |
| Ssh_Deny | SSH - all | Ssh_Access_Denied |

Table F shows the default rules for all the protocols supported by the policy monitor. The policy engine selects these rules when no other rule can be found that is satisfied by the protocol event.

TABLE F

| Rule | Protocol - Action | Disposition |
|---|---|---|
| Ip_Deny_Pure_Ip | IP - PROTOCOL_UNKNOWN | Deny_Pure_Ip |
| Tcp_Missed_Connections | TCP - MISSED_CONNECT | Warn_Missed_Tcp_Connect |
| Ftp_Ignore_Data_Connections | FTP - DATA_OPEN | ok |

Table G below shows rules that cover protocol events not addressed by the wizard's user interface. These are well understood events that can be separated from those handled by the default rules. Ip_Deny_Pure_Ip is assigned to IP associations whose payload is not one of the three well-known IP-based protocols (ICMP, UDP and TCP). Tcp_Missed_Connections is assigned to network events where the establishment of the TCP connection was not witnessed by the policy monitor. Ftp_Ignore_Data_Connections is assigned to all FTP data connections which, from a security policy monitoring perspective, can be safely ignored. It is noted that the preferred policy wizard generates other rules to deal with common protocol events as discussed below.

Table G shows the predefined dispositions used by all the rules in the generated policy. Associated with each disposition are its disposition code and severity, which may be used in the query tool to filter network events.

TABLE G

| Disposition | Disposition Code | Disposition Severity |
|---|---|---|
| ok | OK | None |
| policy-error | POLICY_ERROR | CRITICAL |
| Ip_Access_Denied | ACCESS_DENIED | HIGH |
| Deny_Pure_Ip | ACCESS_DENIED | HIGH |
| Monitor_Broadcasts | OK | MONITOR |
| Icmp_Access_Denied | ACCESS_DENIED | HIGH |
| Monitor_Icmp | OK | MONITOR |
| Udp_Access_Denied | ACCESS_DENIED | HIGH |
| Tcp_Access_Denied | ACCESS_DENIED | HIGH |
| Warn_Missed_Tcp_Connect | OK | WARNING |
| Ftp_Access_Denied | ACCESS_DENIED | HIGH |
| Http_Access_Denied | ACCESS_DENIED | HIGH |
| Ssl_Access_Denied | ACCESS_DENIED | HIGH |
| Ssh_Access_Denied | ACCESS_DENIED | HIGH |

It should be noted that ok and policy-error are actually built-in dispositions in the policy language. If policy-error is encountered it indicates an error in the processing of either the policy or the network traffic data by the policy monitor. The meaning of the other dispositions is explained later in this document in the context of the rules in which they are used.

Finally, the wizard includes a set of predefined credentials that are combined with dynamically generated credentials and used in implicitly generated rules:

_Multicast_Addresses—a set of commonly used IP multicast addresses;

_Local_Broadcast_Address—the IP address used for non-directed local broadcasts (255.255.255.255); and _Zero_Ip_Address—a zero-valued IP address (0.0.0.0), commonly used by BOOTP clients;

It is noted that the double underscore prefix in these credential names is used to ensure that there aren't any name conflicts with credentials generated to represent user-defined communities and services.

Explicit Rules and Credentials

Every community defined by the user results in a credential of the same name. Because the scope of a community name is that of the entire policy specification, the resulting credential names need not be massaged to ensure uniqueness.

Service names are also global in scope. Because services and communities share the same name space, every service defined in the policy results in a credential whose name is constructed by prefixing the user-supplied service name with the underscore character. Thus, for example, the Smb service is represented by a credential named _Smb.

Rule names, on the other hand, are only unique within the scope of a policy domain. Furthermore, if a user-defined rule addresses a service that is both a UDP and a TCP service, the wizard generates two rules, one for the UDP protocol and another for the TCP protocol. Thus, a rule name is constructed by prefixing the user-supplied name with the protocol name (Udp_ or Tcp_) and the policy domain name.

For example, if the user defines a rule titled Smb_Services within a policy domain named Intranet, the wizard generates two rules, Udp_Intranet_Smb_Services and Tcp_Intranet_Smb_Services, for the UDP and TCP protocols respectively.

User-defined rules may also result in the generation of additional credentials. When defining a rule, the user provides the following information:

Zero, one, or more initiator communities;

Zero, one, or more services; and

Zero, one, or more target communities.

If more than one initiator community are specified, the wizard generates a credential that combines these communities into a union. The credential name is constructed by appending the word _Initiator to the user-supplied rule name, prefixed by the policy domain name. Using the example above, the wizard would create a credential named Intranet_Smb_Services_Initiator.

Likewise, if more than one target communities are specified, the wizard creates a credential representing their union and names it by appending the word _Target to the policy domain and rule names, e.g. Intranet_Smb_Services_Target).

However, if one or more services are specified they are combined with the target credentials according to the service type. For example, the Smb service (for the SMB protocol suite) and its like-named credential include ports that are used for both TCP and UDP. Thus, for the Smb_Services rule used above, the wizard would generate the following additional credentials: Udp_Intranet_Smb_Services_Target and Tcp_Intranet_Smb_Services_Target. These credentials combine Intranet_Smb_Services_Target (or a single target community) with the _Smb credential and constitute the actual target credentials used in Udp_Intranet_Smb_Services and Tcp_Intranet_Smb_Services respectively. It should be noted that, in many cases, the set of UDP and TCP services referenced in a rule have little, if any overlap.

If the end user does not specify any services the wizard uses the Intranet_Smb_Services_Target credential (or a single target community credential) to identify the target principal.

Implicit Rules and Credentials

For each policy domain within the policy specification, the wizard automatically generates a set of rules and credentials that define the valid IP-level traffic seen at the monitoring point within the domain. In addition, an ICMP rule is generated that handles all intradomain ICMP traffic, as well as a credential for the monitoring point in that domain.

The monitoring point credential is based on an agent descriptor string manufactured by the wizard. The agent descriptor is constructed by converting the policy domain name to uppercase and appending to it the word _MONITOR. Thus, for example, a policy domain named Intranet is assigned the agent descriptor:

INTRANET_MONITOR.

Note that this is the agent descriptor to be used in the policy monitor when analyzing data collected at this monitoring point.

The monitoring point credential itself is named by appending the word _Monitors to the policy domain's name. In the example above, the credential is named Intranet_Monitors.

The wizard segregates all intradomain ICMP traffic (common on an enterprise network) by use of a rule that assigns it the disposition Monitor_Icmp. The rule is named by combining the protocol name with the domain name using the word _Within. For example, in the Intranet policy domain the rule is named Icmp_Within_Intranet.

IP traffic is described by a set of rules that systematically enumerate all valid IP-level traffic within the policy domain, between hosts in the policy domain and external hosts, and between external hosts through the policy domain (when more than one perimeter element is present). Most of these rules provisionally allow IP traffic, letting the subsequent protocol layers (ICMP, UDP, TCP, etc.) determine if the traffic is indeed allowed either by a user-defined (explicit) rule or by a predefined rule.

The first IP rule provisionally allows all intradomain IP traffic. It is named by combining the protocol name with the domain name using the word _Within (e.g., Ip_Within_Intranet). In the absence of a higher-level protocol within an intradomain IP association, the rule assigns the network event a disposition of Deny_Pure_Ip, i.e. its final outcome.

The intradomain IP rule uses the policy domain's defining community as its target principal. However, it generates another credential to be used as the initiator. This credential combines the defining community with the predefined credential for zero-valued IP addresses (_Zero_Ip_Address). The generated credential is named by appending the word _Initiator to the generated rule name, e.g. Ip_Within_Intranet_Initiator.

Another intradomain IP rule is used to segregate typical broadcast and multicast traffic within an enterprise network. It is named by combining the protocol name with the domain name using the words _Broadcasts_Within, e.g. Ip_Broadcasts_Within_Intranet. Its initiator principal is the same as that used for the general intradomain traffic, e.g. Ip_Within_Intranet_Initiator. Its target is a new credential constructed by combining the predefined credentials _Multicast_Addresses and _Local_Broadcast_Address with the directed broadcast addresses for all the subnets within the policy domain's defining community. The new credential is named by appending the word _Target to the rule name e.g. Ip_Broadcasts_Within_Intranet_Target.

The intradomain broadcast and multicast traffic is assigned the disposition Monitor_Broadcasts.

Traffic between hosts in the policy domain and external hosts is described by a set of rules whose complexity depends on how much information the user supplied about the topology of the network. Specifically, it depends on how many perimeter elements were specified and on whether or not the interface addresses, i.e. MAC addresses, of the perimeter elements are included in the policy specification.

If there are external communities associated with at least one perimeter element for which the interface address is not known, the wizard generates a credential combining all such communities in a single union unless there is only one such community, in which case its credential already exists. This credential is named by combining the policy domain name with the string _External_Communities, e.g. Intranet_External_Communities.

The wizard then generates two rules defining the traffic between hosts internal to the policy domain and these external communities. The wizard names these rules by combining the protocol name with the domain name and the string _To_External_Communities or _External_Communities_To, depending on the direction of the IP traffic, e.g. Ip_Intranet_To_External_Communities for outbound traffic and Ip_External_Communities_To_Intranet for inbound traffic.

The credentials used alternately as the initiator and target principals for these rules are the policy domain's defining community and the aforementioned credential for the external communities. The rules provisionally allow the IP traffic to flow, subject to other rules for higher level protocols. In the absence of a higher-level protocol within the network event, the rule assigns it a disposition of Deny_Pure_Ip, i.e. its final outcome.

External communities visible through one or more perimeter elements whose interface addresses are known, are handled by a separate set of rules, two per perimeter element. For each perimeter element, the wizard starts by creating a credential that combines one or more credentials for one or more external communities visible through it with the perimeter element's interface address. Such credential is named by combining the domain name with the perimeter element name and the string _Communities. For example, external communities visible through a perimeter element named Firewall are described by a credential named Intranet_Firewall_Communities.

The wizard then generates two rules defining the traffic between hosts internal to the policy domain and the external communities visible through this perimeter element. The wizard names these rules by combining the protocol name, the domain name, the perimeter element name and the word _To, e.g. Ip_Intranet To_Intranet_Firewall for outbound traffic and Ip_Intranet_Firewall_To_Intranet for inbound traffic.

The credentials used alternately as the initiator and target principals for these rules are the policy domain's defining community and the aforementioned credential for the external communities. The rules provisionally allow the IP traffic to flow, subject to other rules for higher level protocols. In the absence of a higher-level protocol within the network event, the rule assigns it a disposition of Deny_Pure_Ip, i.e. its final outcome.

Finally, if there is more than one perimeter element associated with the policy domain, the wizard generates rule-pairs that describe the traffic between external communities visible through specific perimeter elements as well as external communities visible through any perimeter element, i.e. those without associated interface addresses. The rules are named by combining the names of each pair of perimeter elements with the protocol name, the policy domain name and with the word _To, in the case of addressable perimeter elements, or with the string _External_Communities, for all other external communities. An additional rule is generated to cover traffic between external communities not associated with an addressable perimeter element and is named by combining the protocol name with the domain name and the string _Between_External_Communities.

Thus, if the Intranet domain used as an example in this section were to have a second (addressable) perimeter element named Router and a third non-addressable perimeter element (whose name is unimportant), the wizard would generate the following rules to cover all traffic amongst their respective external communities:

Ip_Intranet_Firewall_To_Intranet_Router
Ip_Intranet_Router_To_Intranet_Firewall
Ip_Intranet_Firewall_To_External_Communities
Ip_External_Communities_To_Intranet_Firewall
Ip_Intranet_Router_To_External_Communities
IP_External_Communities_To_Intranet_Router
IP_Intranet_Between_External_Communities Table H and Table I summarize all the implicit rules and credentials generated for the example policy domain Intranet. The policy domain includes two perimeter elements with a specified interface address (Firewall and Router) and a third non-addressable perimeter element.

TABLE H

| Credential | Comment |
|---|---|
| Intranet__Monitors | Uses agent descriptor INTRANET__MONITOR |
| Ip__Within__Intranet__Initiator | Defining community plus zero-valued IP address |
| Ip__Broadcasts__Within__Intranet__Target | Combines standard multicast addresses with local broadcast and directed broadcast addresses |
| Intranet__External__Communities | Combines all external communities not associated with addressable perimeter elements |
| Intranet__Firewall__Communities | Combines all external communities visible through the Firewall perimeter element |
| Intranet__Router__Communities | Combines all external communities visible through the Router perimeter element |

TABLE I

| Rule | Credentials (I - Initiator T - Target) | Disposition (I - Immediate F - Final) |
|---|---|---|
| Ip__Within__Intranet | I: Ip__Within__Intranet__Initiator<br>T: Intranet | I: continue<br>F: Deny__Pure__Ip |
| Ip__Broadcasts__Within__Intranet | I: Ip__Within__Intranet__Initiator<br>T: Ip__Broadcasts__Within__Intranet__Target | I: Monitor__Broadcasts |

TABLE I-continued

| Rule | Credentials (I - Initiator T - Target) | Disposition (I - Immediate F - Final) |
|---|---|---|
| Icmp__Within__Intranet | I: none (ignore)<br>T: none (ignore)<br>Note: uses Ip__Within__Intranet as prerequisite | I: Monitor__Icmp |
| Ip__Intranet__To__External__Communities | I: Intranet<br>T: Intranet__External__Communities | I: continue<br>F: Deny__Pure__Ip |
| Ip__External__Communities__To__Intranet | I: Intranet__External__Communities<br>T: Intranet | I: continue<br>F: Deny__Pure__Ip |
| Ip__Intranet__To__Intranet__Firewall | I: Intranet<br>T: Intranet__Firewall__Communities | I: continue<br>F: Deny__Pure__Ip |
| Ip__Intranet__Firewall__To__Intranet | I: Intranet__Firewall__Communities<br>T: Intranet | I: continue<br>F: Deny__Pure__Ip |
| Ip__Intranet__To__Intranet__Router | I: Intranet<br>T: Intranet__Router__Communities | I : continue<br>F: Deny__Pure__Ip |
| Ip__Intranet__RouterTo__Intranet | I: Intranet__Router__Communities<br>T: Intranet | I: continue<br>F: Deny__Pure__Ip |
| Ip__Intranet__Firewall__To__Intranet__Router | I: Intranet__Firewall__Communities<br>T: Intranet__Router__Communities | I: continue<br>F: Deny__Pure__Ip |
| Ip__Intranet__Router__To__Intranet__Firewall | I: Intranet__Router__Communities<br>T: Intranet__Firewall__Communities | I: continue<br>F: Deny__Pure__Ip |
| Ip__Intranet__Firewall__To__External__Communities | I: Intranet__Firewall__Communities<br>T: Intranet__External__Communities | I: continue<br>F: Deny__Pure__Ip |
| Ip__External__Communities__To__Intranet__Firewall | I: Intranet__External__Communities<br>T: Intranet__Firewall__Communities | I: continue<br>F: Deny__Pure__Ip |
| Ip__Intranet__Router__To__External__Communities | I: Intranet__Router__Communities<br>T: Intranet__External__Communities | I: continue<br>F: Deny__Pure__Ip |
| Ip__External__Communities__To__Intranet__Router | I: Intranet__External__Communities<br>T: Intranet__Router__Communities | I: continue<br>F: Deny__Pure__Ip |
| Ip__Intranet__Between__External__Communities | I: Intranet__External__Communities<br>T: Intranet__External__Communities | I: continue<br>F: Deny__Pure__Ip |

Logging and Reporting Modules

The preferred embodiment of the invention provides logging and reporting modules, as described herein with reference to FIG. 1*a*. As the policy engine module 102 reaches dispositions on network events, it passes the network event object to the logging module 103.

The preferred embodiment of the invention also provides an alarm script 155. As the policy engine module 102 reaches dispositions on network events of a certain disposition severity, for example, CRITICAL or HIGH, the alarm script is invoked to provide expedited alerting of the disposition.

The following algorithm is used to enter the data into the database 104.

- During initialization of the logging module 103, the database 104 is tested to see if it contains a policy that matches the MD5 hash of the policy 105 currently being used by the policy engine 102. If no such policy is found then the policy details are added to the database 104;
- with each network event passed to the logging module 103, if logging of network events is enabled, then:
  - if the final disposition of the network event matches one of the list of dispositions that is to be logged, then:
- add the network event to the buffer of network events, flushing the buffer to the database 104 if it is full;
  - loop through each of the protocol events contained in the network event;
- if the initiator and responder principals have not been already added to the database 104 then do so, caching the database keys for later use; and
- add the protocol event to the buffer of network events, flushing the buffer to the database 104 if it is full.

On a periodic basis report statistics 161 are sent across a secure channel to a secure, customer accessible server 162. The preferred embodiment of the invention uses the following algorithm.

- A report script 160 described is used to generate a report 161 for the configured or predetermined time period. An example of a list of preferred acquired or calculated statistics or intermediate steps is contained in Table J below;
- The report 161 is then packaged using the tar command and PGP to encrypt the resulting file using the public key of a recipient email account; and
- This encrypted file is then emailed to the recipient email account.

It should be appreciated that an equally preferred embodiment performs name resolution on packet data after the packet data has been collected, rather than concurrent with collecting the packet data. An advantage to such name resolution technique is that name resolution after collection is removed from real-time processing, thereby rendering name resolution more efficient.

On the receiving secure server 162 the following algorithm is invoked on the received email message.

- PGP is used to decrypt the received encrypted tar file;
- Tar is used to extract the report data;
- The report data is then processed to link the report into the reporting website 164 for the client; and
- Any supplied protocol event data is then stored in a reporting database 165.

Upon accessing the reporting website 164 the client is able to peruse the reports that have been generated, access the protocol event data stored in the database 165 via a cgi script.

TABLE J

| |
|---|
| Generate network events in subsidiary web files, based on execution run; |
| Generate network events table, |
| Generate table for URL's and status codes; |

TABLE J-continued

| |
|---|
| Find events of interest; |
| Check for all execution runs being in sequence; |
| Give best optimization for queries; |
| Compute number of events and number of exceptions; |
| Apply definitions of log severity and disposition code in order of criticality; |
| Apply query to several execution runs at a time, collect results; |
| Select key disposition and key policy rule first, to be able to find distinct disposition and policy rule; |
| Determine sort order for disposition and policy rule table; and |
| Generate a list of dispositions in the selected events, counting how many events were generated by each. |

Automated Generation of an English Language Representation of a Formal Network Security Policy Specification The preferred embodiment of the invention uses a formal specification of network security policy that is to be enforced on a network. This specification provides a precise, compact description of network security policy. However, it is difficult for a layperson to understand. In order to allow comprehension of the policy by non-technical staff within a user's organization the parser module (FIG. 1150) is used to generate an English language description of the policy. This description is simple enough to be understood, yet captures the salient details of the policy. It will be appreciated that the invention generated a representation in a human readable language, such as english, those skilled in the art will recognize that the invention may generate representations in any human readable language.

The preferred embodiment of the invention provides the following algorithm for generating the English language representation. The algorithm comprises the following:

Loading the policy into the parser from its text representation; and

Looping through all supported protocols, from the highest level protocols to the lowest;

Sorting the rules for this protocol into ranked order; and

Looping through these rules from the highest ranking to the lowest;

Generating a text description of the rule using the algorithm below. If an HTML flag has been set then format the text into a HTML table; and Append this description to a collection of descriptions already generated.

Figure 12:
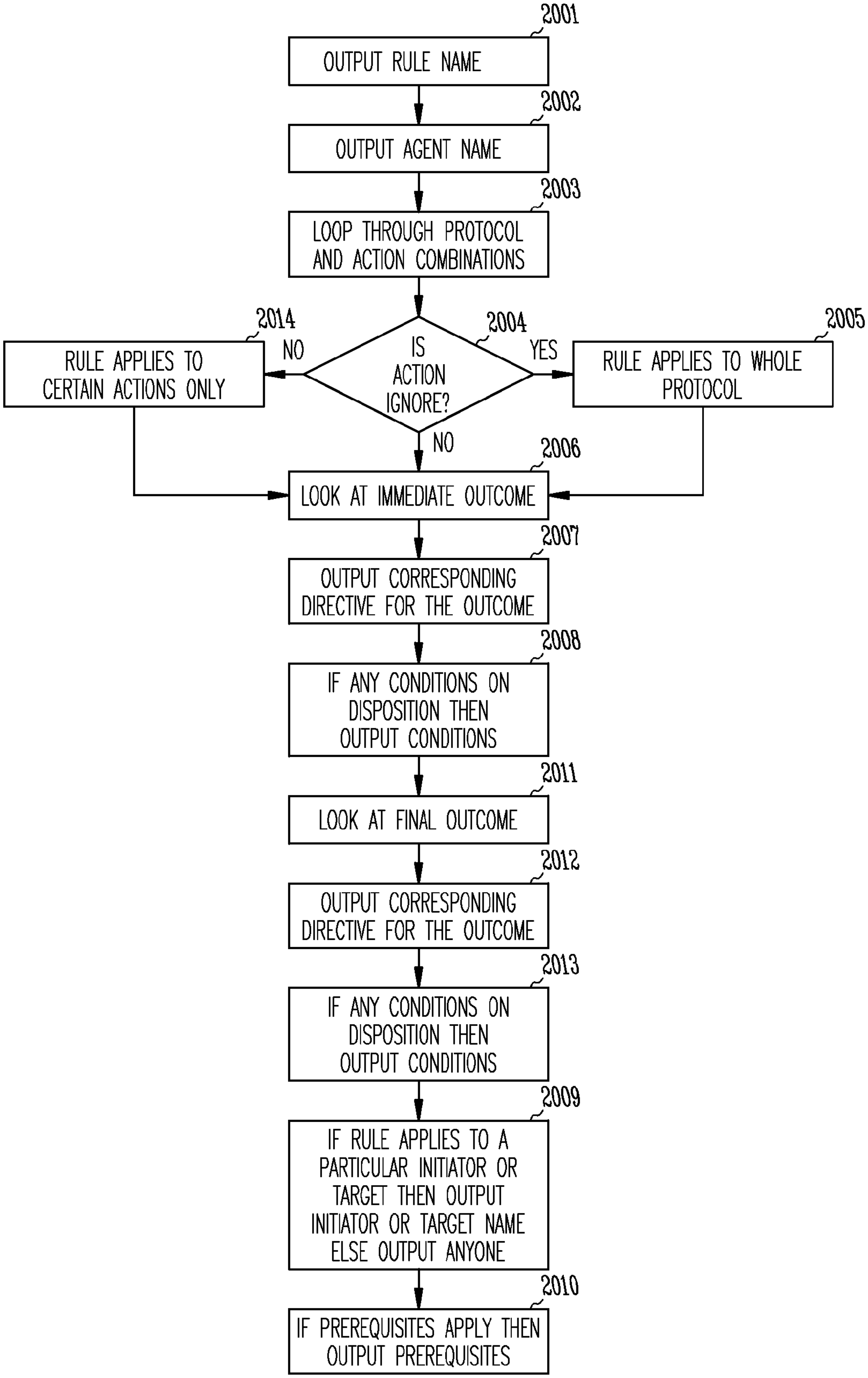
FIG. 12 shows an algorithm according to the invention.

The preferred embodiment of the invention provides the following rule algorithm to generate an English language representation of a single policy language rule. The algorithm is described with reference to FIG. 12. The algorithm outputs the name of the rule at hand (2001). It then proceeds to output the agent's name (2002), where the agent is the subject network monitor(s) to which the policy applies. The algorithm then loops through all protocol and action combinations (2003). If the action is to be ignored (2004), then the rule applies to the whole protocol (2005). Otherwise, the rule applies to certain actions only (2014). The algorithm then looks at the immediate outcome for the rule (2006). The algorithm then outputs the corresponding directive for the outcome (2007). If any conditions exist on the disposition, then the algorithm outputs the conditions (2008). The algorithm looks at the final outcome (2011), then outputs the corresponding final outcome of the rule (2012). If any conditions exist on the disposition, then the algorithm outputs the conditions (2013). If the rule applies to a particular initiator or target, then the algorithm outputs the initiator or target name (2009). Otherwise, the algorithm outputs a general inclusive name, such as, for example, "anyone." The algorithm then checks for prerequisites (2010). If any are discovered, the algorithm then outputs such prerequisites.

For an example of the rule algorithm discussed above, Table K below shows code to the example implementation.

TABLE K

```
if (isBuiltin( ))
        return;
    Bool processedImmediate = false;
    Bool immediateDefaultContinue = false;
    Bool capitalize = true;
    string str;
    string protocol;
    // output the table row start
    if (html) str = "\n<tr><p>"; else str = "\n\n";
    // output the rule name
    if (html)
        str += "<TD WIDTH=\"10%\" VALIGN=\"TOP\"><B>" + getName( ) + "<a name = \"" + getName( ) +
"\"></a></B></TD>";
    else
        str += "Rule " + getName( ) + ": ";
    // output the agent name
    string agentName;
    if (getAgent( ) = = 0)
        agentName = "All Monitors";
    else
        agentName = getAgent( )->getName( );
    if (html)
        str += "<TD WIDTH=\"5%\" VALIGN=\"TOP\">" + agentName + "</TD>";
    // start the cell for the description
    if (html)
        str += "<TD WIDTH=\"85%\" VALIGN=\"TOP\">";
    // loop through the protocol and action combinations
    Bool first = true;
    for (PrsUnion::const__iterator t0 = __protocol->begin( );
         t0 != __protocol->end( );
         t0++)
    {
        for (PrsUnion::const__iterator t2 = __action->begin( );
```

TABLE K-continued

```
            t2 != __action->end( );
            t2++)
        {
            if (first)
                first = false;
            else
                protocol +=“,”;
            // if the action is ignore then it applies to the whole protocol
            if ((*t2)->getStringRepresentation( ) != PrsConst::META__IGNORE)
                protocol += (*t0)->getStringRepresentation( ) + “-” + (*t2)->getStringRepresentation( ) + “ ”;
            else
                protocol += (*t0)->getStringRepresentation( ) + “ ”;
        }
    }
    // look at the outcome to figure what we do with this traffic
    // is there an immediate clause
    if (__immediate != 0)
    {
        // output text based on the code
        string code = __immediate->getDefault( )->getCode( );
        if (code = = PrsConst::DISPCODE__OK)
        {
            capitalize ? str += “Allow ” : str += “allow ”;
            capitalize = false;
        }
        else if (code = = PrsConst::DISPCODE__CONTINUE)
        {
            if (__final->getDefault( )->getCode( ) = = PrsConst::DISPCODE__OK)
                capitalize ? str += “Provisionally allow ” : str += “provisionally allow ”;
            else if (__final->getDefault( )->getCode( ) = = “POLICY__ERROR”)
                ; // say nothing... this is the default
            else
                capitalize ? str += “Provisionally deny ” : str += “provisionally deny ”;
            immediateDefaultContinue = true;
        }
        else
        {
            capitalize ? str += “Deny ” : str += “deny ”;
            capitalize = false;
        }
        str += protocol;
        if ((__immediate->getGuards( )) != 0 && (__immediate->getGuards( )->size( ) != 0)) /* KGS &&
!immediateDefaultContinue */
        {
            if (__immediate->getGuards( )->size( ) = = 1)
                str += “with condition (”;
            else
                str += “with conditions (”;
            first = true;
            for (std::vector<PrsGuardedDisposition*>::const__iterator cond = __immediate->getGuards( )->begin( );
                cond != __immediate->getGuards( )->end( );
                cond++)
            {
                if (first)
                    first = false;
                else
                    str += “, ”;
                if (html) str += “<I>”;
                str += (*cond)->getGuard( )->getName( );
                if (html) str += “</I>”;
            }
            str += “), ”;
        }
        processedImmediate = true;
    }
    // is there a final clause
    if (__final != 0)
    {
        if (!processedImmediate)
        {
            // output text based on the code
            string code = __final->getDefault( )->getCode( );
            if (code = = PrsConst::DISPCODE__OK)
            {
                capitalize ? str += “Provisionally allow ” : str += “provisionally allow ”;
                capitalize = false;
            }
            else if (code = = “POLICY__ERROR”)
                ; // say nothing... this is the default
            else
```

TABLE K-continued

```
                {
                        capitalize ? str += "Provisionally deny " : str += "provisionally deny ";
                        capitalize = false;
                }
                str += protocol;
                if ((__final->getGuards( )) != 0 && (__final->getGuards( )->size( ) != 0))
                {
                        if (__final->getGuards( )->size( ) = = 1)
                                str += "with condition (";
                        else
                                str += "with conditions (";
                        Bool first = true;
                        for (std::vector<PrsGuardedDisposition*>::const__iterator cond = __immediate->getGuards( )->begin( );
                                cond != __immediate->getGuards( )->end( );
                                cond++)
                        {
                                if (first)
                                        first = false;
                                else
                                        str += ", ";
                                if (html) str += "<I>";
                                str += (*cond)->getGuard( )->getName( );
                                if (html) str += "</I>";
                        }
                        str += "), ";
                }
        }
        else
        {
                // output text based on the code
                string code = __final->getDefault( )->getCode( );
                if (!immediateDefaultContinue)
                {
                        if (code = = PrsConst::DISPCODE__OK)
                                str += "but provisionally allow ";
                        else if (code = = "POLICY__ERROR")
                                ; // say nothing... this is the default
                        else
                                str += "but provisionally deny ";
                }
                if ((__final->getGuards( )) != 0 && (__final->getGuards( )->size( ) != 0))
                {
                        str += "with conditions (";
                        Bool first = true;
                        for (std::vector<PrsGuardedDisposition*>::const__iterator cond = __immediate->getGuards( )->begin( );
                                cond != __immediate->getGuards( )->end( );
                                cond++)
                        {
                                if (first) >
                                        first = false;
                                else
                                        str += ", ";
                                if (html) str += "<I>";
                                str += (*cond)->getGuard( )->getName( );
                                if (html) str+= "</I>";
                        }
                        str += "), ";
                }
        }
}
if (html)
        str += "from <I>"
                + (__initiator->getCredential( ) ? __initiator->getCredential( )->getName( ) : "anyone")
                + "</I> to <I>"
                + (__target->getCredential( ) ? __target->getCredential( )->getName( ) : "anyone")
                + "</I>";
else
        str += "from "
                + (__initiator->getCredential( ) ? __initiator->getCredential( )->getName( ) : "anyone")
                + " to "
                + (__target->getCredential( ) ? __target->getCredential( )->getName( ) : "anyone");
if (getPrerequisite( ) != 0)
{
        str += ", provided that ";
        Bool first = true;
        for (vector<const PrsRule*>::const__iterator t3 = __prerequisite->begin( );
                t3 != __prerequisite->end( );
                t3++)
        {
                if (first)
```

TABLE K-continued

```
                    first = false;
                else
                    str += " or ";
                if (html)
                    str += "<l><a href=\"#" + (*t3)->getName( ) + "\">" + (*t3)->getName( ) + "</a></l>";
                else
                    str += (*t3)->getName( );
            }
            str += " is true.";
        }
        // start the cell for the description
        if (html)
            str += "</TD></TR>";
        else
            str += " (Agent " + agentName + ").";
        ostm << str.c_str( );
```

For an example of an output file generated by the main algorithm discussed above, Table L shows the example of the output in table format. For an example of a policy specification file that can be used as input into the main algorithm discussed above, refer to Table P below.

TABLE L

| | | |
|---|---|---|
| | Rules for protocol HTTP | |
| Http_Blocked_Service_Violation | All Monitors | Deny HTTP from anyone to anyone, provided that Tcp Blocked Services is true. |
| Http_Deny | All Monitors | Deny HTTP from anyone to anyone |
| | Rules for protocol FTP | |
| Ftp_Blocked_Service_Violation | All Monitors | Deny FTP from anyone to anyone, provided that Tcp Blocked Services is true. |
| Ftp_Deny | All Monitors | Deny FTP from anyone to anyone |
| Ftp_Anonymous_Authentication | All Monitors | Allow FTP-CONTROL_AUTHENTICATE with condition (Authentication_Rejected), from Anon_User to anyone |
| Ftp_Validate_Password | All Monitors | Allow FTP-CONTROL_AUTHENTICATE with conditions (Authentication_Rejected, Strong_Password), from anyone to anyone |
| Ftp_Ignore_Data_Connections | All Monitors | Allow FTP-DATA_OPEN from anyone to anyone |
| | Rules for protocol SSH | |
| Ssh_Validate_Handshake | All Monitors | Allow SSH-HANDSHAKE, SSH-SESSION_ABORTED with conditions (Ssh_Authentication_Failed, Ssh_Authentication_Aborted, Ssh_Secure_Authentication_Modes), from anyone to anyone |
| Ssh_Blocked_Service_Violation | All Monitors | Deny SSH from anyone to anyone, provided that Tcp Blocked Services is true. |
| Ssh_Deny | All Monitors | Deny SSH from anyone to anyone |
| | Rules for protocol SSL | |
| Ssl_Validate_Handshake | All Monitors | Allow SSL-HANDSHAKE with conditions (Authentication_Rejected, Ssl_Session_Qos), from anyone to anyone |
| Ssl_Blocked_Service_Violation | All Monitors | Deny SSL from anyone to anyone, provided that Tcp Blocked Services is true. |
| Ssl_Deny | All Monitors | Deny SSL from anyone to anyone |
| Ssl_Missed_Handshakes | All Monitors | Allow SSL-MISSED_HANDSHAKE from anyone to anyone |

TABLE L-continued

| | | |
|---|---|---|
| Rules for protocol TCP | | |
| Tcp__Blocked__Services__Response | All Monitors | Deny TCP-ABORT, TCP-CLOSE, TCP-TIMEOUT with condition (Tcp__Data__Xfer), from anyone to anyone, provided that Tcp Blocked Services is true. |
| Tcp__Connection__Terminated | All Monitors | Allow TCP-ABORT, TCP-CLOSE, TCP-TIMEOUT from anyone to anyone |
| Tcp__Deny | All Monitors | Provisionally deny TCP from anyone to anyone |
| Tcp__X__Shh__From__Clouds__To__Cgi__Provisional | X__Monitors | Provisionally allow TCP-CONNECT from Clouds to Tcp__X__Shh__From__Clouds__To__Cgi__Provisional__Target |
| Tcp__X__Spm__Colloc__Traffic | X__Monitors | Allow TCP-CONNECT from Modin to Tcp__X__Spm__Colloc__Traffic__Target |
| Tcp__X__Spm__Colloc__Traffic__Provisional | X__Monitors | Provisionally allow TCP-CONNECT from Modin to Tcp__X__Spm__Colloc__Traffic__Provisional__Target |
| Tcp__X__Ssh__From__Monkey__To__Fluffy__Provisional | X__Monitors | Provisionally allow TCP-CONNECT from Monkey to Tcp__X__Ssh__From__Monkey__To__Fluffy__Provisional__Target |
| Tcp__X__X__Loghost__Traffic | X__Monitors | Allow TCP-CONNECT from X__Web__Servers to Tcp__X__X__Loghost__Traffic__Target |
| Tcp__X__Dns__From__Colloc__To__Dns__Server | X__Monitors | Allow TCP-CONNECT from X__Coloc__Subnet to Tcp__X__Dns__From__Colloc__To__Dns__Server__Target |
| Tcp__X__Port__1984__Traffic | X__Monitors | Allow TCP-CONNECT from X__Coloc__Subnet to Tcp__X__Port__1984__Traffic__Target |
| Tcp__X__Ssh__To__Web__Server | X__Monitors | Allow TCP-CONNECT from X__Ssh__To__Web__Server__Initiator to Tcp__X__Ssh__To__Web__Server__Target |
| Tcp__X__Ssh__From__Fluffy__To__Monkey__Provisional | X__Monitors | Provisionally allow TCP-CONNECT from Fluffy to Tcp__X__Ssh__From__Fluffy__To Monkey__Provisional__Target |
| Tcp__X__Ssh__From__X__To__X__Web__Servers__Provisional | X__Monitors | Provisionally allow TCP-CONNECT from X__Ssh__From__X__To__X__Web__Servers__Provisional__Initiator to Tcp__X__Ssh__From__X__To__X__Web__Servers__Provisional__Target |
| Tcp__X__Http__From__Any__To__All__Web__Servers__Provisional | X__Monitors | Provisionally allow TCP-CONNECT from anyone to Tcp__X__Http__From__Any__To__All__Web__Servers__Provisional__Target |
| Tcp__X__Stmp__From__All__To__X | X__Monitors | Allow TCP-CONNECT from X__Stmp__From__All__To__X__Initiator to__Smtp |
| Tcp__Blocked__Services | All Monitors | Provisionally deny TCP-CONNECT from anyone to anyone |
| Tcp__Missed__Connections | All Monitors | Allow TCP-MISSED__CONNECT from anyone to anyone |
| Tcp__Blocked__Services__Violation | All Monitors | Deny TCP-PROTOCOL__UNKNOWN from anyone to anyone, provided that Tcp Blocked Services is true. |
| Tcp__Unknown__Protocol | All Monitors | Deny TCP-PROTOCOL__UNKNOWN from anyone to anyone |
| Rules for protocol UDP | | |
| Udp__X__Dns__From__Colloc__To__Dns__Server | X__Monitors | Allow UDP-ASSOCIATION from X__Coloc__Subnet to Udp__X__Dns__From__Colloc__To__Dns__Server__Target |
| Udp__Deny | All Monitors | Deny UDP from anyone to anyone |
| Rules for protocol ICMP | | |
| Icmp__Within__X | X__Monitors | Allow ICMP-ASSOCIATION from anyone to anyone, provided that Ip Within X is true. |
| Icmp__Deny | All Monitors | Deny ICMP from anyone to anyone |

TABLE L-continued

| Rules for protocol IP | | |
|---|---|---|
| Ip_Directed_Broadcasts_Within_X | X_Monitors | Allow IP-ASSOCIATION from Ip_Within_X_Initiator to Ip_Directed_Broadcasts_Within_X_Target |
| Ip_External_Communities_To_X | X_Monitors | Provisionally deny IP-ASSOCIATION from X_External_Communities to X_Coloc_Subnet |
| Ip_X_To_External_Communities | X_Monitors | Provisionally deny IP-ASSOCIATION from X_Coloc_Subnet to X_External_Communities |
| Ip_Within_X | X_Monitors | Provisionally deny IP-ASSOCIATION from Ip_Within_X_Initiator to X_Coloc_Subnet |
| Ip_Non_Directed_Broadcasts_Within_X | X_Monitors | Allow IP-ASSOCIATION from Ip_Within_X_Initiator to _Generic_Multicast_And_Broadcast_Addresses |
| Ip_Deny | All Monitors | Deny IP from anyone to anyone |
| Ip_Unknown_Protocol | All Monitors | Deny IP-PROTOCOL_UNKNOWN from anyone to anyone |

Algorithm for Efficient Rule Evaluation

The preferred embodiment of the invention comprises a technique for a policy engine internally to organize policy rules in order to effect an efficient evaluation of protocol events at runtime. Evaluation of a protocol event entails selecting one or more applicable policy rules using an evaluation algorithm. The preferred evaluation algorithm is described in A Declarative Language for Specifying a Security Policy, U.S. patent application Ser. No. 09/479,781 (Jan. 7, 2000). An excerpt describing the preferred evaluation algorithm is provided below in Table P.

Figure 13:
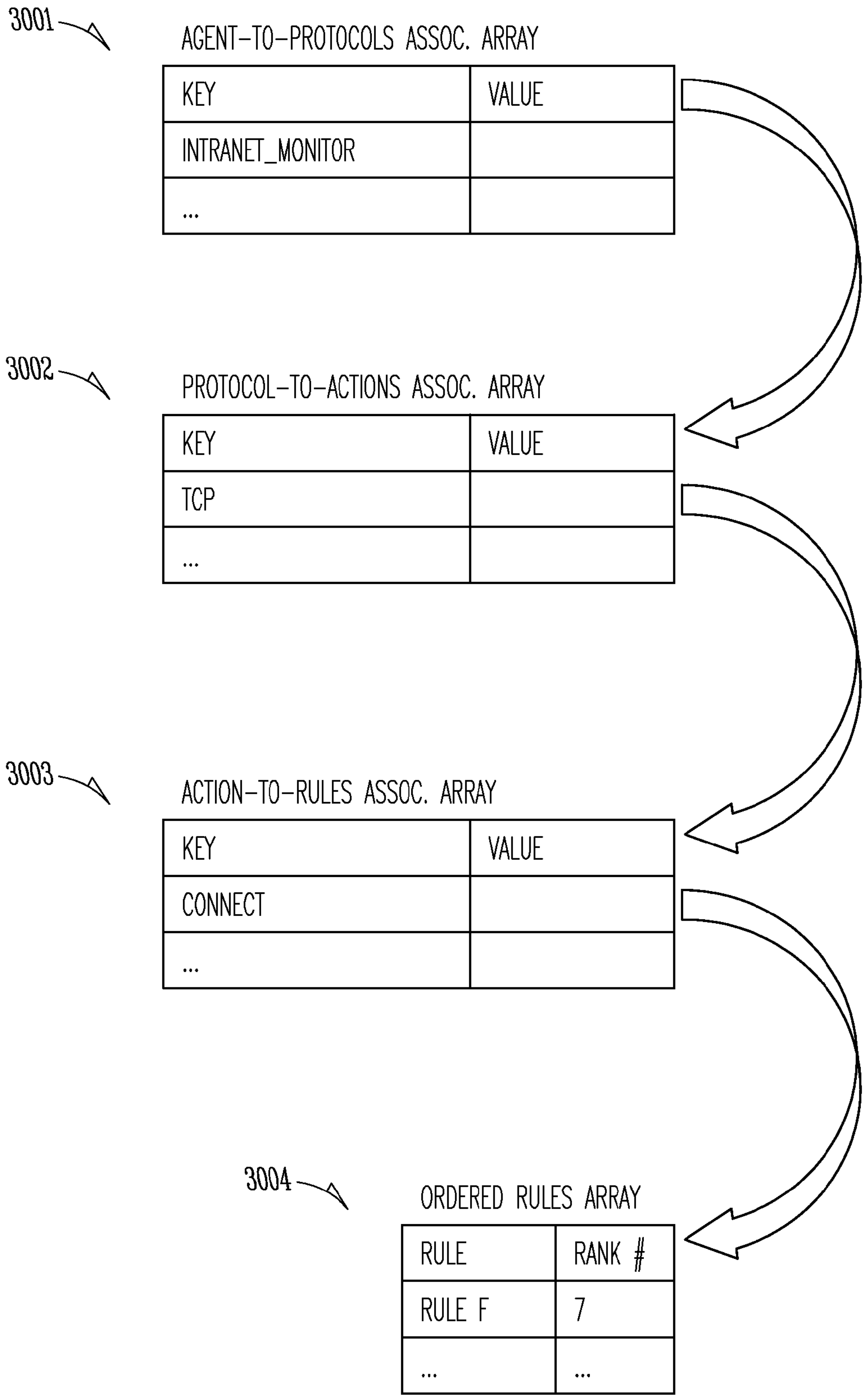
FIG. 13 shows a flow diagram according to the invention.

Using this technique, policy rules are organized in a manner that minimizes the number of rules that need to be considered when determining the set of rules applicable to a given protocol event. The algorithm is described with reference to FIG. 13 as follows:

- Create a first associative array, such as, for example, agent-to-protocols, where the key is an agent descriptor and the value is a reference to a second associative array with all the policy rules applicable to network traffic monitored by that agent (3001);
- Create a second associative array, such as, for example, protocol-to-actions, where the key is a protocol name and the value is a reference to a third associative array with all the policy rules applicable to that protocol (3002).
- Create a third associative array, such as, for example, action-to-rules, where the key is a protocol action and the value is a list of references to the policy rules applicable to that protocol action (3003). The rules referenced in this list (3004) are sorted in decreasing order of rank number, taking into account any constraints such as, for example, rank-above, that might be present. Rules with the same rank number are ordered in the lexical order of their names.

It should be noted that the same rule can be referenced by different lists of ordered rules and, in each list, can have different rank numbers because the ranking of a rule is relative to the ranking of the other rules in the same list.

Assessment Tool

The preferred embodiment of the invention provides an assessment tool that allows the discussed technique for continuously assessing the security of a system to be applicable to both long-term and short-term network assessment. The tool provides an additional dimension to network assessment. That is, it provides the ability to capture and classify large volumes of network traffic efficiently, based on a formal policy which describes permitted traffic. The tool adds network usage to the known list of features discussed in an assessment framework.

It has been found through field experience that the invention can be useful in the following contexts:

- Identifying services that were not mentioned by the system administration staff of a network that is being assessed;
- Identifying usage patterns of critical machines. In an assessment framework, this applies to typical usage patterns, because a long-term deployment of the invention is needed to continuously analyze and monitor changes in usage or rare aberrant behavior;
- Identifying services; and
- Analyze routing patterns. It should be appreciated that subnets are not scanned.

It should be appreciated that using the invention as a supplemental process in performing network assessments results in at least the following benefits:

- Rather than providing an inference of possible network behavior that is based on what hosts are configured to do, the network behavior is directly analyzed based on direct observation of data traffic;
- Rather than basing security analysis on a static snap-shot of the network environment as it existed at a particular moment, the analysis is based on a dynamic recording of network behavior over some non-trivial amount of time. As an analogy, traditional known network vulnerability scans take still photographs, while the invention takes a motion picture;
- Instead of relying on the accuracy of information provided by the customer point of contact through an interview process, the invention provides specific and tangible data points for discussion that facilitates the interview process and educates the customer on problems in an immediate feedback loop; and
- Because the invention is policy based, and because of the rigor built into the policy language and analysis engine, the otherwise manual (and hence error prone) analysis of security issues relative to the business and architectural context are enforced with a precise methodology which greatly reduces errors and omissions during the assessment process.

It should be appreciated that because the invention operates passively, the customer network can be monitored while in normal operation or production.

Operational Description

An example of implementing the assessment tool is described in the following discussion. A consultant arrives at a customer office with one or more workstations with the monitoring invention discussed herein loaded. The workstation, or station for short, may be a laptop computer, or other suitably portable platform. The monitoring station is attached to the customer network at a critical network bottleneck, e.g. just inside an Internet firewall, and monitors all traffic at that point in the network. From a security point of view, the monitoring station is entirely passive and invisible to the network. The monitoring station only receives packets and does not respond to any protocol actions. Due to the monitoring station's passive nature, no operational impact is imposed on the subject network. Hence, assessments may be performed during peak production times, as well as when a network is in a quiescent state.

In this example, the monitoring station is left attached to the network for a long period of time, depending on conditions, such as, for example, the practical demands of the visit, storage space on the station, and the amount of traffic on the customer's network. If appropriate, the station can be left at the customer site to gather data over a short-term period, such as, for example, days and weeks.

In this example of an assessment situation, the policy specification is used to remove from consideration as much mundane network traffic as possible, allowing the analyst to concentrate on more interesting traffic. Due to the opinion of the analyst being part of the assessment process, there is no fixed goal for the level of detail needed in the policy specification. In the simplest case, the analyst generates no policy at all, and examines the network events one by one (perhaps using the query tool to filter them). In practice, it can be suggested that the analyst undergoes a short policy development phase, as the short policy development phase can serve the analyst well to reduce thousands of network events into a page or two, which may then be examined by inspection.

The invention allows data to be stored in full packet form for most detailed analysis, or in compressed form storing only security-sensitive events. The latter form also removes customer-confidential information, such as, for example, embedded passwords, so that it is more appropriate for removal from the customer site. A typical usage scenario is capturing full-packet data in a short burst, such as, for example, five minutes. After a brief analysis, a longer data collection is run using the compressed form.

Figure 14:
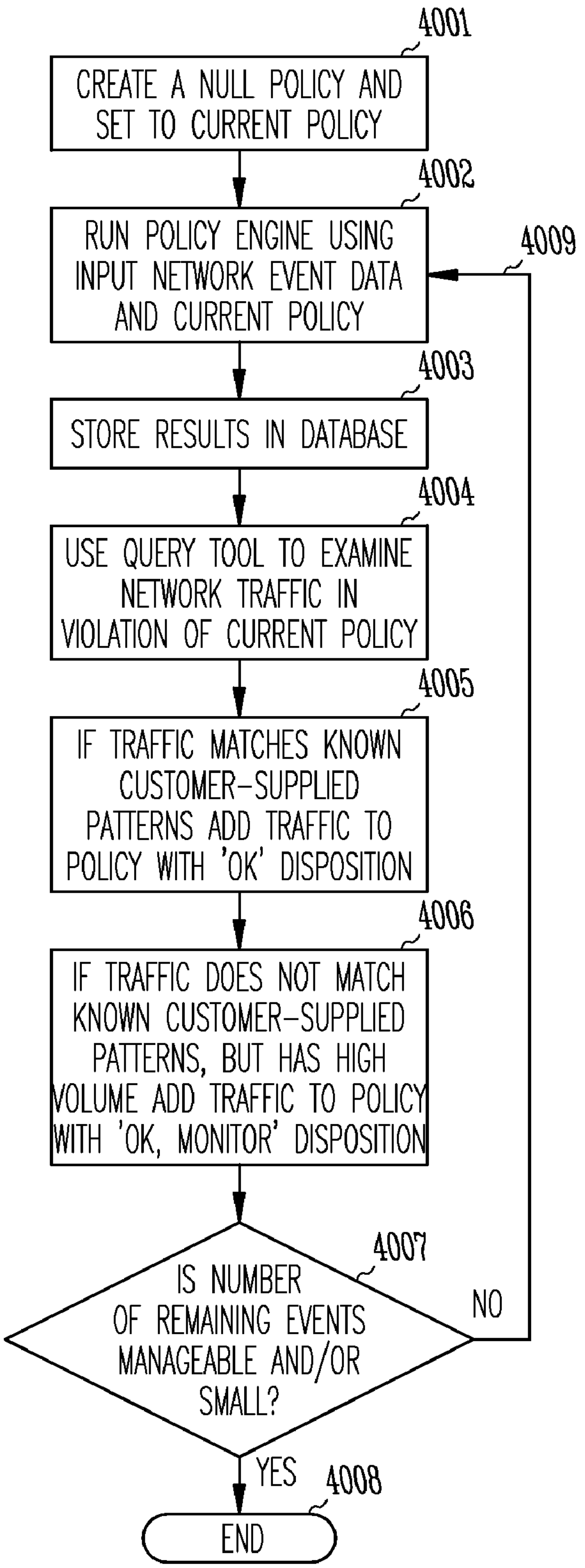
FIG. 14 shows an algorithm according to the invention.

The preferred embodiment of the invention provides the following algorithm for an operator, such as an analyst, to perform the data analysis on a data packet or on a compressed file of data. The algorithm is described referring to FIG. 14, as follows:

1) Create a null policy, which denies all actions, for a customer site (copying a file). Set null policy to the current policy (4002);
2) Run the policy engine discussed herein over the input data and using current policy (4002), and store the resulting data in a local database (4003);
3) Using the query tool discussed herein, examine the network traffic that is declared in violation by the current policy (4004);
4) Categorize the most frequent traffic based on customer input:
   a) If the traffic matches known customer-supplied input patterns, add this traffic to the policy with an OK disposition (4005);
   b) If the traffic does not match customer-supplied input patterns, but has high volume, add this traffic to the policy with an OK, monitor disposition (4006).
5) Repeat from step 2 (4009) until only a small, manageable number of events remains (4007). Then end the algorithm (4008).

It should be appreciated that the same packet or compressed file is run by the policy engine multiple times.

It should be appreciated that in an assessment situation a policy can be edited by using the policy generator discussed herein. The invention provides for using the policy generator for rapid policy development based on transport-level parameters. Enhanced policy development, using more complex tools, typically is not necessary in an assessment situation.

It should also be appreciated implementing the algorithm discussed above does not take very long. Part or all of the process may take place at the customer site, in a hotel room, on an airplane, or back at the analyst's office, for example. When the process is completed, the analyst has a list of monitored network events. This list is used as a basis for additional discussion with the customer to determine the meaning of such events. Experience has shown that such conversation is useful to the assessment interviewing process.

It should also be appreciated that the variations of the algorithm above can be implemented and are within the scope of the invention. Examples of variations follow.

Example Variation I

An equally preferred embodiment comprises the analysts first determining the customer requirements and the customer network credentials. Using this information, the analyst programs an initial policy. The analyst can derive and use additional information from the scanning process as described in the algorithm above.

Example Variation II

The customer or analysts designs an initial best policy as a set of credentials and rules, set all dispositions to DENY, and monitors the network to determine what the dispositions should be.

Credential/Condition Assertion Verification Optimization

In the preferred embodiment of the invention, the policy language describes a policy decision involving two principals, an initiator and a target principal. These principals are identified by a set of one or more credentials. For each policy decision the policy engine ascertains which credential in the policy best describes the information about the principals involved in an interaction. Similarly, the policy language herein describes conditions that in turn describe tests performed on the state of an associated protocol event.

The preferred embodiment of the invention provides a credential/condition assertion verification optimization algorithm to ensure that the choice of credentials and conditions are made as efficiently as possible.

To accomplish credential/condition assertion verification optimization, the policy engine:

During the initialization process dynamically creates comparing functions for principals with credentials, and comparing functions for state of protocol events with particular conditions in a high level language such as C++;

Dynamically creates and loads a module containing the comparing functions;

During runtime ensures that installed policy file matches module containing comparing functions, otherwise generates new module containing comparing functions that correspond to installed policy file; and Calls comparing functions as appropriate.

The preferred embodiment provides a more rigorous algorithm, an example of which is described in Table M below.

TABLE M

| During the initialization process of the policy engine: |
|---|
| the policy engine requests that the parser module load a policy file, comprising credentials and conditions into an in-memory representation;<br>the policy engine requests that the parser module load an assertion verification dynamically loadable library (DLL);<br>if this DLL exists then<br>it is loaded into memory; and<br>a predetermined function, for example named dllValidateFunc( ), contained in the loaded DLL is called.<br>If the return value of the function call is the same as a MD5 hash of the previously loaded policy file, then loading is complete. Otherwise execution initialization continues below;<br>because the DLL does not exist or because the MD5 hash does not match, a code generation function of the parser module is invoked, which:<br>adds header information to a C++ assertion code file;<br>adds a function that returns the MD5 hash of the policy file that was used to generate this C++ file;<br>iterates through credentials contained in the in-memory representation, generating C++ function prototype and function declarations for code that can compare a principal description with the definition of a credential into the assertion code file, wherein such comparison is performed by:<br>calling other credential comparison methods for any credentials used in the definition of the credential under test;<br>making calls to the policy engine module to perform comparison operations based on allowable operations for the built-in types of the policy language; and<br>combining the results of the above tests with logical operators AND, OR and NOT;<br>iterates through the conditions contained in the in-memory representation, generating C++ function prototype and function declarations for code that can compare a protocol state description with the definition of a condition into the assertion code file, wherein such comparison is performed by:<br>calling other condition comparison methods for any conditions used in the definition of the condition under test;<br>making calls to the policy engine module to perform comparison operations based on the allowable operations for the built-in types of the policy language; and<br>combining the results of the above tests with logical operators AND, OR and NOT;<br>compiles and links this generated C++ file to create a dynamically loadable module containing a compiled version of the principal/credential and protocol/condition comparison functions; and<br>loads this newly created module. |
| During the runtime of the policy engine: |
| each time that it needs to decide whether a principal is described by a particular credential it computes the name of the comparison function based on the name of the credential to be tested;<br>calls the comparison function which returns a Boolean value that represents whether the credential under test matches the principal under test;<br>each time that it needs to decide whether a protocol state satisfies a particular condition it computes the name of the comparison function based on the name of the condition to be tested; and<br>calls the comparison function which returns a Boolean value that represents whether the condition under test satisfies the protocol state under test. |

Network Monitor Internals Descriptions

The preferred embodiment of the invention provides a network monitor internals mechanism discussed below that serves to translate packet data into multiple concurrent streams of network event data. It accomplishes this by interpreting both sides of each protocol transaction.

Figure 15:
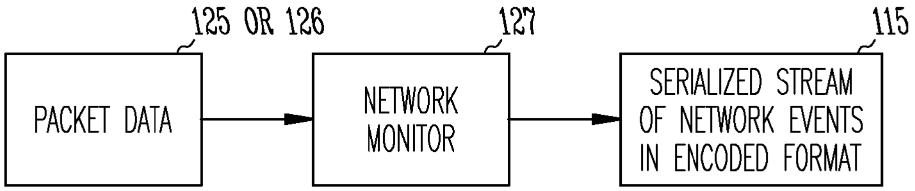
FIG. 15 shows a high level schematic diagram according to the invention.

FIG. 15 shows a high level schematic diagram of the network monitor 127 accepting packet data from either a live network interface 125 or a file containing packet data 126. The network monitor extracts security-sensitive details from the input packet stream 125, 126, and generates output in a serialized stream of encoded network event information 115. The preferred encoded format is DME encoded format, discussed below in section, Network Event Encoding Format. The output network event information can be stored for logging or debugging purposes, or can be passed directly to the policy engine. Thus, the discussed network monitor provides an efficient process of exporting data from a customer's site, such process comprising extracting security-sensitive information.

Figure 16:
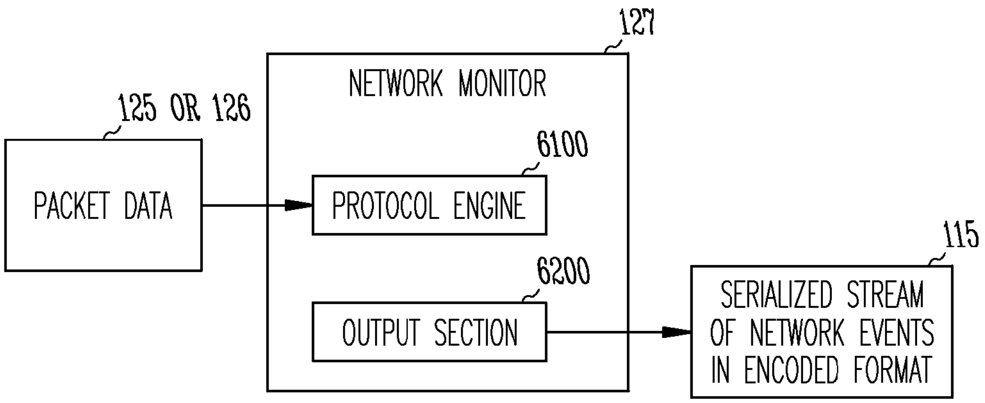
FIG. 16 shows a schematic diagram of process flow according to the invention.

FIG. 16 shows a schematic diagram of process flow according to the invention. The network monitor 127 is a single-threaded program that processes packets (125 or 126) as they are read. Each packet is passed to a monitor protocol engine 6100 for processing. When security-sensitive protocol events are encountered in the packet data, the monitor calls into its output section 6200 to transmit network or protocol events to the rest of the policy monitoring system 100 via a network pipe, direct procedure call. Output section 6200 can also store protocol events in a file for later processing.

Protocol Engine

Figure 17:
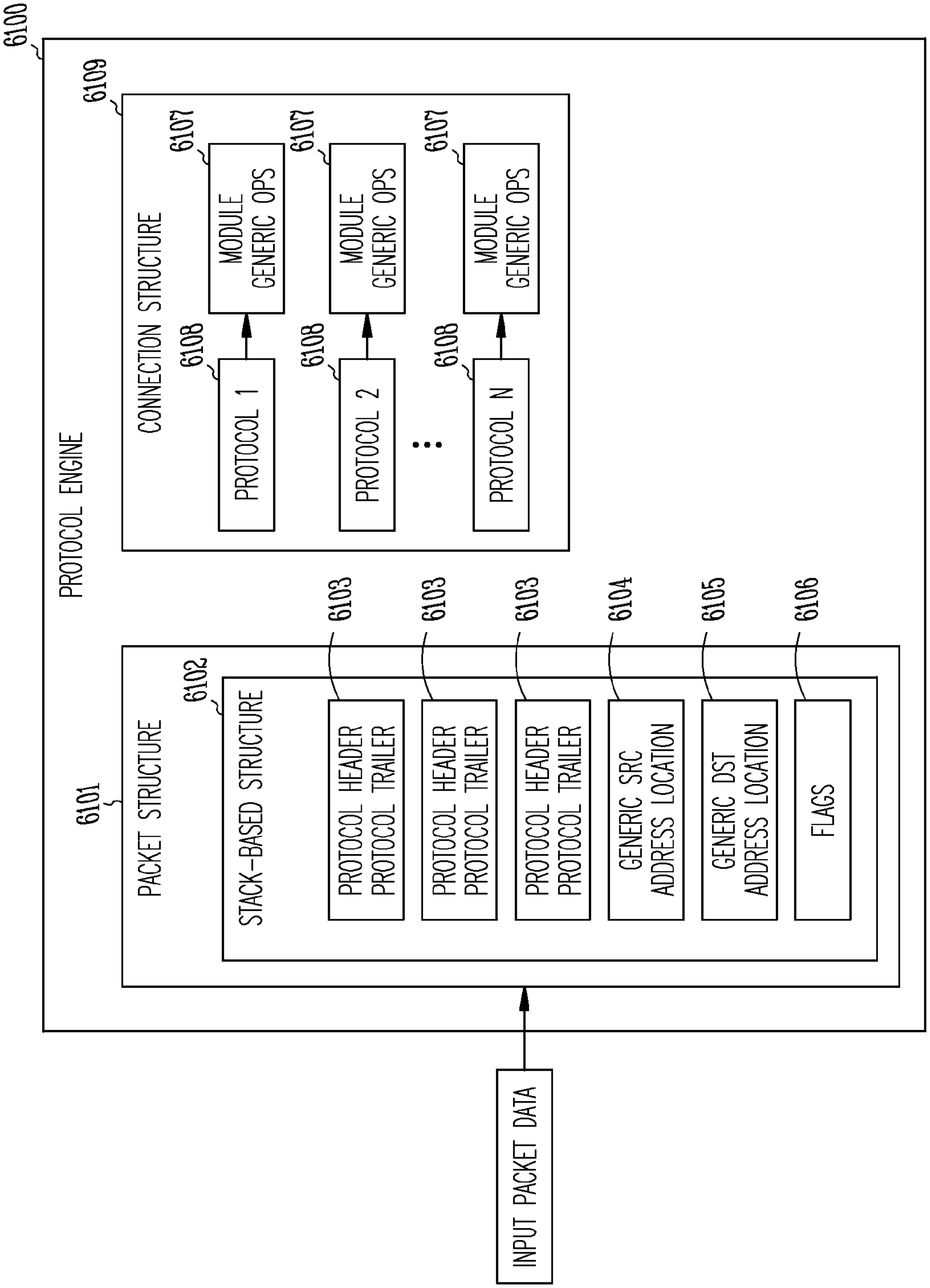
FIG. 17 is a block schematic diagram according to the invention.

The preferred embodiment of the invention provides a protocol engine in the network monitor that can be described with reference to FIG. 17, which is a block schematic diagram of features of the protocol engine according to the invention. Input packet data 115 is read into a known object-oriented structure type 6101, such as, for example, a C structure here named pkt_t_structure. The pkt_t structure 6101 represents a packet on the network. It provides a stack-based structuring mechanism 6102 that allows protocol headers and trailers 6103 to be marked in the packet so that software may focus easily on the correct protocol layer. The pkt_t structure 6101 also includes generic src 6104 and dst 6105 address locations, and flags 6106 to pass useful information up and down a connection stack, for example, if such packet is transiting from server to client or vice versa.

The protocol engine 6100 provides one module 6107 for each protocol implemented 6108. The modules implement a generic series of operations, a preferred example of such series is provided below in Table N. A common connection structure 6109 allows connection data to be arranged in a stack allocation for each access across layer boundaries. In Java or C++ terminology, for example, each protocol is a superclass of connection. The layering permits protocols to assume one or more roles as the layer responsible for each corresponding boundary, such as, for example: Network, Transport, Session, Application, or Transactions.

TABLE N

| Example of generic operations for each protocol implementation: |
|---|
| 1. Init: Call-once initialization<br>2. Bind (packet, connection): given the first packet of a connection, attempt to bind this packet into a new instance of this protocol within connection. Establish the instance in its |

TABLE N-continued

| Example of generic operations for each protocol implementation: |
|---|
| proper role(s) within the connection. |
| 3. Input (packet, connection): given a packet, which has been associated with a connection (in some cases, connection is NULL, indicating that no such relationship exists, or exists yet), process the packet as input to the connection. |
| 4. GiveBack (packet, connection): given a packet, which has been associated with a connection at a higher level of protocol, give back the packet to this layer, so that the data will be received later, as if it was retransmitted. Typically, packet has been modified to contain only part of the input data. |
| 5. GetMore (connection, amountNeeded, fromClientOrServer) returns (packet): given a connection, attempt to return a packet containing more data on the connection, if such is available. This call is used from a higher layer of protocol calling down to a lower layer of protocol. The fromClientOrServer argument is used to determine if the data is being requested that was received by the server side or the client side of the connection. |
| 6. StopCollecting (connection): given a connection, adjust the protocol stack so that no further data will be processed on this connection. Depending on the protocol in question, this may involve discarding data or adjusting filters. A connection which is not "collecting" attempts to process packets in the most efficient manner. |
| 7. Shutdown (connection, fromOrg, fromDst): given a connection, modify the connection state to indicate that the client, server, or both have acted to take down the connection. The full generality of the call is needed only for a transport connection like TCP. |
| 8. Del (connection): given a connection, arbitrarily delete the instance of this protocol from the connection object. This call is intended to clean up the resources used by the connection; Shutdown is used to indicate protocol agreement that the connection is coming to an end. |
| 9. Alarm (connection, time): given a connection and the current time, this call is used to signal an alarm has expired on this connection. The time argument is the official time of the alarm, which may not even be related to the current time. |
| 10. SwitchSrcDst (connection): this call indicates that a higher layer of software (perhaps a higher level protocol) has determined that the choice of client and server in this protocol instance are wrong, and should be reversed. This may happen when initial connection negotiation packets are not seen by the monitor, but later information makes the client and server clear. |

It should be appreciated that in the stopCollecting generic operation, and in a transport protocol, header information in packets may need to be examined to determine connection state, allowing freeing of resources when the connection terminates. Transport protocols discard all subsequent data from the connection, and do not forward packets on to higher level protocols. Such mechanism allows the monitor to efficiently process bulk transfers, encrypted connections, or connections that are no longer of interest to the policy engine.

It should be appreciated that the process discussed above for the stopCollecting generic operation can be appropriate for a hardware filter to stop packets from arriving.

The concept of the current time in the monitor flows from the packet level upwards. That is, time is associated with the packet and is maintained throughout the packet. When the network monitor is running in real time off live packet data, current time reduces to the time a packet was received, which may be earlier than the time when the packet is processed. When the network monitor is running off stored packet data, current time in the monitor has no relation to actual current time. The packet is processed relative to the time it was received and whereby time intervals remain the same. Also, results can be lined up in the database reflecting the point of reference of the time the packet was received.

The network monitor provides support for setting alarms on connections. An alarm is set by registering a connection to receive a signal when the network monitor transitions to a predetermined value of current time. The signal consists of a call to a generic alarm operation in every protocol layer registered with such connection. Alarm handlers are called in order from lowest protocol layer to highest protocol layer.

Because network monitor functionality is based on network events that can map to network connections, the network monitor provides a connectionless association feature. By using the feature, the network monitor registers the fact that it noticed two IP hosts communicating. Typically, an association is long lived, whether or not the network monitor knows its intention. Examples of associations are a series of ICMP PING/PING REPLY packets and a stream of IPSEC packets. The network monitor treats associations as connections. Indeed, often associations are connections at a higher level of protocol.

Output Section

Figure 18:
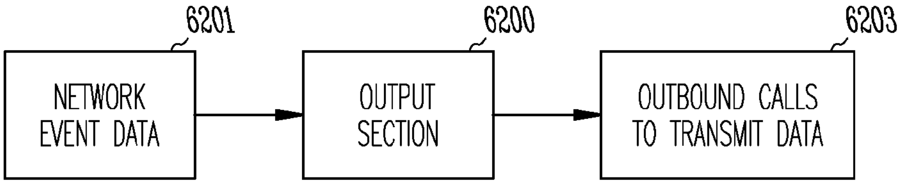
FIG. 18 is a high level flow diagram of the preferred output section according to the invention.

The preferred embodiment of the invention provides an output section in the protocol engine. FIG. 18 is a high level flow diagram of the preferred output section according to the invention. The output section 6200 of the network monitor receives network event data from the protocol engine and generates outbound calls 6203 to transmit such data to the policy engine or to a file.

Figure 19:
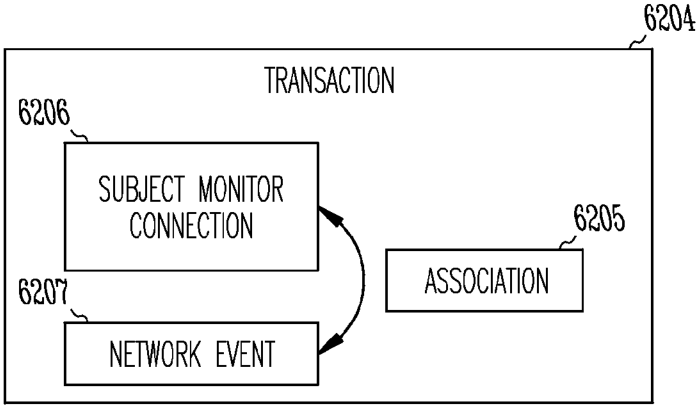
FIG. 19 shows a schematic diagram according to the invention.

The output section 6200 works by allowing the network monitor to establish a transaction which forms an association between a monitor connection and a network event in the policy engine. FIG. 19 shows a schematic diagram of a transaction 6204, comprising an association 6205 between a subject monitor connection 6206 and a network event 6207. Typically, the lifetime of the connection 6206, the transaction 6204, and the network event 6207 is similar.

The output section's interface comprises a set of calls to establish communication with the policy engine, and to start and finish transactions, and a set of protocol-specific calls. The calls progress as follows:

```
Connect
  BeginTransaction
    ProtocolEvent1
    ProtocolEvent2
    . . .
  EndTransaction
Disconnect
```

It should be appreciated that in addition to the calls above, multiple transactions can be active at a time, as long as each transaction follows the ordering described above.

The output section internally translates such calls into a generic set of calls, an example of which is listed below. At initialization of the network monitor, the output section is configured with a chain of output generic modules, each of which is used as filter on the output data. An example of the implemented modules follows:

NULL: acts as an endpoint, but discards input data without doing anything;

SM: connects by procedure call directly to policy processing;

ENC: generate encoded form of output; and

LOG: generate textual form of output.

In an equally preferred embodiment of the invention, the network monitor also includes an input section that decodes an encoded version of events. For an example application, in a real-time monitoring system embodiment the monitor 127 processes network traffic 125 in real time and uses ENC to generate encoded output. The encoded output is transmitted in real-time over a TCP connection where it is decoded and connected using SM to the Policy Engine 102.

In another embodiment of the invention, the output section is used for testing purposes. The output section is configured using command line arguments. An example of an algorithm for such testing follows:

1. Capture packet data into a file;
2. Run the network monitor on the packet data, using LOG→ENC. Store the logged textual data and the encoded form into separate files; and
3. Run the network monitor on the encoded data, using LOG→NULL. Store the logged textual data in a file.
4. Compare the two textual files to make sure that the decoded version matches the logged textual file.

Network Event Encoding Format

The preferred embodiment of the invention provides a technique for network event encoding to be used by the network monitor. The encoding technique is designed for both archival and transmission purposes. The basic format of the encoding is:

Header
Embedded agent descriptors
Type map
Encoded transactions

An example of the preferred form of the header follows:

4 byte magic number: "SMKo"
1 byte major version=2
1 byte minor version=1
4 bytes containing the size of this header
8 bytes (struct timeval) begin time, which is a time which is less than or equal to every timestamp in this encoded record
4 bytes offset of agent descriptor section
4 bytes indicating number of agent descriptors
4 bytes offset of type map section
4 bytes indicating number of type map entries
4 bytes offset to first transaction record
4 bytes size of this file, or 0xFFFFFFFF if unknown.
4 bytes 1's complement checksum of this file or 0xFFFFFFFF if unknown The agent descriptor section is used to store a possibly null list of agent descriptors that are configured into the network monitor at encoding time. The agent descriptors are strings that plug into a particular policy language policy. They indicate the location of the subject monitor in the subject network wiring structure, enabling rules that apply to such location in the network and disable rules that do not apply.

A preferred agent descriptor section comprises an array, where each element of the array is an ASCII string, preceded by a single byte giving its length. The size of the array is given in the header cited above.

The preferred type map section is used to improve maintainability of the full policy monitoring system. Provided by the type map section is a mapping between update types used in an encoded record and the update types' string names. The decoding module uses this information to detect new update types that are not supported by mapping known updates to the correct values. That is, because new update types typically are not interpretable by old software, they are therefore successfully skipped.

A preferred type map section comprises an array, where each element of the array contains a four-byte type value, a single byte of string length, and the ASCII name of the type. The size of the array is given in the header cited above.

The preferred encoded transactions comprise an array of individual update encodings. The size of the array is either derivable from the header file size information, or is unbounded, such as, for real-time monitoring.

A preferred header for an individual update has the following format:

1 byte, giving the update type
4 bytes, giving the size of this header in bytes, not including the length of the header
8 bytes (struct timeval) giving the absolute time when this update occurred
4 bytes, giving the packet number of this update since the monitor started (first packet=packet #0)
4 bytes, giving the eventID of this update, which is the number of BEGIN_TRANS updates that occurred before this one, since the monitor started Following the header a body contains additional update-type-specific data, or possibly none.

To understand all events that transpire on a connection, it is necessary to combine events of different protocol layers. For example, an update, named SM_IP_ASSOCIATION, provides IP src and dst addresses and establishes a peer relationship. Subsequent events assume that this information is known and builds on it. For example, an update named ICMP_ECHO has no body at all.

An example of a set of update types and corresponding encoding body for each update, according to the invention is given below in Table O. The meaning of the term "string" is: if length(string) is <255, then byte[length], byte[string][length], else byte[0xff], byte[a], byte[b], byte[c], byte[d], byte[string][length] where a, b, c, d are the four (big-endian) bytes of length.

TABLE O

SM_BEGIN_TRANS
Body: none
Meaning: begin new transaction (network event)
SM_END_TRANS
Body: none
Meaning: end previously "begin" transaction (network event)
SM_PUOSU
Body: none
Meaning: the monitor can glean no more useful information about this network event. The policy engine should process policy and give additional input to the monitor.
SM_DEBUG_MSG
Body: string
Meaning: debug message, to be inserted into SPM debugging log.
SM_PROTOCOL_UNKNOWN
Body: none
Meaning: the monitor is unable to determine the higher level protocol
SM_FTP_DATAOPEN
Body: none
Meaning: This (new) connection is an FTP data connection
SM_FTP_DATACLOSE TABLE O-continued Body: none
Meaning: This FTP data connection has closed normally.
SM__FTP__DATAABORT
Body: none
Meaning: This FTP data connection has close abnormally.
SM__FTP__OPEN
Body: none
Meaning: This (new) connection is an FTP control connection
SM__FTP__CLOSE
Body: none
Meaning: This FTP control connection has closed normally.
SM__FTP__ABORT
Body: none
Meaning: This FTP control connection has closed abnormally
SM__FTP__NOAUTH
Body: 4-byte, number of authentication failures
Meaning: This FTP control connection has failed to authenticate
SM__FTP__AUTH
Body: String, user name
String, password, if user was anonymous
4-byte, password length
1-byte, nonzero if password contains alphabetics\
1-byte, nonzero if password contains numeric characters
1-byte, nonzero if password contains characters which are non-alphanumeric
4-byte, number of authentication failures
Meaning: This FTP control connection has successfully authenticated
SM__FTP__FILEGET
SM__FTP__FILEPUT
SM__FTP__DEL
SM__FTP__MKDIR
SM__FTP__RMDIR
Body: String, file name
1-byte, FTP error code
String, FTP error message
Meaning: attempt to perform FTP RETR, STORE, DEL, MKD, RMD command. If immediate failure, the error is given in the message. For GET/PUT, if transfer is proceeding, error status comes in the XFERDONE message.
SM__FTP__XFERDONE
Body: String, unused
1-byte, FTP error code
String, FTP error message
Meaning: status from continuing FILEPUT or FILEGET command
SM__FTP__RENAME
Body: String, from file name
String, from file name
1-byte, FTP error code
String, FTP error message
Meaning: attempt to perform FTP file rename command. If failure, the error is given in the message.
SM__HTTP__CLOSE
Body: none
Meaning: This HTTP connection has closed normally.
SM__HTTP__METHOD
Body: 1-byte, method code (one value for each HTTP method)
1-byte, HTTP version (major)
1-byte, HTTP version (minor)
String, URL
Meaning: Describes HTTP method line
SM__HTTP__POSTDATA
Body: 1-byte, always true.
1-byte, nonzero if this is the last POSTDATA call to complete all the post data.
String, post data
Meaning: contains some or all of the post data for an HTTP POST method.
SM__HTTP__REQCTYPE
SM__HTTP__RESPCTYPE
Body: String, content type
Meaning: HTTP content type from request or response header.
SM__HTTP__REQCOOKIE
SM__HTTP__RESPSETCOOKIE
Body: String
Meaning: HTTP cooking / set-cookie headers
SM__HTTP__REQHEADER
SM__HTTP__RESPHEADER
Body: 1-byte, nonzero if this is the last group of header info
4-byte, number of header lines
String[number of header lines]
Meaning: contains HTTP header information from request or response header.
SM__HTTP__REQHEADEREND
SM__HTTP__RESPHEADEREND
Body: none TABLE O-continued Meaning: End of request or response header has been reached.
SM_HTTP_RESPONSE
Body: 4-byte, response code
1-byte, HTTP version (major)
1-byte, HTTP version (minor)
String, response message
Meaning: encoding of the HTTP response header line
SM_HTTP_MISS
Body: none
Meaning: Monitor was unable to parse the HTTP transaction (perhaps because of missed packets)
SM_ICMP_BADCODE
Body: none
Meaning: ICMP packet received of unknown type
SM_ICMP_DU_FRAG (destination unreachable: fragmentation needed and DF set)
SM_ICMP_DU_HOST (destination unreachable: host unreachable)
SM_ICMP_DU_NET (destination unreachable: net unreachable)
SM_ICMP_DU_PORT (destination unreachable: port unreachable)
SM_ICMP_DU_PROT (destination unreachable: protocol unreachable)
SM_ICMP_DU_SRCRT (destination unreachable: source route failed)
SM_ICMP_DU_FILTER (destination unreachable: packet filtered)
SM_ICMP_PARAM (parameter problem)
SM_ICMP_SRCQ (source quench)
SM_ICMP_TE_EXCD (time to live exceeded in transit)
SM_ICMP_TE_FRAG (fragment reassembly time exceeded)
Body: 4-byte, IP src address
2-byte, UDP/TCP src port
4-byte, IP dst address
2-byte, UDP/TCP src port
4-byte, IP protocol
Meaning: This connection contains a particular ICMP error. The body gives information from the nested packet within the ICMP packet.
SM_ICMP_ECHO
SM_ICMP_ECHOR
Body: none
Meaning: ICMP echo / echo reply seen (echo is commonly called "ping").
SM_ICMP_IREQ
SM_ICMP_IREQR
Body: none
Meaning: ICMP information request/reply seen
SM_ICMP_RD_HOST (Redirect datagrams for the Host)
SM_ICMP_RD_HOSTTOS (Redirect datagrams for the Type of Service and Host)
SM_ICMP_RD_NET (Redirect datagrams for the Network)
SM_ICMP_RD_NETTOS (Redirect datagrams for the Type of Service and Network)
Body: 4-byte, gateway address
4-byte, IP src address
2-byte, UDP/TCP src port
4-byte, IP dst address
2-byte, UDP/TCP src port
4-byte, IP protocol
Meaning: For thegiven ICMP redirect, the body gives gateway information and information from the nested packet within the ICMP packet.
SM_ICMP_TSTMP
SM_ICMP_TSTMPR
Body: none
Meaning: ICMP Timestamp / Timestamp reply seen
SM_ICMP_ASSOCIATION
Body: none
Meaning: This connection contains an ICMP-level association.
SM_IPINFO_IP ASSOCIATION
Body: 6-byte, src MAC address
6-byte, dst MAC address
4-byte, IP src address
2-byte, UDP/TCP src port
4-byte, IP dst address
2-byte, UDP/TCP src port
1-byte, IP protocol
1-byte, IP version
Meaning: an IP protocol association exists on this connection.
SM_TCP_CONNECT
SM_TCP_MISSED_CONNECT
Body: none
Meaning: a (new) TCP connection exists on this connection. In the case of a "missed" connect, the first packets from the connection were not seen, so the monitor is unable to properly classify the connection.
SM_TCP_DATA
Body: none
Meaning: data has transited this connection
SM_UDP_ASSOCIATION
Body: none TABLE O-continued

```
    Meaning: This connection contains a (new) UDP association
SM__SSH__AUTH
    Body: 4-byte, client version (major)
        4-byte, client version (minor)
        4-byte, server version (major)
        4-byte, server version (minor)
        4-byte, authmask, gives which cipher suites are supported (see SSH specification)
        4-byte, cipher suite selected.
    Meaning: a successful SSH authentication has occurred.
SM__SSH__ABORT
SM__SSH__CLOSE
    Body: none
    Meaning: the SSH connection has terminated. An ABORT means that the transport layer
aborted.
SM__SSH__HANDSHAKE__FAILURE
    Body: none
    Meaning: the monitor was able to determine that the SSH handshake failed.
SM__SSH__HANDSHAKE__MISS, // We cannot interpret the handshake.
    Body: none
    Meaning: the monitor was unable to determine whether the SSH handshake failed or
succeeded.
SM__SSL__ABORT (fatal alert)
SM__SSL__WARNING (non-fatal alert)
SM__SSL__HANDSHAKE__FAILURE (alert seen, indicates handshake failure)
    Body: 1-byte, alert level (see SSL3 specification)
        1-byte, alert description
    Meaning: The SSL connection has signaled an ALERT.
SM__SSL__HANDSHAKE__SUCCEED
    Body: none
    Meaning: the SSL connection has completed its handshake
SM__SSL__HANDSHAKE__ABORT
    Body: none
    Meaning: the SSL connection was aborted by transport level without handshake
completion
SM__SSL__HANDSHAKE__MISS
    Body: none
Meaning: The monitor was unable to determine the SSL session credentials. Because of
resumed sessions, this may mean that the session was completely successful.
SM__SSL___SERVER__HELLO
    Body: 1-byte, version (major)
        1-byte, version (minor)
        4-byte, ciphersuite (enum)
        1-byte, non-zero if a resumed session
        String, sessionid
    Meaning: SSL (client+)server hello information
SM__SSL__CLIENT__CERT
SM__SSL__SERVER__CERT
    Body: String, client or server certificate chain
    Meaning: client or server certificate
SM__TCP__ABORT
    Body: none
    Meaning: TCP RST packet received, killed connection
SM__TCP__CLOSE
    Body: none
    Meaning: TCP normal close (both sides)
SM__TCP__TIMEOUT
    Body: none
    Meaning: TCP death timer expires, killing connection.
```

Table R

```
( policy PolicyGen "0.9"
( group PolicyGen__Monitors agent__attr__t
    ( union
        X__MONITOR
    )
)
( credential Home__Machine
    ( assertion
        ( eq ip-address 10.0.0.176 ) ) // assertion
)
( credential Cgi
    ( assertion
        ( eq ip-address 10.0.0.119 ) ) // assertion
)
( credential Clouds
    ( assertion
        ( eq ip-address 10.0.0.118 ) ) // assertion
)
( credential Fluffy
    ( assertion
        ( eq ip-address 10.0.0.125 ) ) // assertion
```

TABLE O-continued

```
)
( credential Monkey
	( assertion
		(or
			( eq ip-address 10.0.0.114 )
			(eq ip-address 10.0.0.115 )
			( eq ip-address 10.0.0.121 )
		) // or
	) // assertion
)
( credential X__Web__Servers
	( assertion
		(or
			Cgi
			Clouds
			Fluffy
			Monkey
		) // or
	) // assertion
)
( credential Security__Web__Server
	( assertion
		( eq ip-address 10.0.0.120 ) ) // assertion
)
( credential All__Web__Servers
	( assertion
		(or
			X__Web__Servers
			Security__Web__Server
		) // or
	) // assertion
)
( credential Anon__User
	( assertion
		(or
			( eq login-name "anonymous" )
		) // or
	) // assertion
)
( credential Dns__Server
	( assertion
		( eq ip-address 10.0.0.21 ) ) // assertion
)
( credential Ip__Directed__Broadcasts__Within__X__Target
	( assertion
		(or
			( eq ip-address 10.0.0.119 )
		) // or
	) // assertion
)
( credential X__Coloc__Subnet
	( assertion
		( ip-mask ip-address 10.0.0.112/29 ) )	// assertion
)
( credential___Zero__Ip__Address
	( assertion
		( eq ip-address 10.0.0.0 ) )	// assertion
)
( credential Ip__Within__X__Initiator
	( assertion
		(or
			X__Coloc__Subnet
			___Zero__Ip__Address
		) // or
	) // assertion
)
( credential Loghost
	( assertion
		( eq ip-address 10.0.0.190 ) ) // assertion
)
( credential Modin
	( assertion
		( eq ip-address 10.0.0.117 ) ) // assertion
)
( credential Mother
	( assertion
		( eq ip-address 10.0.0.124 ) ) // assertion
)
( credential X__Netops
	( assertion
```

TABLE O-continued

```
        ( ip-range ip-address 10.0.0.187 10.0.0.190 ) )    // assertion
)
( credential Security
    ( assertion
        ( eq ip-address 10.0.0.61 ) ) // assertion
)
( credential X__External__Communities
    ( assertion
        (or
            Home__Machine
            Dns__Server
            Loghost
            X__Netops
            Security
        ) // or
    ) // assertion
)
( credential X__Monitors
    ( assertion
        ( member X__MONITOR agent-attribute )    ) // assertion
)
( credential X__Ssh__From__X__To__X__Web__Servers__Provisional__Initiator
    ( assertion
        (or
            Home__Machine
            X__Netops
        ) // or
    ) // assertion
)
( credential X__Ssh__From__X__To__X__Web__Servers__Provisional__Target
    ( assertion
        (or
            Mother
            X__Web Servers
        ) // or
    ) // assertion
)
( credential X__Ssh__To__Security__Web__Server__Initiator
    ( assertion
        (or
            X__Netops
            Security
        ) // or
    ) // assertion
)
( credential X__Stmp__From__All__To__X__Initiator
    ( assertion
        (or
            Cgi
            Clouds
        ) // or
    ) // assertion
)
( credential __Dns
    ( assertion
        ( eq ip-port 53 ) ) // assertion
)
( credential Tcp__X__Dns__From__Colloc__To__Dns__Server__Target
    ( assertion
        ( and
            Dns__Server
            __Dns
        ) // and
    ) // assertion
)
( credential __Http
    ( assertion
        ( eq ip-port 80 ) ) // assertion
)
( credential Tcp__X__Http__From__Any__To__All__Web__Servers__Provisional__Target
    ( assertion
        ( and
            All__Web__Servers
            __Http
        ) // and
    ) // assertion
)
( credential __Bigbrother
    ( assertion
        ( eq ip-port 1984 ) ) // assertion
```

TABLE O-continued

```
)
( credential Tcp__X__Port__1984__Traffic__Target
      ( assertion
            ( and
                  Loghost
                  __Bigbrother
            ) // and
      ) // assertion
)
( credential __Ssh26
      ( assertion
            ( eq ip-port 26 ) ) // assertion
)
( credential Tcp__X__X__Loghost__Traffic__Target
      ( assertion
            ( and
                  Loghost
                  __Ssh26
            ) // and
      ) // assertion
)
( credential __Ssh
      ( assertion
            ( eq ip-port 22 ) ) // assertion
)
( credential Tcp__X__Shh__From__Clouds__To__Cgi__Provisional__Target
      ( assertion
            ( and
                  Cgi
                  __Ssh
            ) // and
      ) // assertion
)
( credential Tcp__X__Spm__Colloc__Traffic__Provisional__Target
      ( assertion
            ( and
                  Security
                  __Ssh
            ) // and
      ) // assertion
)
( credential __Smtp
      ( assertion
            ( eq ip-port 25 ) ) // assertion
)
( credential Tcp__X__Spm__Colloc__Traffic__Target
      ( assertion
            ( and
                  Security
                  __Smtp
            ) // and
      ) // assertion
)
( credential Tcp__X__Ssh__From__Fluffy__To__Monkey__Provisional__Target
      ( assertion
            ( and
                  Monkey
                  __Ssh
            ) // and
      ) // assertion
)
( credential Tcp__X__Ssh__From__Monkey__To__Fluffy__Provisional__Target
      ( assertion
            ( and
                  Fluffy
                  __Ssh
            ) // and
      ) // assertion
)
( credential Tcp__X__Ssh__From__X__To__X__Web__Servers__Provisional__Target
      ( assertion
            ( and
                  X__Ssh__From__X__To__X__Web__Servers__Provisional__Target
                  __Ssh
            ) // and
      ) // assertion
)
( credential __Ssh20
      ( assertion
            ( eq ip-port 20 ) ) // assertion
```

TABLE O-continued

```
)
( credential Tcp__X__Ssh__To__Security__Web__Server__Target
    ( assertion
        ( and
            Security__Web__Server
            __Ssh20
        ) // and
    ) // assertion
)
( credential Udp__X__Dns__From__Colloc__To__Dns__Server__Target
    ( assertion
        ( and
            Dns__Server
            __Dns
        ) // and
    ) // assertion
)
( credential __Auth
    ( assertion
        ( eq ip-port 113 )    ) // assertion
)
( credential __Bootp__Client
    ( assertion
        ( eq ip-port 68 ) ) // assertion
)
( credential Bootp__Server
    ( assertion
        ( eq ip-port 67 ) ) // assertion
)
( credential __Finger
    ( assertion
        ( eq ip-port 79 ) ) // assertion
)
( credential __Ftp
    ( assertion
        ( eq ip-port 21 ) ) // assertion
)
( credential __Gopher
    ( assertion
        ( eq ip-port 70 ) ) // assertion
)
( credential __High__Ports
    ( assertion
        ( range ip-port 1025 65535 )    ) // assertion
)
( credential __Https
    ( assertion
        ( eq ip-port 443 )    ) // assertion
)
( credential __Ident
    ( assertion
        ( eq ip-port 113)    ) // assertion
)
( credential __Imap4
    ( assertion
        ( eq ip-port 143 )    ) // assertion
)
( credential __Imap4s
    ( assertion
        ( eq ip-port 993 )    ) // assertion
)
( credential __Netbios__Rpc
    ( assertion
        ( eq ip-port 135 )    ) // assertion
)
( credential __Nntp
    ( assertion
        ( eq ip-port 119)    ) // assertion
)
( credential __Pop3
    ( assertion
        ( eq ip-port 110)    ) // assertion
)
( credential __Pop3s
    ( assertion
        ( eq ip-port 995 )    ) // assertion
)
( credential __Printer
    ( assertion
        ( eq ip-port 515)    ) // assertion
```

TABLE O-continued

```
)
( credential __Rlogin
      ( assertion
            ( eq ip-port 513 )    ) // assertion
)
( credential __Rshell
      ( assertion
            ( eq ip-port 514 )    ) // assertion
)
( credential__Smb
      ( assertion
            (range ip-port 137 139 )    ) // assertion
)
( credential __Smtps
      ( assertion
            ( eq ip-port 465 )    ) // assertion
)
( credential __Syslog
      ( assertion
            (eq ip-port 514 )    ) // assertion
)
( credential __Telnet
      ( assertion
            ( eq ip-port 23 ) ) // assertion
)
( credential __Whois
      ( assertion
            ( eq ip-port 43 ) ) // assertion
)
( credential___Multicast__Addresses
      ( assertion
            ( ip-range ip-address 224.0.0.0 239.255.255.255 )    ) // assertion
)
( credential___Non__Directed__Broadcast__Address
      ( assertion
            ( and
                  ( eq ip-address 255.255.255.255 )
                  ( eq mac-address FF-FF-FF-FF-FF-FF )
            ) // and
      ) // assertion
)
( credential___Generic__Multicast__And__Broadcast__Addresses
      ( assertion
            (or
                  ___Non__Directed__Broadcast__Address
                  ___Multicast__Addresses
            ) // or
      ) // assertion
)
( condition Authentication__Rejected
      ( assertion
            ( eq auth-status REJECTED )    ) // assertion
)
( condition Ssh__Authentication__Aborted
      ( assertion
            ( eq ssh-handshake-status ABORTED ) ) // assertion
)
( condition Ssh__Authentication__Failed
      ( assertion
            ( eq ssh-handshake-status FAILED )    ) // assertion
)
( condition Ssh__Secure__Authentication __Modes
      ( assertion
            ( or                  ( member
                  SSH__RSA ssh-supported-auth-modes )          ( member
                  SSH__RHOSTS__WITH__RSA ssh-supported-auth-modes )
            ) // or
      ) // assertion
)
( condition Ssl__Session__Qos
      ( assertion
            ( and
                  (or
                        ( absent initiator-auth-keysize    )
                        ( ge initiator-auth-keysize 1024 )
                  ) // or
                  ( ge target-auth-keysize 1024 )
                  ( ge ke-keysize 768 )
                  ( ge encipher-keysize 128 )
                  ( ge protocol-version ( version "3.0" ) )
```

TABLE O-continued

```
            ) // and
      ) // assertion
)
( condition Strong__Password
      ( assertion
            ( and
                  ( ge password-length 8 )
                  (or
                        ( eq password-has-alphabetic true )
                        ( eq password-has-numeric true )
                  ) // or
                  ( eq password-has-special true )
            ) // and
      ) // assertion
)
( condition Tcp__Data__Xfer
      ( assertion
            ( eq tcp-data true ) ) // assertion
)
( disposition Authentication__Failed
      ( code AUTHENTICATION__VIOLATION )
      ( log-directive
            HIGH
            "Authentication handshake failed"
      )
)
( disposition Ftp__Access__Violation
      ( code ACCESS__DENIED )
      ( log-directive
            HIGH
            "Illegal traffic at FTP level"
      )
)
( disposition Handshake__Aborted
      ( code AUTHENTICATION__VIOLATION )
      ( log-directive
            INFORMATION
            "Authentication handshake aborted by either party"
      )
)
( disposition Http__Access__Violation
      ( code ACCESS__DENIED )
      ( log-directive
            HIGH
            "Illegal traffic at HTTP level"
      )
)
( disposition Icmp__Access__Violation
      ( code ACCESS__DENIED )
      ( log-directive
            HIGH
            "Illegal traffic at ICMP level"
      )
)
( disposition Incorrect__Port__Usage
      ( code SECURITY__ATTACK )
      ( log-directive
            MEDIUM
            "A TCP/UDP service is being used by an unexpected/unknown protocol"
      )
)
( disposition Ip__Access__Violation
      ( code ACCESS__DENIED )
      ( log-directive
            HIGH
            "Illegal traffic at IP level"
      )
)
( disposition Monitor__Anonymous__Login
      ( code OK )
      ( log-directive
            MONITOR
            "Anonymous login is being used"
      )
)
( disposition Monitor__Broadcasts
      ( code OK )
      ( log-directive
            MONITOR
            "Multicast or Broadcast traffic detected"
```

TABLE O-continued

```
        )
)
( disposition Monitor_Icmp
        ( code OK )
        ( log-directive
                MONITOR
                "ICMP traffic detected"
        )
)
( disposition Probable_Scan
        ( code SECURITY_ATTACK )
        ( log-directive
                WARNING
                "A probable network scan of a blocked TCP service has been detected"
        )
)
( disposition Protocol_Unknown
        (code ACCESS_DENIED)
        ( log-directive
                HIGH
                "A protocol not understood by the monitoring system has been detected"
        )
)
( disposition Ssh_Access_Violation
        ( code ACCESS_DENIED )
        ( log-directive
                HIGH
                "Illegal traffic at SSH level"
        )
)
( disposition Ssl_Access_Violation
        ( code ACCESS_DENIED )
        ( log-directive
                HIGH
                "Illegal traffic at SSL level"
        )
)
( disposition Tcp_Access_Violation
        ( code ACCESS_DENIED )
        ( log-directive
                HIGH
                "Illegal traffic at TCP level"
        )
)
( disposition Udp_Access_Violation
        ( code ACCESS_DENIED )
        ( log-directive
                HIGH
                "Illegal traffic at UDP level"
        )
)
( disposition Warn_Missed_Handshake
        ( code OK )
        ( log-directive
                WARNING
                "Missed the authentication handshake"
        )
)
( disposition Warn_Missed_Tcp_Connect
        ( code OK )
        ( log-directive
                WARNING
                "Missed TCP connect"
        )
)
( disposition Weak_Authentication
        ( code SECURITY_QOS )
        ( log-directive
                HIGH
                "A weak authentication mode or mechanism is being allowed"
        )
)
( disposition Weak_Password
        ( code SECURITY_QOS )
        ( log-directive
                HIGH
                "A weak password is being used for authentication"
        )
)
( rule Ftp_Anonymous_Authentication
```

TABLE O-continued

```
        ( protocol FTP )
        ( action CONTROL__AUTHENTICATE )
        ( initiator Anon__User )
        ( target ignore )
        ( outcome
                ( immediate
                        ( if Authentication__Rejected Authentication__Failed )
                        ( default Monitor__Anonymous__Login )
                )
        )
)
( rule Tcp__Blocked__Services
        ( protocol TCP )
        ( action CONNECT )
        ( initiator ignore )
        ( target ignore )
        ( outcome
                ( final
                        ( default Probable__Scan )
                )
        )
)
( rule Ftp__Blocked__Service__Violation
        ( protocol FTP )
        ( action ignore )
        ( prerequisite Tcp__Blocked__Services )
        ( initiator ignore )
        ( target ignore )
        ( outcome
                ( immediate
                        ( default Ftp__Access__Violation )
                )
        )
)
( rule Ftp__Deny
        ( protocol FTP )
        ( action ignore )
        ( initiator ignore )
        ( target ignore )
        ( outcome
                ( immediate
                        ( default Ftp__Access__Violation )
                )
        )
)
( rule Ftp__Ignore__Data__Connections
        ( protocol FTP )
        ( action DATA__OPEN )
        ( initiator ignore )
        ( target ignore )
        ( outcome
                (immediate
                        ( default ok )
                )
        )
)
( rule Ftp__Validate__Password
        ( protocol FTP )
        ( action CONTROL__AUTHENTICATE )
        ( initiator ignore )
        ( target ignore )
        ( outcome
                ( immediate
                        ( if Authentication__Rejected Authentication__Failed )
                        ( ifnot Strong__Password Weak__Password )
                        ( default ok )
                )
        )
)
( rule Http__Blocked__Service__Violation
        ( protocol HTTP )
        ( action ignore )
        ( prerequisite Tcp__Blocked__Services )
        ( initiator ignore )
        ( target ignore )
        ( outcome
                ( immediate
                        ( default Http__Access__Violation )
                )
        )
```

TABLE O-continued

```
)
( rule Http__Deny
    ( protocol HTTP )
    ( action ignore )
    ( initiator ignore )
    ( target ignore )
    ( outcome
        ( immediate
            ( default Http__Access__Violation )
        )
    )
)
( rule Icmp__Deny
    ( protocol ICMP )
    ( action ignore )
    ( initiator ignore )
    ( target ignore )
    ( outcome
        ( immediate
            ( default Icmp__Access__Violation )
        )
    )
)
( rule Ip__Within__X
    ( protocol IP )
    ( action ASSOCIATION )
    ( agent X__Monitors )
    ( initiator Ip__Within__X__Initiator )
    ( target X__Coloc__Subnet )
    ( outcome
        ( final
            ( default Protocol__Unknown )
        )
    )
)
( rule Icmp__Within__X
    ( protocol ICMP )
    ( action ASSOCIATION )
    ( agent X__Monitors )
    ( prerequisite Ip__Within__X )
    ( initiator ignore )
    ( target ignore )
    ( outcome
        ( immediate
            ( default Monitor__Icmp )
        )
    )
)
( rule Ip__Deny
    ( protocol IP )
    ( action ignore )
    ( initiator ignore )
    ( target ignore )
    ( outcome
        ( immediate
            ( default Ip__Access__Violation )
        )
    )
)
( rule Ip__Directed__Broadcasts__Within__X
    ( protocol IP )
    ( action ASSOCIATION )
    ( agent X__Monitors )
    ( initiator Ip__Within__X__Initiator )
    ( target Ip__Directed__Broadcasts__Within__X__Target )
    ( outcome
        ( immediate
            ( default Monitor__Broadcasts )
        )
    )
)
( rule Ip__External__Communities__To__X
    ( protocol IP )
    ( action ASSOCIATION )
    ( agent X__Monitors )
    ( initiator X__External__Communities )
    ( target X__Coloc__Subnet )
    ( outcome
        ( final
            ( default Protocol__Unknown )
```

TABLE O-continued

```
        )
    )
)
( rule Ip__Non__Directed__Broadcasts__Within__X
    ( protocol IP )
    ( action ASSOCIATION )
    ( agent X__Monitors )
    ( initiator Ip__Within__X__Initiator )
    ( target___Generic__Multicast__And__Broadcast__Addresses )
    ( outcome
        ( immediate
            ( default Monitor__Broadcasts )
        )
    )
)
( rule Ip__X__To__External__Communities
    ( protocol IP )
    ( action ASSOCIATION )
    ( agent X__Monitors )
    ( initiator X__Coloc__Subnet )
    ( target X__External__Communities )
    ( outcome
        ( final
            ( default Protocol__Unknown )
        )
    )
)
( rule IP__Unknown__Protocol
    ( protocol IP )
    ( action PROTOCOL__UNKNOWN )
    ( initiator ignore )
    ( target ignore )
    ( outcome
        ( immediate
            ( default Protocol__Unknown )
        )
    )
)
( rule Ssh__Blocked__Service__Violation
    ( protocol SSH )
    ( action ignore )
    ( prerequisite Tcp__Blocked__Services )
    ( initiator ignore )
    ( target ignore )
    ( outcome
        ( immediate
            ( default Ssh__Access__Violation )
        )
    )
)
( rule Ssh__Deny
    ( protocol SSH )
    ( action ignore )
    ( initiator ignore )
    ( target ignore )
    ( outcome
        ( immediate
            ( default Ssh__Access__Violation )
        )
    )
)
( rule Ssh__Validate__Handshake
    ( protocol SSH )
    ( action ( union HANDSHAKE SESSION__ABORTED ) )
    ( initiator ignore )
    ( target ignore )
    ( outcome
        ( immediate
            ( if Ssh__Authentication__Failed Authentication__Failed )
            ( if Ssh__Authentication__Aborted Handshake__Aborted )
            ( ifnot Ssh__Secure__Authentication__Modes Weak__Authentication )
            ( default ok )
        )
    )
)
( rule Ssl__Blocked__Service__Violation
    ( protocol SSL )
    ( action ignore )
    ( prerequisite Tcp__Blocked__Services )
    ( initiator ignore )
```

TABLE O-continued

```
      ( target ignore )
      ( outcome
            ( immediate
                  ( default Ssl__Access__Violation )
            )
      )
)
( rule Ssl__Deny
      (protocol SSL )
      ( action ignore )
      ( initiator ignore )
      ( target ignore )
      ( outcome
            ( immediate
                  ( default Ssl__Access__Violation )
            )
      )
)
( rule Ssl__Missed__Handshakes
      (protocol SSL )
      ( action MISSED__HANDSHAKE )
      ( initiator ignore )
      ( target ignore )
      ( outcome
            ( immediate
                  ( default Warn__Missed__Handshake )
            )
      )
)
( rule Ssl__Validate__Handshake
      ( protocol SSL )
      ( action HANDSHAKE )
      ( initiator ignore )
      ( target ignore )
      ( outcome
            ( immediate
                  ( if Authentication__Rejected Authentication__Failed )
                  ( ifnot Ssl__Session__Qos Weak__Authentication )
                  ( default ok )
            )
      )
)
( rule Tcp__Blocked__Services__Response
      ( protocol TCP )
      ( action ( union ABORT CLOSE TIMEOUT ) )
      ( prerequisite Tcp__Blocked__Services )
      ( initiator ignore )
      ( target ignore )
      ( outcome
            ( immediate
                  ( if Tcp__Data__Xfer Tcp__Access__Violation )
                  ( default Probable__Scan )
            )
      )
)
( rule Tcp__Blocked__Services__Violation
      (protocol TCP )
      ( action PROTOCOL__UNKNOWN )
      ( prerequisite Tcp__Blocked__Services )
      ( initiator ignore )
      ( target ignore )
      ( outcome
            ( immediate
                  ( default Tcp__Access__Violation )
            )
      )
)
( rule Tcp__Connection__Terminated
      (protocol TCP )
      ( action ( union ABORT CLOSE TIMEOUT ) )
      ( initiator ignore )
      ( target ignore )
      ( outcome
            ( immediate
                  ( default ok )
            )
      )
)
( rule Tcp__Deny
      ( protocol TCP )
```

TABLE O-continued

```
	( action ignore )
	( initiator ignore )
	( target ignore )
	( outcome
		( final
			( default Tcp__Access__Violation )
		)
	)
)
( rule Tcp__Missed__Connections
	(protocol TCP )
	( action MISSED__CONNECT )
	( initiator ignore )
	( target ignore )
	( outcome
		( immediate
			( default Warn__Missed__Tcp__Connect )
		)
	)
)
( rule Tcp__X__Dns__From__Colloc__To__Dns__Server
	(protocol TCP )
	( action CONNECT )
	( agent X__Monitors )
	( initiator X__Coloc__Subnet )
	( target Tcp__X__Dns__From__Colloc__To__Dns__Server__Target )
	( outcome
		( immediate
			( default ok )
		)
	)
)
( rule Tcp__X__Http__From__Any__To__All__Web__Servers__Provisional
	( protocol TCP )
	( action CONNECT )
	( agent X__Monitors )
	( initiator ignore )
	( target Tcp__X__Http__From__Any__To__All__Web__Servers__Provisional__Target )
	( outcome
		( final
			( default ok )
		)
	)
)
( rule Tcp__X__Port__1984__Traffic
	(protocol TCP )
	( action CONNECT )
	( agent X__Monitors )
	( initiator X__Coloc__Subnet )
	( target Tcp__X__Port__1984__Traffic__Target )
	( outcome
		( immediate
			( default ok )
		)
	)
)
( rule Tcp__X__X__Loghost__Traffic
	(protocol TCP )
	( action CONNECT )
	( agent X__Monitors )
	( initiator X__Web__Servers )
	( target Tcp__X__X__Loghost__Traffic__Target )
	( outcome
		( immediate
			( default ok )
		)
	)
)
( rule Tcp__X__Shh__From__Clouds__To__Cgi__Provisional
	( protocol TCP )
	( action CONNECT )
	( agent X__Monitors )
	( initiator Clouds )
	( target Tcp__X__Shh__From__Clouds__To__Cgi__Provisional__Target )
	( outcome
		( final
			( default ok )
		)
	)
)
```

TABLE O-continued

```
( rule Tcp__X__Spm__Colloc__Traffic
	( protocol TCP )
	( action CONNECT )
	( agent X__Monitors )
	( initiator Modin )
	( target Tcp__X__Spm__Colloc__Traffic__Target )
	( outcome
		( immediate
			( default ok )
		)
	)
)
( rule Tcp__X__Spm__Colloc__Traffic__Provisional
	( protocol TCP )
	( action CONNECT )
	( agent X__Monitors )
	( initiator Modin )
	( target Tcp__X__Spm__Colloc__Traffic__Provisional__Target )
	( outcome
		( final
			( default ok )
		)
	)
)
( rule Tcp__X__Ssh__From__Fluffy__To__Monkey__Provisional
	( protocol TCP )
	( action CONNECT )
	( agent X__Monitors )
	( initiator Fluffy )
	( target Tcp__X__Ssh__From__Fluffy__To__Monkey__Provisional__Target )
	( outcome
		( final
			( default ok )
		)
	)
)
( rule Tcp__X__Ssh__From__Monkey__To Fluffy__Provisional
	(protocol TCP )
	( action CONNECT )
	( agent X__Monitors )
	( initiator Monkey )
	( target Tcp__X__Ssh__From__Monkey__To__Fluffy__Provisional__Target )
	( outcome
		( final
			( default ok )
		)
	)
)
( rule Tcp__X__Ssh__From__X__To__X__Web__Servers__Provisional
	( protocol TCP )
	( action CONNECT )
	( agent X__Monitors )
	( initiator X__Ssh__From__X__To__X__Web__Servers__Provisional__Initiator )
	( target Tcp__X__Ssh__From__X__To__X__Web__Servers__Provisional__Target )
	( outcome
		( final
			( default ok )
		)
	)
)
( rule Tcp__X__Ssh__To__Security__Web__Server
	( protocol TCP )
	( action CONNECT )
	( agent X__Monitors )
	( initiator X__Ssh__To__Security__Web__Server__Initiator )
	( target Tcp__X__Ssh__To__Security__Web__Server__Target )
	( outcome
		( immediate
			( default ok )
		)
	)
)
( rule Tcp__X__Stmp__From__All__To__X
	(protocol TCP )
	( action CONNECT )
	( agent X__Monitors )
	( initiator X__Stmp__From__All__To__X__Initiator )
	( target __Smtp )
	( outcome
		( immediate
```

TABLE O-continued

```
                ( default ok )
            )
        )
)
( rule Tcp__Unknown__protocol
        ( protocol TCP )
        ( action PROTOCOL__UNKNOWN )
        ( initiator ignore )
        ( target ignore )
        ( outcome
            ( immediate
                ( default Incorrect__Port__Usage )
            )
        )
)
( rule Udp__Deny
        ( protocol UDP )
        ( action ignore )
        ( initiator ignore )
        ( target ignore )
        ( outcome
            ( immediate
                ( default Udp__Access__Violation )
            )
        )
)
( rule Udp__X__Dns__From__Colloc__To__Dns__Server
        ( protocol UDP )
        ( action ASSOCIATION )
        ( agent X__Monitors )
        ( initiator X__Coloc__Subnet )
        ( target Udp__X__Dns__From__Colloc__To__Dns__Server__Target )
        ( outcome
            ( immediate
                ( default ok )
            )
        )
)
)
```

TABLE P

| Evaluation Algorithm |
| --- |
| In the preferred embodiment the policy engine applies a policy evaluation algorithm to each incoming protocol event. The algorithm results in a selection of a policy rule applicable to the protocol event and may produce an immediate or final disposition.<br>Following is a step-by-step description of the evaluation algorithm according to the preferred embodiment. It is noted that the evaluation procedure described herein below is in conceptual form and does not take into account any possible runtime optimizations:<br>1) Select a set of rules applicable to an Agent reporting an event;<br>2) From said set, select a second set of rules applicable to an associated examined protocol.<br>3) From said second set, select a third set of rules applicable to an associated examined protocol action.<br>4) Starting with a most specific policy rule in said third set and descending to a least specific rule find a policy rule satisfied by said protocol event. A matching algorithm according to the preferred embodiment is as follows:<br>a) If one or more orderly listed prerequisite rules are specified, ensure at least one of said prerequisite rules is satisfied by a previously processed protocol event. In the preferred embodiment a prerequisite rule is satisfied if it is a pending policy rule for the protocol event.<br>b) Match initiator and target credentials in the policy rule against the corresponding initiator and target credentials presented in the protocol event.<br>5) If a policy rule satisfying the protocol event is not found the policy engine generates a disposition for the network event indicating that a policy specification error was encountered. Effectively the processing of the network event thereby terminates. |

TABLE P-continued

| Evaluation Algorithm |
| --- |
| 6) If a policy rule satisfying the protocol event is found, the policy engine checks for other rules having a same ranking number and also satisfying the event. If such rules are found the policy engine uses the following algorithm in the preferred embodiment to select a single applicable rule:<br>a) Rules that specify all protocols, i.e. using ignore or present, are less specific than rules that explicitly list a set of one or more protocols.<br>b) Rules that specify all actions (i.e. using ignore or present) are less specific than rules that explicitly list a set of one or more actions.<br>c) Rules that have prerequisites are more specific than rules that do not have prerequisites. Rules that specify a higher-ranking prerequisite are more specific than rules that specify a lower-ranking prerequisite. In the preferred embodiment a ranking relationship is relevant only if both prerequisite rules belong to a same protocol-action group.<br>d) If thereafter a single rule is determined as more specific than the others it is selected for the protocol event. If more than one rule remains the policy engine sorts the remaining rules in increasing lexical order by name and selects a first rule from the sorted rules having an immediate disposition indicating in decreasing order of precedence:<br>i) a policy violation (any disposition code other than OK or CONTINUE);<br>ii) CONTINUE (allows other rules to examine further the network event); and<br>iii) OK |

The outcome of the policy evaluation algorithm herein above is a policy rule that satisfies the protocol event. If an immediate outcome is specified for that rule, it is executed, producing a disposition for the protocol event. If the disposition comprises a final disposition code (any code other than CONTINUE), the disposition is also the final disposition for the network event.

Otherwise in the preferred embodiment the selected policy rule is a pending policy rule for the network event. In absence of any further protocol events the pending policy rule is promoted to selected policy rule. A final outcome of the selected policy rule is executed producing a final disposition for the network event.

An Exemplary User Interface for Providing and Reporting Processed and Analyzed Network Data to an End User An exemplary user interface for providing and reporting the processed and analyzed network data from the database (FIGS. 1*a*-165) to an end user is provided below.

It should be appreciated that examples of a typical end user using such interface are, but are not limited to a customer whose network is being monitored, an operations analyst reviewing the customer's network environment and network data, and/or a policy analyst reviewing the network data and its conformance to network policy.

The preferred embodiment of the invention uses a web page paradigm as an example of a type of user interface, and is described with reference to figures of screen prints of web pages herein. While the claimed invention herein has disclosed a web page implementation of a user interface, it will be appreciated by those skilled in the art that such user interface readily encompasses any form, that can be substituted therefore to effect a similar result as is achieved by the web page, including but not limited to any graphical user interface or non-graphical user interface.

The preferred embodiment of the invention is described with reference to FIG. 20 and comprises a system dashboard, label 20000 on a home page, wherein the dashboard 20000 is kept up to date with current monitoring information from the monitored network.

In the preferred embodiment of the invention, the dashboard 20000 updates once every five minutes. It should be appreciated that different update rates can be used to keep the data on the dashboard 20000 current, and that parts of the underlying customer data may be updated at a different, such as a slower rate.

Figure 21:
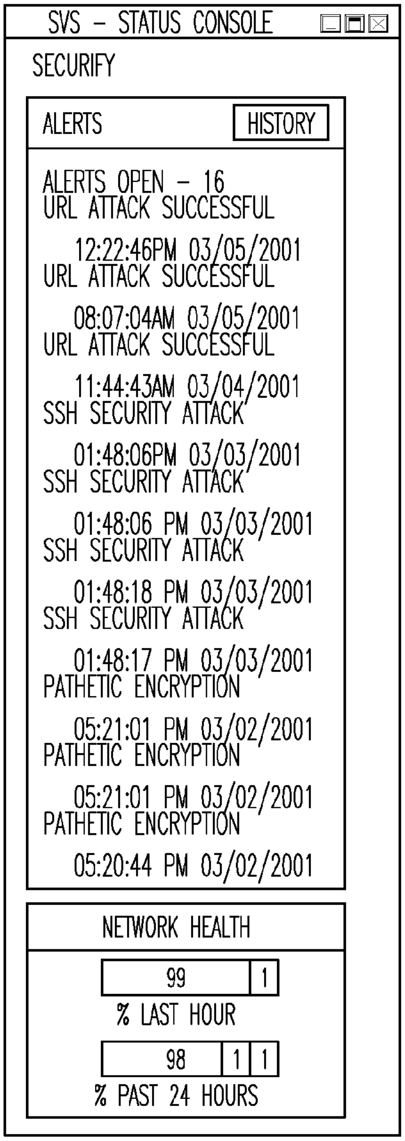
FIG. 21 shows an example of a tear off console according to the invention.

The preferred embodiment of the invention provides a tear off feature on the system dashboard 20000. In this example, the end user clicks on a tear off tab 20010 to open a tear off console window. FIG. 21 shows an example of a tear off console window according to the invention. It is intended that the end user keep the console window open on the computer desktop all day long to view high level reporting of the health of the monitored network.

The preferred embodiment of the invention provides an outstanding alerts area 20020 of the dashboard and consists of a FIFO queue of CRITICAL alerts that have been generated by the policy monitoring system (FIGS. 1*a*-106). In the preferred embodiment of the invention the following applies. The size of the alert list can be limited to a predetermined number of elements. The total number of open alerts can be displayed within the alerts area 20030.

Figure 28:
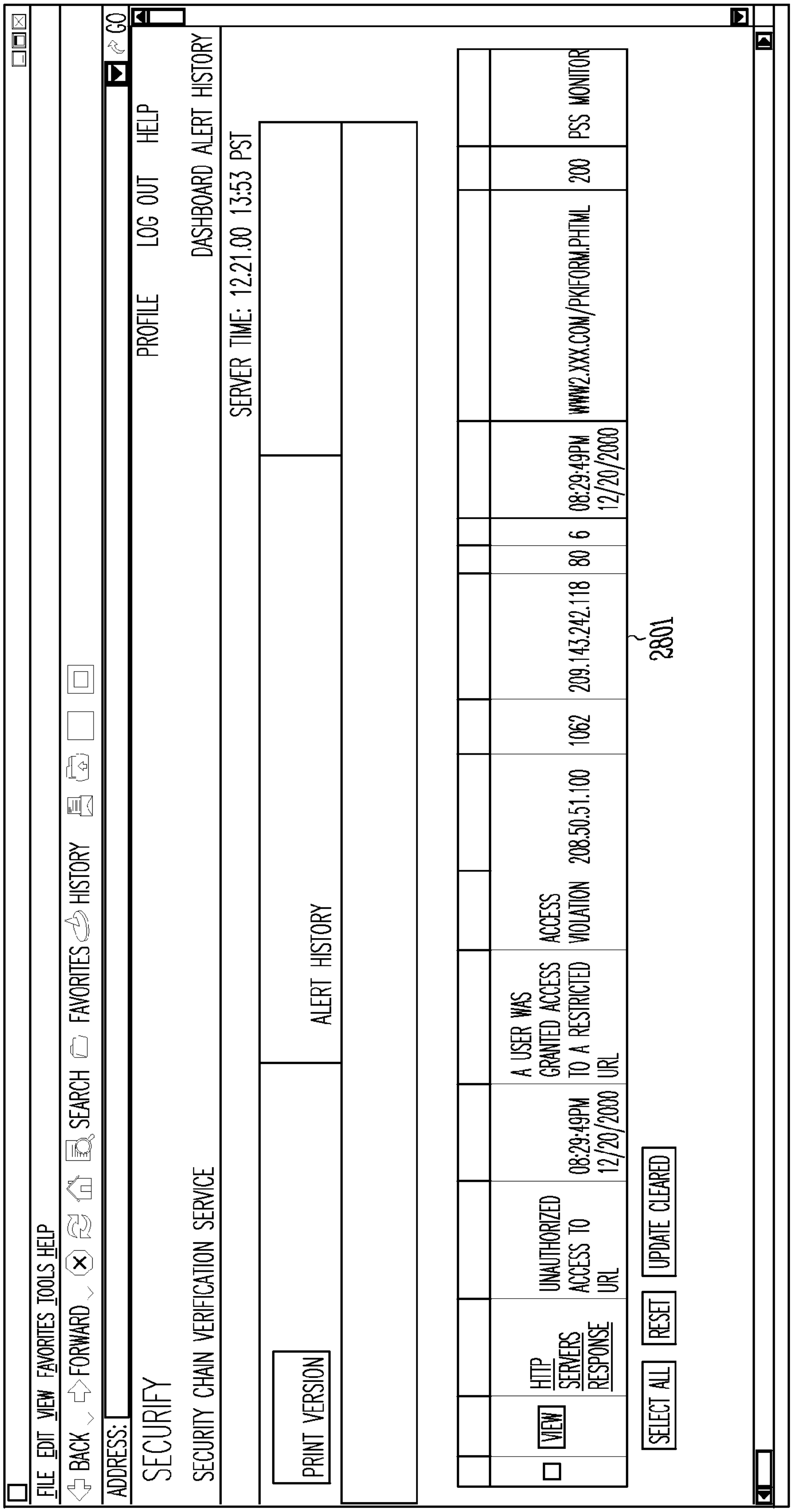
FIG. 28 shows an example of an alert details page according to the invention.

The underlying data is updated on a real-time basis. Entries in the list link to alert details, as depicted in FIG. 28. In this example, clicking on an entry in the list 20030 opens up an alert details page 2801 for that particular alert, comprising such alert details as, for example rule, disposition, time of alert, type of alert, source ip-address, destination IP-address, and the like.

The preferred embodiment of the invention provides a health monitor 20040 to show a visual representation of the severity categories into which the current observed traffic has been assigned over a predetermined amount of time. In this example, the underlying data is updated every five minutes and summarizes traffic over the last one hour and last twenty four hour periods. CRITICAL and HIGH severity alerts have a red bar 20050, MEDIUM, WARNING and MONITOR uses a yellow bar 20060, and all others are green 20070.

The preferred embodiment of the invention provides access to current summary reports. An example is shown in FIG. 20 as part of the end user's home page. Such screen allows the end user to generate queries that summarize report data filtered by the monitoring point and over configurable time periods. An interface feature, such as a dropdown listbox 20090 allows the end user to choose one of a predetermined set of time periods, such as but not limited to the following:

- Select date range—A specific time period expressed in starting month, day and hour, followed by ending month, day and hour using an interface feature such as dropdown listboxes 20091;
- Last two hours;
- Last 24 hours;
- Today (since midnight);
- Yesterday (00:00-23:59:59);
- Last seven days;
- This month (from first to present);
- Last month (from first to end of month);
- Last three months (three months back from present); and
- Custom (retrieves date/time range from the last manually configured query).

Figure 22:
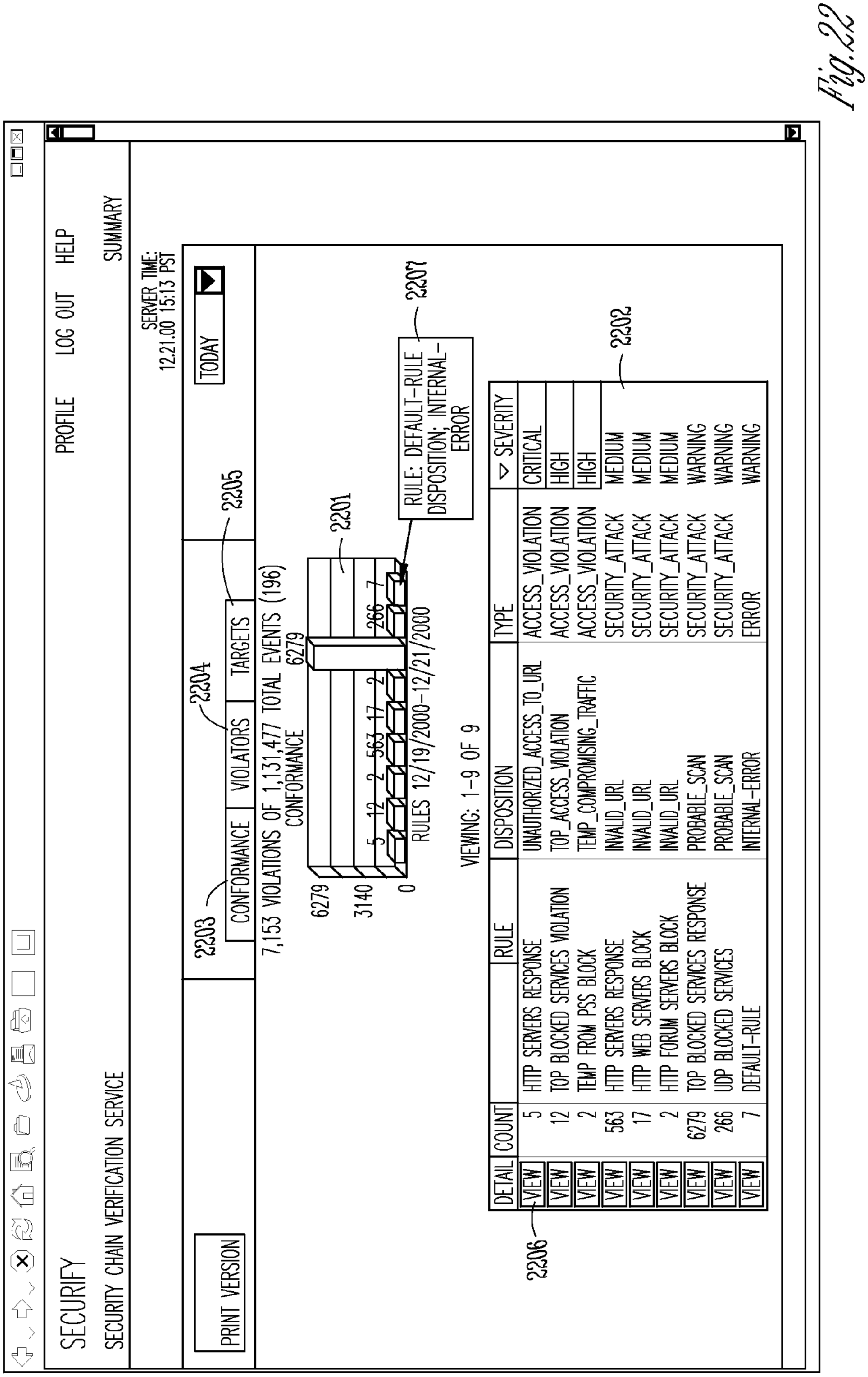
FIG. 22 shows an example of an events summary view according to the invention.

The preferred embodiment of the invention provides an events summary view as shown in FIG. 22.

Figure 29:
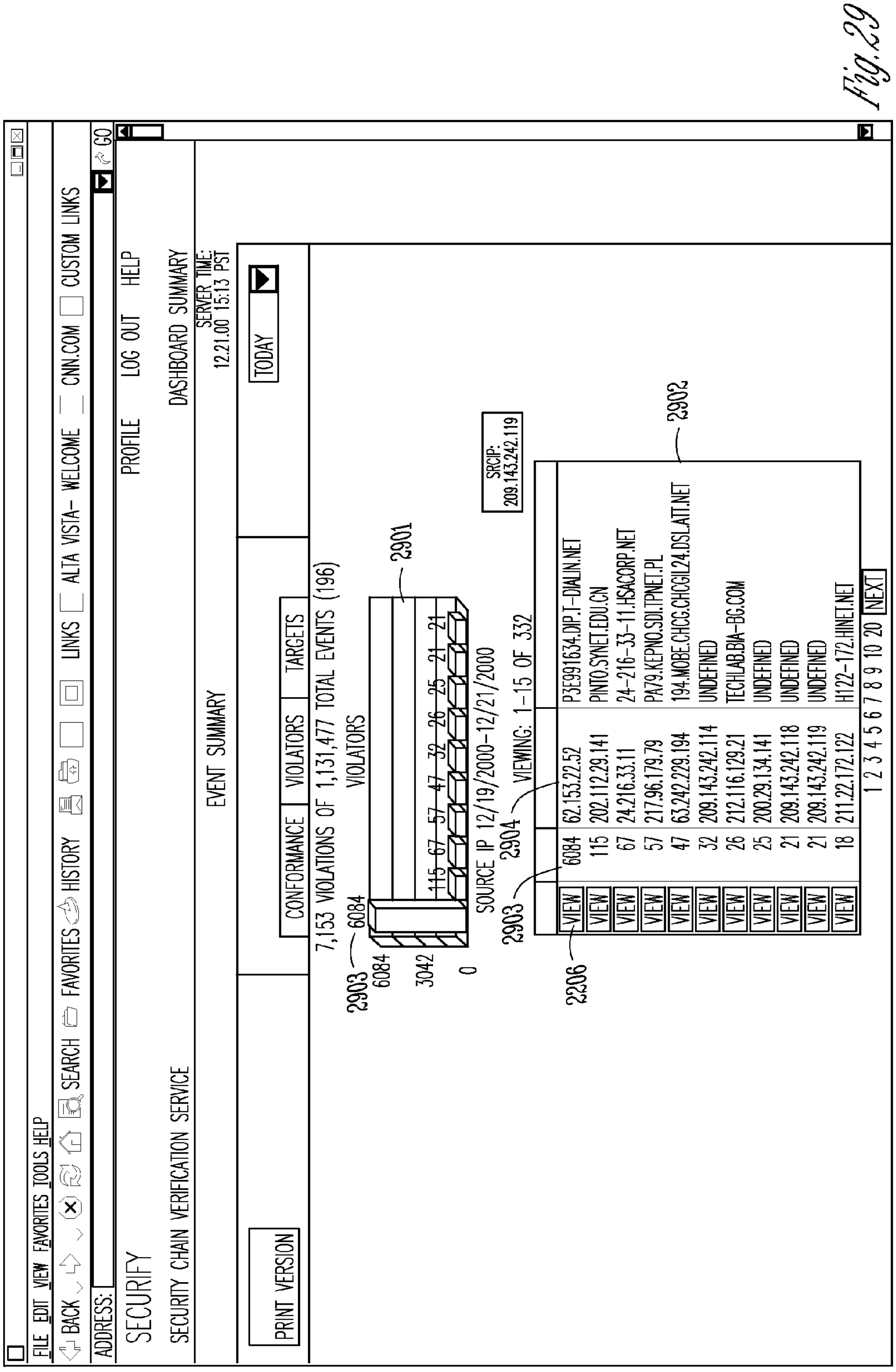
FIG. 29 shows an example of a violators chart and table page according to the invention.
Figure 30:
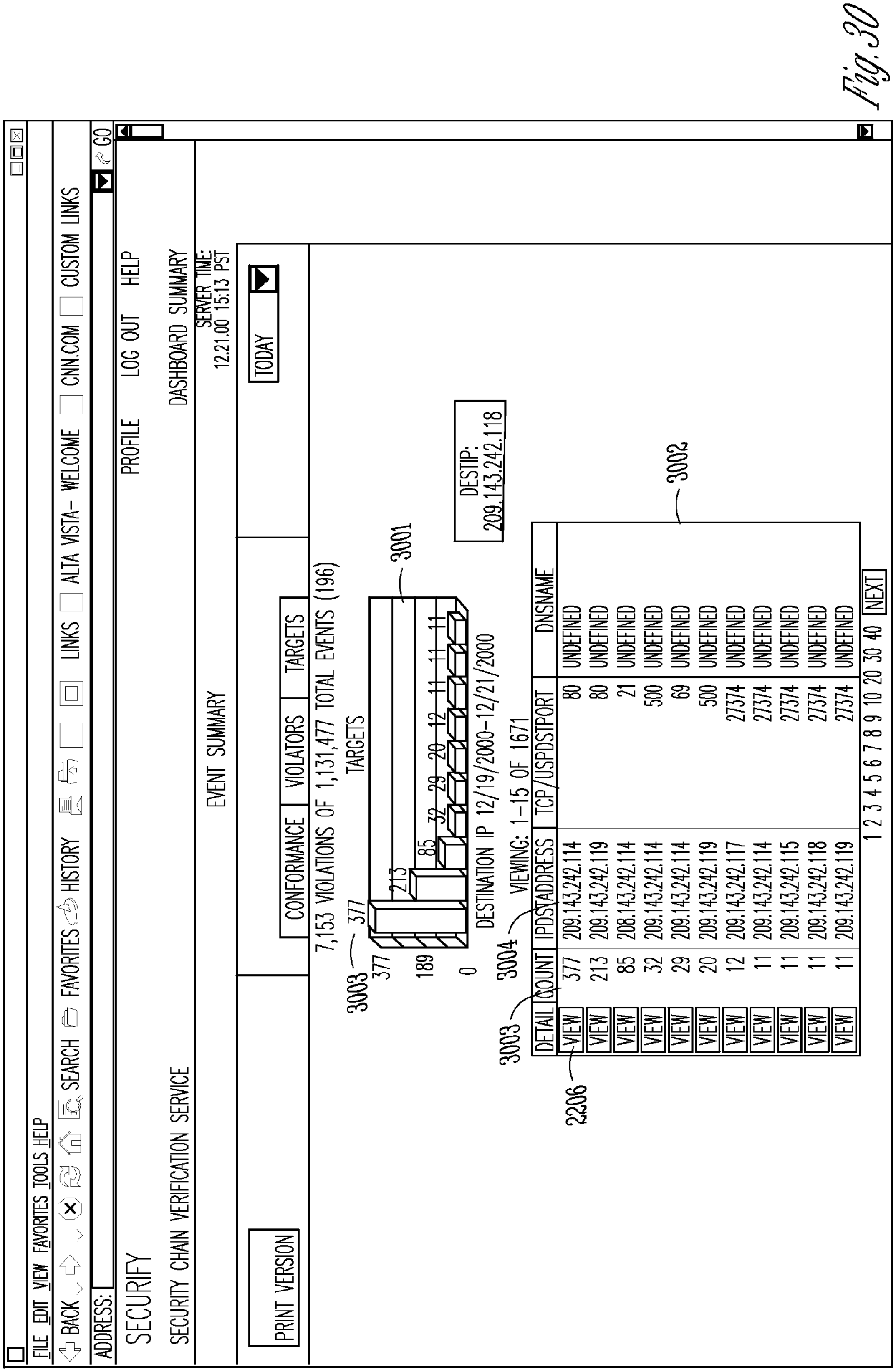
FIG. 30 shows an example of a targets chart and table page according to the invention.

In the example shown in FIG. 22, viewing the summary for a specific time period displays both a chart 2201 of a predetermined number of columns and a table 2202 displaying the following information, when the conformance tab 2203, the violators tab 2204, or the targets tab 2205, respectively, is selected:

- A conformance chart/table shown in FIG. 22, displaying the count of violations for each rule/disposition pair.
- An icon 2206 links to a network event details page, such as shown in FIG. 23 that contains details of events that make up this count, i.e. all network events with such rule/disposition pair that occurred in the given time period.
- A violators chart 2901 and table 2902 shown in FIG. 29, displaying the count 2903 of the number of violations for each of the top violating ip-addresses 2904.
- An icon 2206 links to a network event details page, such as shown in FIG. 23 that contains details of events that make up this count, i.e. all network events with such originating ip-address that occurred in the given time period.
- A targets chart 3001 and table 3002 shown in FIG. 30, displaying the count 3003 of the number of violations for each of the top destination IP-addresses 3004.
  - An icon 2206 links to the a event details page, such as shown in FIG. 23 that contains details of events that make up this count, i.e. all network events with such destination IP-address and port that occurred in the given time period.

FIG. 22 shows the events summary report for conformance.

The preferred embodiment of the invention provides a link to network events detail information. In this example, a separate link 2206 builds a network events details page as shown in FIG. 23. FIG. 23 contains a table that may be sorted or reverse sorted by any of the columns displayed 2301 of all violating network events with such a rule/disposition pair that occurred in the chosen time period.

In the preferred embodiment of the invention, the summary page (FIG. 22) contains a specification of the date range of the data being displayed. In particular, if the start of the range falls outside the range of date for acquiring user data then the actual start date of the user data is displayed.

It should be appreciated that in another equally preferred embodiment, user defined and configurable query and reports settings can be stored, for example, in a user's preferences or profile.

The preferred embodiment of the invention comprises trend reports on the dashboard, wherein such reports comprise charts that link to a network events summary page containing details of the summarized traffic. More specifically, the charts, unless otherwise explicitly specified, are bar charts, each of which link to the network events summary page.

Figure 20:
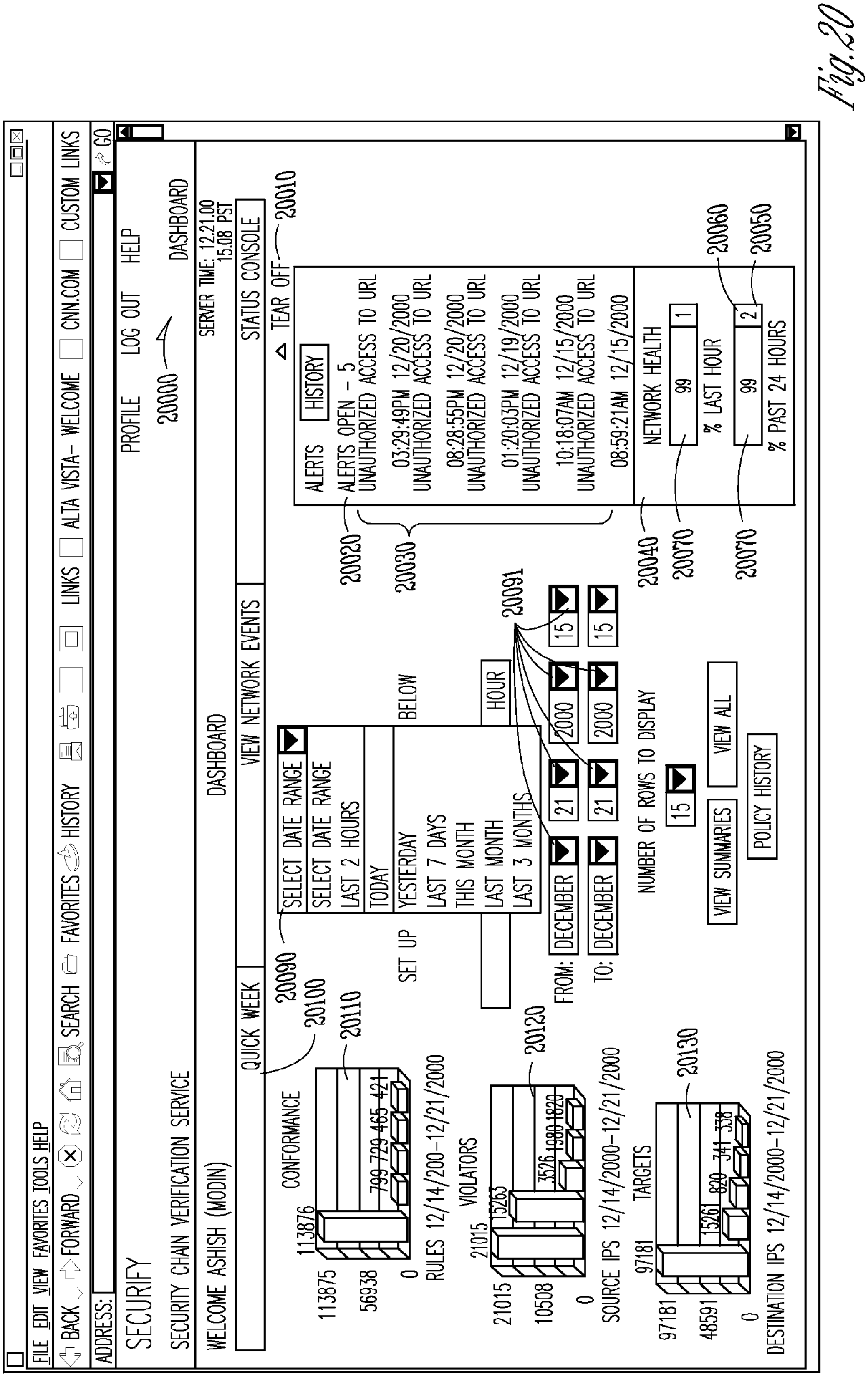
FIG. 20 is an example of a dashboard according to the invention.

Referring to FIG. 20, the preferred embodiment of the invention comprises a section, such as a QuickWeek section 20100 of the end user's main page, such as a login page or home page that contains trend graphs, such as but not limited to the following:

- During the past seven days, the five most frequent rule/disposition combinations versus count 20110;
- During the past seven days, the five most frequent violator ip-addresses versus count 20120; and
- During the past seven days, the five most frequent target ip-addresses versus count 20130.

It should be appreciated that another equally preferred embodiment of the invention comprises an input means for the end user to customize which trends appear in the trend, e.g. QuickWeek section, and to customize the time period being viewed.

The preferred embodiment of the invention comprises trend charts that are embedded into details pages. Each of the trend charts allows the end user to dynamically configure a time range by a means such as a pull down menu. Examples of such embedded trend charts are:

- Policy effectiveness;
- Number of policy changes over time;
- Event Summary (such as for the following):
  - Conformance: Graphical view of the data for the specified time period 2201;
  - Violators: Graphical view of the data for the specified time period; and
  - Targets: Graphical view of the data for the specified time period; and
- Network Event Details (such as for the following):
  - Conformance Event Details (FIG. 23):Violator count over time for a particular rule/disposition combination 2303;
- Violators Event Details: Conformance count over time for a particular violator; and
- Target Event Details: Conformance count over time for a particular target;
- All, e.g. in chronological order:Conformance count over time for a particular time period.

The preferred embodiment of the invention provides event detail reports, such as for but not limited to network event details, protocol event details, and alert details, described below.

The preferred embodiment of the invention provides a network event details page containing listed fields in columns that vary according to the violation type, such as, for example, All, Conformance (FIG. 23), Violator, and Target that had been selected at the summary level. For each type, except All, rather than repeat the field or column(s) which reiterate the violation, it will be displayed in the heading of the events detail page. For example, after choosing to view event details for a particular target, the DstIP is not repeated in every row. Each of the columns may be used to sort or reverse sort the report by clicking on that column's heading name. Following is a list of types of data provided in a network event details page:

- Monitoring Point;
- Disposition Name;
- Rule Name;
- Disposition Code;
- Severity;
- Src IP;
- Src Port;
- Dst IP;
- Dst Port;
- IPProtocol;
- Event Time: event times can be stored throughout the system in UTC; and
- Application Data:
  - ICMP—ICMP action code;
  - HTTP—URL;
  - FTP—Filename;
  - SSL—Ciphersuite, Issuer and Subject's certificate CommonName, Certificate Status;
  - SSH—Authentication handshake status; and
- Application Status Code
  - HTTP—StatusCode.

Figure 24:
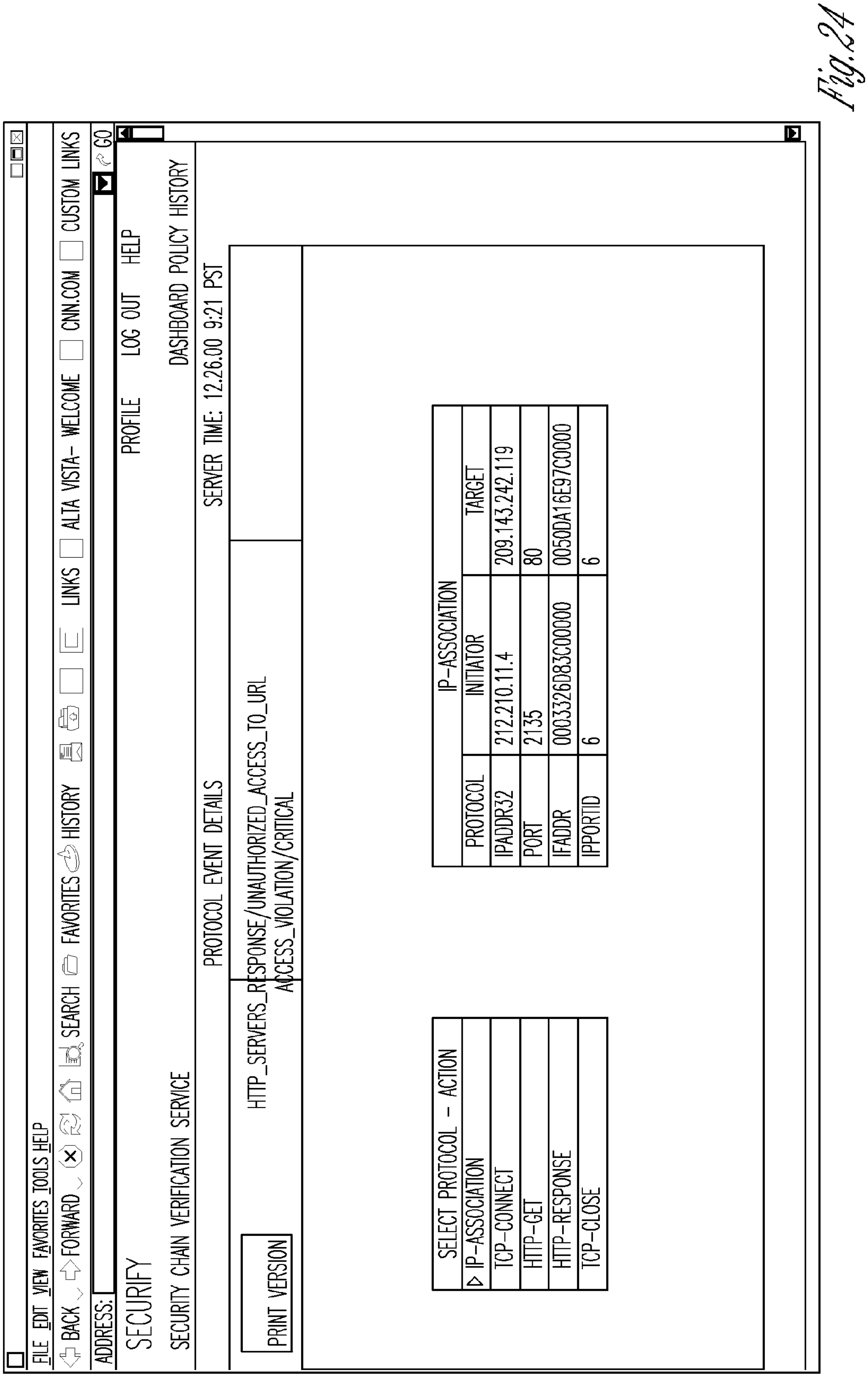
FIG. 24 shows an example of a protocol event details page according to the invention.
Figure 25:
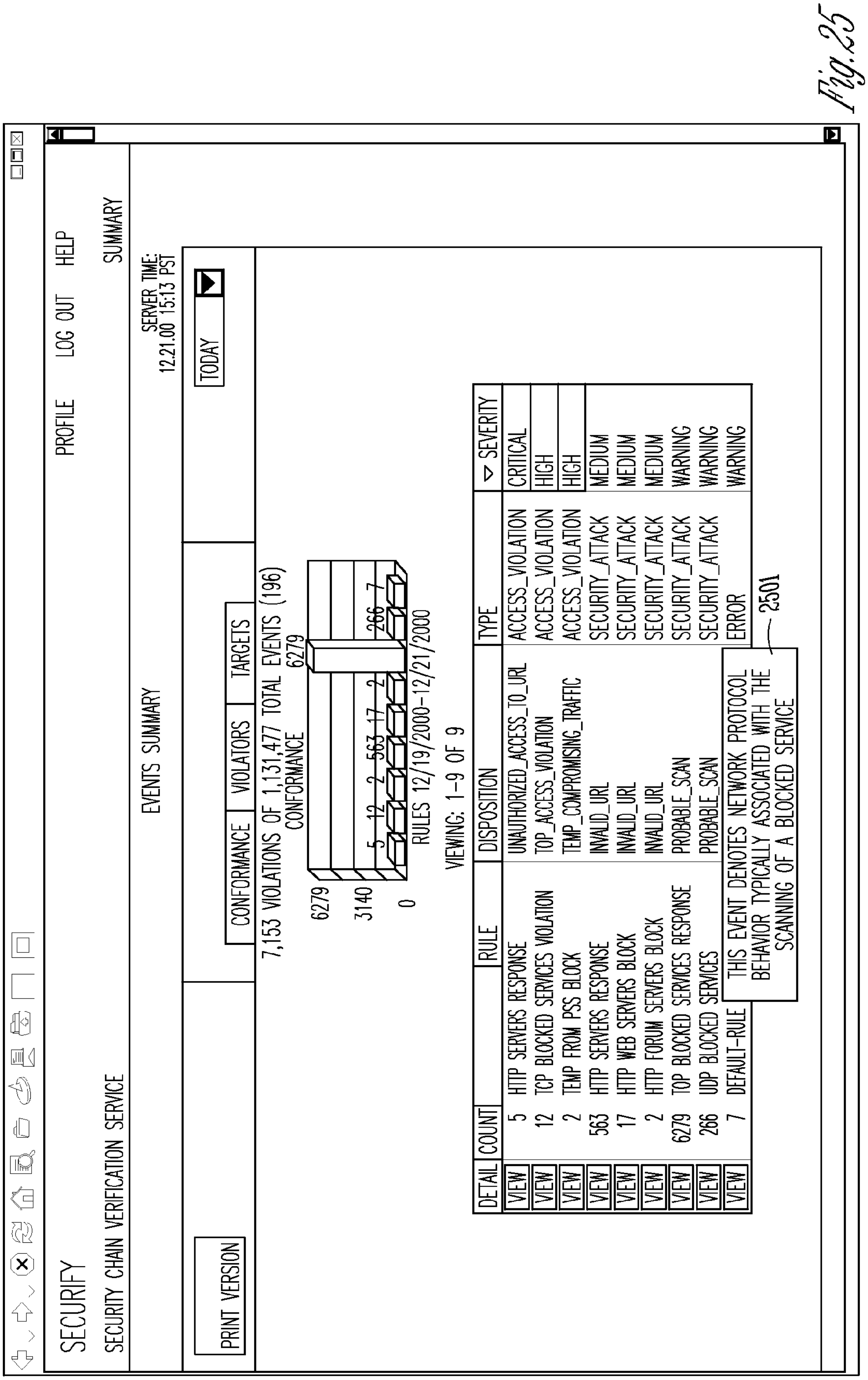
FIG. 25 shows an example of an events summary page containing a pop up description according to the invention.
Figure 26:
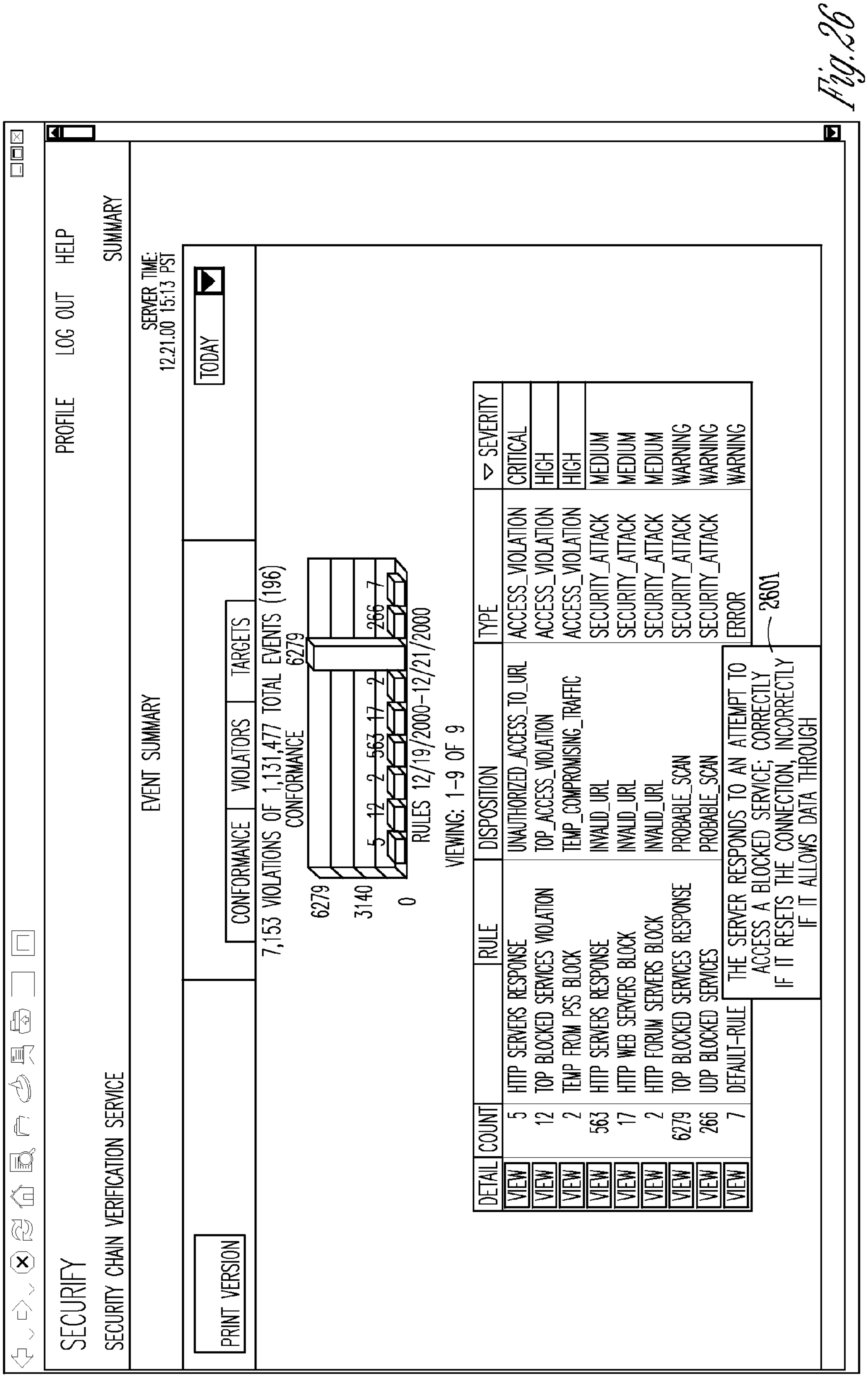
FIG. 26 shows an example of an events summary page containing a pop up description according to the invention.

The preferred embodiment of the invention provides a protocol event details page as depicted in FIG. 24 and that is created in the context of a particular network event instance. This data is retrieved on an as-needed basis from a database. The content of this page reflects the data available in a protocol event view of the QueryTool and is specific to the protocol or protocols being displayed. Such data includes, but is not limited to:

- Data from such attributes as IP address, interface address, protocol ID, service port, URL, file pathname, user name, password metrics, public key certificate, encrypted session parameters and status codes; and
- Protocol-specific actions such as HTTP methods, TCP protocol messages, ICMP message codes, FTP control commands, and authentication steps.

The preferred embodiment of the invention provides an alert event details page as depicted in FIG. 28 containing, but not limited to the following:

- details of the network event that caused the alert;
- rule and disposition name that triggered alert;
- log comment from the disposition;
- time at which the alert was generated;
- initiator ip address of the corresponding non-conformant traffic;
- target ip address of the corresponding non-conformant traffic;
- an icon that links to the network event details page describing the non-conformant network event; and
- checkbox to clear the alert.

The preferred embodiment of the invention provides a policy update page containing, but not limited to a table displaying each time a new policy is installed on the security policy management system discussed herein. This table contains, but is not limited to:

Date of the policy installation;

Description of policy; and

A link to the English description that represents the newly installed policy.

It should be appreciated that in the preferred embodiment of the invention alerts are generated whenever a disposition with a CRITICAL severity is assigned to a network event, each alert generating an email containing, but not limited to the following information:

time the alert occurred;

rule and disposition name that triggered alert;

log description, if any, from the corresponding disposition;

initiator ip address of the corresponding non-conformant traffic;

target ip address of the corresponding non-conformant traffic; and link to the network event detail describing the non-conformant network event.

The preferred embodiment of the invention provides a customer page that allows the user to configure a list of email addresses within a customer's organization that shall receive alert email.

Another equally preferred embodiment provides means for accessing ad-hoc queries for the end user, such as, but not limited to, filtering results by any one or all of the following:

Protocol of the rule name;

Policy rule name;

A regular expression within the rule name;

Disposition name of the violation;

A regular expression within the disposition name;

Source ip-address;

A regular expression with source ip-address;

Target (Destination) ip-address;

A regular expression within target (destination) ip-address;

Target (destination) port; and

A regular expression within target (destination) port.

Figure 31:
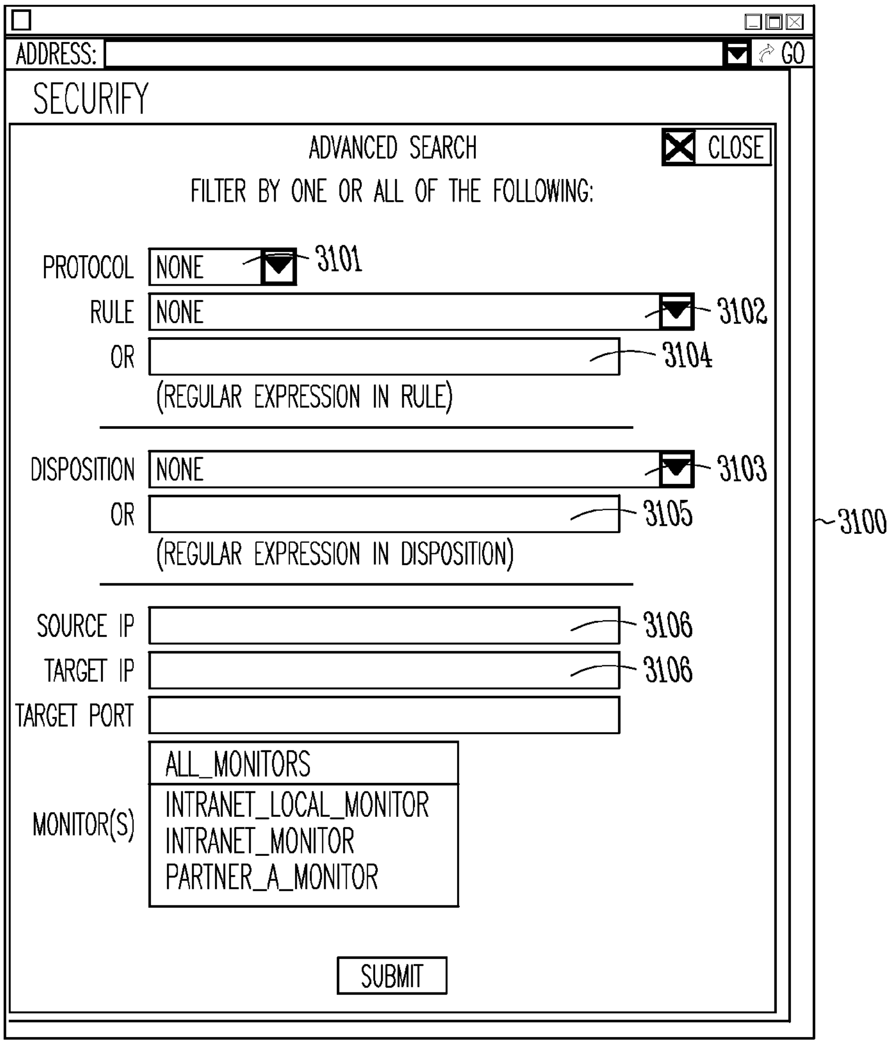
FIG. 31 shows an example of an advanced search dialog box according to the invention.

An example of a means for accessing ad-hoc queries is an advanced search feature, such as for example, an advanced search dialog box 3100, as depicted in FIG. 31. In the preferred embodiment of the invention, the advanced search dialog box 3100 comprises list boxes for such categories, such as protocol 3101, rule 3102, and disposition 3103, and text boxes for descriptions, such as regular expression in a rule 3104 or disposition 3105 and IP-addresses 3106.

Figure 32:
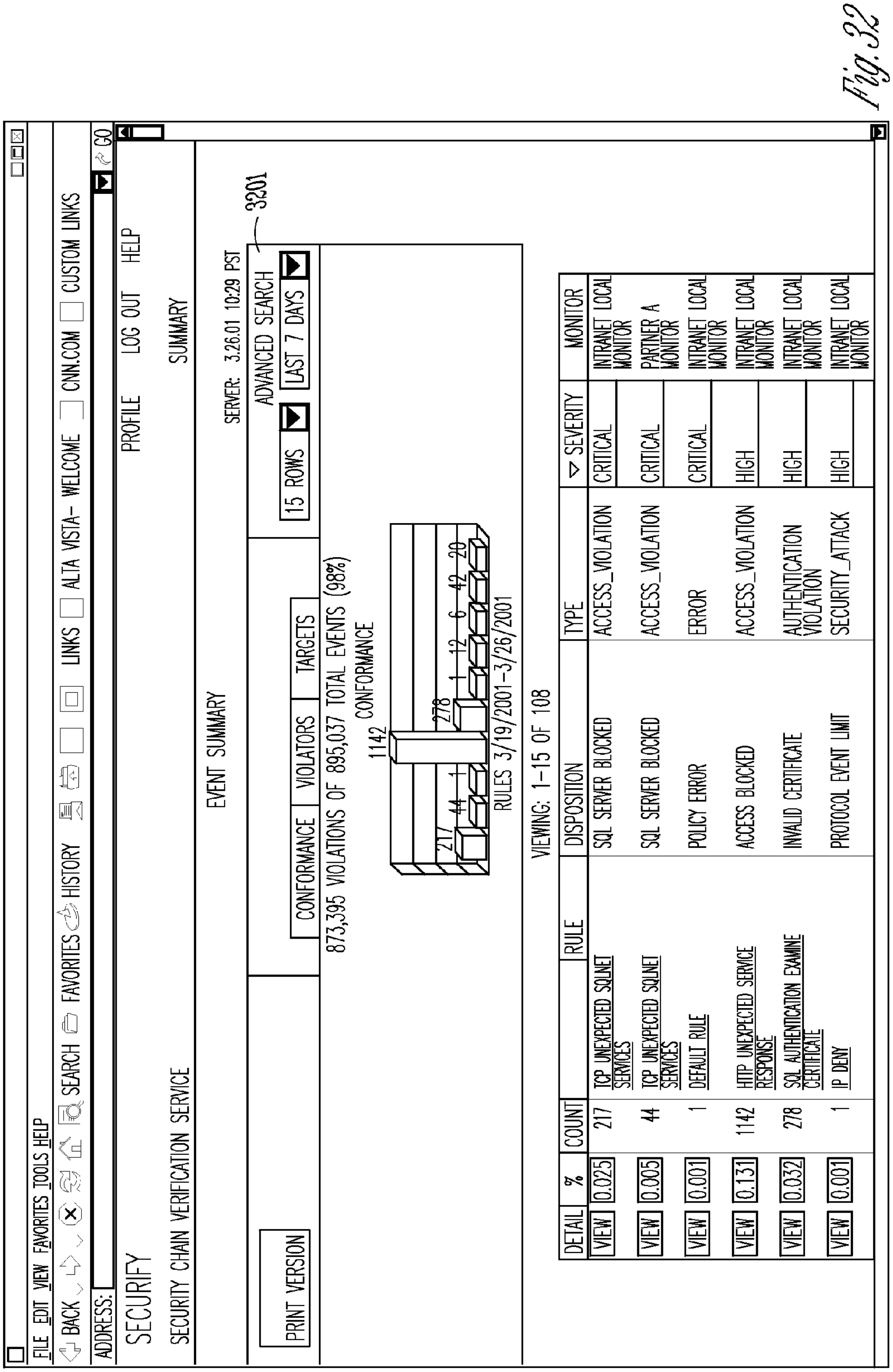
FIG. 32 shows an example of a link to the advanced search dialog box according to the invention.

In the preferred embodiment of the invention, an end user can open the advanced search dialog box 3100 from an Advanced Search link 3201 on the dashboard, as depicted in FIG. 32, or from any event summary or event details page.

The preferred embodiment of the invention provides informational aids. For example, the following information about a user's policy is available via a variety of features, such as but not limited to links, tool tips, and the like:

Customer specific policy interpretation, such as provided by English language representation;

Rule and disposition descriptions as defined by the user in the user's policy, resolved DNS names for ip-addresses, and TCP and UDP service names; and A copyright page containing copyrights and trademarks as required by licensing agreements with vendors.

The preferred embodiment provides links to descriptions of rules, dispositions, IP-addresses, and the like, displayed, for example in a pop up window whenever the user's cursor is over the respective field, as depicted in FIG. 22 2207, FIGS. 23-2302, FIG. 25-2501, FIG. 26-2601, and FIG. 27-2701, respectively.

The preferred embodiment of the invention provides links on each page that include, but are not limited to:

Context sensitive help per-page.

In the preferred embodiment of the invention, each details page contains a button linking to a printer friendly version of the page.

In the preferred embodiment of the invention, regardless of the time zone the user's or the policy monitoring systems runs on, such as, for example Universal Time Coordinates (UTC). Any time being displayed to the user, such as, for example, on a website or in contents of emails, is converted to the user's time zone and as such is explicitly displayed.

Enterprise Management and Rate Limiting Description

A method and apparatus for a network monitor internals mechanism, which serves to translate packet data into multiple concurrent streams of encoded network event data, to contribute to enterprise management, reporting, and global mechanisms for aggregating monitors at a centralized aggregation point, and to facilitate rate limiting techniques because such monitors are not in control (i.e. cannot back pressure flow) is provided.

More specifically, an architecture of enterprise management, enterprise global management, and enterprise reporting is provided; a corresponding underlying technology for distributed querying, i.e. a command manager protocol is provided; an exemplary enterprise monitor operations view is provided; and rate limiting techniques for the incoming packets are provided.

Data Dictionary

This section provides a user level view of the information managed by the invention. It includes definitions of entities visible to the user, rules for determining a unique instance of each entity, relationships between entities, and the constraints that the application of the invention enforces to maintain data integrity.

Conventions

The data entities are presented using the following conventions:

Entity Name

{Enumerated list of values or types, where appropriate}

Unique identifier for an instance

References to other entities

Attributes

Definition and usage

Constraints

It should be appreciated that unique identifiers in the logical model herein are defined based on objects represented in the system, rather than system generated identifiers used in implementation.

Policy Entities

Policy

Policy Name

Current policy version

Author

Checkout status

Definition:

A Policy is a technical specification of network security policy for a specific network. A policy is made up of policy objects used by a Policy Engine to characterize network traffic. A policy is versioned each time a change is made anywhere in the policy.

Policy Version
- Policy Name
- Policy Version
- Last Update Time

Definition:

A specific collection of policy entities making up the policy at a point in time. Individual policy objects have timestamps to indicate when they were last changed, allowing easy identification of what actually changed in a given revision.

The policy version defines what policy is in effect for all conformance data.

Network Object

{Top Level Network, Subnet, Network Interface, Host}
- Network Object Name
- Policy Name
- Policy Version
- Last Update Time
- Fully Model Traffic Flag Definition:

The network object is a supertype entity that represents anything that generates or receives network traffic. Network objects have the ability to participate in Relationships, which means they can offer services to and require them from other network objects. See Relationship.

In one embodiment of the invention, a Fully Model Traffic flag directs a Policy Developer system (Policy Developer) to create detailed rules to validate all traffic to and from network objects rolling up to a reporting element. If this flag is not set, traffic not covered by specific relationships are not reported, i.e. are swept under the carpet. Tuning detailed rule generation improves output when evaluating a policy. It also allows policy to be developed for part of a network only.

Constraints:
- Each network object has a unique name.
- Every network object has one to which Reporting Element it reports. See Reporting Element.
- Every IP address unambiguously resolves to a specific subnet and host network object.

Top Level Network

{All Networks, Internet, Intranet, Extranet}

Definition:

A Top Level Network is a type of network object and is one of a defined set of commonly recognized high level network elements. Top Level Network objects provide containment for subnets, and form the first two levels of a network object containment hierarchy, with All Networks at the root of the hierarchy.

A Top Level Network object may be connected to one or more Perimeter Elements through a Network Interface.

Subnet
- Collection Point Name (optional)
- Network Type {Intranet, Extranet}
- Subnet Mask(s)

Definition:

A subnet is a type of network object contained by a designated Top Level Network object (network type). A subnet represents a collection of network devices using an address space defined by the subnet mask(s).

If a subnet has a collection point, it is considered a "monitored" subnet.

A Subnet may be connected to one or more Perimeter Elements through a Network Interface.

Constraints:
- A subnet is contained within a Top Level Network object.
- Subnet address spaces may not overlap.

Network Interface
- Perimeter Element Name
- Subnet Connected
- IP Address (optional)
- Media Access Control (MAC) Address (optional)
- NAT Specification Definition:

A Network Interface is a type of network object that defines a connection between a Subnet or Top Level Network and a Perimeter Element. The MAC address of the network interface is used to generate IP routing rules if provided. The network address translation specification is also used to validate IP routing when provided.

Constraints:
- A Network Interface must uniquely connect a Subnet or Top Level Network and a Perimeter Element (only one Network Interface can connect a given pair).

Host

Host Member(s) {IP Address Space, Host}

Definition:

A host represents a device or logical group of devices. Hosts are commonly used to represent groups of devices that share relationships or other characteristics. A host may contain an IP addresses space (an IP list or range) and/or other hosts (host group).

Constraints:
- A host's IP address space may not overlap with another host's IP address space or span multiple subnets. If a host definition would result in an IP space overlap, more specific hosts must be created such that no overlap exists. The specific hosts can then be contained in a host group for relationship definition and reporting purposes. In the case of a host with interfaces on multiple subnets, a virtual host is created for each interface and a host group defined containing those virtual hosts if summary reporting is needed.
- A host may not recursively contain itself.

Perimeter Element
- Perimeter Element Name
- Policy Name
- Policy Version
- Last Update Time
- Perimeter Element Type {Firewall, Router}

Definition:

A perimeter element is a device that acts as a router or firewall, and supports network connections between subnets and Top Level Network objects. The perimeter element contains a network interface for each connection it supports.

Service
- Service Name
- Policy Name
- Policy Version
- Last Update Time
- Protocol
- Service Owner Definition:

A service is a category of network traffic that is associated with a specific application. A service has a "base protocol", which specifies both the transport protocol and application layer protocols supported by the invention. See Protocol. The traffic descriptor(s) identify which ports are used by this service. If the "base protocol" is TCP and/or UDP, the service is more generally defined as all traffic using the specified transport protocol(s) and set of ports.

Protocol Component
  Protocol Component Name
  Protocol Name
Definition:
Each IP network protocol is defined to have a set of "components", which are potential characteristics of a protocol session. For example, the SSL protocol has a component to identify a connection where poor-quality encryption is used. The TCP protocol has a component to identify a connection where data is transferred, and another one to identify a connection where no data is transferred.

Outcome
  Protocol Name
  Outcome Name
  Policy Name
  Policy Version
  Last Update Time
  Outcome Owner
  Outcome Component(s)
  Protocol Component Name
  Criticality
Definition:
An outcome defines how security policy applies to the use of a given protocol. For example, an OK outcome means that use of the protocol is expected. Note that outcome names are not unique, e.g. each protocol has an OK outcome. An outcome contains a list of protocol components with a criticality assigned to each one. For protocol uses that are not expected, or are known to be bad, an outcome can be created that defines for each protocol component how critical a policy violation it represents.

Criticality is an important attribute throughout the system, as it identifies to the user when significant violations occur. Criticality is assigned to each network event by the policy engine, and is used to generate policy alerts.

Relationship
  Destination Network Object
  Source Network Object
  Service
  Policy Name
  Policy Version
  Last Update Time
  Outcome
Definition:
Relationships describe expected or anticipated network traffic and are the basis for the rules used by the policy engine. A relationship is defined as a service "offered" by a destination object (or server application), and "required" by a source object (or client application). An associated outcome defines how policy applies to the relationship. Relationships can describe both expected good traffic and traffic that is forbidden by policy.

Inherited relationships are created when relationships are defined for a network object that contains other network objects. For example, if a host is contained within a subnet and a relationship is defined for the subnet, the contained host inherits the relationship. This means that the same policy applies to traffic to or from the host as to the subnet. Inherited relationships can be overridden.

Conformance Entities
Conformance entities are used or created by the policy engine when evaluating network traffic against a policy.

Collection Point
  Collection Point Name
Definition:
A collection point represents a physical place in the network (typically a SPAN port on a switch) where traffic capture is occurring and the policy engine is applying policy. The location of the collection point determines what traffic should be visible to the Monitor.

A Collection point is associated with one or more subnet objects.

Rule Name
  Policy Name
  Policy Version
  Prerequisite rule (optional)
  Source credential
  Destination credential
  Service (optional)
  Descriptioin
  Protocol
  Action
  Outcome
Definition:
A rule is an input to the policy engine created when a policy is compiled in the Policy Developer. Rules are derived from relationships and other policy objects through system logic. The policy engine associates a rule to each protocol and network event.

Disposition
  Disposition Name
  Policy Name
  Policy Version
  Outcome Component
  Owner
  Description
  Disposition Code
  Log Directive
Definition:
A disposition is an input to the policy engine created when a policy is compiled. A disposition characterizes a possible outcome of applying a rule to a protocol event. Dispositions are derived from relationships and other policy objects through system logic.

Credential
  Credential Name
  Policy Name
  Policy Version
  Description
  Assertion
Definition:
A credential is an input to the policy engine created when a policy is compiled. A credential identifies a network entity or type of network traffic. It includes a boolean expression which, if true, defines a match. Credentials can also be created for application level entities such as user name, PKI certificate, URL, etc. Credentials are used in rules.

Condition
  Condition Name
  Policy Name
  Policy Version
  Description
  Assertion
Definition:
A condition is an input to the policy engine created when a policy is compiled. A condition contains a boolean expression used in evaluating a rule. Credentials are used in rules.

Network Event
  Network Event ID
  Collection Point Name
  Dump File (optional)
  Policy Name
  Policy Version
  Source Network Object Destination Network Object
Rule
Source IP Address
Destination IP Address
Source Routing Object
Destination Routing Object
Network Event Service
Outcome Component
Owner
Criticality
Protocol Action
Source Port
Destination Port
Source MAC
Destination MAC
Event Time Definition:

A network event is an output of the policy engine created when network traffic is evaluated against a policy. A network event is a summary of the set of protocol events that make up a complete application level session on the network. For example, viewing a Web page creates a network event that summarizes the underlying IP association, TCP connection and HTTP Get protocol events.

A network event is identified by the packet which initiates an application session between devices. The optional capture file reference supports offline traffic analysis using discrete capture files. The policy engine assigns the following information to the network event, based on the protocol events and the most relevant policy rule that fires during policy evaluation:

- source and destination IP addresses, and the derived policy network objects to which those IP addresses resolve;
- policy rule that was selected as the most relevant by the policy engine;
- service: either the service specified in the selected rule; the industry standard service for the destination port; user defined service on that port if no standard exists; or finally the combined protocol/port (e.g. tcp/1300) in that order of precedence;
- outcome component assigned, including: protocol, outcome, protocol component, criticality;
- owner: either the outcome, service or reporting element owner in that order of precedence;
- source and destination routing objects to provide IP routing information; and
- event time and other relevant protocol details.

Policy Alert
Network Event ID
Notification Time
Notification Method
Alert Cleared
Time Cleared Definition:

A policy alert is created whenever a network event is assigned a severity of "critical". The policy alert is sent via email or SNMP trap to specified addresses, and is tracked through an Operations View. The alert cleared flag and time indicate when an operational user clears the alert from the Operations View.

Protocol Event
Protocol Event ID
Policy Name
Policy Version
Network Event ID
Protocol
Rule
Disposition
Protocol Action Definition:

A protocol event is an output of the policy engine that is created when network traffic is evaluated against a policy. A protocol event describes a single protocol exchange, and references the policy rule/disposition pair describing the result of policy evaluation for that event.

Protocol Event Attribute
Protocol Event ID
Protocol Name
Protocol Attribute Name
Protocol Attribute Value Definition:

A protocol event attribute is output from the policy engine recording the value of each defined field in a protocol event. The set of protocol attributes for each protocol is statically defined.

Reporting Entities

Reporting Element
Reporting Element Name
Policy Name
Policy Version
Last Update Time Definition:

A reporting element is a network object used to summarize network activity. Any network object may be designated a Reporting Element. Being reporting elements makes "interesting" network objects visible in summary views regardless of where they appear in the network object hierarchy.

When containment relationships create a hierarchy of reporting elements, network events are preferably reported at the lowest level. Reporting elements higher in the hierarchy summarize network events that do not roll up to any lower-level reporting element. Every IP address rolls up to some Reporting Element, with the Top Level Network objects functioning as Reporting Elements by default for any IP addresses that don't roll up to a user defined reporting element.

An owner may be assigned to the reporting element.

Network Object Hierarchy

Definition:

The network object containment relationships create a network object hierarchy. At the root is "All Networks", the next level is the Internet, Intranet and Extranet objects. All defined subnets are contained within either Intranet of Extranet, and hosts are contained (implicitly) by the subnets.

Groups of hosts can be defined as well as groups of groups, forming a host group hierarchy separate from the subnet hierarchy.

Counts of network events can be rolled up at all the nodes in these hierarchies.

It should be appreciated that in one embodiment of the invention, host groups are constrained to roll up to a specific subnet.

Reporting Network Objects

For reporting purposes, network objects are identified by name. This has two implications:

- if an object's definition is changed such that it no longer represents the same logical entity, its name must be changed; and
- if two objects in different policies have the same name and the same parent name, the data is then rolled up and aggregated across policies.

Violation Summary
Monitor Name
Time Interval
Collection Point

Policy Name
Policy Version
Source Network Object
Destination Network Object
Source IP Address
Destination IP Address
Summary Service
Outcome Component
Owner
Criticality
Count Definition:

Counts of violations (network events with criticality other than OK) from a monitor summarized over a time interval. The monitor is part of the identifier to support the case where multiple monitors are deployed at a collection point. The time interval varies depending on the level of summarization. At the monitor, summarization is performed on a batch interval, e.g. 5 minute. Each summary row counts the number of occurrences of violations with the same:

Source IP Address
Destination IP Address
Summary Service
Outcome Component
Owner
Criticality The Summary Service is the same as the Network Event Service except that the "Unknown Service" value is used to consolidate all protocol/port based network event services into a single count.

Conformance Summary

Monitor Name
Time Interval
Collection Point
Policy Name
Policy Version
Source Network Object
Destination Network Object
Outcome Component
Owner
Summary Service
Count Definition:

Counts of conforming network events (events with criticality of OK) from a monitor summarized over a time interval.

The Conformance Summary is the same as the Network Event Summary except that the summarization is by network object instead of IP address. As implemented, the two types of summaries are denormalized into the same summary table, but the level of detail available for conforming events is less than for violations.

Policy Domain

Policy Name
Management Domain Name

Definition:

A policy domain represents the collection of all Monitors running the same policy. The monitors are referenced indirectly through the Management Domain. See Management Domain.

Management of a policy domain is the responsibility of the policy analyst who is the author of the policy.

A policy domain can span management domains.

Architecture

Introduction

The preferred embodiment of the invention provides the following architecture of the invention. The description of the preferred architecture comprises studio components (Studio), monitor components (Monitor), and Enterprise Manager and Reporting components (Enterprise Global and/or Enterprise Reporting) and their respective communication protocols.

It should be appreciated that the following discussed architecture in this entire section is by way of example only, and that other architectural configurations are possible and necessarily fall within the scope of the present invention.

Terms and Definitions

Following are definition of terminology introduced in this section.

An enterprise manager (EM) is a consolidation point for several monitors that provides an operational view and centralized management.

A tier 1 enterprise manager is an EM that interfaces directly to monitors.

A tier 2 enterprise manager is an EM that interfaces with monitors and other downstream EM's. Embodiments of tier 2 managers would be Enterprise Global and Enterprise Reporting.

High Level Architecture

Deployment Scenarios

Single Monitor Deployment

Figure 33:
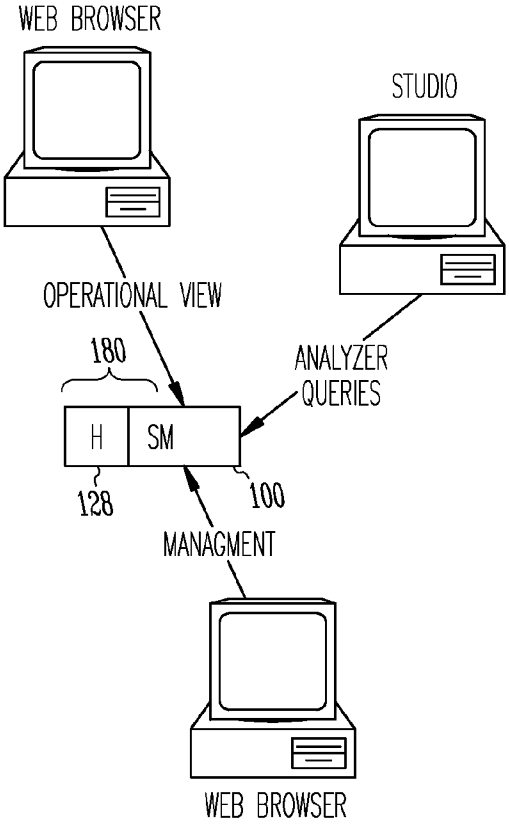
FIG. 33 is a schematic diagram of the main components of a single monitor deployment according to the invention.

Single Monitor Deployment can be described with reference to FIG. 33, a schematic diagram of the main components of single monitor deployment according to the invention.

The preferred Monitor 180 is made up of two machines, a harvester performing packet capture and protocol processing 128, and a Security Manager (SM) 100 evaluating the captured traffic against policy. The SM additionally provides an externally accessible web interface for operations view ("a dashboard") and systems management, and a remote querying and management technology ("the command manager").

Each harvester collects data from a single "policy collection point". Data may be physically collected on multiple interface cards for de-multiplexing into a single logical SPFM device from which the harvester is reading (see SPFM-below).

Full Deployment

Figure 34:
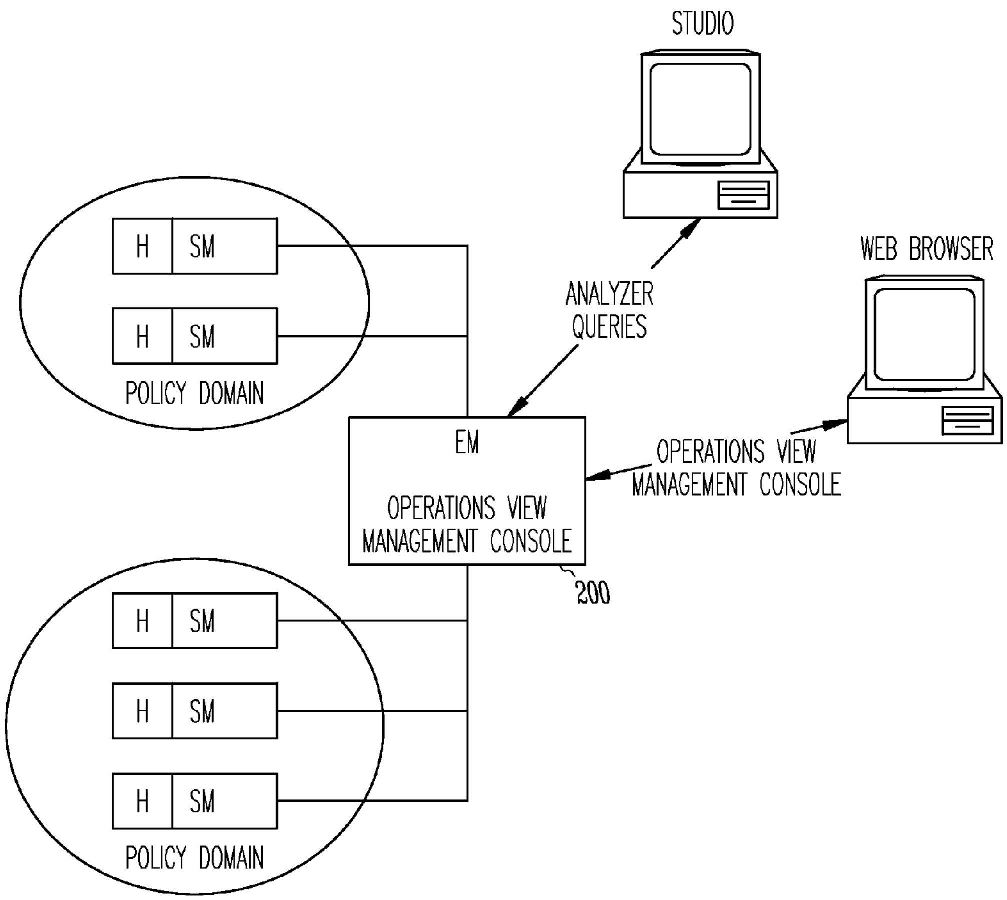
FIG. 34 is a schematic diagram of the main components of full monitor deployment according to the invention.

Full Deployment can be described with reference to FIG. 34, a schematic diagram of the main components of full monitor deployment according to the invention.

A full deployment of the preferred architecture comprises:

An Enterprise Manager 200 providing consolidated operational view, reporting, and systems management over a collection of monitors. This collection of monitors is divided into disjoint Policy Domains within which each monitor processes the same policy.

As with single monitor deployment, each monitor is made up of two machines, a harvester performing packet capture and protocol processing, and an SM evaluating the captured traffic against policy. Each harvester collects data from a single "policy collection point". Data may be physically collected on multiple interface cards for de-multiplexing into a single device from which the harvester is reading.

Architectural Diagram

Figure 35:
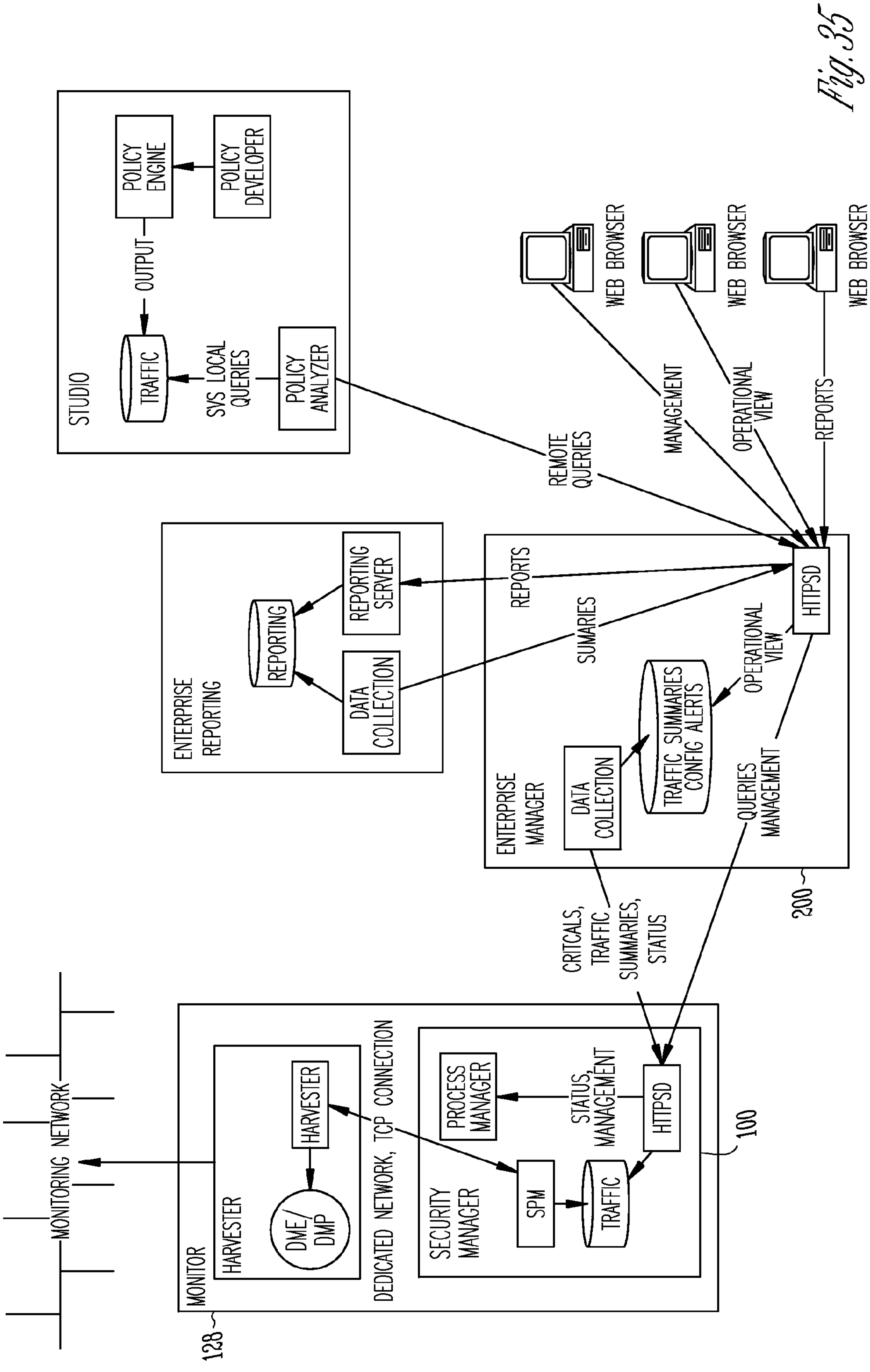
FIG. 35 is a schematic diagram illustrating basic architectural components and their respective interactions with each other according to the invention.

FIG. 35 illustrates the basic architectural components of one preferred embodiment of the invention and their respective interactions with each other. Each of these components is described in more detail in subsequent sections of this document.

Components

Monitor

The Monitor provides the following functionality:

24×7 monitoring of network traffic against policy.

A web-based operational view (the "dashboard") of the conformance of monitored traffic.

A web-based console for the systems management of the monitoring application.

An interface to which Studio can connect to query online conformance data.

Generation of alerts for CRITICAL violations of policy.

Generation of alerts for status changes of monitor components.

Figure 36A:
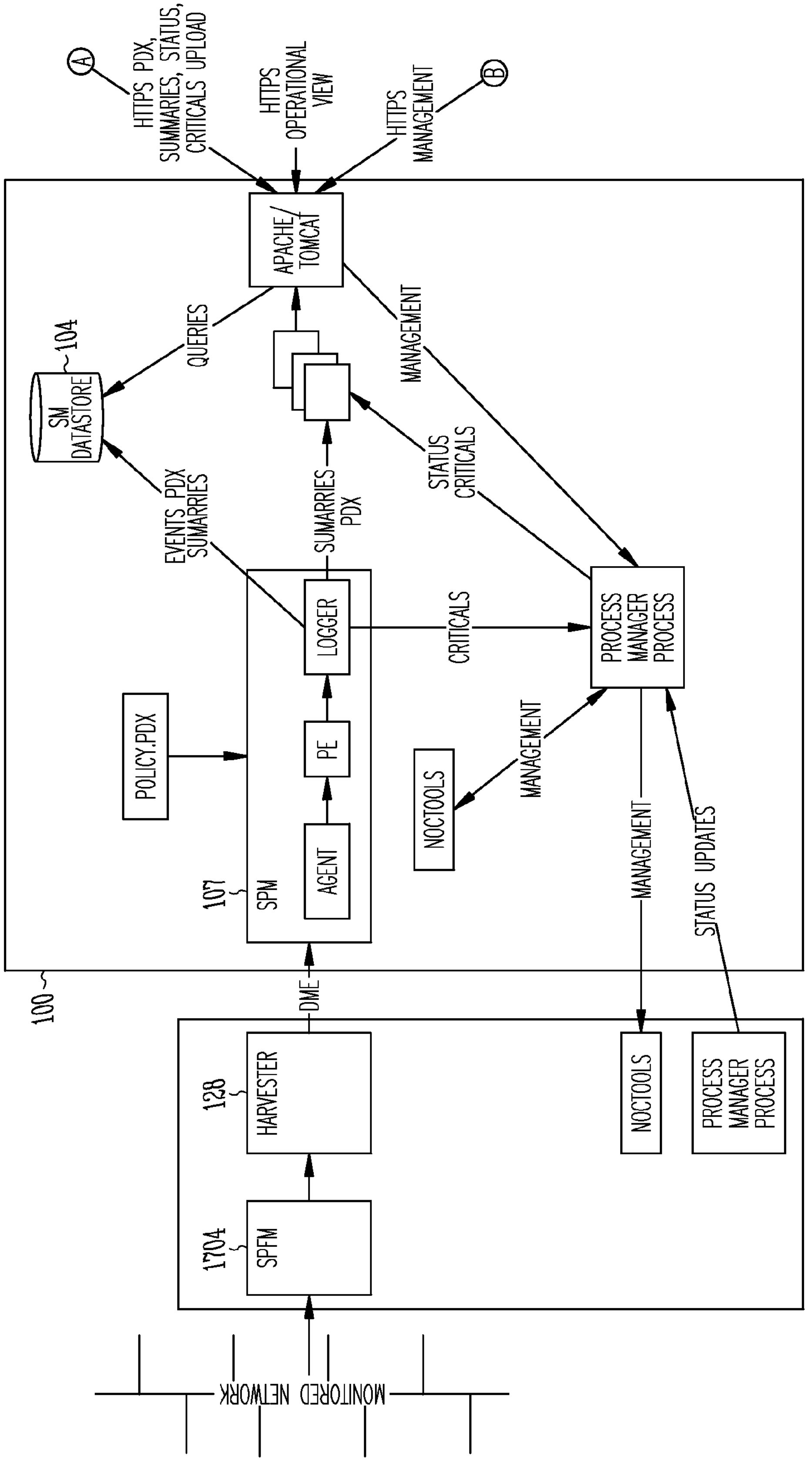
FIG. 36A is a schematic diagram illustrating the main monitor component according to the invention.

The preferred Monitor is physically two servers, one (the "harvester") 128 collecting packet data, performing protocol analysis and sending a summary of the traffic to a second (the "SM") 100 evaluating these summaries against a user supplied policy and storing the output of this evaluation. Refer to FIG. 36A, a schematic diagram illustrating the main monitor component according to the invention.

Enterprise Manager

The preferred Enterprise Manager 200 provides the following functionality (refer to FIG. 36B):

A consolidated web-based operational view 202 of the conformance of traffic monitored by multiple monitors.

Consolidated web-based trend reporting 204 over the data collected by multiple monitors.

A web-based console for the systems management 206 of the deployment according to the invention.

An interface to which Studio 400 can connect to query online conformance data across multiple monitors.

Display of alerts for CRITICAL violations of policy.

Generation of alerts for status changes of monitor components.

Enterprise Reporting

The preferred Enterprise Reporting module 410 provides the following functionality (refer to FIG. 36C):

Providing Management reports 412; and

Long term trend reporting 412.

Figure 36B:
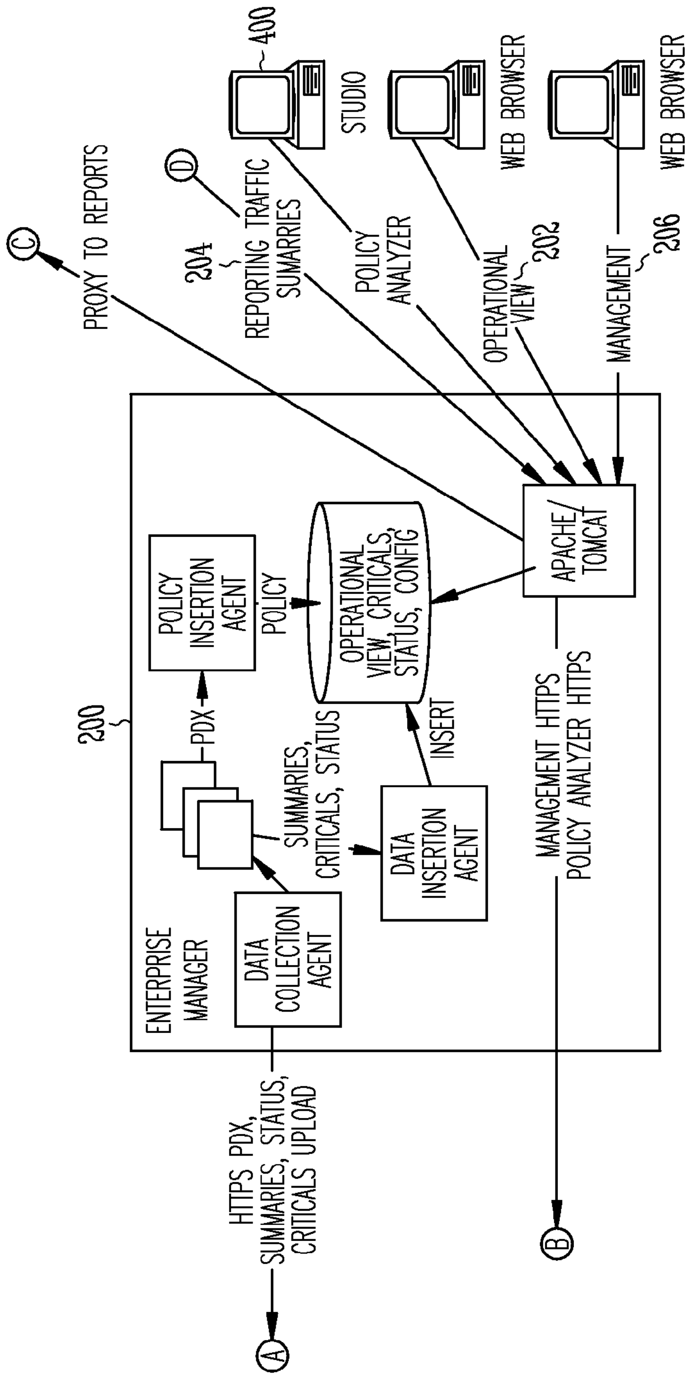
FIG. 36B is a schematic diagram illustrating the main Enterprise Manager component according to the invention.
Figure 36C:
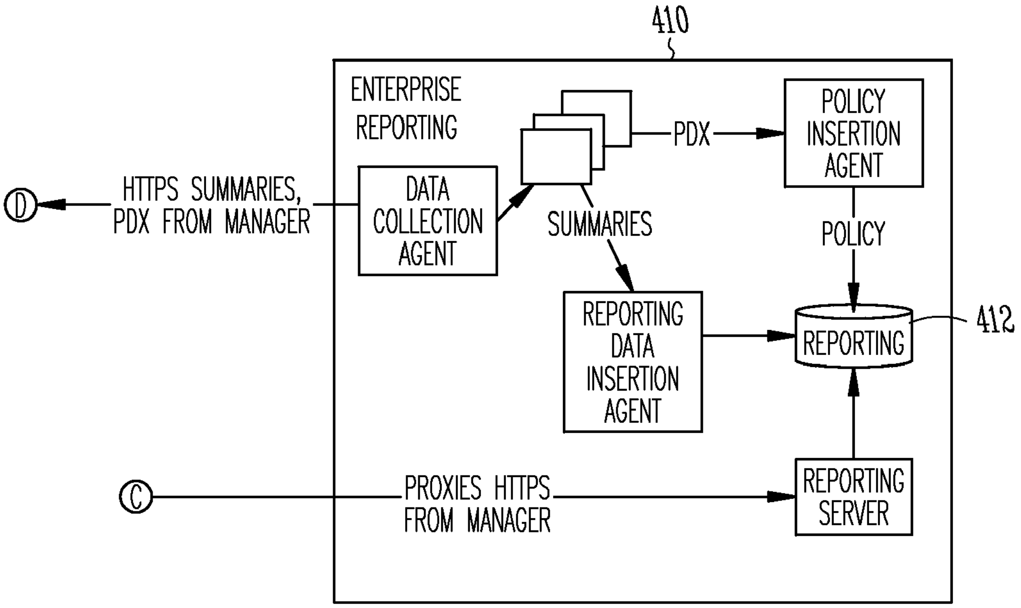
FIG. 36C is a schematic diagram illustrating the main Enterprise Reporting component according to the invention.

It should be appreciated that FIGS. 36A-36C can be placed together contiguously, side by side, such that the output of FIG. 36A provides the input to FIG. 36B, and the output of FIG. 36B provides the input to FIG. 36C. In other words, the flow starts from the Monitor, proceeds to the Enterprise Manager, and then proceeds to the Enterprise Reporter.

Enterprise Global

The preferred Enterprise Global module 900 provides the following functionality (refer to FIG. 48):

A consolidated web-based operational view 1502 of the conformance of traffic monitored by Enterprise Managers.

Studio

Figure 37:
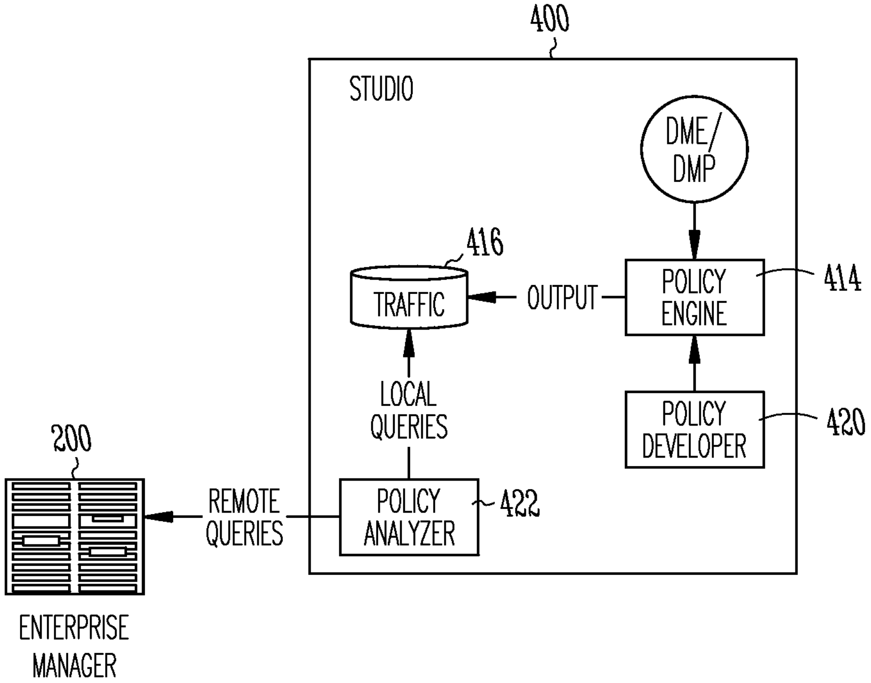
FIG. 37 is a schematic diagram illustrating the studio component according to the invention.

The preferred Studio 400 provides the following functionality (refer to FIG. 37):

A visual development tool for the creation and maintenance of a corresponding Policy 420.

An analysis environment 422 that allows the interrogation of the output of policy evaluation. This output may be either on the local machine, or within a Manager and/or Monitor.

A policy evaluation environment 414 within which a network traffic file can be locally evaluated against a policy and the output stored in a local datastore 416.

Web Server Structure

The following functionality is provided by the preferred web server environment 600 (refer to FIG. 38):

Reporting (Manager only) 602

Console 604

Operational View 606

Remote Query Support 608

Data Transport Access 610

Figure 38:
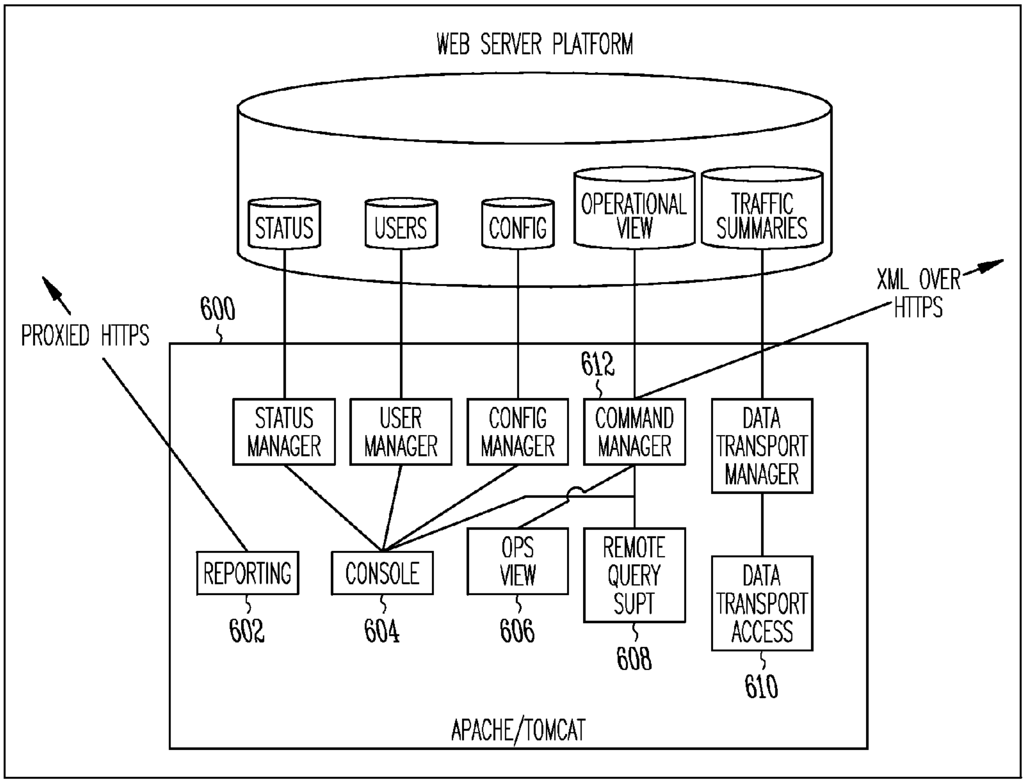
FIG. 38 is a schematic diagram illustrating the web server structure according to the invention.

FIG. 38 is the general structure of the webserver application in both the Manager and Monitor. Each of the "Manager" components provides an interface that abstracts away the monitor or manager specifics of the underlying concrete implementation.

It should be appreciated that one possible embodiment of the Command Manager 612 protocol of FIG. 38 is XML over HTTPS (referred to as XML/HTTPS).

Communication Protocols

This section discusses the preferred communications protocols between various components according to one preferred embodiment of the invention.

Manager and Monitor

Table Q below summarizes the communication between the Manager and each of its Monitors.

TABLE Q

| Function | Protocol | Src | Dest | Rqd | Description |
|---|---|---|---|---|---|
| Conformance Summaries | XML/ HTTPS | Manager | Monitor | ✓ | Manager periodically polls each Monitor requesting any summary files (and associated policies) that are available. Client/Server certificates authentication. |
| Systems Management | XML/ HTTPS | Manager | Monitor | ✓ | Manager Systems Management interface proxies requests to Monitors. Client/ Server certificates authentication. |
| Policy Analyzer Queries | XML/ HTTPS | Manager | Monitor | ✓ | Queries originating on a Studio being forwarded to the monitor for evaluation. Client/Server certificates authentication. |
| CRITICAL alerts | XML/ HTTPS | Manager | Monitor | ✓ | Manager periodically polls each monitor requesting any alerts generated from the Policy Engine for critical violations of the policy. |
| Monitor Component Status Changes | XML/ HTTPS | Manager | Monitor | ✓ | Manager periodically polls each monitor requesting any alerts generated from the Process Manger to indicate system status, such as system startup, or a process failure. |

Manager and Studio

Table R summarizes the communication between the Manager and Studio.

TABLE R

| Function | Protocol | Src | Dest | Rqd | Description |
|---|---|---|---|---|---|
| Policy Analyzer Queries | XML/ HTTPS | Studio | Manager | ✓ | Conformance data queries for analysis of policy violations. The query will be executed either on the Manager or on a (or a set) of Monitors. Cookie-based scheme using username/password. |

It should be appreciated that the protocol XML/HTTPS is that of the Command Manager component.

Manager and Reporting

Table S summarizes the communication between the Manager and Reporting.

TABLE S

| Function | Protocol | Src | Dest | Rqd | Description |
|---|---|---|---|---|---|
| Reports | HTTPS | Manager | Reporting | | Manager proxies client report requests to the Reporting server. |
| Conformance Summaries | XML/ HTTPS | Reporting | Manager | | Reporting periodically polls the Manager requesting any summary files (and associated policies) that are available. Client/Server certificates authentication. |

Manager and External Servers

Table T summarizes the communication between the Manager and servers that are external to the preferred deployment of the invention.

TABLE T

| Function | Protocol | Src | Dest | Rqd | Description |
|---|---|---|---|---|---|
| Time | NTP | Manager | NTP Server | ✓ | System clock synchronization with a configurable external clock. |
| Monitor Component Status Changes | SNMP | Manager | NMS | | System status alerts for Manager components being forwarded to a configurable, external, Network Management System. |

Manager and External Clients

Table U summarizes the communication between the Manager and clients that are external to the deployment.

TABLE U

| Function | Protocol | Src | Dest | Rqd | Description |
|---|---|---|---|---|---|
| Operations View | HTTPS | Browser | Manager | ✓ | Web based operational view. Cookie-based scheme using username/ password or X.509 client side certificate. |
| Reports | HTTPS | Browser | Manager | ✓ | Web based trend reporting. Cookie-based scheme using username/ password or X.509 client side certificate. |
| Management Console | HTTPS | Browser | Manager | ✓ | Web based SecurVantage management console. Cookie-based scheme using username/password or X.509 client side certificate. |
| Management Console | HTTPS | NMS | Manager | | Web based SecurVantage management console being opened within the context of an external NMS. Cookie-based scheme using username/password or X.509 client side certificate. |

Monitor and Studio

Table V summarizes the communication between the Monitor and Studio.

TABLE V

| Function | Protocol | Src | Dest | Rqd | Description |
|---|---|---|---|---|---|
| Policy Analyzer Queries | XML/ HTTPS | Studio | Monitor | ✓ | In the single monitor deployment scenario, conformance data queries for analysis of policy violations. The query will be executed either on the Manager or on a Monitor (or a set thereof). Cookie-based scheme using username/ password or X.509 client side certificate. |

Again, it should be appreciated that the protocol XML/ HTTPS is from the Command Manager protocol.

Monitor and External Servers

Table W summarizes the communication between the Monitor and servers that are external to the deployment.

TABLE W

| Function | Protocol | Src | Dest | Rqd | Description |
|---|---|---|---|---|---|
| Time | NTP | Monitor | NTP Server | ✓ | System clock synchronization with a configurable external clock. |
| Name Lookup | DNS | Monitor | DNS Server | | DNS name lookup for host names that appear in conformance data; uses a configurable external server. |
| CRITICAL alerts | SNMPv2c | Monitor | NMS | | Critical policy alerts having been received from a Monitor being forward to a configurable, external, Network Management System. |
| CRITICAL alert email/ page | SMTP | Monitor | SMTP Server | | Critical policy alerts being sent to an email address; uses a configurable external server. |
| Status Update | SNMPv2c | Monitor | NMS | | System status alerts generated to indicate, for example, the start or stop of system processes. Being forwarded to a configurable, external, Network Management System. |
| Status update email/page | SMTP | Monitor | SMTP Server | | System status alerts being sent to an email address. Uses a configurable external server. |

Monitor and External Clients

Table X summarizes the communication between the Monitor and clients that are external to the deployment.

TABLE X

| Function | Protocol | Src | Dest | Rqd | Description |
|---|---|---|---|---|---|
| Operations View | HTTPS | Browser | Manager | ✓ | In the single monitor deployment scenario, web based operational view. Cookie-based scheme using username/ password or X.509 client side certificate. |
| Management Console | HTTPS | Browser | Manager | ✓ | In the single monitor deployment scenario, web based Monitor console. Cookie-based scheme using username/ password or X.509 client side certificate. |

Protocols Summary

Figure 39:
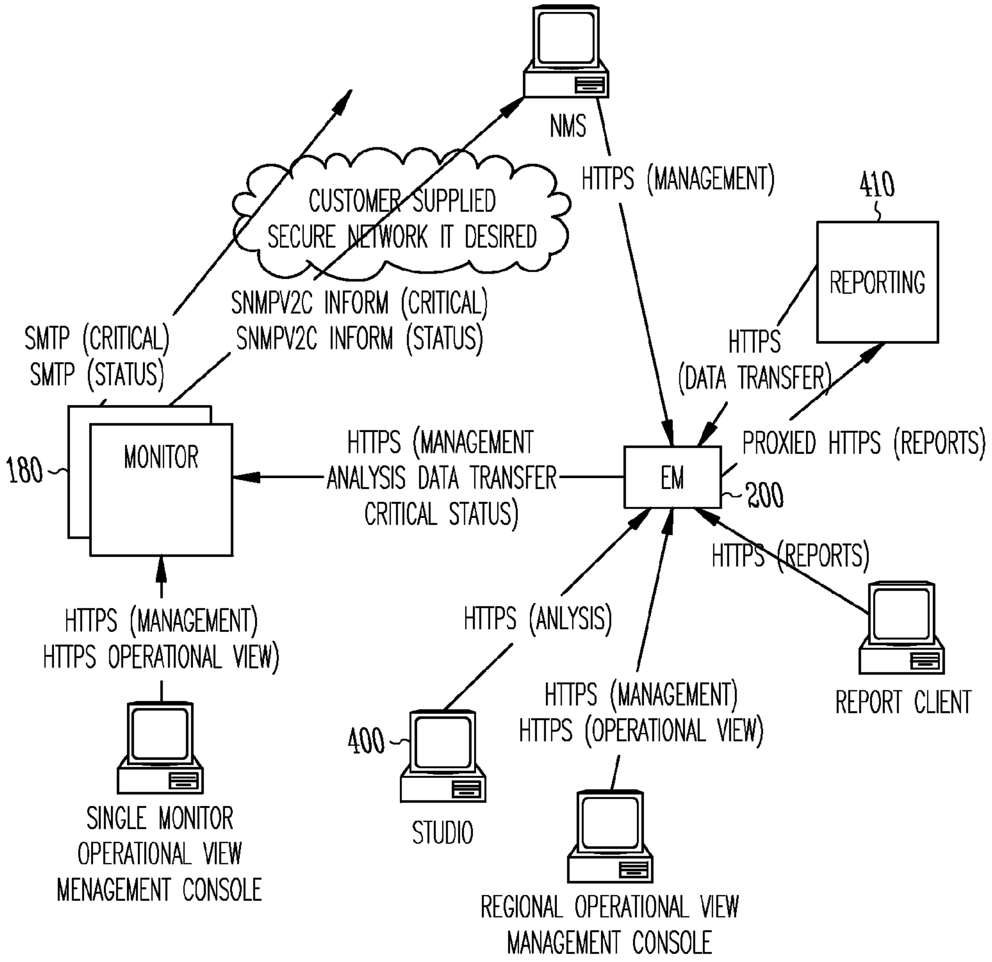
FIG. 39 is a schematic diagram illustrating a summary of protocols according to the invention.

Refer to FIG. 39 for viewing an illustrated summary of protocols according to one preferred embodiment of the invention.

Enterprise Global

One preferred embodiment of the invention provides Enterprise Global, which comprises a configuration of a plurality of Enterprise Managers.

High Level Architecture

Figure 40:
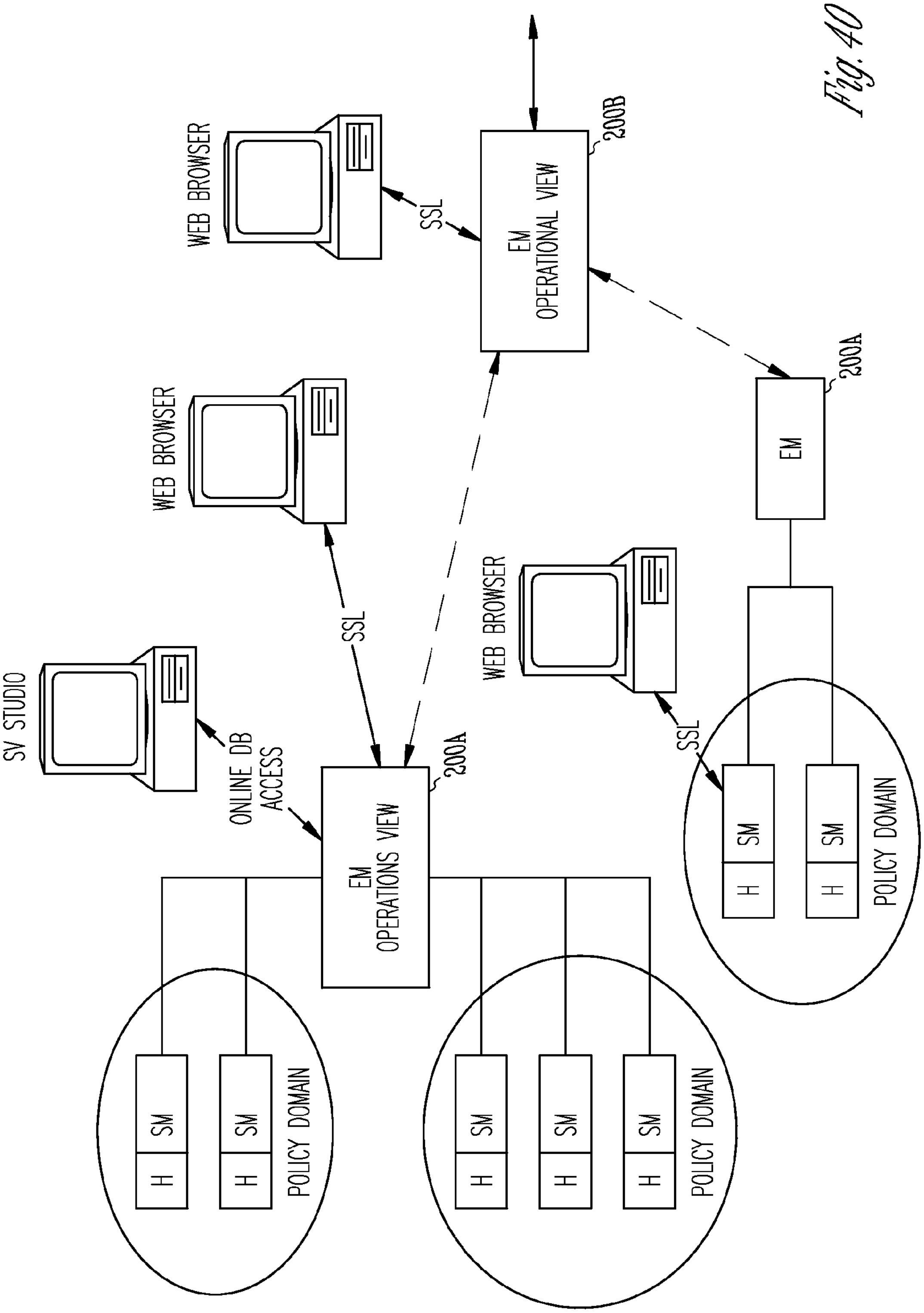
FIG. 40 is a schematic diagram illustrating a high level architecture of Enterprise Global according to the invention.

For an understanding of Enterprise Global, refer to FIG. 40, a schematic diagram illustrating a high level architecture of the preferred Enterprise Global.

The full hierarchical architecture comprises a second tier manager 200*b* farming out requests to first tier managers 200*a*. The second tier managers uses the same protocols to interact with the first tier managers as the first tier use to talk to the monitors.

Further tiers are identical to the second tier.

Reporting Server without a Manager

One embodiment of the invention provides having a Reporting server without a Manager, the Reporting server collecting data from a number of Monitors.

Tier-2 Manager

The second tier manager is a "global" manager as opposed to a "regional" manager. Such second tier manager maintains no conformance data but rather farms out the queries it needs to perform to its Tier-1 Managers. The second tier manager provides for a greater aggregation of conformance data, and a more centralized locus of management. As another embodiment, the second tier manager provides for aggregation of conformance data via web interface, but does not provide centralized management or studio query functions.

One embodiment would be an implementation acting purely as a HTTP proxy, i.e. a UI displays the list of accessible Tier-1 managers, and then proxies the Tier-1 interface to the user.

A second embodiment would be an implementation that puts application logic on the Tier-2 manager that then generates queries to the Tier-1 Managers and then renders the results. Such permits a Tier-2 Manager to perform a query that spans multiple Tier-1 Managers.

Figure 41:
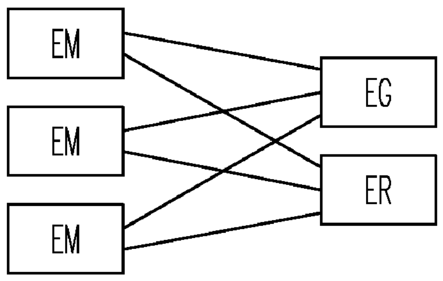
FIG. 41 is a schematic diagram illustrating a high level architecture of an Enterprise Global and an Enterprise Report gathering data from a plurality of Enterprise Managers according to the invention.

FIG. 41 is a schematic diagram illustrating a high level architecture of an Enterprise Global and an Enterprise Report gathering data from more than one Enterprise Managers according to the invention.

Protocols

The following protocol interactions are added to the system to support the extended architecture.

Tier-2 Manager and Tier-1 Manager

The following table summarizes the communication between the Manager and the Studio.

TABLE Y

| Function | Protocol | Src | Dest | Rqd | Description |
|---|---|---|---|---|---|
| Operational View | XML/ HTTPS | T2-Manager | T1-Manager | ✓ | Operational view queries for analysis of policy violations. The query will be executed on the T1-Manager. Client/Server certificates authentication. |
| Operational View | HTTPS | T2-Manager | T1-Manager | ✓ | Proxied HTTP for Operational view as available on a particular T1-Manager. Client/Server certificates authentication. |
| Systems Management | HTTPS | T2-Manager | T1-Manager | ✓ | T2-Manager Systems Management interface proxies requests to T1-Manager. Client/Server certificates authentication. |
| Policy Analyzer Queries | XML/ HTTPS | T2-Manager | T1-Manager | ✓ | Conformance data queries for analysis of policy violations. The query will be executed either on the T1-Manager or on a (or a set) of Monitors. Client/Server certificates authentication. |

Tier-2 Manager and External Servers

The following table summarizes the communication between the Tier-2 Manager and servers that are external to the deployment.

TABLE Z

| Function | Protocol | Src | Dest | Rqd | Description |
|---|---|---|---|---|---|
| Time | NTP | T2-Manager | NTP Server | ✓ | System clock synchronization with a configurable external clock. |

Tier-2 Manager and External Clients

The following table summarizes the communication between the Tier-1 Manager and clients that are external to the deployment.

TABLE AA

| Function | Protocol | Src | Dest | Rqd | Description |
|---|---|---|---|---|---|
| Operations View | HTTPS | Browser | T2-Manager | ✓ | Web based operational view. Cookie-based scheme using username/password or X.509 client side certificate. |
| Management | HTTPS | Browser | T2- | ✓ | Web based management console. |

TABLE AA-continued

| Function | Protocol | Src | Dest | Rqd | Description |
|---|---|---|---|---|---|
| Console | | | Manager | | Cookie-based scheme using username/ password or X.509 client side certificate. |

Tier-2 Manager and Studio

The following table summarizes the communication between the Tier-2 Manager and the Studio.

TABLE AB

| Function | Protocol | Src | Dest | Rqd | Description |
|---|---|---|---|---|---|
| Policy Analyzer Queries | XML/ HTTPS | Studio | T2-Manager | ✓ | Conformance data queries for analysis of policy violations. The query will be passed directly to the Tier-1 Manager where it may be evaluated or further passed on to a Monitor. Cookie-based scheme using username/password or X.509 client side certificate. |

Summary

Figure 42:
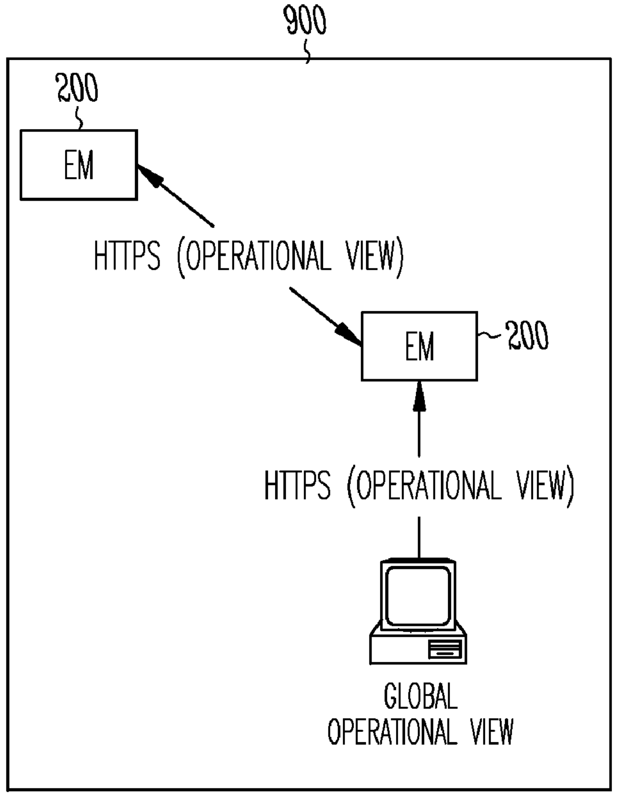
FIG. 42 shows a summary configuration of the Enterprise Global system according to the invention.

FIG. 42 shows a summary configuration of the Enterprise Global system 900 according to the invention.

User Configuration Data

The User Authentication and Authorization database within a system deployment contains user authentication data and what roles that user has within each Policy Domain.

Independent Manager User Databases

Figure 43:
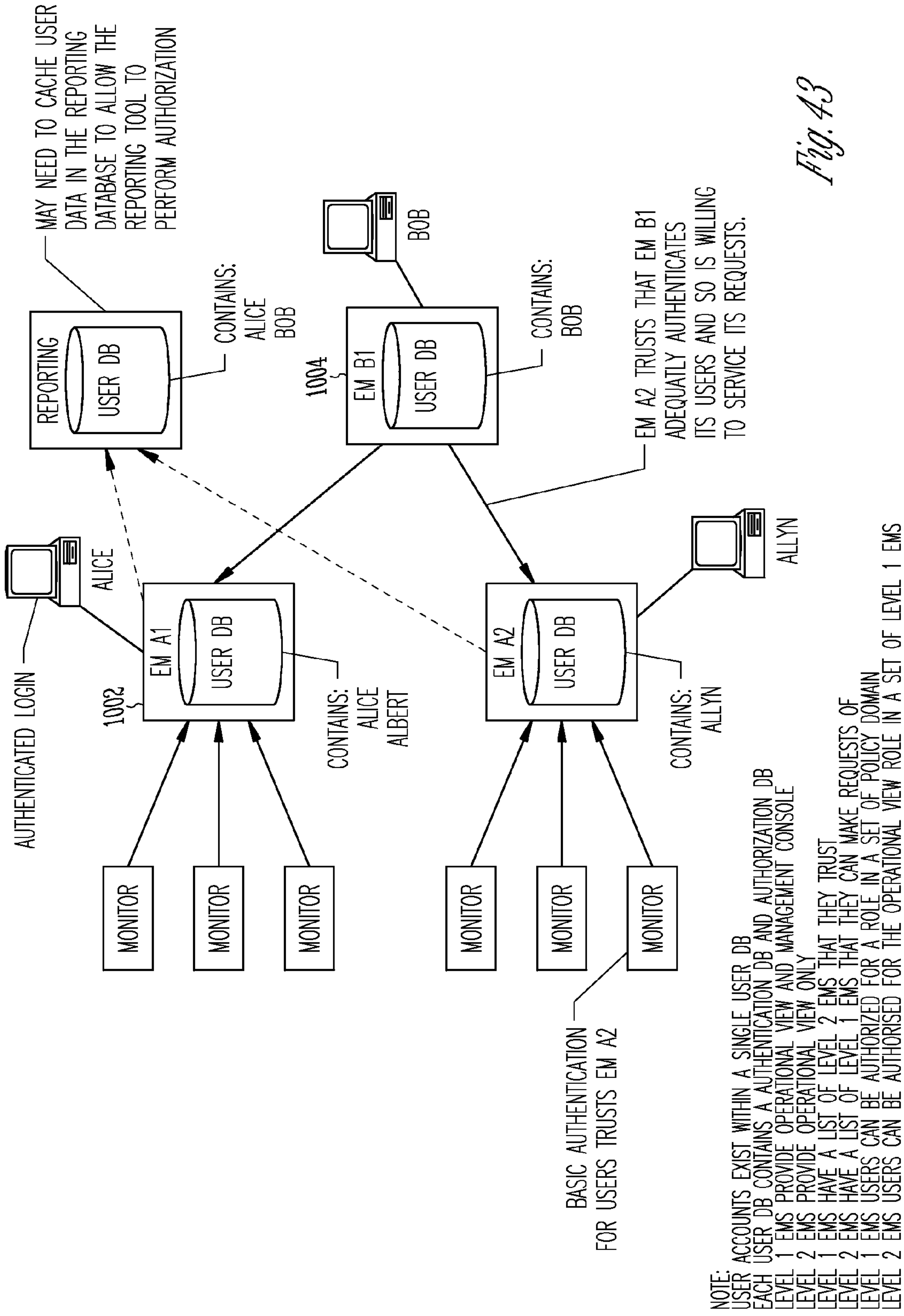
FIG. 43 is a schematic diagram illustrating a configuration of Independent Manager User Databases according to the invention.

Refer to FIG. 43. FIG. 43 is a schematic diagram illustrating a configuration of Independent Manager User Databases according to the invention, as follows. A default deployment contains an independent User Authentication and Authorization database. A login is authenticated in the context of a particular Manager. Manager to Manager and Manager to Monitor trust relationships are then used to allow a user to access data further. For example, EM A1 1002 may only trust EM B1 1004 to access only one of its two policy domains.

Shared Manager User Databases

Figure 44:
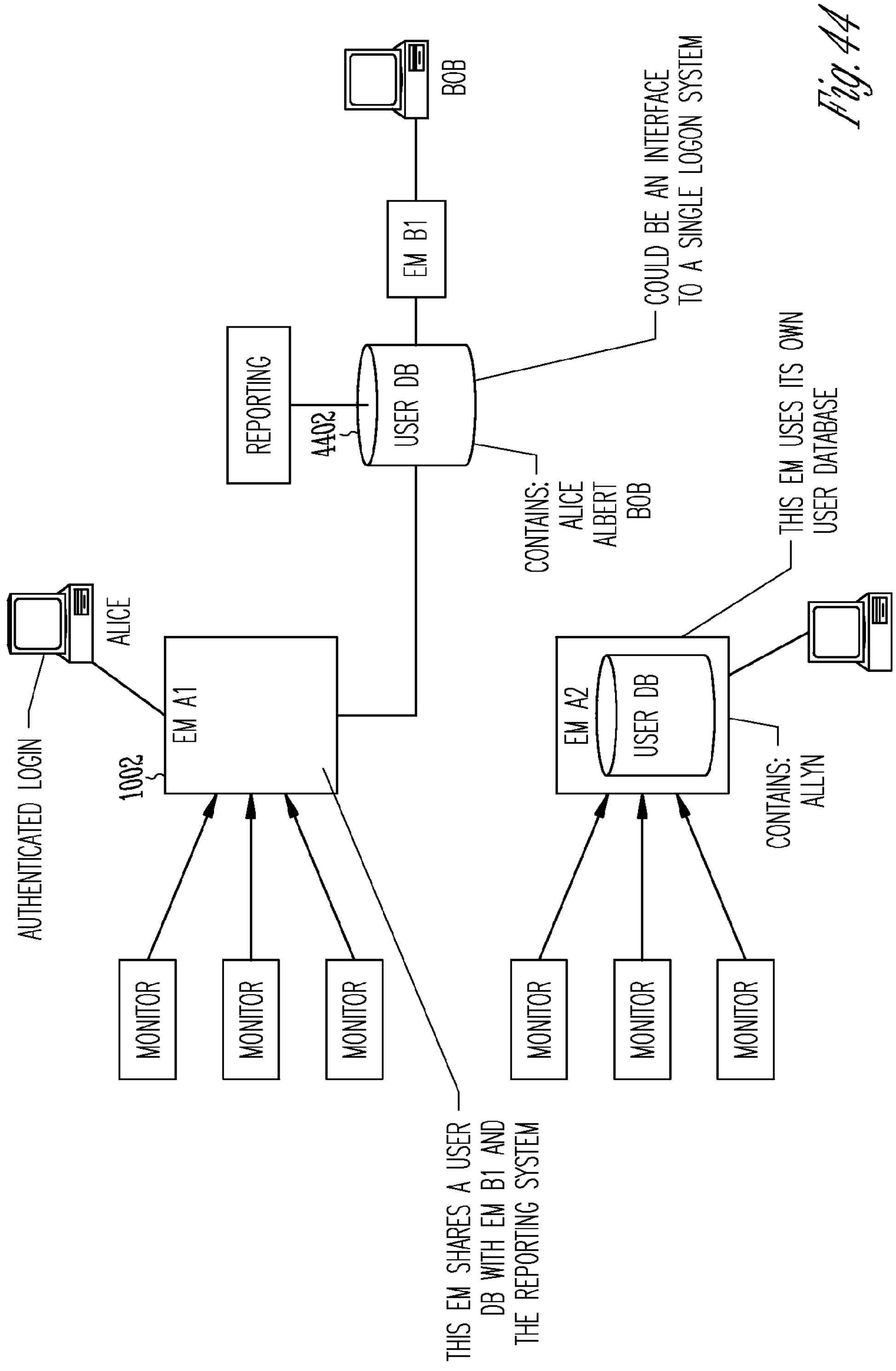
FIG. 44 is a schematic diagram illustrating a configuration of Shared Manager User Databases according to the invention.

One alternative deployment is using a shared user authentication and authorization database, or an external authentication server such as an LDAP directory or a Radius server. Refer to FIG. 44, a schematic diagram illustrating a configuration of Shared Manager User Databases 4402 according to the invention.

An Exemplary Command Manager Protocol

This section discussed one preferred embodiment of the Command Manager protocol. Such embodiment is meant by example only and does not limit the scope of the invention.

Herein is a description the functional interface and design of the provided systems management, also referred to herein as the Command Manager. In particular this mechanism is used to manage:

A Monitor;

A collection of Monitors via a Manager (EM); and

An EM.

High Level Design

Assumptions

The system management of the Monitor and Manager is accomplished via a Web based interface. All active management of the system takes place through this interface.

Status change notifications and ongoing monitoring are provided.

Component Architecture

An application, referred to herein as the Apache/tomcat, is used as the webserver platform. The management application is implemented as a collection of Java language JSP (Java Server Pages) and servlets that perform system functions.

In one embodiment, the Manager invokes operations on the Monitor by accessing URLs. The Manager has the capability to do such on multiple monitors simultaneously, e.g. for restarting the entire system.

Figure 45:
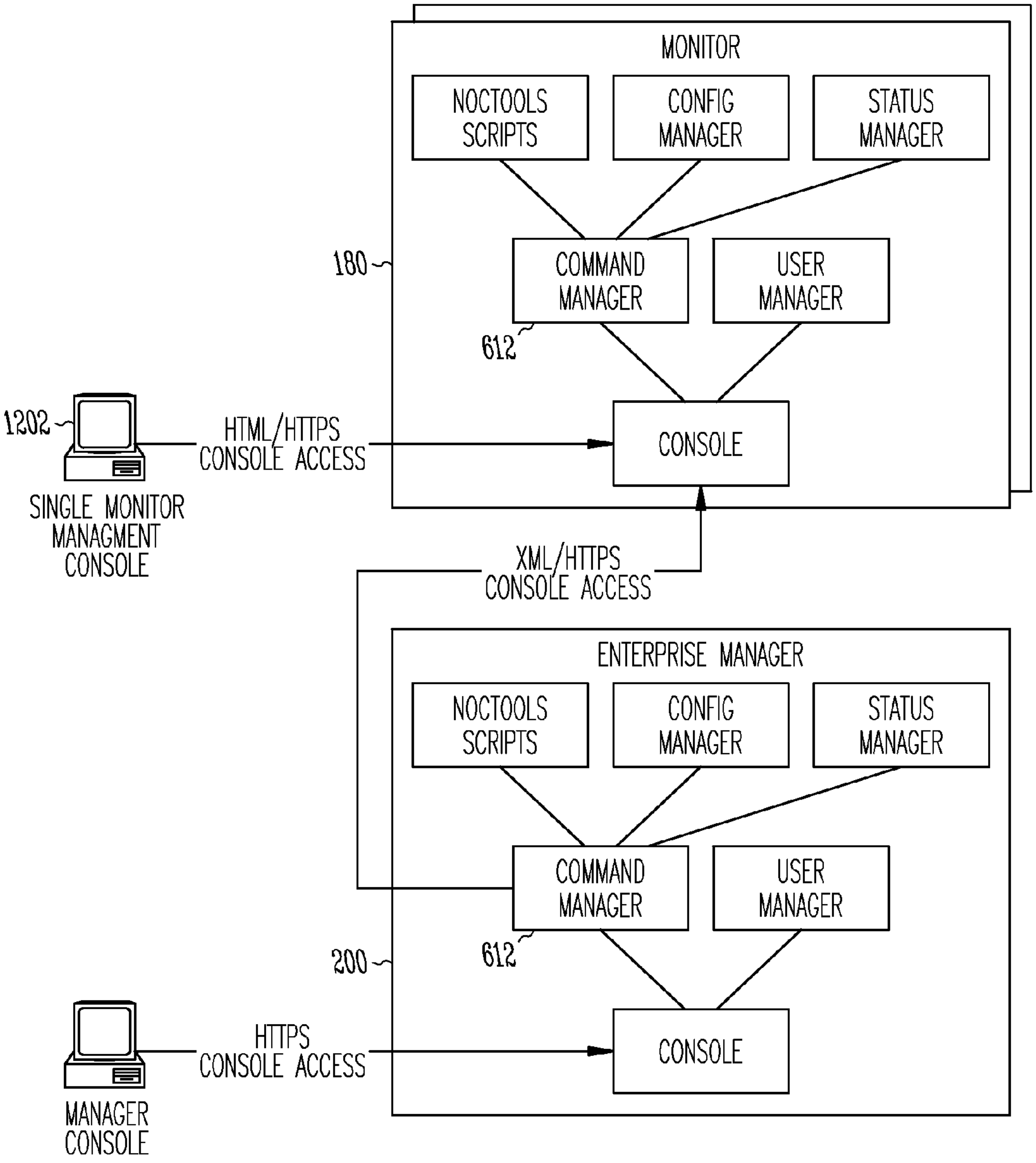
FIG. 45 is a schematic diagram illustrating the web architecture on both the Monitor and the EM according to the invention.

Refer to FIG. 45 for understanding the web architecture on both the Monitor 180 and the EM 200. The web architecture on both the Monitor and the EM consists of the same core abstract classes with their implementations varying to conform to their respective platform.

Functional Specification

Monitor Console

The Monitor console 1202 is a web browser that connects to a set of servlets that run on the Monitor 180, where they invoke console manager commands on behalf of a client. The client can request that the result be returned either as a rendered HTML page or as a XML document.

Environment

The Monitor console 1202 uses a web browser to run commands on the Monitor 180.

Interactions

Figure 46:
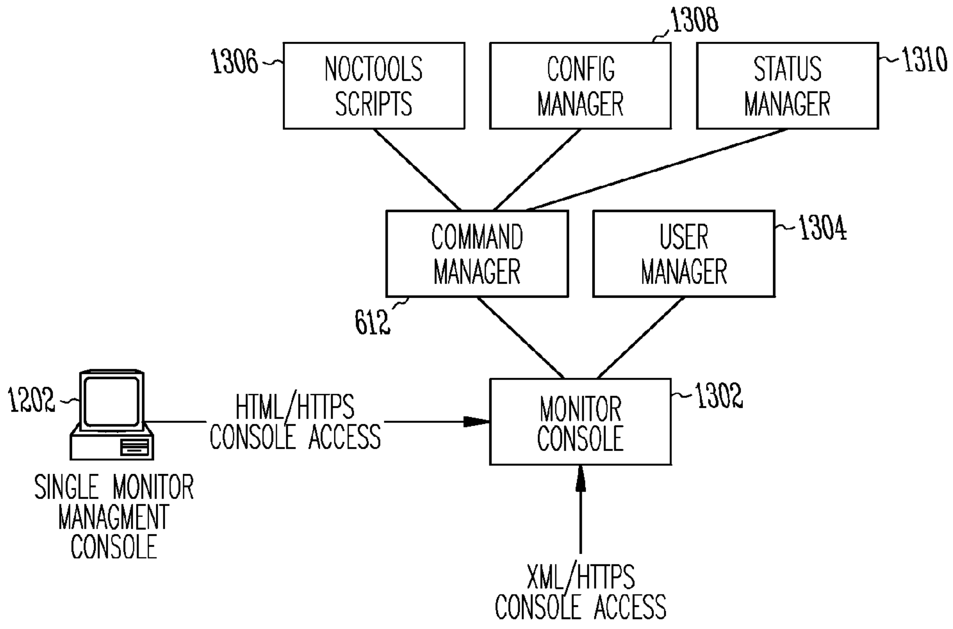
FIG. 46 is a schematic diagram illustrating Monitor console interactions according to the invention.
Figure 47:
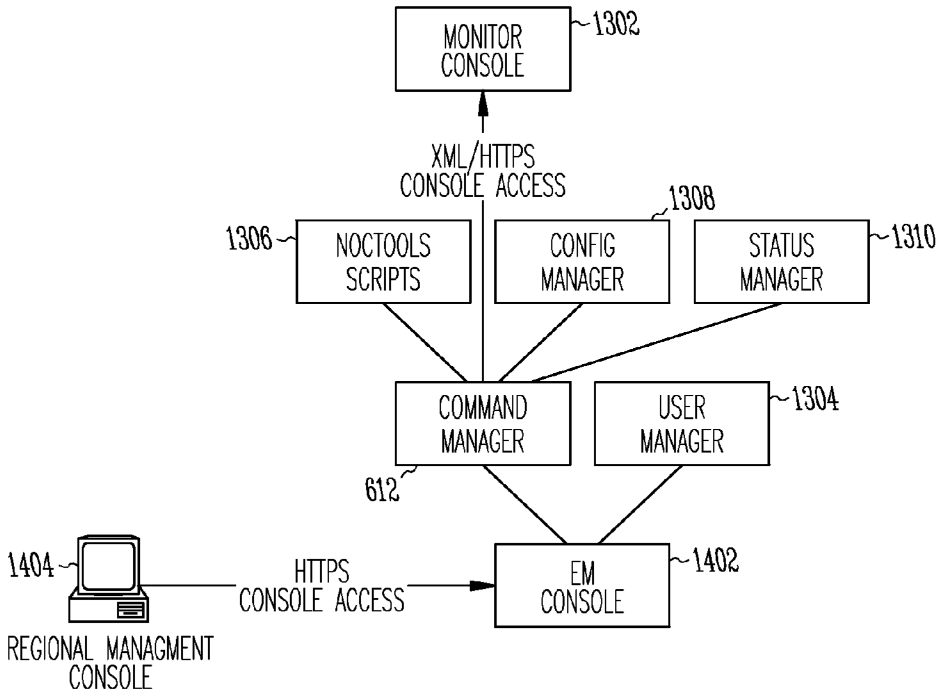
FIG. 47 is a schematic diagram illustrating the Enterprise Manager (Regional) Console interactions according to the invention.

Refer to FIG. 46 for a schematic diagram illustrating Monitor console 1302 interactions according to the invention.

Management Console to Monitor, EM Command Manager to Monitor

The monitor management interface, implemented by the Command Manager, consists of a list of commands/URLs. A preferred embodiment of this command list is in the Table AC, following. Additional or different commands may be added to extend the protocol framework. It should be appreciated that the set of commands provided by the command manager is limited by its configuration. This limitation provides for an interface that is easily audited for security issues, and is resistant to many common security attacks.

TABLE AC

| Command | Custom Arguments | Action and Result |
|---|---|---|
| Restart | | (re)start the system. Returns Success or Failure reason. |
| Stop | | Stop the system. Returns Success or Failure reason. |
| Status | | Return a list of system components and their current status or Failure reason. |
| UploadPolicy | PDX file name, restart | Install a new policy file, validating that it successfully compiles. Restart the system if the restart flag is set. Returns Success or Failure reason. |
| GetPolicyHash | | Return the hash of the current policy file or a Failure reason. |
| UploadConfig | Config file name, restart | Install a new configuration file. Validate that the file contains information for this Monitor. Restart the system if the restart flag is set. Returns Success or Failure reason. |
| GetConfigHash | | Return the hash of the current configuration file or a Failure reason. |
| EditConfig | | Edit the current configuration file |
| changeMonitorName | newName | Change the name of the monitor. Returns Success or Failure reason. |
| Install Software Update | update file, sm, harvester | Upload an update file to the Monitor and install it on the specified machines. Returns Success or Failure reason. |
| ListDMEs | | Return a list of the DME files that are currenly available on the Monitor or Fialure reason. |
| DownloadDME | DME file name | Download a particular DME file or return a Failure reason. |
| ListLogs | | Return a list of the log files that are currently available on the Monitor or Failure reason.. |
| downloadLog | Log file name | Download a particular log file or return a Failure reason. |
| AddUser | Username, password | Add a user who is permitted to connect locally to the Monitor (as opposed to via the Manager). Returns Success or Failure reason. |
| ListUsers | | Return a list of the monitor users or a Failure reason. |
| SetUserPassword | Username, password | Change the password of a monitor user. Returns Success or Failure reason. |
| DeleteIUser | Username | Delete a monitor user. Returns Success or Failure reason. |

It should further be appreciated that in addition to the custom arguments named above a "no-render" argument is also optionally supplied. If supplied then an XML result is returned to the caller rather than an HTML page.

Console Manager Result DTD

One embodiment of a Document Type Definition (DTD) is provided that describes the data returned by the Command Manager 612. It should be appreciated that this DTD is encapsulated and transported within the Command Manager DTD.

The following table shows sample DTD.

TABLE AD

```
<?xml version='1.0' encoding='UTF-8' ?>
<!-- What is the version of the file that is being used →
<!ELEMENT    version X CDATA #REQUIRED >
<!ELEMENT result (result-value+, (hash-result | file-list | status-list)? >
<!ELEMENT result-value >
  <!-- system-name is the name of the monitor or EM that generated      →
  <!-- the result. Value is "1" (success) or "0" (failure).             →
  <!-- information is freeform text with further information.           →
  <!ATTLIST result-value system-name CDATA #REQUIRED
            value CDATA #REQUIRED
            information CDATA
  >
<!ELEMENT hash-list (hash-details*) >
  <!ELEMENT hash-result >
  <!ATTLIST hash-result file-name CDATA #REQUIRED
                        file-hash CDATA #REQUIRED
  >
<!ELEMENT file-list (file-details*) >
```

TABLE AD-continued

```
<!ELEMENT file-details >
  <!ATTLIST file-details file-name CDATA #REQUIRED
                         file-size CDATA
>
<!ELEMENT status-list (status-details*) >
<!ELEMENT status-details >
  <!-- component is the name of the subsystem being reported on          →
  <!-- State is "1" (up) or "0" (down) or "-1" (unknown).                →
  <!-- Update-time is the time at which the components state was last    →
  <!-- assessed. Comment is free form additional data                    →
  <!ATTLIST status-details component CDATA #REQUIRED
                         state CDATA #REQUIRED
                         update-time CDATA #REQUIRED
                         comment CDATA
  >
```

Details of Command Manager Preferred Embodiment

The command manager 612 provides a naming mechanism for command targets, referred to as LogicalHostnames. Exemplary targets are: a Monitor, an Enterprise Manager, an Enterprise Reporting system, and Enterprise Global. The naming structure makes use of randomly allocated large numbers, referred to as UUID's. The size of the UUID's and their random selection makes it possible to choose them without a coordinated selection scheme. Each UUID also maps to a more convenient textual name, used in the user interface.

A LogicalHostname consists of three subsidiary entity names, referred to as the Domain, Tier, and MachineID. The Domain indicates the policy domain into which the Command Manager requestor is authenticated. The Tier indicates the level of hierarchy within the domain, 0 being a Monitor, 1 being an Enterprise Manager (tier 1), 2 being an Enterprise Manager (tier 2), and so on. The MachineID identifies a single machine within the Command Manager interconnectivity.

Each of Domain, Tier, and MachineID may be specified to be a wildcard, indicating that all or any such target will match this field. In this way, a LogicalHostname may refer to more than one actual command manager target.

With reference to the preferred embodiment of a command set in Table AC and FIG. 45, and the command manager 612 provides a requesting entity (e.g. a servlet program running on Enterprise Manager 200) with the ability to invoke an authorized command on one or more targets identified by a LogicalHostname (e.g. one or more Monitors 180), the latter case implying concurrent execution. The requesting entity is not required to specify network routing or addressing information to reach the target machines, and need not know how many machines matches a given LogicalHostname.

An exemplary notation for a LogicalHostname is as follows:

[DomainString.TierNumber.MachineIDString]

where DomainString and NameString are textual strings and identify the Domain and MachineID, respectively, and TierNumber is a decimal number indicating the Tier, where 0 is a Monitor, 1 is a Tier 1 Enterprise Manager, 2 is a Tier 2 Enterprise Manager, and so on. For each of these values, a '*' is used to denote a wildcard.

Some examples of this notation follow:

[policy3.0.*]

indicates all Monitors that are in the Policy Domain "policy3".

[*.1.*]

indicates all Enterprise Managers that are reachable via command manager, regardless of what policy domains or machine identification they have.

[*.0.fred]

indicates the (single) monitor named 'fred', regardless of the policy domain in which it is contained.

Authorization

Authorization begins when a requesting entity, referred to as the requester, gives the command manager a command to invoke, a LogicalHostname, specifying one or more machines on which to invoke the command, and a set of roles to authorize the command. An exemplary command set appears in Table AC. Such set of roles may indicate that any role is acceptable.

The command manager has access to User Configuration Data as specified below. The requester authenticates to the command manager, which looks up the acceptable roles for the user in the User Configuration Data. In two equally preferred embodiments, such authentication is based on either user name and password or SSL client certificate authentication. With respect to the exemplary command set in Table AC, a set of roles is associated with each command. The command manager matches the authenticated requestor's command to the roles associated with the command, and requires the requester to have such role before such command is performed.

If such command is authorized in said manner, the command manager configuration builds, on behalf of the requestor, a chain of trusted connections through one or more connected machines, which may serve as requestors or targets. A preferred embodiment example of said trusted connections is an SSL protocol connection with Client and Server certificate authentication.

The requested command, set of roles, and LogicalHostname is then transmitted to one or more connected machines using such trusted connections, along with the LogicalHostname. The command manager sends said items to only those machines that might need to perform it, based on the said LogicalHostname.

When a machine on the chain receives such command, such set of roles and such LogicalHostname, it intersects the set of roles with a configured list of roles it is willing to adopt on behalf of the previous machine in the chain. For example, a monitor may be willing to perform only a subset of available commands for its Enterprise Manager. The LogicalHostname is translated into a set of LogicalHostNames, with the Domain wildcards expanded to each domain which might be able to execute the command, based on the intersected set of roles. The command, intersected set of roles, and set of LogicalHostnames is then transmitted to further machines, if required.

In addition to the such transmission to further machines, if said machine on the chain matches an element of the set of LogicalHostnames, then the set of roles is further intersected with a configured list of roles that said is willing to adopt for that command. If the result of this intersection is not an empty set, then the command is executed.

An Exemplary Enterprise Monitor Operations View

This section discusses an exemplary embodiment of both the user interface and functional interface design of the Operations (Ops) view for the Enterprise Manager and Monitor systems. The Operations View provides access to the data being generated by the SM and is then viewed via a website. The data generated by the SM is currently stored into a database. The Operations View is responsible for querying the database using a separate API that has been optimized and been written specifically for this purpose. The difference between the Manager's and the Monitor's Ops View is that the Manager can show one or more Policy Domains whereas the Monitor only shows one Policy Domain.

It should be appreciated that such exemplary implementation is by example only. It should be apparent to one skilled in the art that various other implementations and configurations are possible and are each within scope of the invention.

Figure 48:
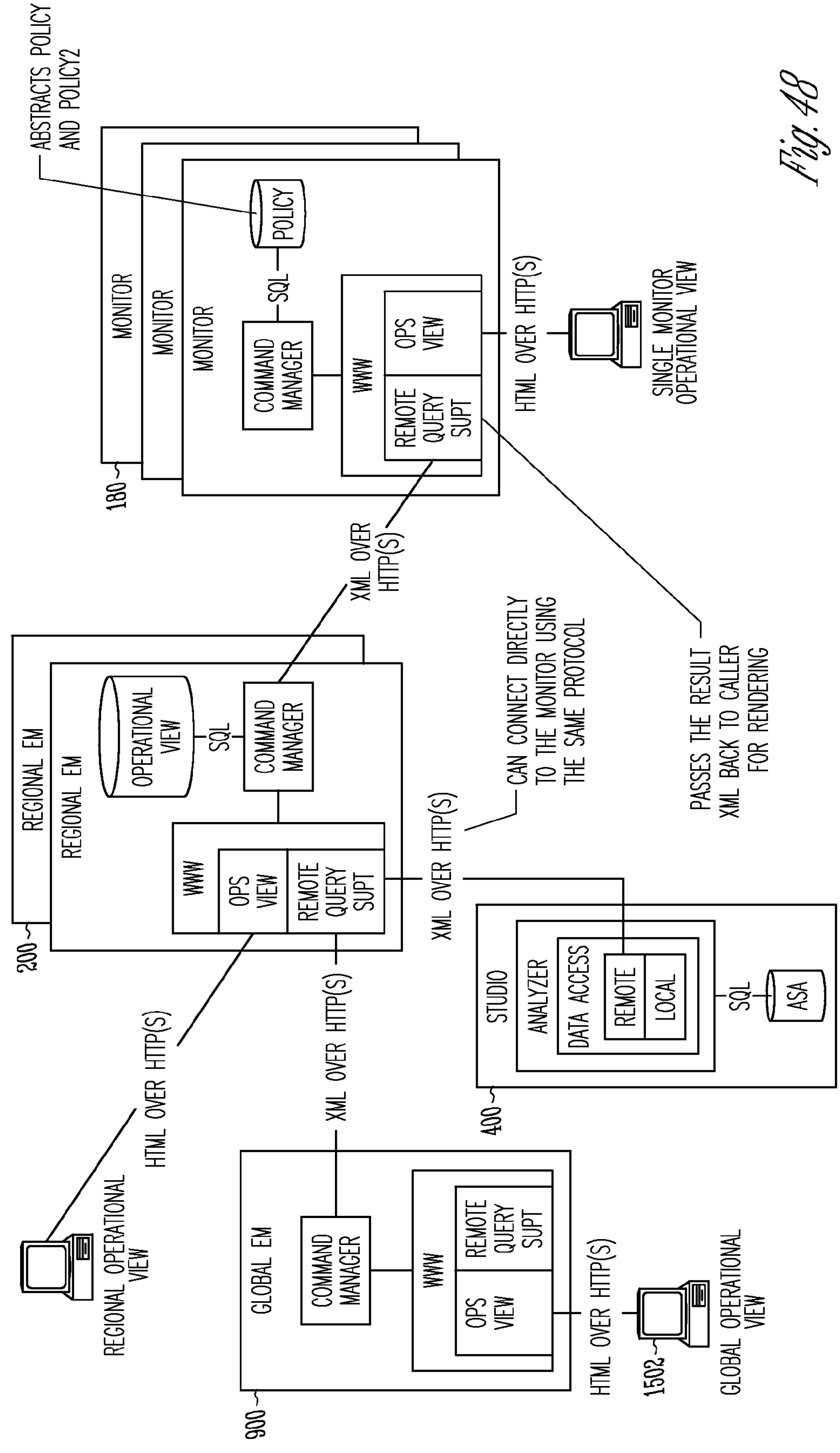
FIG. 48 is a schematic diagram illustrating an overall architecture of the Enterprise Global, Single Monitor, and Enterprise Manager Operational Views according to the invention.

FIG. 48 provides a view of the overall architecture of the Global, Single Monitor, and Regional Operational Views. It should be appreciated, however, that FIG. 48 does not show the Enterprise Reporting.

User Interface

Several components share the same look and feel, including the Manager and Monitor Operation Views, and the Monitor Console. Access to the same such components is through a common infrastructure. All components are accessed from a web browser, using HTTPS to access a Java language servlet that implements monitor operation view functions.

Home

Home Page (monitor page, dashboard, etc.)

Figure 49:
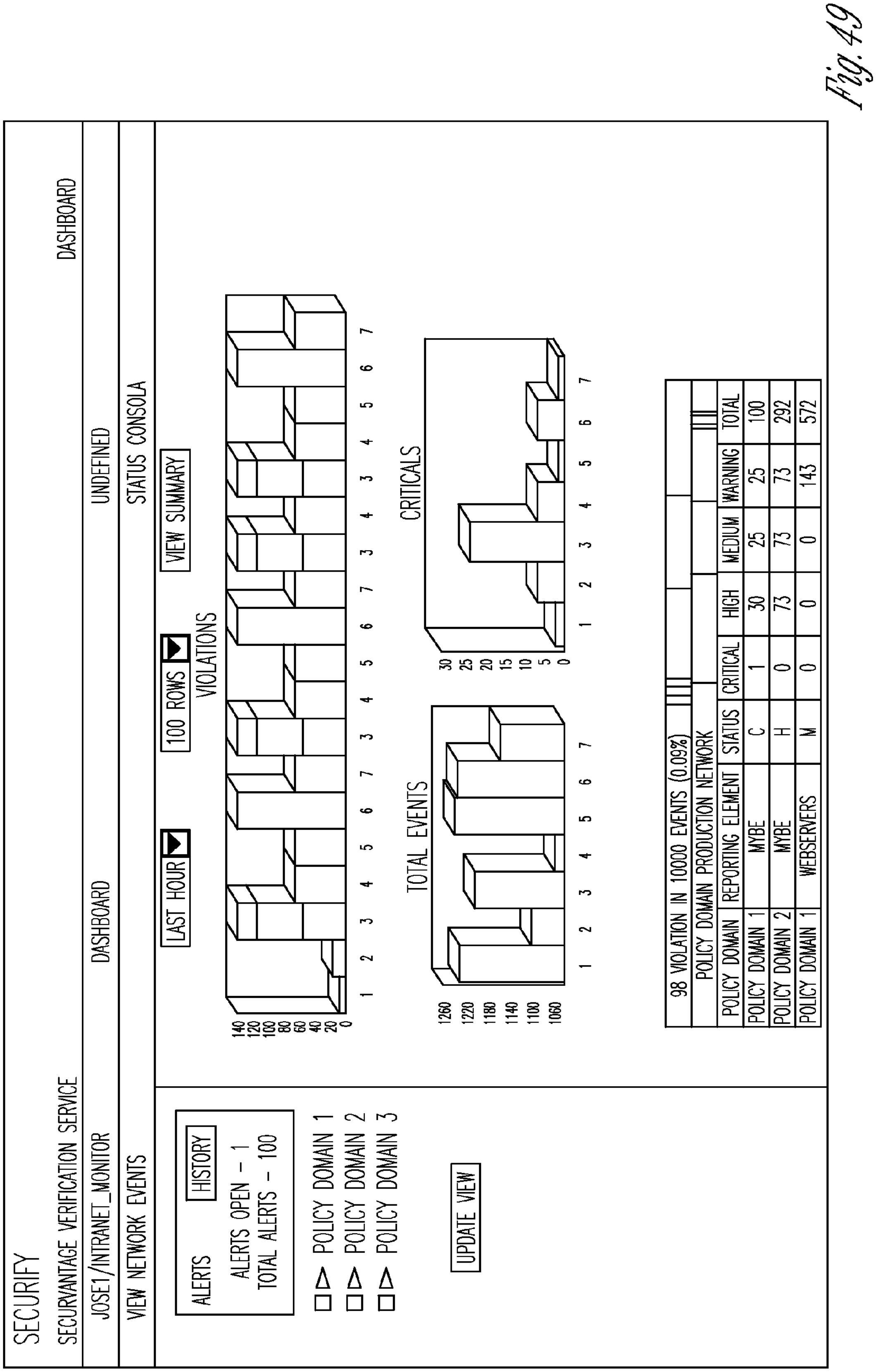
FIG. 49 is a screen shot of a monitor home page according to the invention.

FIG. 49 is a screen shot of an example monitor home page. The page contains a summary of the data that an operator may want to see. This data allows the user to determine whether there is a problem to attend to. This page meta-refreshes every predetermined number of minutes. The data shown is restricted according to the user's identity, so that the user can only view data he is allowed to see. The left hand side navigation allows the user to select the items that are needed to update the current page. The user is also able to view a single policy domain view by clicking on the graphs or the buttons just below them.

Referring to FIG. 49, such data shown is over a previous 24 hour period. From this page the user is able to drill down to the summary page by clicking on one of the reporting element links or graphs.

This page also shows an alert box. In this summary, the user is able to see the new alerts coming in and he or she is then able to go to the details of each of these from there. The alert box works similarly to the way email works. Whenever there are new alerts, the New Alerts text becomes bold and it shows how many new alerts there are. These will remain bold until a user goes to the details view by clicking on them, reviewing them, and checking them as "read".

The user then gets to this page after logging in. The login servlet checks whether the username/password are valid and then it checks the roles for that particular user. The role dictates what policy domains the user is allowed to see. The policy domains that the user is allowed to see show on the left side of the page, and the graphs containing the last twenty four hour data show on the right hand side of the page together with the first fifteen lines of the first level summary table. The data shown the first time is of the first policy domain on the list. The user is able to click on an item in the summary table to go to the second level summary table or select a date range, the number of rows desired to view and clicks on the view summary button to go to the first level summary table.

The user may filter the data by Policy Domains. All a user has to do is select the Policy Domain desired from the left hand side of the page, and click on the update view button. This causes the page to reload and shows the data for the Policy Domain(s) selected. The last selection the user makes is remembered across logins, depending if the user has cookies enabled in the browser.

First Level Summary

The first page in the event summary provides a table with a Policy Domain's Reporting Element and the count for each of its severities. This table is sorted on the status column with most critical being on top; the status column indicates the most severe violation for that Reporting Element during the selected time period. Clicking on a row of the table displays second level summary for that Reporting Element.

There are two ways to get to this page. One is from the home page, by clicking on the view summary button, and the other is by clicking on the home page graphs. Required information is date range, number of rows to show, and user information.

The following table shows an example of the data rollup at the first level.

TABLE AE 98 violation in 10000 events (0.09%)
Policy Domain Production Network

| Policy Domain | Reporting Element | Status | Critical | High | Medium | Warning | Total |
|---|---|---|---|---|---|---|---|
| Pd1 | MyBE | c | 1 | 30 | 25 | 25 | 100 |
| Pd2 | MyBE | h | 0 | 73 | 73 | 73 | 292 |
| Pd1 | WebServers | m | 0 | 0 | 143 | 143 | 572 |

Second Level Summary

The second level summary expands the information for the Reporting Element selected in the previous page. Each line has at least one reporting element. The reporting element appears in bold text, for emphasis. Clicking on a row of the table displays Event Summary 3 for that Reporting Element. This table is sorted by criticality.

The only way to get to this page is by clicking on one of the rows on the first level summary table. This can be done from the first level summary page or from the summary table on the home page. Required information is date range, number of rows to display, and Reporting Element.

The following table shows data rollup at the second level.

TABLE AF

| Src | Dest | Service | Outcome | Outcome Component | Monitor/CP | Owner | Criticality | Count |
|---|---|---|---|---|---|---|---|---|
| MyBE | Internet | Https | Default | Session Qos | SM1/DMZ | Fred | HIGH | 12 |
| MyBE | Webserver | Https | Default | Session Qos | SM2/DMZ | Fred | HIGH | 13 |
| LDAP | MyBE | SSH | UnexpectedHost | Connection Accepted Data Transfer | SM1/DMZ | George | Medium | 73 |

It should be appreciated that Source (Src), Destination (Dest), Service, Outcome, Outcome Component, Owner and Criticality columns show how the traffic violations fit into the way that the Policy models the network.

Third Level Summary

The third level summary shows event detail summary for the row clicked on the second level summary. The Execution-Run keys in which this data can be found is available either in the table or as a tooltip.

DNS names are available for the IP-Addresses, either as tooltips or vise versa.

The only way to get to this page is by clicking on a row on the second level summary table on the second level summary page. Required information are date range, number of rows to display, outcome and outcome component, plus either source or destination reporting element The following table shows third level summary data.

TABLE AG

| IpLevelRollup for MyBE FROM Noc Session_Qos (HIGH) on SM1 / DMZ for <time period> | | | | | | |
|---|---|---|---|---|---|---|
| Src Object | Dest Object | Svc | Src IP | Dest IP | Port | Count |
| BEServers | NocMgmtServers | HTTPS | 10.2.3.5 | 192.168.200.10 | 443 | 5 |
| BEServers | NocMgr | HTTPS | 10.10.7.15 | 192.168.200.12 | 443 | 7 |

Parameters

Most of the summary and detail queries preferably give the user the option of setting the following parameters:

Time Periods: 1 hour, each our for the last 24 hours, and last 24 hours;

Policy Domain (choose 1 or more); and

Collection Point(s) (within the selected Policy Domain).

Other Embodiments

It should be appreciated that in the first level summary, add another view that is by Outcome and another one by Criticality. And, in the third level summary, allow clicking through the rows to perform a remote query (of some definition) on the SM.

Rate Limiting Overview

Rate limiting is the process of selectively dropping data at various stages of a pipelined system, so as to prevent back pressuring. Rate limiting is applied at each stage so that data is dropped in a heuristic manner that is appropriate to this stage of the pipeline. The heuristic is chosen so that the data discarded causes the least impact on the monitoring result. For example: packets may be dropped based on connection boundaries, rather than randomly; event details may be dropped, but counts of the events maintained; event information may be abstracted by counting and combining like events over a time interval.

Figure 50:
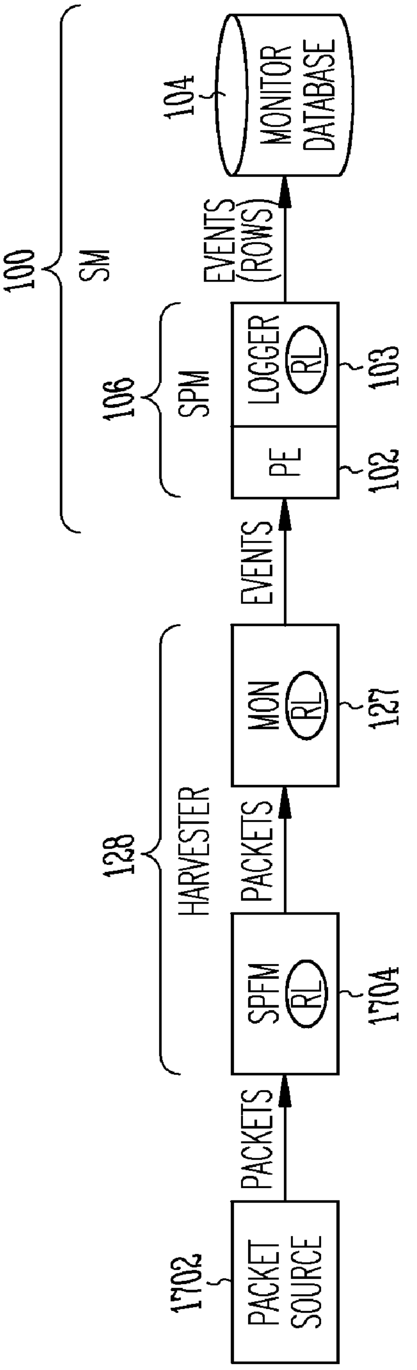
FIG. 50 is a schematic diagram showing incorporated rate limiting features into a network security system's components according to the invention.

One preferred embodiment of rate limiting according to the invention is discussed with reference to FIG. 50, a schematic diagram of incorporated rate limiting features into a network security system's components according to the invention. Packets from a packet source 1702 are gathered by the Harvester 128. Such packets first enter through the SPFM 1704 component. Because SPFM cannot back pressure in the case of too many packets, a rate limiting mechanism has been incorporated into the SPFM module. The non-discarded packets are then passed on to the Monitor 127 component. Similarly, the Monitor has a rate limiting feature incorporated in order to effectively control the incoming packets. The monitor processes the packets and forwards events to the SPM module, first to the Policy Engine 102. In one embodiment of the invention, the Monitor 127 incorporates a rate limiting technique for input data, referred to as RL0. In another equally preferred embodiment of the invention, the RL0 algorithm is incorporated in the rate limiting module of the SPFM 1704 component. Similarly, the Monitor incorporates a rate limiting technique referred to as RL1 for rate limiting events that it wishes to send to the SPM 106. An enhanced version of this algorithm, referred to as RLE, is also present in the Monitor 127. Similarly, the Logger module 103 also has a rate limiting mechanism. Finally, non-discarded events are forwarded on to the monitor database 104, consistent with the normal operation of the logger module 103, as described above. Although, the logger module might not forward events to the database, if they are not violations, as is described herein above.

Each of these rate limiting features is discussed in detail herein below.

It should be appreciated that each rate limiting design and implementation is based on the type of process (such as the SPFM, the Monitor, and the Logger, for example) and each process' idea of connection. Each process discards unwanted packets and events in its own way.

It should further be appreciated that the rollup feature discussed herein above can be viewed as another means for rate limiting as data goes into the Enterprise Reporting system. In one embodiment of the Enterprise Reporting System, received event data is processed over a time interval so that like events are counted and combined as a rollup, such rollup data maintained in lieu of the complete event data. In addition, as such rollup data ages, it may be further rolled up over successively longer time intervals, to achieve more efficient storage for older data. Further, the rolled up event data may be combined based on the network object containment hierarchy including a combination of the following:

1. Host objects may be rolled up to a containing host object.
2. Host objects may be rolled up to a reporting element.
3. Host objects may be rolled up to a containing subnet element
4. Subnet elements may be rolled up to a containing object, such as Intranet, Extranet, Internet or All Networks.

In another embodiment of the Enterprise Reporting System, such longer time interval are dynamically adjusted over time to allow data to fit into available storage space as follows, based on rollup data:

Algorithm for Dynamic Space Adjusting Based on Rollups

Parameters

MT=Target available space

MC=current available space

MaxRollup=maximum interval over which events are currently rolled up.

Algorithm

1. If MC<=MT then the algorithm terminates.
2. MaxRollup=N*MaxRollup (where N may be 2 or a greater integer)
3. Combine N adjacent rollups in data into rollups with the new MaxRollup interval.
4. Optionally: Combine rollups based on object hierarchy, using one or more of the following:
   Combine host groups with containing host groups;
   Combine host groups with containing subnets;
   Combine host groups based on reporting element
   Said combination performed by incrementing the count of the containing group and removing the contained group, so that the total count of events remains the same.
5. Continue with step 1

A Functional Description of Rate Limiting for the Logger

This section provides an in depth discussion and functional description of one preferred embodiment of rate limiting. It should be appreciated that the discussion below is meant by example only and that variations of specific configurations and descriptions are readily apparent to one skilled in the art as being within scope of the invention.

Benefits of the Mechanism

Following is a list of benefits from the rate limiting mechanism of one preferred embodiment of the invention:

The number of events entered into the Monitor (mon) database 104 is limited, even if the number of events on the wire is not. A sudden bulge of events on the wire or a sudden change of network traffic (for example, if the policy is mistuned) should not cause unlimited data to be written into the database.

This above benefit applies both when policy is initially developed for the monitor and later, if the network traffic should unexpectedly change.

The logger 103 is able to distinguish between a momentary increase in data, representing a sporadic increase in input traffic, compared with a longer term increase in data, caused by a mistuned policy (either because the policy is bad or the traffic has changed long term).

The logger 103 maintains several levels of "degraded service" so that service degrades slowly, rather than abruptly.

When it needs to degrade service, the logger 103 drops data based on a heuristic classification of the input traffic by rule, disposition and logging severity.

Logger Rate Limiting Functional Description

Configuration

The logger rate limiting is configured via the following example .ini file configuration variables, i.e. parameters:

Enables rate based filtering, if set to 0 no rate limiting takes place

FILTER_ENABLE=1

For each execution run, once this percentage of violations occur then start filtering the highest volume rule/disposition combinations. Expressed in tenth of a percent.

FILTER_START_HIGH_VOLUME_VIOL=15

For each execution run, once this percentage of violations is reached start filtering off all but CRITICAL violations. Expressed in tenth of a percent.

FILTER_START_LOW_PRIORITY=25

For each execution run, once this percentage of violations is reached logging of further violations is disabled. Expressed in tenth of a percent.

FILTER_START_ALL=30

How many execution runs should be logged in a non-limited way even though the filtering threshold has been met

FILTER_ER_LAG=10

It should be appreciated that the term "execution run," above, refers to an interval defined by a number of packets, a period of time, or a number of network events, or some combination of the three.

Description

Such logger algorithm performs a filter on data arriving into the logger module 103 of the SPM 106 process. The algorithm escalates the aggressiveness of the filtering based on the number of violations the Policy Engine 102 (PE) prefers to log and the configuration of the filter as defined in the .ini file. This filtering takes place on a per ExecutionRun (ER) basis, with the filtering lagging by N execution runs, i.e. the N execution runs after a change in traffic pattern will contain unfiltered data.

The function will be described by example.

Consider the following configuration as defined in the .ini file, svs.ini.

| | |
|---|---|
| FILTER_ENABLE = 1 | |
| FILTER_START_HIGH_VOLUME = 20 | # 20 tenths of a percent (i.e. 2%) |
| FILTER_START_LOW_PRIORITY = 30 | # 30 tenths of a percent (i.e. 3%) |
| FILTER_START_ALL = 40 | # 40 tenths of a percent (i.e. 4%) |
| FILTER_ER_LAG = 10 | |
| EVENTS_PER_ER = 10000 | |

Note this means a total of 10000 events, both conformant and non- conformant

The above implies that the following filtering takes place:

All violations are logged until 200 violations have occurred (i.e 2% of 10000 events)

All but the highest volume rule/disposition pairs are logged when the number of violations is between 200 and 300 (i.e. between 2% and 3% of 10000 events)

Only CRITICAL violations are logged between 300 and 400 violations (i.e. between 3% and 4% of 10000 events)

No further violations are logged once 400 violations have occurred (i.e. greater than 4% of 10000 events)

Imagine the following:

A monitoring system (SVS system) is started with a reasonably tuned policy wherein about 0.5% violations (50 violations per ER) are observed; all violations are logged.

A user logs onto the internet via a modem on a PC while also connected to the LAN, the routers notice a new route to the internet and start routing traffic through the PC.

The SVS system notices the invalid traffic and assigns the disposition IP_Rogue_Router (rule IP_Deny) to the traffic.

SVS continues logging the current ER without filtering despite the fact that now 20% of the traffic being assigned IP_Rogue_Router is observed.

The logger closes the ER with the following statistics:

| | | | |
|---|---|---|---|
| Ip_Deny | Ip_Rogue_Router | M | 2000 |
| Weird_SMB | Strange | H | 5 |
| FTP_Authentication | Weak_Password | M | 2 |
| SSL_Bad_Cipher | 40_Bit | M | 1 |

For a total of 2008 violation of EVENTS_PER_ER NEs seen (20.08%). Note that all of these violations have been logged.

After this rate has continued for another 9 execution runs (i.e. FILTER_ER_LAG execution runs are observed where the violation rate is higher than FILTER_START_HIGH_VOLUME) and rate limiting is now enabled.

The traffic pattern continues and all violations are logged until 200 violations are logged (EVENTS_PER_ER * FILTER_START_HIGH_VOLUME/100). At this point the statistics are as follows:

| | | | |
|---|---|---|---|
| Ip_Deny | Ip_Rogue_Router | M | 198 |
| Weird_SMB | Strange | H | 1 |
| FTP_Authentication | Weak_Password | M | 1 |
| SSL_Bad_Cipher | 40_Bit | M | 0 |

The logger then starts to filter the rule/disposition pair with the highest rates, by calculating the maximum of a slowly trailing average of the normal number of violations for this pair or X % of violations. Note that this average is not updated when rate limiting is in effect.

Once filtering is enabled and the FILTER_HIGH_START value is reached, the following applies per rule/disposition:

the minimum per rule/disposition pair is the greater of 0.1% of the traffic or 5 events. A minimum exists so that rarely occurring events (a low average per ER) is not starved when limiting occurs; and the maximum is the smaller of the average of this rule/disposition over the last 20 execution runs or the FILTER_START_HIGH_VOLUME * EVENTS_PER_ER.

In such case, the rule/disposition pair max is calculated as, for example, 175 violations (with the minimum set at 5). This implies that no more Ip_Deny/Ip_Rogue_Router events are logged, although the statistics table are updated accurately.

As more IP_Deny/IP_Rogue_Router violations arrive they are ignored, while other violations continue to be logged. Once EVENTS_PER_ER NEs have been seen, the ER is once again closed, resulting in:

| | | | |
|---|---|---|---|
| Ip_Deny | Ip_Rogue_Router | M | 1550 |
| Weird_SMB | Strange | H | 2 |
| FTP_Authentication | Weak_Password | M | 1 |
| SSL_Bad_Cipher | 40_Bit | M | 2 |

It should be appreciated that only 198 of the 1550 Ip_Deny/IP_Rouge_Router events are logged, while all other violating NEs are logged. It should be further appreciated that the correct count, being 1550, of Ip_Deny/IP_Rouge_Router events is logged with the summary rollup data for this period of time.

Because the total number of violations is still greater than FILTER _START_HIGH_VOLUME, the logger leaves rate limiting enabled for the next ER.

With the next ER, a high IP_Deny/IP_Rogue_Router violation rate continues to be observed. When the 200 violations point is hit, the following results:

| | | | |
|---|---|---|---|
| Ip_Deny | Ip_Rogue_Router | M | 198 |
| Weird_SMB | Strange | H | 1 |
| FTP_Authentication | Weak_Password | M | 0 |
| SSL_Bad_Cipher | 40_Bit | M | 1 |

Once again, the number of each pair is capped.

Now, however, an increase in the number of Weird_SMB/Strange violations is also observed, and the (FILTER_START_LOW_PRIORITY*EVENTS_PER_ER/100)=300 limit is hit.

| | | | |
|---|---|---|---|
| Ip_Deny | Ip_Rogue_Router | M | 1009 |
| Weird_SMB | Strange | H | 99 |
| FTP_Authentication | Weak_Password | M | 1 |
| SSL_Bad_Cipher | 40_Bit | M | 2 |

Now, the process starts logging only critical violations, and collecting the count statistics for all other violations.

Similarly, should the (FILTER_START_ALL*EVENTS_PER_ER/100)=400 limit be reached (i.e. 100 more CRITICALS are generated in this ER), all logging is stopped and only count statistics are collected until such execution run ends.

Once the rogue router is disconnected, then the next execution run falls below the FILTER FILTER_START_HIGH_VOLUME and rate limiting is again disabled internally for the next ER.

Tracking of Dropped Events

The ExecutionRun object of the monitor Database preferably has counters added to indicate the following:

the number of NetworkEvents that are logged;

the number of NetworkEvents that are dropped; and the total number of Network Events that occurred.

during the collection of the current ExecutionRun.

This information is then sent to the EM within a batch file that is generated periodically, such as every 5 minutes.

An Exemplary Monitor Rate Limiting Mechanism

One preferred embodiment of the invention provides a monitor program (i.e. a harvester and a monitor) including two rate limiting options. This section describes the changes to an existing monitor program and how to use such changes according to one preferred embodiment of the invention. It should be appreciated that variations on rate limiting and monitoring rate limiting are apparent to one skilled in the art to be within scope of the present invention.

Following is a table showing the two rate limiting options added:

| Option | Flag to invoke | Description |
|---|---|---|
| RL0 | -rlp | Rate limit packets - discard packets on input when input packet rate exceeds a specified limit. |
| RL1 | -rle | Rate limit events - choose not to send events to the SM when the rate at which new events arrive exceeds a specified limit. |

The specific chosen numbers correspond to where in the pipeline the option appears. The RL0 code comes into play just after packets are received. The RL1 code comes into play after the monitor has processed packets. The RL0 option is useful in the following situations:

Where the traffic incoming into the monitor 127 has so many new connections that the monitor 127 process grows without bound.

Where the output from the monitor 127 is too great for the SPM 106 to keep up. However, applying RL1 is preferred in this case.

The RL1 option is useful in the following situation:

Where the output from the monitor 127 is too great for the SPM 106 to keep up.

It is apparent that the RL0 option protects the monitor 127 itself, and the RL1 option protects the SPM 106 downstream from the monitor 127. Clearly, RL0 also has effects downstream and can be used to protect the SPM 106, but the RL1 option is the preferred option.

RL0 Algorithm

The RL0 algorithm causes the monitor 127 to discard packets when the number of packets received per unit time is too great. The input is the number of packets per second that may be processed by the monitor 127, as:

harvester -i spfm2-rip 10000-enc localhost:6669

Such command runs the harvester on a local network device, SPFM2, generating a stream of events in a TCP connection to localhost port 6669, and restricting the average processing rate to 10,000 packets/second.

The algorithm works by defining a measurement interval. An exemplary interval is 71 seconds. The argument value is normalized to the number of packets that may be received in a single measurement interval. When that number of packets is received, no more packets are received until the interval is over.

For example:

harvester . . . -i spfm1 -rip 5000 . . .

Maximum packets/interval is 5,000*71=355,000 packets/interval

If, for example, data is received on spfm1 at 10,000 packets/second. Then 355,000 packets are received and processed by the monitor in the first 35.5 seconds of the interval.

For the last 35.5 seconds of the interval, packets are received by the monitor, but discarded (not processed).

The monitor runs effectively in a 50% duty cycle, sampling the wire.

This technique is somewhat coarse. When rate limiting is needed, it causes the monitor to sample the wire, going "deaf" for a certain portion of each 71 second interval. This is a heuristic to ensure that the monitor 127 generates the best possible event data for the SPM 106 while it is "on" and then generates nothing while it is "off".

RL1 Algorithm

The RL1 algorithm causes the monitor 127 to choose not to pass data to the SPM 106 about one or more connections (a "network event") when the rate of new connections exceeds a fixed number of connections per second. The argument is the number of events/second*100 (or the number of events in 100 seconds).

The argument is normalized to the measurement interval (exemplary value=10 seconds) to yield 'S':

Iv=interval length, in seconds avgN=number of intervals to time average

S=maximum events per Iv (input specification)

M=measured events per last Iv

Ma=time averaged value of M

NB=a number of bytes to write at once

The RL1 algorithm works by measuring the number, M, of new connections over the interval Iv (exemplary value=10 seconds). The succeeding interval of Iv seconds is then rate limited based on this measured value M and the specified limit S. Thus the algorithm is always at least one measurement interval behind the input.

To smooth out the performance of the algorithm, the number of connections measured in one interval (M) is time averaged over the last avgN (currently 8, in one embodiment) intervals using the algorithm:

$$Ma=(Ma*(\text{avg}N-1)+M)/\text{avg}N$$

This is intended to allow a small spike through the rate limiting code, while a steady trend is limited.

From Ma and S, the number of connections that should have been dropped by rate limiting over the last interval is derived, as well as the fraction of connections that should have been dropped:

$$D=Ma-S, \text{ (when } Ma>S, \text{ 0 otherwise)}$$

$$\text{frac}=D/Ma$$

Figure 51:
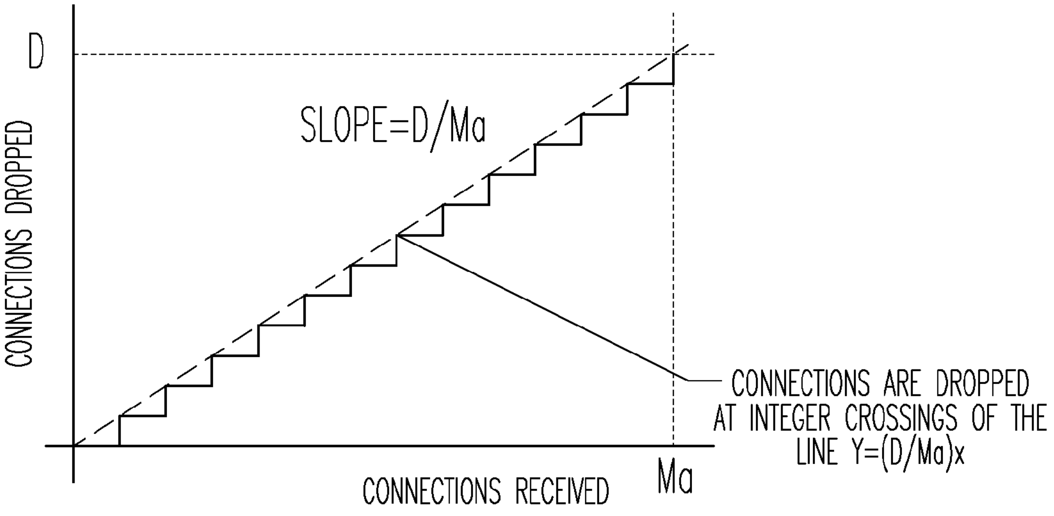
FIG. 51 is a graph of connections received versus connections dropped according to the invention.

To apply this number to the next interval, frac is added to a sum every time there is a new connection. When frac crosses an integer boundary, the connection is dropped. Such is analogous to drawing a line from (0,0) to (D, Ma) as shown in FIG. 51. Each packet advances the line to the right, and every integer crossing represents one part of "D".

Figure 52:
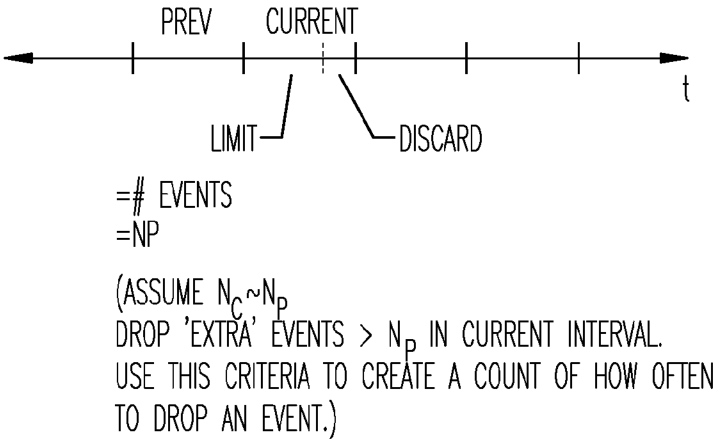
FIG. 52 is a time line presentation of a previous interval and a current interval used for rate limiting according to the invention.

Refer to FIG. 52 for a time line interpretation of the RL1 rate limiting. Assume the number of events for the current interval, $N_c$, is approximately equal to the number of events in the previous interval, $N_p$. Then drop 'extra' events>$N_p$ in current interval. Use the assumption to create a count of how often to drop an event.

It should be appreciated that connections are not really "dropped" in RL1. They are still maintained by monitor 127, but the SPM 106 is not informed of them.

An Exemplary Automatic Monitor To Policy Engine Rate Limiting Mechanism

This section describes a system and method of an automatic monitor 127 to policy engine 102 rate limiting. It should be appreciated that the discussion below is meant by example only and that variations of specific configurations of components are readily apparent to one skilled in the art as being within scope of the invention.

In one preferred embodiment of the invention, the monitor 127 includes automatic rate limiting to the SPM 106. This rate limiting algorithm, referred to as RLE, enhances the RL1 algorithm described, above.

RLE accepts as an input parameter the buffer size for encoding DME data to the SPM 106. An exemplary value is 2 MB. A second input parameter specifies a fraction of the buffer to reserve for rate limiting. An exemplary value is 0.5 (one half). A third input parameter, NB, specifies the number of bytes to write at one time. An exemplary value is 8192.

RLE may be combined with the previously defined RL0 and RL1 options in the section, Description of Monitor Rate Limiting, herein. RLE represents an automatic tuning mechanism for performing the RL1 function, so typically RL1 is not used in conjunction with RLE. RL0 is independent of RL1 and RLE.

The RLE option is useful when the output of the monitor 127 is too great for the SPM 106 to process. RLE protects the SPM from overload of data, and protects the monitor from being back pressured by the SPM 106.

RLE Algorithm

The output section of the preferred monitor 127 implements the RLE algorithm in the follow way:

When writing DME data to a socket for transmission to the SPM 106, the monitor 127 maintains a large output buffer as a queue data structure.

Figure 53:
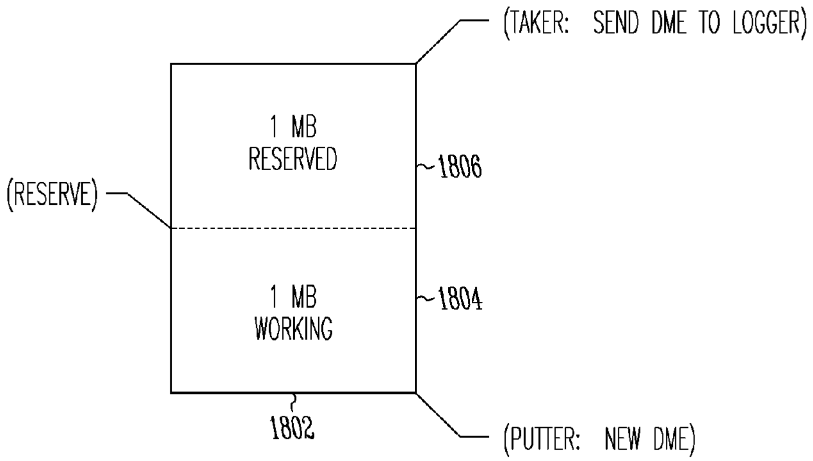
FIG. 53 is a schematic diagram showing a working block and a Ring Buffer reserve block according to the invention.

Referring to FIG. 53, the buffer 1802 is conceptually divided into a working section 1804 and a reserved section 1806. In reality, the entire buffer is treated as one unit, with the "last" part of the buffer containing the reserved section. The monitor tests the output buffer from time to time to see if the reserved section has come into use (see below).

The TCP socket to the SPM 106 is modified to use non-blocking I/O mode, so that the monitor process can tell when the socket is full.

Generated DME data is placed in the output buffer. Every NB bytes, the monitor 127 attempts to write buffered data to the socket. The monitor attempts to write all the data in the output buffer, stopping only when the buffer is empty or the socket is full.

If the buffer is empty, there is no more data to send to the SPM 106, so the monitor continues (the SPM is keeping up with the stream, so rate limiting is not needed).

If the socket is full, the SPM 106 is currently not keeping up with the monitor's production of DME data. The DME data is left in the output buffer and processing continues until another NB bytes of data has been added to the output buffer.

If the DME output buffer is full, the socket is placed in blocking I/O mode, and the harvester must wait until at least NB bytes of data are processed by the SPM before continuing. Note that this condition is rare, because rate limiting occurs as below.

When the monitor 127 determines that a new connection has appeared, it queries the RLE code to see if the output buffer is currently using the reserved section.

If the output buffer is using the working section, the new connection is processed and all the DME data from that connection will be sent to the SPM 106 as it is produced.

If the output buffer's working section is full, and the reserved section is in use, the new connection is processed, but all the DME data from that connection is discarded.

For automatic RLE algorithm, the following should be appreciated (refer to FIG. 53):

The flow goes from Monitor 127 Output to DME encoder to Ring Buffer;

For a new connection:

If Ring Buffer size is greater than Ring Buffer reserve size, then do not send this connection;

else send this connection.

An Exemplary Packet Filter Module Design

The preferred embodiment of the invention provides a packet filter system based on a preferred packet filter module design according to the invention. This section discusses an exemplary packet filter module, Securify Packet Filter Module (SPFM).

It should be appreciated that the discussion herein below is meant by example only and that variations of specific configurations and descriptions are readily apparent to one skilled in the art as being within scope of the invention.

Overview

A Monitor Configuration

One configuration for data capture included a monitor 127 component and a PCAP Library in a User space, and NIC Driver(s) in Kernel space. It has been found that data capture rates were restricted by packet flow through the PCAP library. The monitor 127 would request a packet, which would be copied from the NIC driver to a PCAP buffer and then handed to monitor. This resulted in numerous switches from user to kernel space and yielded limited performance.

SPFM

Then, an SPFM module is introduced in the Kernel space between the PCAP Library of the User space and the NIC Driver(s) of the Kernel space, as follows:

The Securify Packet Filter Module (SPFM) allows a user program to supply thousands of buffers into which the packet stream from the NIC drivers is placed.

This results in an increase in performance due to a significant decrease in context switching from user space to kernel space and visa versa.

No monitor 127 or NIC driver changes required.

The SPFM module may filter packets that are not of interest to the Monitor 127 (see FIG. 50) e.g. non-IP protocol packets.

Modified PCAP Library

The PCAP Library is modified as follows:

The upper interface into monitor remains the same.

A small initialization routine allocates a number of buffers into which SPFM writes packet data.

The modified PCAP Library requests numerous packets from SPFM at a time and gives them to monitor one at a time as requested from monitor 127.

Components

Figure 54:
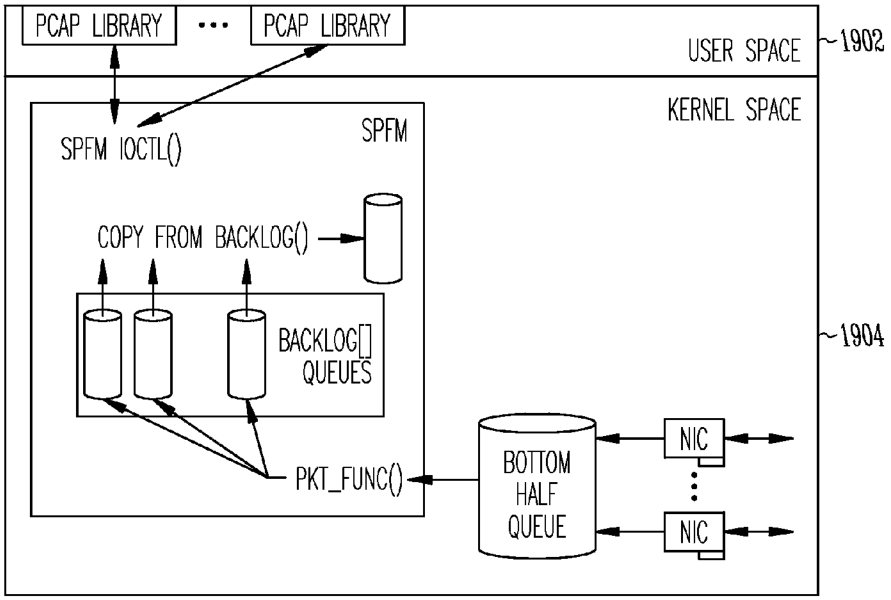
FIG. 54 is a schematic diagram of part of a User Space and a Kernel Space according to the invention.

Referring to FIG. 54, a schematic diagram of part of a User Space 1902 and a Kernel Space 1904 according to the invention, shows a embodiment of the invention whereby up to eight NIC cards and up to eight monitors 127 can connect to a SPFM device.

SPFM Initialization

The initialization process incorporates the following:

SPFM is a module and inserted by startup scripts; and

The command line parameters below are used:

debug=N Debug Level, defaults to 0 use_tty=[0, 1] use tty for debug output, defaults to 0 logfile=filename log debug to a file, default NULL conTime=t1 average connection time for a stream (in jiffies) connection discTime=t2 disconnect timer, used in disabling streams (in jiffies)

lowWater=LLLL set low water mark for capture, default 10,000 hiWater=HHH set high water mark for capture, default 20,000 leaveVlan=1 defaults to 0 since Monitor doesn't recognize vlan tags (yet).

SPFM Packet Initialization

Each buffer has an owner flag set to module.

SPFM Start Capture

PCAP starts capture by issuing a IOCTL_SET_START to the SPFM device. This sets an internal flag that cause SPFM to start capture for the interface that issued the start command.

SPFM Packet Copies

Such IOCTL_GET_NEXT command causes data to be copied from the backlog[ ] queues to the appropriate user space queue. Once copied, the owner flag is switched to user which allows the PCAP Library to access the packet.

SPFM Streams

The preferred embodiment of the invention provides the following innovative SPFM Streams processing.

To maximize the usefulness of captured data, SPFM has the concept of data streams. A stream uses a hash of the SRC and DST IP addresses (in either order). The hash function used has the property that hashID=hash(SRC,DST)=hash (DST,SRC). This hashID is used to identify a stream. It should be appreciated that, such "stream" could be composed of numerous connections between two servers.

In another embodiment of the invention, the hash function includes the destination and source port numbers for UDP and TCP packets, such that hashID=hash(SRC, SrcPort, DST, DstPort)=hash(Dst, DstPort, Src, SrcPort).

A Most Recently Used (MRU) queue is kept for all connections with a given hashID. The hashID indexes into a hash_struct array.

Command line parameters for the streams are as follows:

con Time=t1 average connection time for a stream connection discTime=t2 disconnect timer, used in disabling streams lowWater=LLLL set low water mark for capture, default 10,000 hiWater=HHH set high water mark for capture, default 20,000

It should be appreciated that lowWater=LLLL is the rate limiting point.

It should be appreciated that while the preferred embodiment of the invention uses a hash of addresses, the particular hash chosen, and the choice of SRC and DST is a specific implementation and that it is readily apparent to one skilled in the art that other hashes can equally be used.

It should be appreciated that with the SPFM feature, stream rate limiting (RL) is compatible with Monitor Connections or Network Events, resulting in complete connections being transmitted.

It should further be appreciated that without the SPFM feature, rate limiting occurs at the monitor 127 interface, resulting in random packet loss being very high and a loss of connection integrity.

SPFM Discard Policy

This sub-section describes a preferred embodiment of the invention in the case of limited memory. Following is a list of the SPFM discard policy according to the invention:

Each connection has a hash_state: HASH_UNUSED, HASH_RECEIVING or HASH_DISCARDING.

Initially the hash_state is HASH_UNUSED and switches to HASH_RECEIVING when a stream is first encountered.

When below lowWater all streams are collected.

When above lowWater any new stream of data is ignored. A packet on a current data stream in (HASH_RECEIVING) times out after conTime and is placed into the HASH_DISCARDING state for a period of discTime. This is an attempt to discard data input when above the lowWater mark, but only on rarely used connections.

When above the hiWater mark, all streams are discarded and each discarded stream stays in the discard state for discTime.

SPFM Streams Structures

SPFM Streams Structures is described with reference to FIG. 55, a schematic diagram showing the interaction of a hash_struct 2002 with a mru_struct 2004 according to the invention.

The preferred hashStruct is indexed via a hashID. If the stream has a most recently used (MRU) element already, it is moved to the top of the queue. Otherwise, an element is removed from the bottom of the MRU and placed on the top with a back pointer to the hashStruct.

The following table summarizes processing streams using low water marks (LWM) and high water marks (HWM) according to the invention.

| O-LWM | LWM-HWM | @HWM |
|---|---|---|
| New Stream | No | No |
| Old Stream | Yes | No |
| Timeout | Yes | Yes |

-continued

| O-LWM | LWM-HWM | @HWM |
|---|---|---|
| No New Discards | Yes New Discards | Yes |
| Yes Old Discards | Yes Old Discards | N/A |

Figure 56:
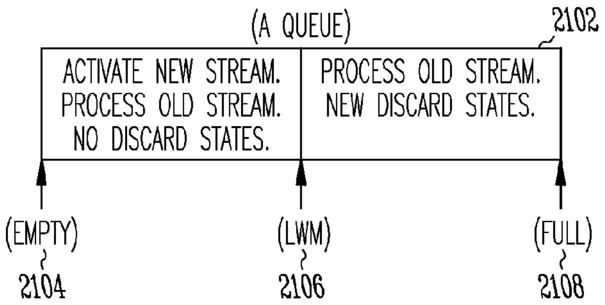
FIG. 56 is a schematic diagram illustrating what happens within a queue at the Empty, LWM, and Full (=HWM) levels according to the invention.

Also, FIG. 56 illustrates what happens within a queue 2102 at the Empty 2104, LWM 2106, and Full 2108 (=HWM) levels. Between empty and the low water mark, the SPFM activates new streams, processes old streams, and has no new discard states. Between the low water mark and the high water mark, SPFM processes old streams and discards new streams.

MRU Circular Queue

Figure 55:
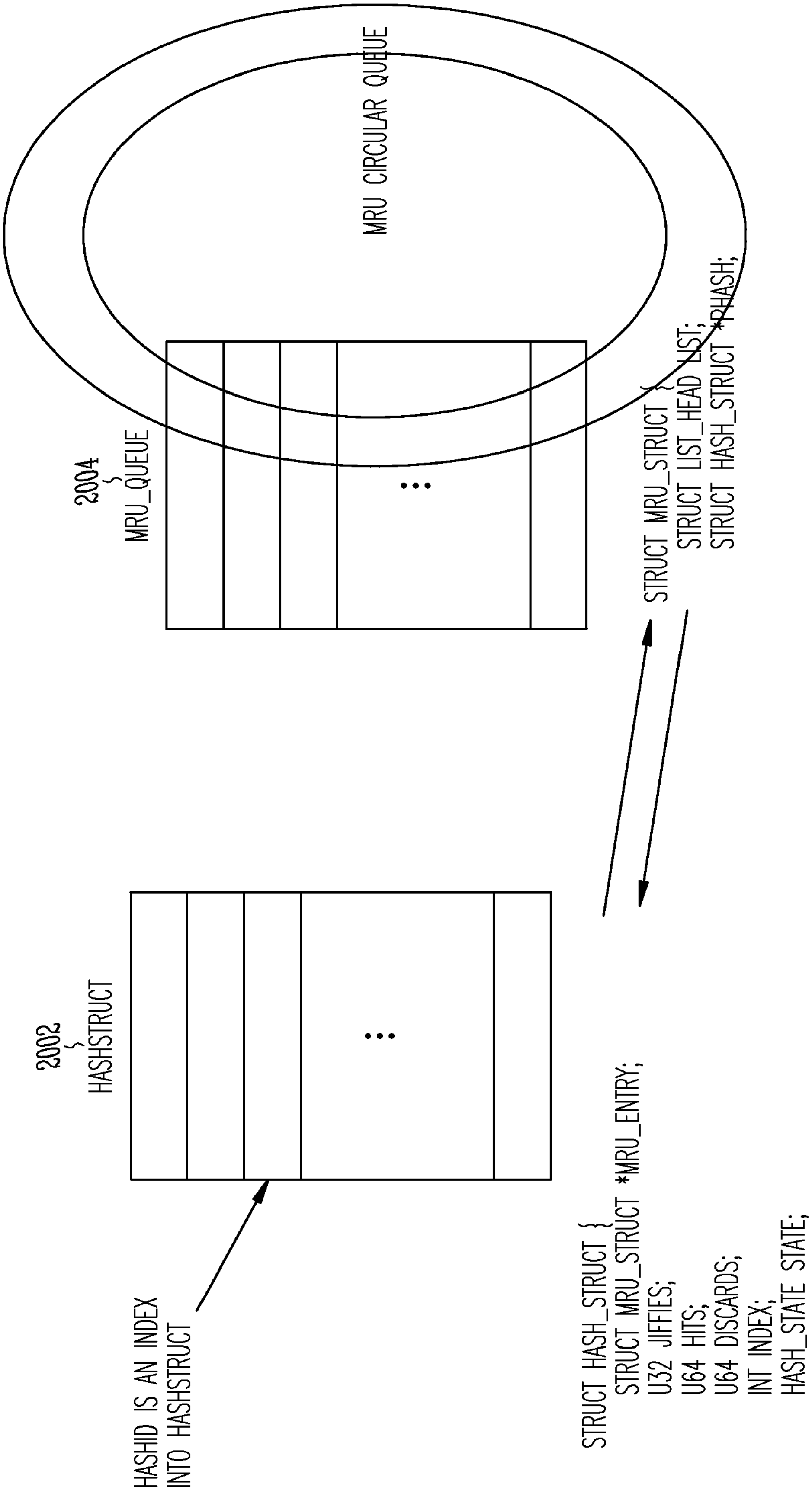
FIG. 55 is a schematic diagram showing the interaction of a hash_struct with a mru_struct according to the invention.

Referring to FIG. 55, also, the SPFM MRU list is like a set of tickets or tokens that limit the number of simultaneous connections (stream/host pairs) that SPFM can handle. When SPFM is rate limiting, only streams with an MRU object are processed. When a stream is processed in non-rate limiting mode, the least recently used (LRU) object is assigned to the stream and set as the MRU for every packet.

It should be appreciated that the MRU feature is optionally added to the RL algorithm.

It should be appreciated that if sizeof mru.q==sizeof hasharray, then the MRU algorithm above has no effect.

SPFM VLAN Tags Background

VLAN tags, as specified in IEEE 802.1Q, typically are used by a switch to create virtual LANs inside a switch (or series of switches). VLAN tags typically consist of 4 bytes of protocol information that is inserted in what would be the TYPE field of an Ethernet frame. Also, the 4 bytes consist of the Tag Protocol Identifier (TPID) and Tag Control Information (TCI).

Innovative SPFM VLAN Support

According to one preferred embodiment of the invention, VLAN configuration is via the setupVlan program, as follows:

| | |
|---|---|
| A) | spfm0=eth1\|eth2 |
| B) | spfm0=eth0:[VLAN1] |
| | spfm1=eth0:[VLAN2] |
| A+B) | spfm0=eth0:[VL1]\|eth1:[VL4] |
| | spfm1=eth0:[VL2]\|eth1:[VL3] |

Figure 57:
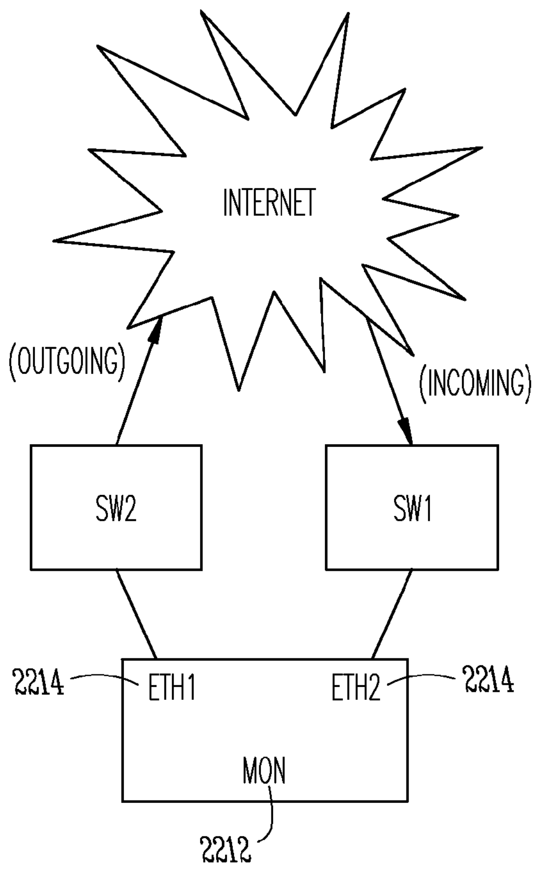
FIG. 57 is a schematic diagram of one device mapping multiple interface cards according to the invention.

Item A is described with reference to FIG. 57, a schematic diagram of one SPFM device 2212 mapping multiple interface cards 2214 according to the invention. The monitor can see all traffic, e.g. in and out, as one SPFM device.

Figure 58:
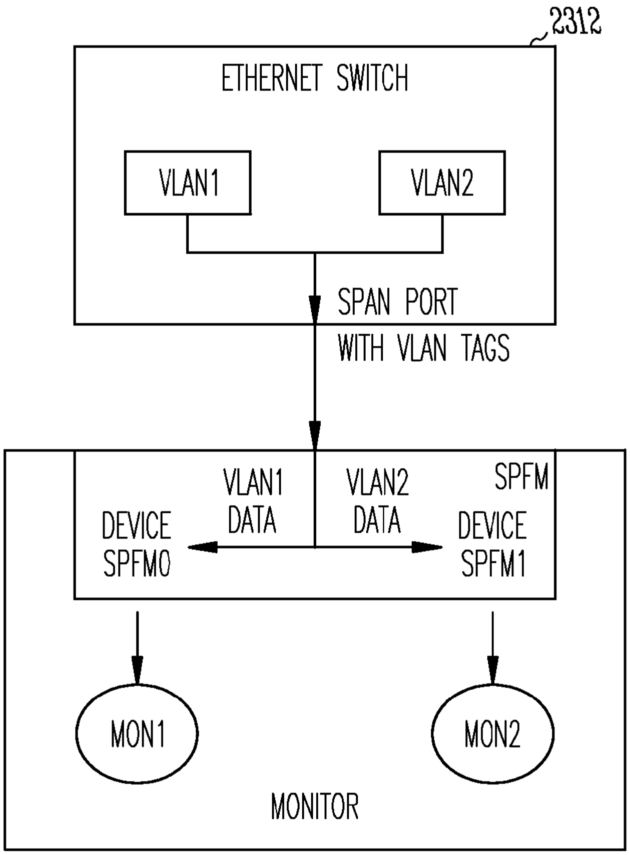
FIG. 58 is a schematic diagram of the VLAN switch according to the invention.

Item B is illustrated in FIG. 58, a schematic diagram of the VLAN switch 2312 according to the invention.

Figure 59:
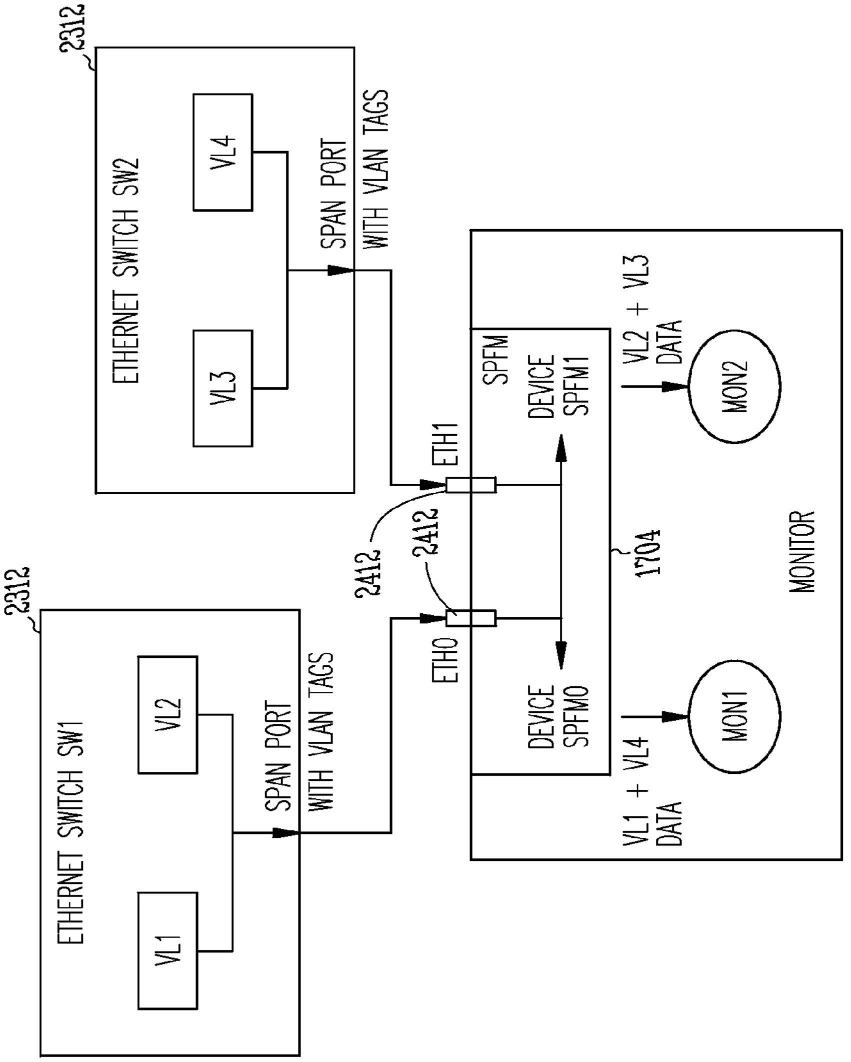
FIG. 59 is a schematic diagram showing both the mapping of multiple interface cards and the VLAN tags according to the invention.

Item A+B is illustrated in FIG. 59, a schematic diagram showing both the mapping of multiple interface cards and the VLAN tags according to the invention.

If the embodiment of the monitor 127 does not support VLAN tags, the tags are stripped off by SPFM. However the VLAN tags are used to show which monitor 127 is interested in which VLAN stream.

Separate portions of multiple Ethernets 2412 can be grouped into a single SPFM device 1704.

Innovative SPFM Physical Replication

Following is a list of considerations for SPFM physical replication according to one preferred embodiment of the invention:

Use a physical layer stream duplication (e.g. a NetOptics Layer1 1:4 optical splitter or an electro-optical Tap for a 1:2 duplication, or an Ethernet hub).

Assign each SPFM device different parts of the hashID stream to capture.

Implementation is simple and cheaper than using a dedicated stream-aware load balancer device (e.g., TopLayer).

Figure 60:
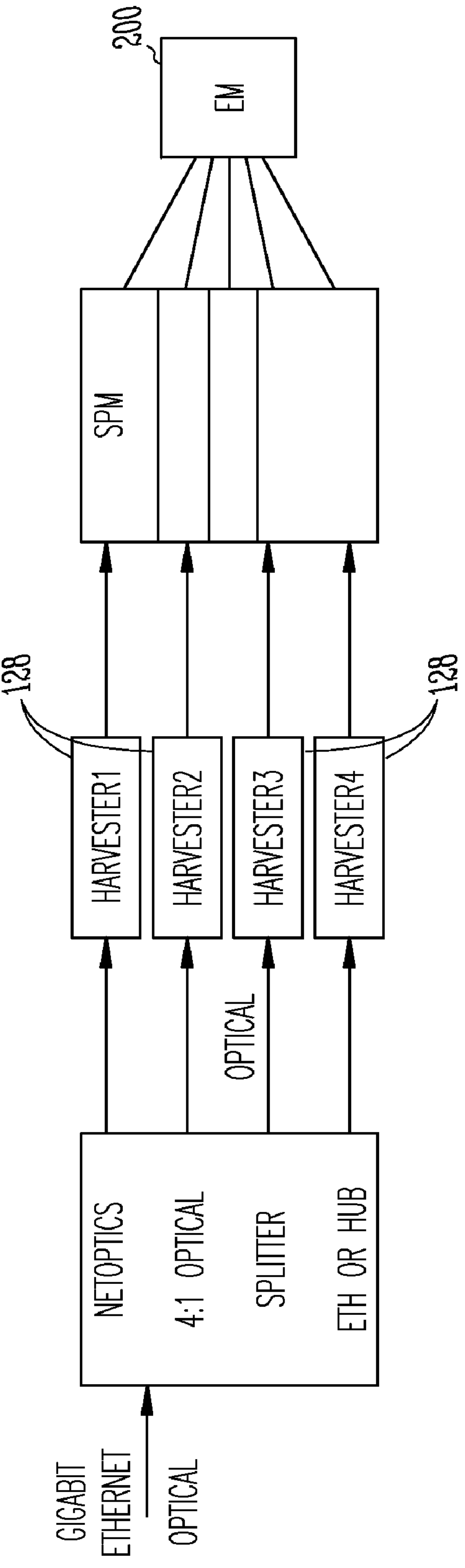
FIG. 60 is a schematic diagram of SPFM physical replication according to the invention.

Refer to FIG. 60, a schematic diagram of SPFM physical replication according to the invention. It should be appreciated that the hash table can be logically split between multiple monitors in the configuration.

That is, according to a preferred embodiment of the invention, a configuration item is added: use_hash_only (UHO) to a region of the Hash table, e.g. [0,127][128,255]. Thus, packets in its respective region are processed as normal; other packets are discarded.

N Boxes (monitors) 128 are configured for all traffic going to all boxes.

Each box is configured with a portion (e.g., 1/N) of the hash space.

Then, the traffic is partitioned amongst the boxes by SPFM.

Figure 61:
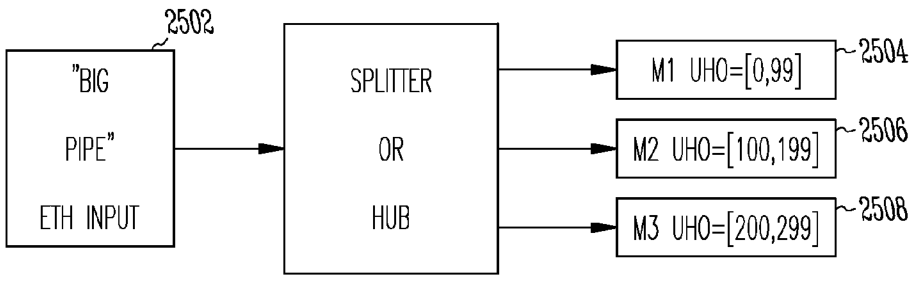
FIG. 61 is a schematic diagram of SPFM physical replication in a Load Balancing application according to the invention.

It should be appreciated that an application of SPFM physical replication is load balancing. Refer to FIG. 61, a schematic diagram of SPFM physical replication in a Load Balancing application according to the invention. FIG. 61 shows a high bandwidth network channel ("Big Pipe") 2502 is thus partitioned 2504, 2506, 2508.

Innovative SPFM Cascade

Figure 62:
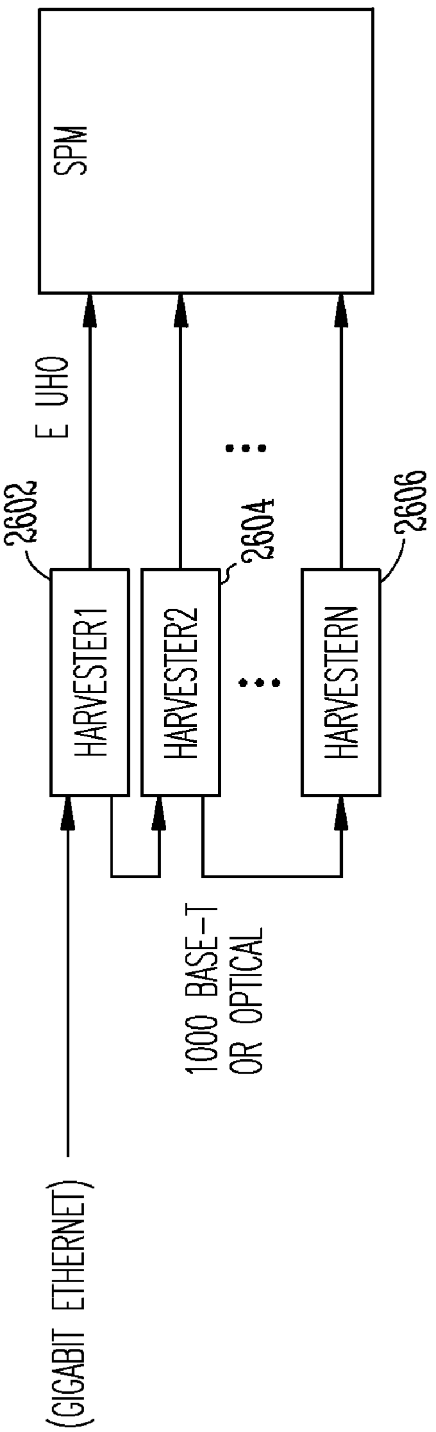
FIG. 62 is a schematic diagram showing a cascading design with each harvester taking a portion of the traffic according to the invention.

One embodiment of the invention uses a cascading design with each harvester taking a portion of the traffic. Refer to FIG. 62.

It should be appreciated that SPFM Cascade design is similar to SPFM Physical Replication. However, for packets in Harvester1 2602, process events as normal. For other packets, send to the next machine, i.e. Harvester2-HarvesterN 2604, 2606.

SPFM Cascade avoids using an expensive splitter device.

It should be appreciated that an embodiment of the SPM Cascade design may use a plurality of network interface cards for both/either input and for output, with a tree-like interconnection, the SPFM VLAN support, described above, being used to combine streams, and other packet selection criteria (e.g., protocol identity) being used to split the output packet data that is destined for the said next machine to a plurality of said next machines.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. An apparatus for rate limiting to control amounts of data in a passive network monitoring pipelined system, said apparatus comprising:

a processor-implemented packet filter module having a first rate limiting mechanism for discarding particular incoming packets and passing on non-discarded packets;

a monitor receiving said non-discarded packets from said packet filter module, said monitor processing said non-discarded packets and outputting corresponding events, said monitor having a second rate limiting mechanism for discarding particular incoming events and passing on non-discarded events;

a logger module having a third rate limiting mechanism for discarding unwanted data and passing on said non-discard events, said logger module within a policy monitor module receiving said outputted corresponding events from said monitor;

and a reporting module, having a fourth rate limiting mechanism wherein said non-discarded events are received from said logger module and combined with like events in a roll-up over a time interval or based on the hierarchy of objects to meet storage requirements.

2. The apparatus of claim 1, wherein said second rate limiting mechanism chooses not to send events to a security manager system when the rate at which such events arrive exceeds a specified limit.

3. The apparatus of claim 1, further comprising means for rate limiting by rolling up input data to an Enterprise Reporting system.

4. The apparatus of claim 3, wherein said means for rate limiting further comprises means for combining said rolled-up data over an interval of time or with rolled-up data from objects higher in the object hierarchy.

5. The apparatus of claim 1, further comprising means for said third rate limiting mechanism to maintain several levels of degraded service such that service degrades slowly, and to degrade service, data is discarded based on a heuristic classification of the input traffic by rule, disposition and logging severity.

6. The apparatus of claim 1, further comprising a logger algorithm for performing a filtering process on data arriving into said logger module of said policy monitor module, said algorithm escalating aggressiveness of said filtering process based on a number of violations a Policy Engine prefers to log, and based on a configuration of said filtering process, wherein said filtering process takes place on a periodic basis over intervals of time, packets, or events, with said filtering process lagging by N of said intervals.

7. The apparatus of claim 6, wherein said configuration is in part defined by, but not limited to, the following parameters:

FILTER_ENABLE, set to 1 enables rate based filtering, and if set to 0 no rate limiting takes place;

FILTER_START_HIGH_VOLUME_VIOL=a first predetermined number, wherein for each interval of time, packets, or events, and once such percentage of violations occur, start filtering the highest volume rule/disposition combinations;

FILTER_START_LOW_PRIORITY=a second predetermined number, wherein for each said interval, and once such percentage of violations is reached, start filtering off all but CRITICAL violations;

FILTER_START_ALL=a third predetermined number, wherein for each said interval, and once such percentage of violations is reached, logging of further violations is disabled;

and FILTER_ER_LAG=a fourth predetermined number, indicating how many of said intervals are logged in a non-limited way even though the filtering threshold is met.

8. The apparatus of claim 1, further comprising means for tracking discarded events, said means for tracking comprising counters to indicate the following during a collection process of the a current interval of time, packets, or events: number of NetworkEvents that are logged;

number of NetworkEvents that are discarded;

and total number of Network Events that occurred.

9. The apparatus of claim 8, wherein information from said collection process is passed on to an Enterprise Manager periodically.

10. The apparatus of claim 4, further comprising an algorithm to combine rollups to fit a predetermined amount of storage wherein:

MT=Target available space;

MC=current available space;

and MaxRollup=maximum interval over which events are currently rolled up, said algorithm operating as follows:

1. If MC<=MT then the algorithm terminates;
2. MaxRollup=N*MaxRollup (where N may be 2 or a greater integer);
3. Combine N adjacent rollups in data into rollups with the new MaxRollup interval;
4. Optionally combine rollups based on object hierarchy, using one or more of the following: Combine host groups with containing host groups;

Combine host groups with containing subnets; and

Combine host groups based on reporting element;

wherein said combination performed by incrementing the count of the containing group and removing the contained group, so that the total count of events remains the same; and
5. Continue with step 1.

11. The apparatus of claim 2, further comprising an algorithm, wherein said algorithm has the following arguments:

Iv=interval length, in seconds;

avgN=number of intervals to time average;

S=maximum events per Iv (input specification);

M=measured events per last Iv;

and Ma=time averaged value of M;

NB=a number of bytes to write at once;

wherein said algorithm comprises the steps of:

measuring M;

rate limiting a succeeding interval of Iv seconds based on M and S;

to smooth out the performance of said algorithm, time averaging M over a last avgN intervals using said algorithm, as follows:

$$Ma=(Ma*(\text{avg}N-1)+M)/\text{avg}N$$

from Ma and S, deriving a number of events that should have been discarded by rate limiting over said last interval, as well as deriving a fraction of said events that should have been discarded, as follows:

$$D=Ma-S, \text{ (when } Ma>S\text{, 0 otherwise); and}$$

$$\text{frac}=D/Ma;$$

for applying said number to a next interval, adding frac to a sum every time there is a new event;

when frac crosses an integer boundary, do not pass on said event.

12. The apparatus of claim 2, wherein said rate limiting mechanism accepts as a first input parameter a buffer size for encoding DME data to said policy monitor module, and accepts as a second input parameter a specification of a fraction of said buffer to reserve for rate limiting.

13. The apparatus of claim 12, further comprising an algorithm, said algorithm comprising the steps of: when writing DME data to a socket for transmission to said policy monitor module, said monitor maintaining a large output buffer as a queue data structure; conceptually dividing said buffer into a working section and a reserved section;

modifying a TCP socket to said policy monitor module to use non-blocking I/O mode, so that said monitor process can determine when said socket is full;

placing generated DME data in said output buffer;

every NB bytes, said monitor attempting to write said buffered data to said socket, stopping only when said buffer is empty or said socket is full;

if said buffer is empty, said monitor continue processing;

if said socket is full, leaving said DME data in said output buffer and continue processing until another NB bytes of data is added to said output buffer;

if said output buffer is full, placing said socket in blocking I/O mode, whereby said monitor waits until at least NB bytes of data are processed by said policy monitor module before continuing processing;

when said monitor determines a new event appears, providing means for said monitor determining if said output buffer is currently using said reserved section;

if said output buffer is using said working section, then processing said new event and sending all DME data from said event to said policy monitor module as it is produced.

14. The apparatus of claim 1, wherein said packet filter module further comprises: a streams process, wherein said streams process comprises the following steps:

a stream using a predetermined hash for identifying said stream;

optionally keeping a most recently used (MRU) queue for all events with a given hashID, wherein said hashID indexes into a hash_struct array; and providing command line parameters for streams as follows:

conTime=t1, average connection time for a stream connection;\ discTime=t2, disconnect timer, used in disabling streams;

lowWater=LLLL, set low water mark for capture; and hiWater=HHH, set high water mark for capture;

wherein lowWater=LLLL is a rate limiting point;

a discard policy, comprising:

each event has a hash_state: HASH_UNUSED, HASH_RECEIVING or HASH_DISCARDING;

initially said hash_state is HASH_UNUSED and switches to HASH_RECEIVING when a stream is first encountered;

when below lowWater all streams are collected;

when above lowWater any new stream of data is ignored, wherein a packet on a current data stream in (HASH_RECEIVING) times out after conTime and is placed into said HASH_DISCARDING state for a period of discTime; and when above the hiWater mark, all streams are discarded and each discarded stream stays in said HASH_DISCARDING state for said discTime.

15. The apparatus of claim 14, wherein if an MRU queue is kept, and wherein said hashStruct is associated with an element of said MRU queue, then said MRU element is moved to the top of said MRU queue when said hashStruct is referenced by data in an associated stream, or wherein if said hashStruct does not have an associated MRU element when data arrives on said stream, then a second MRU element is removed from the bottom of said MRU queue, said second MRU element disassociated with any other hashStruct, and associated with said hashStruct, and said second MRU element is moved to the top of said MRU queue.

16. The apparatus of claim 15, further providing an MRU circular queue, wherein when during rate limiting only streams with an MRU object are processed, and when a stream is processed in non-rate limiting mode, a least recently used (LRU) object is assigned to said stream and set as the MRU for every packet.

17. A method for rate limiting to control amounts of data in a passive network monitoring pipelined system, said method comprising:

providing a processor-implemented packet filter module having a first rate limiting mechanism for discarding particular incoming packets and passing on non-discarded packets;

providing a monitor receiving said non-discarded packets from said packet filter module, said monitor processing said non-discarded packets and outputting corresponding events, said monitor having a second rate limiting mechanism for discarding particular incoming events and passing on non-discarded events;

providing a logger module having a third rate limiting mechanism for discarding unwanted data and passing on said non-discard events, said logger module within a policy monitor module receiving said outputted corresponding events from said monitor;

and providing a rate limiting module, having a fourth rate limiting mechanism wherein said non-discarded events are received from said logger module and abstracted over a predetermined time interval to meet storage requirements.

18. The method of claim 17, wherein said second rate limiting mechanism chooses not to send events to a security manager system when the rate at which such events arrive exceeds a specified limit.

19. The method of claim 17, further comprising rate limiting by rolling up input data to an Enterprise Reporting system.

20. The method of claim 19, wherein said rate limiting further comprises means for combining said rolled-up data over an interval of time or with rolled-up data from objects higher in the object hierarchy.

21. The method of claim 17, further comprising said third rate limiting mechanism maintaining several levels of degraded service such that service degrades slowly, and to degrade service, discarding based on a heuristic classification of the input traffic by rule, disposition, and logging severity.

22. The method of claim 17, further comprising providing a logger algorithm for performing a filtering process on data arriving into said logger module of said policy monitor module, said algorithm escalating aggressiveness of said filtering process based on a number of violations a Policy Engine prefers to log, and based on a configuration of said filtering process, wherein said filtering process takes place on a periodic basis over intervals of time, packets, or events, with said filtering process lagging by N of said intervals.

23. The method of claim 22, wherein said configuration is in part defined by, but not limited to, the following parameters:

FILTER_ENABLE, set to 1 enables rate based filtering, and if set to 0 no rate limiting takes place;

FILTER_START_HIGH_VOLUME_VIOL=a first predetermined number, wherein for each interval of time, packets, or events, and once such percentage of violations occur, start filtering the highest volume rule/disposition combinations;

FILTER_START_LOW_PRIORITY=a second predetermined number, wherein for each said interval, and once such percentage of violations is reached, start filtering off all but CRITICAL violations;

FILTER_START_ALL=a third predetermined number, wherein for each said interval, and once such percentage of violations is reached, logging of further violations is disabled;

and FILTER_ER_LAG=a fourth predetermined number, indicating how many of said intervals are logged in a non-limited way even though the filtering threshold is met.

24. The method of claim 17, further comprising means for tracking discarded events, said tracking comprising counters to indicate the following during a collection process of the a current interval of time, packets, or events:

number of NetworkEvents that are logged;

number of NetworkEvents that are discarded;

and total number of Network Events that occurred.

25. The method of claim 24, wherein information from said collection process is passed on to an Enterprise Manager periodically.

26. The method of claim 18, further comprising providing an algorithm, wherein said algorithm has the following arguments:

Iv=interval length, in seconds;

avgN=number of intervals to time average;

S=maximum events per Iv (input specification);

M=measured events per last Iv; and

Ma=time averaged value of M;

NB=a number of bytes to write at once;

wherein said algorithm comprises the steps of: measuring M;

rate limiting a succeeding interval of Iv seconds based on M and S;

to smooth out the performance of said algorithm, time averaging M over a last avgN intervals using said algorithm, as follows:

$$Ma=(Ma*(\text{avg}N-1)+M)/\text{avg}N$$

from Ma and S, deriving a number of events that should have been discarded by rate limiting over said last interval, as well as deriving a fraction of said events that should have been discarded, as follows:

$$D=Ma-S, \text{ (when } Ma>\text{S, 0 otherwise); and}$$

$$\text{frac}=D/Ma;$$

for applying said number to a next interval, adding frac to a sum every time there is a new event;

when frac crosses an integer boundary, do not pass on said event.

27. The method of claim 18, wherein said rate limiting mechanism accepts as a first input parameter a buffer size for encoding DME data to said policy monitor module, and accepts as a second input parameter a specification of a fraction of said buffer to reserve for rate limiting.

28. The method of claim 27, further comprising providing an algorithm, said algorithm comprising the steps of:

when writing DME data to a socket for transmission to said policy monitor module, said monitor maintaining a large output buffer as a queue data structure;

conceptually dividing said buffer into a working section and a reserved section;

modifying a TCP socket to said policy monitor module to use non-blocking I/O mode, so that said monitor process can determine when said socket is full;

placing generated DME data in said output buffer;

every NB bytes, said monitor attempting to write said buffered data to said socket, stopping only when said buffer is empty or said socket is full;

if said buffer is empty, said monitor continue processing;

if said socket is full, leaving said DME data in said output buffer and continue processing until another NB bytes of data is added to said output buffer;

if said output buffer is full, placing said socket in blocking I/O mode, whereby said monitor waits until at least NB bytes of data are processed by said policy monitor module before continuing processing;

when said monitor determines a new event appears, providing means for said monitor determining if said output buffer is currently using said reserved section;

if said output buffer is using said working section, then processing said new event and sending all DME data from said event to said policy monitor module as it is produced.

29. The method of claim 17, wherein said packet filter module further comprises:

a streams process, wherein said streams process comprises the following steps:

a stream using a predetermined hash for identifying said stream;

optionally keeping a most recently used (MRU) queue for all events with a given hashID, wherein said hashID indexes into a hash_struct array; and providing command line parameters for streams as follows:

conTime=t1, average connection time for a stream connection;

discTime=t2, disconnect timer, used in disabling streams;

lowWater=LLLL, set low water mark for capture; and hiWater=HHH, set high water mark for capture; wherein lowWater=LLLL is a rate limiting point;

a discard policy, comprising:

each event has a hash_state: HASH_UNUSED, HASH_RECEIVING or HASH_DISCARDING;

initially said hash_state is HASH_UNUSED and switches to HASH_RECEIVING when a stream is first encountered;

when below lowWater all streams are collected;

when above lowWater any new stream of data is ignored, wherein a packet on a current data stream in (HASH_RECEIVING) times out after conTime and is placed into said HASH_DISCARDING state for a period of discTime; and when above the hiWater mark, all streams are discarded and each discarded stream stays in said HASH_DISCARDING state for said discTime.

30. The method of claim 29, wherein if an MRU queue is kept, and wherein said hashStruct is associated with an element of said MRU queue, then said MRU element is moved to the top of said MRU queue when said hashStruct is referenced by data in an associated stream, or wherein if said hashStruct does not have an associated MRU element when data arrives on said stream, then a second MRU element is removed from the bottom of said MRU queue, said second MRU element disassociated with any other hashStruct, and associated with this said hashStruct, and said second MRU element is moved to the top of said MRU queue.

31. The method of claim 30, further comprising providing an MRU circular queue, wherein when during rate limiting only streams with an MRU object are processed, and when a stream is processed in non-rate limiting mode, a least recently used (LRU) object is assigned to said stream and set as the MRU for every packet.

32. The method of claim 20, further comprising providing an algorithm to combine rollups to fit a predetermined amount of storage wherein: MT=Target available space;

MC=current available space;

and MaxRollup=maximum interval over which events are currently rolled up, said algorithm operating as follows:

1. If MC<=MT then the algorithm terminates;
2. MaxRollup=N*MaxRollup (where N may be 2 or a greater integer);
3. Combine N adjacent rollups in data into rollups with the new MaxRollup interval;
4. Optionally combine rollups based on object hierarchy, using one or more of the following:

Combine host groups with containing host groups;

Combine host groups with containing subnets;

and Combine host groups based on reporting element;

wherein said combination performed by incrementing the count of the containing group and removing the contained group, so that the total count of events remains the same;

and

5. Continue with step 1.

* * * * *

UNITED STATES PATENT AND TRADEMARK OFFICE

CERTIFICATE OF CORRECTION

PATENT NO. : 7,917,647 B2
APPLICATION NO. : 10/453824
DATED : March 29, 2011
INVENTOR(S) : Cooper et al.

It is certified that error appears in the above-identified patent and that said Letters Patent is hereby corrected as shown below:

On page 2, under “Other Publications”, in column 2, line 3, delete “Admissibilty” and insert -- Admissibility --, therefor.

On page 2, under “Other Publications”, in column 2, line 46, delete “criminats,” and insert -- criminals, --, therefor.

In column 47-48, line 22, delete “alphabetics/” and insert -- alphabetics --, therefor.

In column 90, line 13, delete “Descriptioin” and insert -- Description --, therefor.

In column 105-106, line 27, delete “Fialure” and insert -- Failure --, therefor.

In column 110, line 67, delete “element” and insert -- element. --, therefor.

In column 112, line 37, delete “element” and insert -- element. --, therefor.

In column 123, line 67 and in column 124, line 1, in Claim 1, delete “non-discard” and insert -- non-discarded --, therefor.

In column 124, line 61, in Claim 8, delete “of the a” and insert -- of the --, therefor.

In column 126, lines 30-31, in Claim 14, delete “connection;\” and insert -- connection; --, therefor.

In column 128, line 11, in Claim 24, delete “of the a” and insert -- of the --, therefor.

Signed and Sealed this
Twelfth Day of July, 2011

David J. Kappos

*Director of the United States Patent and Trademark Office*